United States Patent
Thomas et al.

(10) Patent No.: US 10,387,879 B2
(45) Date of Patent: Aug. 20, 2019

(54) PAYMENT IDENTIFICATION CODE AND PAYMENT SYSTEM USING THE SAME

(71) Applicant: THE CLEARING HOUSE PAYMENTS COMPANY L.L.C., New York, NY (US)

(72) Inventors: George F. Thomas, Staten Island, NY (US); Albert G. Wood, Kings Park, NY (US); Joseph S. Pawelczyk, Morris Plains, NJ (US); Kenneth H. Friedman, Marlboro, NJ (US); Paul Palmese, Oceanside, NY (US)

(73) Assignee: The Clearing Housse Payments Company L.L.C., New York, NY (US)

( * ) Notice: Subject to any disclaimer, the term of this patent is extended or adjusted under 35 U.S.C. 154(b) by 0 days.

(21) Appl. No.: 14/805,589

(22) Filed: Jul. 22, 2015

(65) Prior Publication Data

US 2015/0324801 A1    Nov. 12, 2015

Related U.S. Application Data

(63) Continuation of application No. 14/514,124, filed on Oct. 14, 2014, now abandoned, which is a
(Continued)

(51) Int. Cl.
*G06Q 20/40* (2012.01)
*G06Q 20/38* (2012.01)
(Continued)

(52) U.S. Cl.
CPC ......... *G06Q 20/4012* (2013.01); *G06Q 20/02* (2013.01); *G06Q 20/023* (2013.01);
(Continued)

(58) Field of Classification Search
CPC ................. G06Q 40/00; G06F 17/60
(Continued)

(56) References Cited

U.S. PATENT DOCUMENTS 3,852,571 A   12/1974  Hall et al.
4,201,978 A   5/1980   Nally et al.
(Continued)

FOREIGN PATENT DOCUMENTS

CA    2131667           6/1995
EP    0 029 733 A2      6/1981
(Continued)

OTHER PUBLICATIONS

EP 03 72 8532 European Search Report dated Feb. 15, 2008, 3 pages.
(Continued)

*Primary Examiner* — Clifford B Madamba
(74) *Attorney, Agent, or Firm* — Merchant & Gould P.C.

(57) ABSTRACT

A method for effecting electronic payment, safeguarding banking and account information, while utilizing existing payment systems. The method comprises generating a system routing number and a payment identification code (PIC) relating to the beneficiary's account information, distributing payment identification codes to the existing payment system and financial institutions owning the account related to the payment identification codes, and the originator receiving a system routing number and the beneficiary's PIC number. The method also includes the originator communicating a payment instruction to a financial institution of the originator, wherein the payment instruction includes the system routing number beneficiary's payment identification code, the originator's financial institution receiving the payment instruction from the originator, wherein if the
(Continued)

received PIC matches the originator's financial institution internal list of PICs, the originator's financial institution performs an "on us" transaction, and transmitting a payment instruction to an existing payment system in a case where the received PIC does not match originator's financial institution internal list of PICs. The method also includes the existing payment system validating the received PIC, wherein if the PIC is invalid, the payment instruction is returned to the originator's financial institution, converting the PIC and system routing number to a receiving payment instruction in a case where the PIC is a valid PIC, wherein the receiving payment instruction includes the beneficiary's financial institution's routing number and the beneficiary's account number. The existing payment system transmits the receiving payment instruction to a financial institution of the beneficiary, that financial institution credits the beneficiary's account if no problem exists, and otherwise returns a receiving payment instruction to the existing payment system. Upon receipt of the returned receiving payment instruction, the existing payment system translates the receiving payment instruction into the payment instruction prior to transmitting the payment instruction back to originator's financial institution.

37 Claims, 44 Drawing Sheets

Related U.S. Application Data continuation of application No. 14/181,474, filed on Feb. 14, 2014, now abandoned, which is a continuation of application No. 13/748,448, filed on Jan. 23, 2013, now abandoned, which is a continuation of application No. 13/116,584, filed on May 26, 2011, now abandoned, which is a continuation of application No. 10/420,726, filed on Apr. 23, 2003, now Pat. No. 7,979,348.

(60) Provisional application No. 60/374,936, filed on Apr. 23, 2002.

(51) Int. Cl.
    *G06Q 20/10*          (2012.01)
    *G06Q 20/02*          (2012.01)
    *G06Q 20/04*          (2012.01)
    *G06Q 20/14*          (2012.01)
    *G06Q 40/00*          (2012.01)

(52) U.S. Cl.
    CPC ........... *G06Q 20/027* (2013.01); *G06Q 20/04* (2013.01); *G06Q 20/10* (2013.01); *G06Q 20/102* (2013.01); *G06Q 20/108* (2013.01); *G06Q 20/14* (2013.01); *G06Q 20/382* (2013.01); *G06Q 20/385* (2013.01); *G06Q 20/407* (2013.01); *G06Q 40/00* (2013.01)

(58) Field of Classification Search
    USPC .................................................. 705/44, 72
    See application file for complete search history.

(56) References Cited

U.S. PATENT DOCUMENTS

| | | |
|---|---|---|
| 4,205,780 A | 6/1980 | Burns et al. |
| 4,264,808 A | 4/1981 | Owens et al. |
| 4,268,715 A | 5/1981 | Atalla |
| 4,270,042 A | 5/1981 | Case |
| 4,321,672 A | 3/1982 | Braun et al. |
| 4,326,258 A | 4/1982 | de la Guardia |
| 4,404,649 A | 9/1983 | Nunley et al. |
| 4,417,136 A | 11/1983 | Rushby et al. |
| 4,457,015 A | 6/1984 | Nally et al. |
| 4,491,725 A | 1/1985 | Pritchard |
| 4,500,750 A | 2/1985 | Elander et al. |
| 4,523,330 A | 6/1985 | Cain |
| 4,555,617 A | 11/1985 | Brooks et al. |
| 4,578,530 A | 3/1986 | Zeidler |
| 4,602,936 A | 7/1986 | Töpfl et al. |
| 4,617,457 A | 10/1986 | Granzow et al. |
| 4,652,990 A | 3/1987 | Pailen et al. |
| 4,672,377 A | 6/1987 | Murphy et al. |
| 4,673,802 A | 6/1987 | Ohmae et al. |
| 4,675,815 A | 6/1987 | Kuroki et al. |
| 4,680,803 A | 7/1987 | Dilella |
| 4,694,147 A | 9/1987 | Amemiya et al. |
| 4,723,283 A | 2/1988 | Nagasawa et al. |
| 4,771,460 A | 3/1988 | Tamada et al. |
| 4,745,267 A | 5/1988 | Davis et al. |
| 4,747,058 A | 5/1988 | Ho |
| 4,748,557 A | 5/1988 | Tamada et al. |
| 4,750,201 A | 6/1988 | Hodgson et al. |
| 4,755,940 A | 7/1988 | Brachtl et al. |
| 4,757,543 A | 7/1988 | Tamada et al. |
| 4,758,530 A | 7/1988 | Schubert |
| 4,799,156 A | 1/1989 | Shavit et al. |
| 4,810,866 A | 3/1989 | Lord, Jr. |
| 4,823,264 A | 4/1989 | Deming |
| 4,843,220 A | 6/1989 | Haun |
| 4,858,121 A | 8/1989 | Barber et al. |
| 4,882,779 A | 11/1989 | Rahtgen |
| 4,888,812 A | 12/1989 | Dinan et al. |
| 4,910,774 A | 3/1990 | Barakat |
| 4,912,762 A | 3/1990 | Lee et al. |
| 4,922,503 A | 5/1990 | Leone |
| 4,926,325 A | 5/1990 | Benton et al. |
| 4,941,125 A | 7/1990 | Boyne |
| 4,960,981 A | 10/1990 | Benton et al. |
| 4,961,142 A | 10/1990 | Elliott et al. |
| 4,962,531 A | 10/1990 | Sipman et al. |
| 4,977,595 A | 12/1990 | Ohta et al. |
| 4,985,921 A | 1/1991 | Schwartz |
| 5,003,594 A | 3/1991 | Shinagawa |
| 5,014,311 A | 5/1991 | Schrenk |
| 5,016,277 A | 5/1991 | Hamilton |
| 5,053,607 A | 10/1991 | Carlson et al. |
| 5,054,096 A | 10/1991 | Belzer |
| 5,081,680 A | 1/1992 | Bennett |
| 5,091,968 A | 2/1992 | Higgins et al. |
| 5,093,787 A | 3/1992 | Simmons |
| 5,095,480 A | 3/1992 | Fenner |
| 5,111,395 A | 5/1992 | Smith et al. |
| 5,122,950 A | 6/1992 | Benton et al. |
| 5,123,047 A | 6/1992 | Rosenow |
| 5,144,115 A | 9/1992 | Yoshida |
| 5,159,548 A | 10/1992 | Caslavka |
| 5,159,592 A | 10/1992 | Perkins |
| 5,163,098 A | 11/1992 | Dahbura |
| 5,168,444 A | 12/1992 | Cukor et al. |
| 5,170,466 A | 12/1992 | Rogan et al. |
| 5,173,594 A | 12/1992 | McClure |
| 5,175,682 A | 12/1992 | Higashiyama et al. |
| 5,175,766 A | 12/1992 | Hamilton |
| 5,185,798 A | 2/1993 | Hamada et al. |
| 5,187,750 A | 2/1993 | Behera |
| 5,195,133 A | 3/1993 | Kapp et al. |
| 5,198,975 A | 3/1993 | Baker |
| 5,200,993 A | 4/1993 | Wheeler et al. |
| 5,204,811 A | 4/1993 | Bednar et al. |
| 5,214,697 A | 5/1993 | Saito |
| 5,220,501 A | 6/1993 | Lawlor et al. |
| 5,231,569 A | 7/1993 | Myatt et al. |
| 5,233,547 A | 8/1993 | Kapp et al. |
| 5,233,656 A | 8/1993 | Langrand et al. |
| 5,235,433 A | 8/1993 | Clarkson et al. |
| 5,237,158 A | 8/1993 | Kern et al. |
| 5,237,159 A | 8/1993 | Stephens et al. |
| 5,237,620 A | 8/1993 | Deaton et al. |

(56) References Cited

U.S. PATENT DOCUMENTS

| | | |
|---|---|---|
| 5,241,600 A | 8/1993 | Hillis |
| 5,256,863 A | 10/1993 | Ferguson et al. |
| 5,259,025 A | 11/1993 | Monroe et al. |
| 5,262,942 A | 11/1993 | Earle |
| 5,265,007 A | 11/1993 | Barnhard et al. |
| 5,274,567 A | 12/1993 | Kallin et al. |
| 5,283,829 A | 2/1994 | Anderson |
| 5,287,497 A | 2/1994 | Behera |
| 5,317,637 A | 5/1994 | Pichlmaier et al. |
| 5,321,238 A | 6/1994 | Kamata et al. |
| 5,321,751 A | 6/1994 | Ray et al. |
| 5,321,816 A | 6/1994 | Rogan et al. |
| 5,326,959 A | 7/1994 | Perazza |
| 5,329,589 A | 7/1994 | Fraser et al. |
| 5,337,358 A | 8/1994 | Axelrod et al. |
| 5,341,428 A | 8/1994 | Schatz |
| 5,343,529 A | 8/1994 | Goldfine et al. |
| 5,345,090 A | 9/1994 | Hludzinski |
| 5,373,550 A | 12/1994 | Campbell et al. |
| 5,383,113 A | 1/1995 | Kight et al. |
| 5,396,558 A | 3/1995 | Ishiguro et al. |
| 5,408,531 A | 4/1995 | Nakajima |
| 5,412,190 A | 5/1995 | Josephson et al. |
| 5,426,281 A | 6/1995 | Abecassis |
| 5,434,928 A | 7/1995 | Wagner et al. |
| 5,436,970 A | 7/1995 | Ray et al. |
| 5,440,634 A | 8/1995 | Jones et al. |
| 5,444,794 A | 8/1995 | Uhland, Sr. |
| 5,446,796 A | 8/1995 | Ishiguro et al. |
| 5,453,601 A | 9/1995 | Rosen |
| 5,454,575 A | 10/1995 | Del Buono |
| 5,455,407 A | 10/1995 | Rosen |
| 5,457,747 A | 10/1995 | Drexler et al. |
| 5,465,206 A | 11/1995 | Hilt et al. |
| 5,473,143 A | 12/1995 | Vak et al. |
| 5,479,510 A | 12/1995 | Olsen et al. |
| 5,484,988 A | 1/1996 | Hills et al. |
| 5,502,765 A | 3/1996 | Ishiguro et al. |
| 5,506,691 A | 4/1996 | Bednar et al. |
| 5,523,167 A | 6/1996 | Hunt et al. |
| 5,524,073 A | 6/1996 | Stambler |
| 5,528,705 A | 6/1996 | Reasoner, Jr. et al. |
| 5,532,464 A | 7/1996 | Josephson et al. |
| 5,539,822 A | 7/1996 | Lett |
| 5,539,825 A | 7/1996 | Akiyama et al. |
| 5,544,043 A | 8/1996 | Miki et al. |
| 5,544,255 A | 8/1996 | Smithies et al. |
| 5,557,518 A | 9/1996 | Rosen |
| 5,577,121 A | 11/1996 | Davis et al. |
| 5,590,038 A | 12/1996 | Pitroda |
| 5,594,226 A | 1/1997 | Steger |
| 5,596,642 A | 1/1997 | Davis et al. |
| 5,602,933 A | 2/1997 | Blackwell et al. |
| 5,602,936 A | 2/1997 | Green et al. |
| 5,604,640 A | 2/1997 | Zipf et al. |
| 5,604,802 A | 2/1997 | Holloway |
| 5,608,800 A | 3/1997 | Hoffmann et al. |
| 5,613,001 A | 3/1997 | Bakhoum |
| 5,615,269 A | 3/1997 | Micali |
| 5,621,796 A | 4/1997 | Davis et al. |
| 5,621,797 A | 4/1997 | Rosen |
| 5,623,547 A | 4/1997 | Jones et al. |
| 5,625,694 A | 4/1997 | Lee et al. |
| 5,629,981 A | 5/1997 | Nerlikar |
| 5,633,930 A | 5/1997 | Davis et al. |
| 5,642,419 A | 6/1997 | Rosen |
| 5,649,117 A | 6/1997 | Landry |
| 5,647,017 A | 7/1997 | Smithies et al. |
| 5,649,116 A | 7/1997 | McCoy et al. |
| 5,652,786 A | 7/1997 | Rogers |
| 5,657,389 A | 8/1997 | Houvener |
| 5,657,396 A | 8/1997 | Rudolph et al. |
| 5,659,616 A | 8/1997 | Sudia |
| 5,668,897 A | 9/1997 | Stolfo |
| 5,673,333 A | 9/1997 | Johnston |
| 5,677,955 A | 10/1997 | Doggett et al. |
| 5,682,549 A | 10/1997 | Tanaka et al. |
| 5,684,965 A | 11/1997 | Pickering |
| 5,691,524 A | 11/1997 | Josephson |
| 5,699,528 A | 12/1997 | Hogan |
| 5,703,344 A | 12/1997 | Bezy et al. |
| 5,708,810 A | 1/1998 | Kern et al. |
| 5,710,887 A | 1/1998 | Chelliah et al. |
| 5,715,298 A | 2/1998 | Rogers |
| 5,717,868 A | 2/1998 | James |
| 5,732,400 A | 3/1998 | Mandler et al. |
| 5,742,668 A | 4/1998 | Pepe et al. |
| 5,742,888 A | 4/1998 | Fuchiwaki et al. |
| 5,751,842 A | 5/1998 | Riach et al. |
| 5,754,673 A | 5/1998 | Brooks et al. |
| 5,760,916 A | 6/1998 | Dellert et al. |
| 5,778,178 A | 7/1998 | Arunachalam |
| 5,781,654 A | 7/1998 | Carney |
| 5,783,808 A | 7/1998 | Josephson |
| 5,784,503 A | 7/1998 | Bleecker, III et al. |
| 5,784,610 A | 7/1998 | Copeland, III et al. |
| 5,787,403 A | 7/1998 | Randle |
| 5,790,260 A | 8/1998 | Myers |
| 5,790,790 A | 8/1998 | Smith et al. |
| 5,793,869 A | 8/1998 | Claflin, Jr. |
| 5,832,460 A | 11/1998 | Bednar et al. |
| 5,832,463 A | 11/1998 | Funk |
| 5,832,464 A | 11/1998 | Houvener et al. |
| 5,848,400 A | 12/1998 | Chang |
| 5,857,034 A | 1/1999 | Tsuchiya et al. |
| 5,870,456 A | 2/1999 | Rogers |
| 5,870,724 A | 2/1999 | Lawlor et al. |
| 5,870,725 A | 2/1999 | Bellinger et al. |
| 5,873,072 A | 2/1999 | Kight et al. |
| 5,884,271 A | 3/1999 | Pitroda |
| 5,893,080 A | 4/1999 | McGurl et al. |
| 5,903,874 A | 5/1999 | Leonard et al. |
| 5,903,880 A | 5/1999 | Biffar |
| 5,903,881 A | 5/1999 | Schrader et al. |
| 5,910,988 A | 6/1999 | Ballard |
| 5,915,023 A | 6/1999 | Berstein |
| 5,917,965 A | 6/1999 | Cahill et al. |
| 5,920,847 A | 7/1999 | Kolling et al. |
| 5,925,865 A | 7/1999 | Steger |
| 5,926,288 A | 7/1999 | Dellert et al. |
| 5,930,778 A | 7/1999 | Geer |
| 5,937,396 A | 8/1999 | Konya |
| 5,940,844 A | 8/1999 | Cahill et al. |
| 5,956,700 A | 9/1999 | Landry |
| 5,963,647 A | 10/1999 | Downing et al. |
| 5,963,925 A | 10/1999 | Kolling et al. |
| 5,973,731 A | 10/1999 | Schwab |
| 5,978,780 A | 11/1999 | Watson |
| 5,987,500 A | 11/1999 | Arunachalam |
| 5,999,625 A | 12/1999 | Bellare et al. |
| 6,006,208 A | 12/1999 | Forst et al. |
| 6,021,202 A | 2/2000 | Anderson et al. |
| 6,029,150 A | 2/2000 | Kravitz |
| 6,029,151 A | 2/2000 | Nikander |
| 6,032,133 A | 2/2000 | Hilt et al. |
| 6,032,137 A | 2/2000 | Ballard |
| 6,036,344 A | 3/2000 | Goldenberg |
| 3,047,051 A | 4/2000 | Ginzboorg et al. |
| 3,049,785 A | 4/2000 | Gifford |
| 6,049,786 A | 4/2000 | Smorodinsky |
| 6,055,567 A | 4/2000 | Ganesan et al. |
| 6,058,382 A | 5/2000 | Kasai et al. |
| 6,069,896 A | 5/2000 | Borgstahl et al. |
| 6,070,150 A | 5/2000 | Remington et al. |
| 6,076,068 A | 6/2000 | DeLapa et al. |
| 6,076,074 A | 6/2000 | Cotton et al. |
| 6,108,104 A | 8/2000 | Tesavis |
| 6,115,509 A | 9/2000 | Yeskel |
| 6,138,107 A | 10/2000 | Elgamal |
| 6,145,738 A | 11/2000 | Stinson et al. |
| 6,173,272 B1 | 1/2001 | Thomas et al. |
| 6,181,837 B1 | 1/2001 | Cahill et al. |
| 6,189,785 B1 | 2/2001 | Lowery |
| 6,192,142 B1 | 2/2001 | Pare et al. |

(56) References Cited

U.S. PATENT DOCUMENTS

| | | |
|---|---|---|
| 6,192,407 B1 | 2/2001 | Smith et al. |
| 6,199,077 B1 | 3/2001 | Inala et al. |
| 6,202,054 B1 | 3/2001 | Lawlor et al. |
| 6,209,095 B1 | 3/2001 | Anderson et al. |
| 6,212,556 B1 | 4/2001 | Arunachalam |
| 6,223,168 B1 | 4/2001 | McGurl et al. |
| 6,230,148 B1 | 5/2001 | Pare et al. |
| 6,243,689 B1 | 6/2001 | Norton |
| 6,260,024 B1 | 7/2001 | Shkedy |
| 6,269,348 B1 | 7/2001 | Pare et al. |
| 6,278,993 B1 | 8/2001 | Kumar et al. |
| 6,282,523 B1 | 8/2001 | Tedesco et al. |
| 6,283,366 B1 | 9/2001 | Hills et al. |
| 6,285,991 B1 | 9/2001 | Powar |
| 6,289,322 B1 | 9/2001 | Kitchen et al. |
| 6,292,789 B1 | 9/2001 | Schutzer |
| 6,301,379 B1 | 10/2001 | Thompson et al. |
| 6,304,857 B1 | 10/2001 | Heindel et al. |
| 6,317,745 B1 | 11/2001 | Thomas et al. |
| 6,317,783 B1 | 11/2001 | Freishtat et al. |
| 6,324,526 B1 | 11/2001 | D'Agostino |
| 6,327,577 B1 | 12/2001 | Garrison et al. |
| 6,330,544 B1 | 12/2001 | Walker et al. |
| 6,334,116 B1 | 12/2001 | Ganesan et al. |
| 6,338,050 B1 | 1/2002 | Conklin et al. |
| 6,351,553 B1 | 2/2002 | Hayosh |
| 6,353,811 B1 | 3/2002 | Weissman |
| 6,363,362 B1 | 3/2002 | Burfield et al. |
| 6,385,595 B1 | 5/2002 | Kolling et al. |
| 6,385,652 B1 | 5/2002 | Brown et al. |
| 6,405,245 B1 | 6/2002 | Burson et al. |
| 6,408,284 B1 | 6/2002 | Hilt et al. |
| 6,411,939 B1 | 6/2002 | Parsons |
| 6,412,073 B1 | 6/2002 | Rangan |
| 6,438,527 B1 | 8/2002 | Powar |
| 6,442,590 B1 | 8/2002 | Inala et al. |
| 6,477,565 B1 | 11/2002 | Daswani et al. |
| 6,493,685 B1 | 12/2002 | Ensel et al. |
| 6,510,451 B2 | 1/2003 | Wu et al. |
| 6,517,587 B2 | 2/2003 | Satyavolu et al. |
| 6,553,346 B1 | 4/2003 | Walker et al. |
| 6,567,850 B1 | 5/2003 | Freishtat et al. |
| 6,574,377 B1 | 6/2003 | Cahill et al. |
| 6,578,015 B1 | 6/2003 | Haseltine et al. |
| 6,594,647 B1 | 7/2003 | Randle et al. |
| 6,594,766 B2 | 7/2003 | Rangan et al. |
| 6,633,910 B1 | 10/2003 | Rajan et al. |
| 6,647,376 B1 | 11/2003 | Farrar et al. |
| 6,678,664 B1 | 1/2004 | Ganesan |
| 6,694,300 B1 | 2/2004 | Walker et al. |
| 6,725,425 B1 | 4/2004 | Rajan et al. |
| 6,738,804 B1 | 5/2004 | Lo |
| 6,748,367 B1 | 6/2004 | Lee |
| 6,802,042 B2 | 10/2004 | Rangan et al. |
| 6,826,545 B2 | 11/2004 | Kawashima et al. |
| 6,842,782 B1 | 1/2005 | Malik et al. |
| 6,856,974 B1 | 2/2005 | Ganesan et al. |
| 6,856,975 B1 | 2/2005 | Inglis |
| 6,859,212 B2 | 2/2005 | Kumar et al. |
| 6,863,214 B2 | 3/2005 | Garner, IV et al. |
| 6,865,680 B1 | 3/2005 | Wu et al. |
| 6,871,220 B1 | 3/2005 | Rajan et al. |
| 6,910,023 B1 | 6/2005 | Schibi |
| 6,932,268 B1 | 8/2005 | McCoy et al. |
| 6,934,691 B1 | 8/2005 | Simpson et al. |
| 6,945,453 B1 | 9/2005 | Schwarz |
| 6,948,063 B1 | 9/2005 | Ganesan et al. |
| 6,968,319 B1 | 11/2005 | Remington et al. |
| 6,980,973 B1 | 12/2005 | Karpenko |
| 6,996,542 B1 | 2/2006 | Landry |
| 7,004,382 B2 | 2/2006 | Sandru |
| 7,013,310 B2 | 3/2006 | Messing et al. |
| 7,028,008 B2 | 4/2006 | Powar |
| 7,028,886 B1 | 4/2006 | Maloney |
| 7,039,656 B1 | 5/2006 | Tsai et al. |
| 7,076,458 B2 | 7/2006 | Lawlor et al. |
| 7,085,997 B1 | 8/2006 | Wu et al. |
| 7,089,208 B1 | 8/2006 | Levchin et al. |
| 7,099,845 B2 | 8/2006 | Higgins et al. |
| 7,107,244 B2 | 9/2006 | Kight et al. |
| 7,110,969 B1 | 9/2006 | Bennett et al. |
| 7,110,993 B2 | 9/2006 | Soulanille et al. |
| 7,120,602 B2 | 10/2006 | Kitchen et al. |
| 7,146,338 B2 | 12/2006 | Kight et al. |
| 7,155,508 B2 | 12/2006 | Sankuratripati et al. |
| 7,158,955 B2 | 1/2007 | Diveley et al. |
| 7,165,052 B2 | 1/2007 | Diveley et al. |
| 7,165,723 B2 | 1/2007 | McGlamery et al. |
| 7,167,711 B1 | 1/2007 | Dennis |
| 7,175,074 B2 | 2/2007 | Mejias et al. |
| 7,177,846 B2 | 2/2007 | Moenickheim et al. |
| 7,178,096 B2 | 2/2007 | Rangan et al. |
| 7,181,430 B1 | 2/2007 | Buchanan et al. |
| 7,191,150 B1 | 3/2007 | Shao et al. |
| 7,191,151 B1 | 3/2007 | Nosek |
| 7,200,551 B1 | 4/2007 | Senez |
| 7,200,804 B1 | 4/2007 | Khavari et al. |
| 7,203,845 B2 | 4/2007 | Sokolic et al. |
| 7,213,003 B1 | 5/2007 | Kight et al. |
| 7,225,156 B2 | 5/2007 | Fisher et al. |
| 7,225,464 B2 | 5/2007 | Satyavolu et al. |
| 7,236,950 B2 | 6/2007 | Savage et al. |
| 7,240,031 B1 | 7/2007 | Kight et al. |
| 7,249,080 B1 | 7/2007 | Hoffman et al. |
| 7,249,094 B2 | 7/2007 | Levchin et al. |
| 7,251,656 B2 | 7/2007 | Keown et al. |
| 7,263,548 B2 | 8/2007 | Daswani et al. |
| 7,296,004 B1 | 11/2007 | Garrison et al. |
| 7,302,408 B2 | 11/2007 | Engdahl et al. |
| 7,302,411 B2 | 11/2007 | Ganesan et al. |
| 7,308,426 B1 | 12/2007 | Pitroda |
| 7,313,813 B2 | 12/2007 | Rangan et al. |
| 7,321,874 B2 | 1/2008 | Dilip et al. |
| 7,321,875 B2 | 1/2008 | Dilip et al. |
| 7,330,831 B2 | 2/2008 | Biondi et al. |
| 7,334,128 B2 | 2/2008 | Ganesan et al. |
| 7,356,502 B1 | 4/2008 | Labadie et al. |
| 7,366,696 B1 | 4/2008 | Ganesan et al. |
| 7,366,697 B2 | 4/2008 | Kitchen et al. |
| 7,370,014 B1 | 5/2008 | Vasavada et al. |
| 7,383,223 B1 | 6/2008 | Dilip et al. |
| 7,383,226 B2 | 6/2008 | Kight et al. |
| 7,392,223 B1 | 6/2008 | Ganesan et al. |
| 7,395,319 B2 | 7/2008 | Harris et al. |
| 7,415,610 B2 | 8/2008 | Ganesan et al. |
| 7,424,520 B2 | 9/2008 | Dawsani et al. |
| 7,426,638 B2 | 9/2008 | Ganesan et al. |
| 7,447,347 B2 | 11/2008 | Weber |
| 7,474,779 B2 | 1/2009 | Duncan |
| 7,490,063 B2 | 2/2009 | Garrison et al. |
| 7,502,749 B2 | 3/2009 | Ganesan et al. |
| 7,505,937 B2 | 3/2009 | Dilip et al. |
| 7,526,448 B2 | 4/2009 | Zielke et al. |
| 7,533,058 B2 | 5/2009 | Kulakowski |
| 7,536,340 B2 | 5/2009 | Dheer et al. |
| 7,558,795 B2 | 7/2009 | Malik et al. |
| 7,606,752 B2 | 10/2009 | Hazlehurst et al. |
| 7,606,787 B2 | 10/2009 | Keown et al. |
| 7,610,245 B2 | 10/2009 | Dent et al. |
| 7,636,686 B2 | 12/2009 | Pierdinock et al. |
| 7,636,688 B2 | 12/2009 | Kitchen et al. |
| 7,640,197 B1 | 12/2009 | Gentry et al. |
| 7,644,023 B2 | 1/2010 | Kumar et al. |
| 7,644,036 B2 | 1/2010 | McCoy et al. |
| 7,653,598 B1 | 1/2010 | Hamilton et al. |
| 7,657,484 B2 | 2/2010 | Ganesan et al. |
| 7,660,766 B1 | 2/2010 | Lawson et al. |
| 7,672,879 B1 | 3/2010 | Kumar et al. |
| 7,685,525 B2 | 3/2010 | Kumar et al. |
| 7,693,790 B2 | 4/2010 | Lawlor et al. |
| 7,702,583 B1 | 4/2010 | Hamilton et al. |
| 7,702,585 B2 | 4/2010 | Lyda et al. |
| 7,711,626 B2 | 5/2010 | Nanjundamoorthy et al. |
| 7,711,690 B1 | 5/2010 | Garrison et al. |

(56) References Cited

U.S. PATENT DOCUMENTS

| | | |
|---|---|---|
| 7,725,389 B1 | 5/2010 | D'Aquisto et al. |
| 7,729,283 B2 | 6/2010 | Ferguson et al. |
| 7,729,969 B1 | 6/2010 | Smith, III et al. |
| 7,729,996 B2 | 6/2010 | Zito |
| 7,734,541 B2 | 6/2010 | Kumar et al. |
| 7,752,130 B2 | 7/2010 | Byrd et al. |
| 7,752,535 B2 | 7/2010 | Satyavolu |
| 7,778,901 B2 | 8/2010 | Ganesan et al. |
| 7,788,172 B2 | 8/2010 | Kight et al. |
| 7,792,749 B2 | 9/2010 | Ganesan |
| 7,886,156 B2 | 2/2011 | Franchi |
| 7,979,348 B2 | 7/2011 | Thomas et al. |
| 8,032,932 B2 | 10/2011 | Speyer et al. |
| 8,073,772 B2 | 12/2011 | Bishop et al. |
| 8,327,429 B2 | 12/2012 | Speyer et al. |
| 8,369,601 B2 | 2/2013 | Lugg |
| 8,725,607 B2 | 5/2014 | Dunn et al. |
| 8,725,609 B2 | 5/2014 | Pawelczyk et al. |
| 9,135,620 B2 | 9/2015 | Chen et al. |
| 9,264,902 B1 | 2/2016 | Ward et al. |
| 9,600,817 B2 | 3/2017 | Bondesen et al. |
| 9,693,234 B2 | 6/2017 | Cook |
| 9,799,011 B2 | 10/2017 | Dunn et al. |
| 2001/0000537 A1 | 4/2001 | Inala et al. |
| 2001/0016034 A1 | 8/2001 | Singh et al. |
| 2001/0023414 A1 | 9/2001 | Kumar et al. |
| 2001/0024157 A1 | 9/2001 | Hansmann et al. |
| 2001/0032182 A1 | 10/2001 | Kumar et al. |
| 2001/0032183 A1 | 10/2001 | Landry |
| 2001/0051907 A1 | 12/2001 | Kumar et al. |
| 2002/0002536 A1 | 1/2002 | Braco |
| 2002/0007323 A1 | 1/2002 | Tamatsu |
| 2002/0010612 A1 | 1/2002 | Smith et al. |
| 2002/0010677 A1 | 1/2002 | Kitchen et al. |
| 2002/0015480 A1 | 2/2002 | Daswani et al. |
| 2002/0019808 A1 | 2/2002 | Sharma |
| 2002/0019809 A1 | 2/2002 | Kitchen et al. |
| 2002/0023108 A1 | 2/2002 | Daswani et al. |
| 2002/0046167 A1 | 4/2002 | Kitchen et al. |
| 2002/0046168 A1 | 4/2002 | Kitchen et al. |
| 2002/0049671 A1 | 4/2002 | Trende et al. |
| 2002/0049672 A1 | 4/2002 | Kitchen et al. |
| 2002/0052840 A1 | 5/2002 | Kitchen et al. |
| 2002/0059139 A1 | 5/2002 | Evans |
| 2002/0059369 A1 | 5/2002 | Kern et al. |
| 2002/0062282 A1 | 5/2002 | Kight et al. |
| 2002/0065773 A1 | 5/2002 | Kight et al. |
| 2002/0069161 A1 | 6/2002 | Eckert et al. |
| 2002/0077952 A1 | 6/2002 | Eckert et al. |
| 2002/0077961 A1 | 6/2002 | Eckert et al. |
| 2002/0077978 A1 | 6/2002 | O'Leary et al. |
| 2002/0087454 A1 | 7/2002 | Cabo et al. |
| 2002/0087455 A1 | 7/2002 | Tsagarakis et al. |
| 2002/0087461 A1 | 7/2002 | Ganesan et al. |
| 2002/0087465 A1 | 7/2002 | Ganesan et al. |
| 2002/0091635 A1 | 7/2002 | Dilip et al. |
| 2002/0111886 A1 | 8/2002 | Chenevich et al. |
| 2002/0128964 A1 | 9/2002 | Baker et al. |
| 2002/0128968 A1 | 9/2002 | Kitchen et al. |
| 2002/0143655 A1 | 10/2002 | Elston et al. |
| 2002/0174048 A1 | 11/2002 | Dheer et al. |
| 2002/0184144 A1 | 12/2002 | Byrd et al. |
| 2002/0194137 A1 | 12/2002 | Park et al. |
| 2003/0014489 A1 | 1/2003 | Inala et al. |
| 2003/0015881 A1 | 1/2003 | Neveu |
| 2003/0018571 A1 | 1/2003 | Eckert et al. |
| 2003/0023552 A1 | 1/2003 | Kight et al. |
| 2003/0037002 A1 | 2/2003 | Higgins et al. |
| 2003/0089768 A1 | 5/2003 | Page |
| 2003/0120774 A1 | 6/2003 | Satyavolu et al. |
| 2003/0126075 A1 | 7/2003 | Mascavage |
| 2003/0182206 A1 | 9/2003 | Hendrix et al. |
| 2003/0187925 A1 | 10/2003 | Inala et al. |
| 2003/0191701 A1 | 10/2003 | Haseltine et al. |
| 2003/0191711 A1 | 10/2003 | Jamison et al. |
| 2003/0191832 A1 | 10/2003 | Satyavolu et al. |
| 2003/0195844 A1 | 10/2003 | Hogan |
| 2003/0208421 A1 | 11/2003 | Vicknair et al. |
| 2003/0208441 A1 | 11/2003 | Poplawski et al. |
| 2003/0225705 A1 | 12/2003 | Park et al. |
| 2003/0236728 A1 | 12/2003 | Sunderji et al. |
| 2004/0034594 A1 | 2/2004 | Thomas et al. |
| 2004/0039701 A1 | 2/2004 | Nakamura et al. |
| 2004/0059671 A1 | 3/2004 | Nozaki et al. |
| 2004/0059672 A1 | 3/2004 | Baig et al. |
| 2004/0059673 A1 | 3/2004 | Kitchen et al. |
| 2004/0064407 A1 | 4/2004 | Kight et al. |
| 2004/0064408 A1 | 4/2004 | Kight et al. |
| 2004/0064409 A1 | 4/2004 | Kight et al. |
| 2004/0064410 A1 | 4/2004 | Kight et al. |
| 2004/0071333 A1 | 4/2004 | Douglas et al. |
| 2004/0078423 A1 | 4/2004 | Satyavolu et al. |
| 2004/0078464 A1 | 4/2004 | Rajan et al. |
| 2004/0083167 A1 | 4/2004 | Kight et al. |
| 2004/0083171 A1 | 4/2004 | Kight et al. |
| 2004/0088235 A1 | 5/2004 | Ziekle et al. |
| 2004/0093305 A1 | 5/2004 | Kight et al. |
| 2004/0133515 A1 | 7/2004 | McCoy et al. |
| 2004/0139005 A1 | 7/2004 | Ganesan |
| 2004/0139009 A1 | 7/2004 | Kozee et al. |
| 2004/0139010 A1 | 7/2004 | McMichael et al. |
| 2004/0139011 A1 | 7/2004 | Kozee et al. |
| 2004/0143552 A1 | 7/2004 | Weichert et al. |
| 2004/0148235 A1 | 7/2004 | Craig et al. |
| 2004/0148252 A1 | 7/2004 | Fleishman |
| 2004/0215543 A1 | 10/2004 | Betz et al. |
| 2004/0225609 A1 | 11/2004 | Greene |
| 2004/0236653 A1 | 11/2004 | Sokolic et al. |
| 2004/0236681 A1 | 11/2004 | Modigliani et al. |
| 2005/0010483 A1 | 1/2005 | Ling |
| 2005/0110523 A1 | 1/2005 | Myklebust et al. |
| 2005/0086165 A1 | 4/2005 | Pawelczyk et al. |
| 2005/0119971 A1 | 6/2005 | Zito |
| 2005/0137960 A1 | 6/2005 | Brann et al. |
| 2005/0137978 A1 | 6/2005 | Ganesan et al. |
| 2005/0149439 A1 | 7/2005 | Suisa |
| 2005/0154923 A1 | 7/2005 | Lok et al. |
| 2005/0171899 A1 | 8/2005 | Dunn et al. |
| 2005/0171900 A1 | 8/2005 | Onneken |
| 2005/0177505 A1 | 8/2005 | Keeling et al. |
| 2005/0182720 A1 | 8/2005 | Willard et al. |
| 2005/0187867 A1 | 8/2005 | Sokolic et al. |
| 2005/0192901 A1 | 9/2005 | McCoy et al. |
| 2005/0198377 A1 | 9/2005 | Ferguson et al. |
| 2005/0203835 A1 | 9/2005 | Nhaissi et al. |
| 2005/0203844 A1 | 9/2005 | Ferguson et al. |
| 2005/0210297 A1 | 9/2005 | Wu et al. |
| 2005/0222954 A1 | 10/2005 | Keown et al. |
| 2006/0047724 A1 | 3/2006 | Messing et al. |
| 2006/0106717 A1 | 5/2006 | Randle et al. |
| 2006/0136595 A1 | 6/2006 | Satyavolu |
| 2006/0184451 A1 | 8/2006 | Ganesan et al. |
| 2006/0195398 A1 | 8/2006 | Dheer et al. |
| 2006/0230343 A1 | 10/2006 | Armandpour et al. |
| 2006/0253340 A1 | 11/2006 | Levchin et al. |
| 2006/0253463 A1 | 11/2006 | Wu et al. |
| 2006/0282381 A1 | 12/2006 | Ritchie |
| 2007/0011090 A1 | 1/2007 | Baker et al. |
| 2007/0067239 A1 | 3/2007 | Dheer et al. |
| 2007/0088821 A1 | 4/2007 | Sankuratripati et al. |
| 2007/0094151 A1 | 4/2007 | Moenickheim et al. |
| 2007/0100748 A1 | 5/2007 | Dheer et al. |
| 2007/0106612 A1 | 5/2007 | O'Brien et al. |
| 2007/0121840 A1 | 5/2007 | Ganesan et al. |
| 2007/0125840 A1 | 6/2007 | Law et al. |
| 2007/0130347 A1 | 6/2007 | Rangan et al. |
| 2007/0131758 A1 | 6/2007 | Mejias et al. |
| 2007/0162769 A1 | 7/2007 | Sokolic et al. |
| 2007/0179885 A1 | 8/2007 | Bird et al. |
| 2007/0180380 A1 | 8/2007 | Khavari et al. |
| 2007/0208645 A1 | 9/2007 | Hoffman et al. |
| 2007/0230371 A1 | 10/2007 | Tumminaro |
| 2007/0233615 A1 | 10/2007 | Tumminaro |
| 2007/0239601 A1 | 10/2007 | Ganesan et al. |

(56) References Cited

U.S. PATENT DOCUMENTS

| | | |
|---|---|---|
| 2007/0244811 A1 | 10/2007 | Tumminaro et al. |
| 2007/0255620 A1 | 11/2007 | Tumminaro et al. |
| 2007/0255652 A1 | 11/2007 | Tumminaro et al. |
| 2007/0255653 A1 | 11/2007 | Tumminaro et al. |
| 2007/0255662 A1 | 11/2007 | Tumminaro |
| 2008/0015982 A1 | 1/2008 | Sokolic et al. |
| 2008/0032741 A1 | 2/2008 | Tumminaro |
| 2008/0033878 A1 | 2/2008 | Krikorian et al. |
| 2008/0052226 A1 | 2/2008 | Agarwal et al. |
| 2008/0082454 A1 | 4/2008 | Dilip et al. |
| 2008/0086403 A1 | 4/2008 | Dilip et al. |
| 2008/0086426 A1 | 4/2008 | Dilip et al. |
| 2008/0091663 A1 | 4/2008 | Inala et al. |
| 2008/0097899 A1 | 4/2008 | Jackson et al. |
| 2008/0133407 A1 | 6/2008 | Guillory et al. |
| 2008/0263069 A1 | 10/2008 | Harris et al. |
| 2008/0275816 A1 | 11/2008 | Hazlehurst |
| 2008/0288376 A1 | 11/2008 | Panthaki et al. |
| 2008/0288400 A1 | 11/2008 | Panthaki et al. |
| 2008/0301022 A1 | 12/2008 | Patel et al. |
| 2008/0301023 A1 | 12/2008 | Patel et al. |
| 2008/0306846 A1 | 12/2008 | Ferguson |
| 2009/0006582 A1 | 1/2009 | Dawsani et al. |
| 2009/0024505 A1 | 1/2009 | Patel et al. |
| 2009/0063197 A1 | 3/2009 | Lisle |
| 2009/0076950 A1 | 3/2009 | Chang et al. |
| 2009/0119190 A1 | 5/2009 | Realini |
| 2009/0125446 A1 | 5/2009 | Saunders et al. |
| 2009/0132289 A1 | 5/2009 | Stenman et al. |
| 2009/0138394 A1 | 5/2009 | Garrison et al. |
| 2009/0265241 A1 | 10/2009 | Bishop et al. |
| 2009/0265774 A1 | 10/2009 | Malik et al. |
| 2009/0271854 A1 | 10/2009 | Hazlehurst et al. |
| 2009/0287601 A1 | 11/2009 | Tumminaro et al. |
| 2009/0287613 A1 | 11/2009 | Pierdinock et al. |
| 2009/0319410 A1 | 12/2009 | Kight et al. |
| 2009/0319425 A1 | 12/2009 | Tumminaro et al. |
| 2010/0004990 A1 | 1/2010 | Hazlehurst et al. |
| 2010/0005025 A1 | 1/2010 | Kumar et al. |
| 2010/0017322 A1 | 1/2010 | Kight et al. |
| 2010/0100462 A1 | 4/2010 | Lyda et al. |
| 2010/0100466 A1 | 4/2010 | Garrison et al. |
| 2010/0100467 A1 | 4/2010 | McCoy et al. |
| 2010/0138243 A1 | 6/2010 | Carroll |
| 2011/0125613 A1 | 5/2011 | Franchi |
| 2011/0295746 A1 | 12/2011 | Thomas et al. |
| 2013/0262296 A1 | 10/2013 | Thomas et al. |
| 2013/0268839 A1 | 10/2013 | Lefebvre et al. |
| 2014/0089182 A1 | 3/2014 | Short et al. |
| 2014/0164246 A1 | 6/2014 | Thomas et al. |
| 2014/0289106 A1 | 9/2014 | Pawelczyk et al. |
| 2015/0046319 A1 | 2/2015 | Thomas et al. |
| 2015/0161597 A1 | 6/2015 | Subramanian et al. |
| 2016/0358163 A1 | 12/2016 | Kumar et al. |
| 2016/0359829 A1 | 12/2016 | Gulledge |
| 2017/0004501 A1 | 1/2017 | Ledford et al. |
| 2017/0221066 A1 | 8/2017 | Ledford et al. |
| 2018/0012199 A1 | 1/2018 | Dunn et al. |
| 2018/0012200 A1 | 1/2018 | Dunn et al. |
| 2018/0012201 A1 | 1/2018 | Dunn et al. |

FOREIGN PATENT DOCUMENTS

| | | |
|---|---|---|
| EP | 0593209 | 4/1994 |
| EP | 0661654 | 7/1995 |
| GB | 2328310 | 2/1999 |
| WO | 1990/004837 | 5/1990 |
| WO | 1991/006058 | 5/1991 |
| WO | 93/02424 A1 | 2/1993 |
| WO | 1995/012859 | 5/1995 |
| WO | 1997/007468 | 2/1997 |
| WO | 1997/022060 | 6/1997 |
| WO | 1998/018095 | 4/1998 |
| WO | 1998/047100 | 10/1998 |
| WO | 1998/058356 | 12/1998 |
| WO | 1999/056219 | 11/1999 |
| WO | 2002/017196 | 2/2002 |
| WO | 03/060749 A1 | 7/2003 |
| WO | 2007/053123 | 5/2007 |
| WO | 2007/056274 | 5/2007 |
| WO | 2008/027620 | 3/2008 |
| WO | 2008/027621 | 3/2008 |
| WO | 2008/060725 A2 | 5/2008 |
| WO | 2009/114876 | 9/2009 |
| WO | 2009/152184 | 12/2009 |

OTHER PUBLICATIONS

Brooks, A., "Still Waiting for the E-Mail and Faxes to Start Coming in?", The New York Times, (Late Edition (East Coast)), New York, NY, Dec. 19, 1996, p. C7, 2 pages.

Scheschuk, B., "Pay it on the Net", CMA Management, Hamilton, Jun. 2001, vol. 75, Issue 4, pp. 30-34, 4 pages.

"Check Adjustment Request Federal Reserve Bank," http://www.richmondfed.org/financial_services/check/adjustments/pdf/request_form.pdf, 1993, 1 page.

Messmer, E., "Banks Turn to Web for Check Processing," Network World (Framingham: Jun. 19, 2000, vol. 17, Iss. 25, pp. 53-54), 3 pages.

Beckett, P., "Credit-card Firms Get Into Web Game", Asian Wall Street Journal, New York, NY, 2001 WLNR 9914744, Apr. 3, 2001, p. N1, 1 page.

"Electronic Check Adjustments: Are You Using FedLine?", The Federal Reserve Bank of St. Louis, http://www.stlouisfed.org/publications/q/1998/a/-q1998a5.html, 1998, 3 pages.

Morton, E., "E Commerce (A Special Report): A Consumer's Guide—Payments—Check It Out—The Web is suddenly crowded with online-payment services; Here's how they compare", Wall Street Journal, New York, NY, Dec. 10, 2001, p. R13, 4 pages.

"Financial EDI over the Internet—A pilot conducted by BankAmercia and Lawrence Livermore National Laboratory," Bank of America, 1996. http://www.bofa.com/batoday/edi_briefing.html, Downloaded Mar. 2, 1996, 7 pages.

"Ibnamed, A Load Balancing Name Server Written in Peri," Sep. 17, 1995, located at URL www.standford. edu/-schemers/docs/Ibnamed/Ibnamed.html, 5 pages.

"ICI Project Security Work Session," May 10, 1996. Image Archive Forum Flow Nos. 1-13, Sep. 1997, 3 pages.

"Image systems garner NOAC spotlight (American Bankers' Association's National Operations and Automation Conference)," Computer in Banking, vol. 6, No. 7, p. 8(4), Jul. 1989, 9 pages.

"Industry Security Leader Racal Supports Visa/Mastercard Proposal for Internet," PR Newswire, Apr. 17, 1996. INSPEC search with abstracts, 2 pages.

"Microsoft Introduces SNA Server Version 3.0, Begins Beta Testing," Microsoft Press Release, Aug. 29, 2006, found at: http://www.microsoft.com/presspass/press/1996/jun96/sna30pr.mspx, 4 pages.

"SurePOS ACE Electronic Payment Support PRPQ for 4690 OS-User's Guide," Version 1, Release 5, IBM, Mar. 2002, 281 pages.

"Understanding EDI," Mar. 2, 1996, 2 pages.

"American National Standard for Financial Image Interchange ("ANSI"): Architecture, Overview and System Design Specification", American Bankers Association, American National Standards Institute, Inc., pp. 1-202 (1994), 216 pages.

Dinan et al., "ImagePlus High Performance Transaction System," IBM Systems Journal, vol. 29, No. 3, 1990, pp. 421-434, 16 pages.

Check Image Processing Archive and Retrieval System: Technical Volume—Total System Solution Overview, BancTec, Inc., Jul. 8, 1994, 128 pages.

eCheck: Homepage, http://www.echeck.org, Downloaded Feb. 27, 2003, 1 page.

"Electronic Imaging '88-International Electronic Imaging Exposition & Conference," vol. 1, Anaheim, California, Mar. 28-31, 1988, 26 pages.

Walter, G. "Making Optical Disk Based Systems Pay," Electronic Imaging '88-Advanced Printing of Paper Summaries, vol. 1, Oct. 3-6, 1988, Boston, MA, 11 pages.

(56) References Cited

OTHER PUBLICATIONS

"Request for Proposal for Check Image Processing and Archival and Retrieval Systems for the Federal Reserve," Federal Reserve Bank of Boston, Version 1.0, Apr. 21, 1994, 246 pages.
Brown, R.J., "FSTC Check Image Interchange Project Pilot Phase-1A: Preliminary Architecture and Project Plan", dated: Jun. 30, 1995, 34 pages.
"FSTC Check Image Interchange Project—Archive Storage and Retrieval Component Decomposition," May 25, 1995, 20 pages.
Brown, R.J., ANSI X9.46, Data Structure Reference, IBM Corporations, Jul. 31, 1995, 16 pages.
"Image Quality Functional Requirements," FSTC, Chase Manhattan Bank, pp. 1-19, Jul. 26, 1995, 19 pages.
Stanley, P., "Pilot Overview," Apr. 3, 1995, 8 pages.
"The Bank Internet Payment System (BIPS): Leading the Way to Electronic Commerce," FSTC, http://www.fstc.org/projects/bips/index.cfm, Downloaded Feb. 27, 2003, 3 pages.
"IBM Proposal for FRB Phase Four: Image Archive System," IBM Financial Document Processing, IBM, Nov. 7, 1991, Yeskel Exhibit, 175 pages.
"Image Archive Forum—Payments Systems Task Force—Economic Framework," Jan. 27, 1998, 33 pages.
"NCR and NYCH to develop image-based check notification system," AT&T News Release, Aug. 24, 1992, 2 pages.
Moreau, T., "Payment by Authenticated Facsimile Transmission, a Check Replacement Technology for Small and Medium Enterprises," found at: http://connotech.com/PAYPROC.HTM, Apr. 15, 2001, 23 pages.
"PACES—Paperless Automated Check Exchange & Settlement—Business Requirements," FSTC, PACESBusReq3[1].doc, Apr. 3, 1998, 7 pages.
Rivest et al., "A Method for Obtaining Digital Signatures and Public-Key Cryptosystems," Feb. 1978, 15 pages.
Roldan, M., "Image Quality White Paper," FSTC PACES Project Document, Chase Manhattan Bank, pp. 1-18 Feb. 18, 1999, 18 pages.
PCT/US00/33010 Search Report dated Jun. 21, 2002, 4 pages.
"New York Clearing House—A Proposal for an Image-based Return Item Processing System," Unisys, Document No. PDC 1010-16, pp. 1-1 to 7-11, Jun. 1991, 126 pages.
Vermeire, D.R., "Prosecution of Check Image Patent," letter to Peter Hanna, Jul. 11, 1997, 1 page.
"ANSI/ABA X9.46/1995, Draft version 0.13, American National Standard for Financial Image Interchange: Architecture, Overview and System Design Specification," American Bankers Association, American National Standards Institute, Inc., 1995, 229 pages.
"ANSI/ABA X9.46-1997, American National Standard for Financial Image Interchange: Architecture, Overview and System Design Specification." American Banker Association, American National Standards Institute, Inc., 1996, 245 pages.
"Real-Time Gross Settlement Systems," http://www.bis.org/publ/cpss22/pdf, Bank for International Settlements; Basle, Mar. 1997, 66 pages.
Carey, T.W., "Quicken versus Money," PC World, vol. 14, No. 4, p. 162(6), Apr. 1996, 8 pages.
Cummings, S., "Home Banking with Quicken," New York: MIS Press, pp. 24-29, 34-37, and 52-59, 1996, 15 pages.
Lee et al., NOVAHID: A Novel Architecture for Asynchronous Hierarchical, Distributed, Real-Time Payments Processing, IEEE Journal on selected areas in communications, vol. 12, No. 6, 1994, pp. 1072-1087, 16 pages.
"Check Adjustment Quick Reference Guide," Federal Reserve System, Jul. 1996, 10 pages.
"3174 Configuration," http://www.commercecomputer.com/3174.html, downloaded Oct. 7, 2002, Commerce Computer Corporation, 3 pages.
Addink et al., "AS/400 ImagePlus System View," IBM Systems Journal, vol. 29, No. 3, pp. 451-466, 1990, 16 pages.
"Check Clearing for the 21st Century Act: Frequently Asked Questions about Check 21," http://www.federalreserve.gov/paymentsystems/truncation/faqs.htm, downloaded Oct. 26, 2005, The Federal Reserve Board, 2 pages.
"Declaration of Richard Jesmajian," In re Ballard for Remote Image Capture with Centralized Processing and Storage, Nov. 18, 2005, 3 pages.
"Financial Services Technology Consortium—Interbank Check Imaging Project—White Paper (Draft)," FSTC, pp. 1-29, Jun. 20, 1994, 29 pages.
Casey et al., "Intelligent Forms Processing," IBM Systems Journal, vol. 29, No. 3, pp. 435-450, 1990, 16 pages.
Harding et al., "Object Storage Hierarchy Management," IBM Systems Journal, vol. 29, No. 3, pp. 384-397, 1990, 14 pages.
"Image Archive Forum—Payments System Task Force—Introduction," 1998, 52 pages.
Kingson et al., "E-Processing by Banks: Idea Gains Ground", American Banker, Apr. 26, 2001, 2 pages.
Roth, A., "Banks Fund B2B Payment System Effort", American Banker, Apr. 24, 2001, 1 page.
Winig, E., "Cracking the Code", Washington Business Journal, Jul. 20-26, 2001, vol. 20. No. 11, 2 pages.
"NYCH Project Shows Promise for Facilitating E-Payments", AFP Pulse, The News Source for Financial Professionals, Mar. 2002, 2 pages.
"The Remaining Barriers to ePayments and Straight-through Processing", Research Conducted Oct. 2001-Mar. 2002 by The Clearing House, the Clearing House, 24 pages.
"New Universal Payment Identification Code Will Become Industry Standard for I-Enabled Payments" UPIC (Universal Payment Identification Code) The Clearing House press release Apr. 24, 2001, 2 pages.
"Supplement to Authentication in an Internet Banking Environment," Federal Financial Institutions Examination Council, http://www.ffiec.gov/pdf/auth-its-final%206-22-11%20(ffiec%20formated).pdf, pp. 1-12, published 2011.
"Suspicious Activity Monitoring—Anti-Money Laundering Solutions," NICE-Actimize, www.niceactimize.com, 4 pages, Mar. 15, 2014.
Technical Volume—Check Image Processing Archive and Retrieval System—Proposal, BancTec, Inc., 469 pages (Jul. 8, 1994).
Ten Dyke, R.P., "Books," IBM Systems Journal, vol. 29, No. 1, pp. 489-490, 2 pages (1990).
Terminal Data to Supply NCR with Document Microfilmers, AT&T News Release, http://www.att.com/news/1093/931013.nca.html, 2 pages (Oct. 13, 1993).
The Check Information Age, Vision Executive Summary Image Archive Forum, Payment System Task Force, 10 pages (Jan. 27, 1998).
The Clearing House, "Healthcare EFT Enrollment, Mar. 25, 2011 Stakeholder Meeting Minutes & Wrap-Up," NACHA—The Electronic Payments Association, pp. 1-22, Apr. 20, 2011.
The Clearing House, "Healthcare EFT Enrollment, Stakeholder Meeting Materials," NACHA—The Electronic Payments Association, pp. 1-43, Mar. 25, 2011.
The Clearing House, "Healthcare EFT Enrollment, Stakeholder Meeting: Pre-read Materials," NACHA—The Electronic Payments Association, pp. 1-21, Mar. 25, 2011.
The Clearing House, "Mayo Clinic Interview," Healthcare EFT Enrollment, NACHA—The Electronic Payments Association, Healthcare EFT Enrollment, pp. 1-6, Mar. 14, 2011.
The New Era of Check Scanning Technology—Introducing Excella, Specifically Designed to Meet the Processing Requirements of Check21, MagTek, Inc., 22 pages. (2005).
The Wachovia Story, RDM Corporation, 1 page (Oct. 1993).
Tracey, "IBM Unveils First Stage of Image-check System (product announcement)," Computers in Banking, vol. 7, No. 4, p. 13(3), 3 pages (Apr. 1990).
Tucker, "Broadway Rolls Out Check Imaging System for Community Banks (Broadway & Seymour Inc.)," American Banker, vol. 160, No. 61, p. 14(1), 2 pages (Mar. 30, 1995).
Unisys Acquires VisualImpact Solution for Check Processing, Archive & Image Delivery, Business Wire, p. 9181204, 3 pages (Sep. 19, 1997).

(56) References Cited

OTHER PUBLICATIONS

Unisys Enhances Check Imager (Unisys Corp. Makes Effort to Appeal to Wider Range of Financial Institutions), American Baker, vol. CLIX, No. 205, p. 15A, 1 page (Oct. 24, 1994).
Unisys Enters Image Processing Market with Two New Products and Major Financial and Industrial Customers. (product announcement), PR Newswire, p. 1011PH009, 3 pages (Oct. 11, 1989).
Unisys Integrates Retail/Wholesale Lockbox Solution for Remittance Processors, Business Wire, p. 03251075, 4 pages. (Mar. 25, 1997).
Unisys Provides Services to Bank of the West to Support Retail Banking, Business Wire, p. 9180098, 2 pages (Sep. 19, 1995).
Unisys Solution will Support Check Processing at Vermont Federal, Business Wire, p. 5201185, 3 pages (May 20, 1996).
Unisys Wins Contract to Supply Imaging Solution to Chase Manhattan/ FISERV Check Processing Alliance, Business Wire, p. 6121175, 2 pages (Jun. 12, 1995).
Unix-based Imge Statement Software (Cincinnati Bell Information Systems Inc. introduces ImageBanc II computer software)(Brief Article), ABA Banking Journal, vol. 85, No. 2, p. 80(1), 1 page (Feb. 1993).
Universal Card Purchases BancTec ImageFIRST System, AT&T News Release, http://www.att.com/news/1292/921222.uca.html, 2 pages (Dec. 22, 1992).
U.S. Appl. No. 14/926,112, filed Oct. 29, 2015 entitled "Secure Payment Processing".
Verifone Software Links PCs to the Point of Sale (Brief Article), American Banker, vol. 158, No. 156, p. 13A(1), 2 pages (Aug. 16, 1993).
Wachovia Tests NCR's New Imaging Item Processing System, AT&T News Release, http://www.att.com/news/1091/911015.nca. html, 2 pages (Oct. 15, 1991).
Wagner, "Banc One Checks Out Web," Computerworld, vol. 30, No. 35, p. 69, 2 pages (Aug. 26, 1996).
Western Bank Purchases NCR's Document Managing System, AT&T News Release, http://www.att.com/news/0893/930831.nca. html, 3 pages (Aug. 31, 1993).
What Is a Financial TransactionSwitch?, NCR Reports—Financial Services Trends & Technologies, NCR Corporation, vol. 1, Issue 6, 6 pages (1997).
Wong et al., FSTC Check Image Quality Subproject Status and Project Plan Update, 6 pages (May 22, 1996).
You Have Requested Data From 32 Answers—Continue? Y/(N): Y, INSPEC, pp. 175-198 (2001).
250 U.S. Banks to Use NCR, Cincinnati Bell Financial Systems, AT&T News Release, http://www.att.com/news/0593/930504.ncd. html, 2 pages (May 4, 1993).
3174 Network Processor, Specification Sheet, http://ecc400.com/ ibm/controllers/314.prod.htm, Downloaded Oct. 7, 2002.
7780 Mid-Range Item Processing—Product Overview, NCR Corporation, http://www.ncr.com/products/hardware/hw_7780_ts_product. htm, 4 pages (Downloaded Nov. 15, 2002).
7780 Mid-Range Item Processing—Technical Specifications, NCR Corporation, http://www.ncr.com/products/hardware/hw_7780_ts_ product.htm, 1 page. (Downloaded Nov. 15, 2002).
7780—The Robust, Reliable Solution . . . for Processing Varying Volumes In any Environment, NCR Corporation, 8 pages (1998).
"820 Payment Order/Remittance Advice" Version: X12-4010, pp. 1-61, Sep. 2005.
"835 Health Care Claim Payment/Advice" Version: 1.0 Final, pp. 1-70, Jul. 20, 2011.
"A Primer on HIPPA and the ACH Network," Banking Industry HIPPA Task Force, pp. 1-34.
About FSTC, Financial Services Technology Consortium, http:// www.fstc.org/about/history.cfm, 2 pages (Downloaded Feb. 27, 2003).
"ACI Proactive Risk Manager for Enterprise Risk—Product Flyer," ACI Universal Payments, www.aciworldwide.com, 4 pages, 2016.
Anderson, Re: Electronic Check and Check Law, Letter to Robert Batten, 2 pages (Apr. 8, 1996).

Anderson et al., "ImagePlus Workstation Program," IBM Systems Journal, vol. 29, No. 3, pp. 398-407 (1990).
Arnold B. et al., "Increasing eBilling in the Healthcare Industry Without Running Afoul of Privacy Laws," 2011 Payments, pp. 1-29, Apr. 3-6, 2011.
AT&T Global Offers One-Step Imaging. (AT&T Global Information Solutions) (Brief Article), American Banker, vol. 159 No. 39, p. 14A(1), 1 page (Feb. 28, 1994).
AT&T Partners with Fisery to Form Single Source Provider for Leading Image Item Processing Solutions, PR Newswire, p. 913CI011, 2 pages (Sep. 13, 1995).
Atzel, Article Order, Email to Marshall J. Hambro, 1 page (Oct. 9, 2001).
"Authentication in an Internet Banking Environment," Federal Financial Institutions Examination Council, http://www.ffiec.gov/ pdf/authentication_guidance.pdf, pp. 1-14, published 2005.
Avers et al., "ImagePlus as a Model for Application Solution Development," IBM Systems Journal, vol. 29, No. 3, pp. 356-370 {1990}.
Baby Boomers, Generation X are Both Addicted to the ATM, AT&T News Release, http://www.att.com/news/0295/950228.nca.html, 3 pages (Feb. 28, 1995).
Banctec Inc. has Received Another Order for Its Image Statement Processing Product. (First National Bank of Chicago Orders ImageFirst), Financial Services Report, vol. 8, No. 22, p. 5(2) (Nov. 13, 1991).
Banet, Document Image Processing, 1991: The Imaging Edge, Seybold Report on Publishing Systems, vol. 20, No. 19, p. 22(8), 10 pages (Jun. 24, 1991).
Bank Automation News, Phillips Business Information, vol. 9, Issue 6, 2 pages (Apr. 2, 1997).
Banks to Check Out Imaging (Solutions), Communicationsweek International, No. 093, p. 46, 2 pages (Oct. 19, 1992).
Barhel, "NCR and Unisys Exchange Check Images in a Pivotal Test. (Computer Makers Test Compatibility of Check Imaging Systems)," American Banker, vol. 158, No. 67, p. 3(1), 2 pages (Apr. 8, 1993).
Barthel, "Unisys, Banctec Offer PC-based Imaging: High-tech Check Statements Produced; Community Banks are Market, (Banctec Systems Inc.)," American Banker, vol. 157, No. 195, p. 3(1) (Oct. 8, 1992).
Bartholomew, "More Checks on Checks—Bank of America Plans to Convert to an IBM Imaging System that Screens Checks Faster and More Thoroughly (Spotlight)," Informationweek, No. 504, p. 32 (Dec. 5, 1994).
Bartimo et al., "Fine Tuning the Terminal Picture," ComputerWorld, Special Report, vol. XVII, No. 35, 48 pages (Aug. 29, 1983).
Behnke, "NSSDC's Mass Storage System Evolves," NSSDC, http:// nssdc.gsfc.gov/nssdc_news/march95/09_i_behnke_0395.htm1, 2 pages (Mar. 1995).
Bill Processing: US West Re-engineers with $7.2 Million Unisys Image-based Remittance Processing Solution, Edge On & About AT&T, vol. 10, No. 378, 3 pages (Oct. 23, 1995).
Blankenhom, "Cincinnati Bell and Unisys Go Into Bank Imaging. (Cincinnati Bell Information Systems, Inc.)", Newsbytes, p. NEW10240020, 1 page (Oct. 24, 1990).
Block, USAA Federal Gets Imaging System. (USAA Federal Savings Bank, Cincinatti Bell Information Systems Inc.) (Brief Article), American Banker, vol. 159, No. 49, p. 6A(1), page (Mar. 14, 1994).
Booker, "Bank to Test Scalable NCR Imaging for Check Processing," Computerworld, p. 66, 2 pages (Dec. 14, 1992).
Broadway & Seymour Announces Client/Server Product for Item and Image Processing, Business Wire, p. 03201186, 2 pages (Mar. 20, 1995).
Broadway & Seymore Announces New VISUALIMPACT Release, Business Wire, p. 3291274, 2 pages (Mar. 29, 1996).
Broadway & Seymour to Invest in Two Strategic Initiatives, Business Wire, p. 03151248, 2 pages (Mar. 15, 1995).
Brown, "Imaging May Dramatically Alter Bank Data Networks," Network World, vol. 6, No. 19, p. 6(2), 1 page (May 15, 1989).
Buchok, "OCR Gets Processing Credit," Computing Canada, vol. 19, No. 26, p. 30(1), 1 page (Dec. 20, 1993).
"By-law no. 7 Respecting the Large Value Transfer System," Canada Gazette, Part I, vol. 132, No. 16 (Canadian Government

(56) References Cited

OTHER PUBLICATIONS

Publishing, online: Archive 1998, Part I http://canadagazette.gc.ca/partI/1998/19980418/pdf/g1-13216.pdf, Apr. 18, 1998, 71 pages.
Cahill, T.P., "Image Processing Applications at the Chase Manhattan Bank," 2 pages (date unknown).
Cantwell, Data Compression Over Frame Relay Implementation Agreement FRF.9, Frame Relay Forum Technical Committee, 38 pages (Jan. 22, 1996).
"CAQH Committee on Operating Rules for Information Exchange (CORE), Phase III CORE EFT & ERA Operating Rule Set," pp. 1-138, Jun. 2012.
CashFlex Selects NCR Item Processing Systems for Lockbox, AT&T News Release, http://www.att.com/news/0793/930712.ncd.html, 2 pages (Jul. 12, 1993).
Chase's New Image (Chase Manhattan Awards 12-yrs Image-processing Contract to Flserv; Contract Could Generate $40 mil/yr in Revenue for Flserv), Information Week, No. 517, p. 14, 1 page (Mar. 6, 1995).
check Adjustment Request Federal Reserve-Bank, Form FRBADJ, 1 page (Sep. 1993).
Check Image Exchange Project—Project Participants, FSTC Projects, FSTC, http://www.fstc.org/projects/imaging/participants.cfm, 1 page (Downloaded Oct. 30, 2002).
Check-Image Interchange Inches Closer (New York Clearing House, Chase Manhattan Bank and Federal Reserve Bank of Boston All Launch Check-image Interchange Program), Bank Technology News, vol. 10, No. 1, p. 19+, 2 pages (Jan. 1997).
Check Image Processing Delivers Truncation Benefits Today, NCR Reports—Financial Services Trends & Technologies, NCR Corporation, vol. 1, Iss. 8, 13 pages (1997).
Check Technology Case Stays in Texas, IP Law Bulletin, 4 pages (Oct. 13, 2005).
Checks & Checking: Check Imaging at the Teller Station, Bank Technology News, vol. 9, No. 10, p. 37 (Oct. 1996).
Chemical Chooses IBM Check Imaging (Chemical Banking Corp to Install IBM's ImagePlus High Performance Transaction System to Process 9 Mil Checks Daily), Bank Technology News, vol. 8, No. 9, p. 11 (Sep. 1995).
Cincinnati Bell: CBIS & Unisys in Major Imaging Agreement, EDGE, On & About AT&T, vol. 5, No. 118, 1 page (Oct. 29, 1990).
Cincinnati Bell Information Systems (Integrator Briefs), Computer Reseller News, No. 534, p. 129 (Jul. 12, 1993).
Cisco Partners with AT&T CMS on Network Switch Manufacturing, Lucent Technologies, http://www.lucent.com/press/0995/950926.mma.html, 2 pages (Sep. 26, 1995).
Citibank, New Castle Installation, one page (no date available).
Cooney,"*Frame* *Relay* Comes to Computerm Extenders," Network World, p. 14, 2 pages (Jun. 28, 1993).
Company Background and Product Guide, MagTek, 42 pages (no date available).
Computerm Announces Remote Check Imaging Support for VMC 8200 High-speed Channel Extension System, PR Newswire, p. 408LAM012, 2 pages (Apr. 8, 1996).
Computerm Earns MCI "Level 1" Approval; Computerm's Industry Exdusive Native *Frame * *Relay* Interface Passes Test for Interoperability with MCI's *Frame* *Relay* Services, Business Wire, p. 4121139, 2 pages (Apr. 12, 1995).
Computerm Eases Remote Imaging, (Introduces Remote Image Solution) Brief Article, American Banker, vol. 158, No. 156, p. 13A(1), 1 page (Aug. 16, 1993).
Computerm Enables Boatmen's Bancshares to Execute Remote Check Imaging, PR Newswire, p. 408LAM013 (Apr. 8, 1996).
Cortese, Image Yields Interest at Banks, Collaboration Results in Imaging System to Automate Check Processing, Computerworld, p. 6, 2 pages (Mar. 19, 1990).
Costanzo, "As Banks Cling to the Conventional, Check-imaging Struts Its Stuff," Bank Technology News, p. 1, 5 pages (Mar. 1994).
Crockett, Systematics to Use Deposited-check Imaging; Installation at Firm's N.J. Center Would Be the First by an Outsourcer, Systematics Financial Services Inc., Unisys Corp., American Banker, vol. 158, No. 95, p. 3(1), 2 pages (May 19, 1993).
Crone, Reducing Data Processing Costs with a Remote Item Processing System, Bank Administration, vol. 62, No. 10, pp. 44-46 (Oct. 1986).
Current Check Flow, PowerPoint Presentation, Check[1].ppt, pp. 1-4.
Department of Health and Human Services, Federal Register, vol. 77, No. 6, pp. 1556-1590, Jan. 10, 2012.
Depompa, "IBM Adds Image-based Processing," MIS Week, vol. 11, No. 12, p. 12(1), 2 pages (Mar. 19, 1990).
Dowdell, "Security," Email to fstc-imagE, 2 pages (Apr. 27, 1996).
Electronic Payment Systems Support/Check Processing Control System: Program Reference and Operations Manual, BM Corporation, 6 pages (Jun. 1986).
Encryption and Digital Signature Explained, Northern Telecom Inc., 4 pages (no date available).
Evans, "The End of Paper Wait: Document Imaging. (includes related articles on successful document imaging implementations at Borgess Medical Center, the Huntington Internal Medicine Group, the University of Alabama Health Services Foundation and Quest Diagnostics)(Industry Trend or Event)," Health Management Technology, vol. 18, No. 2, p. 16(5), 7 pages (Feb. 1997).
Fassett, "Impact of Imaging," Bank Management, vol. 67, No. 11, p. 56, 1 page (Nov. 1991).
Fisher, "IBM, Customers Continue Work on Document Image Processor," Datamation, vol. 34, No. 19, 3 pages (Oct. 1, 1988).
Fitch, "Check Image Capture Speeds Up Positive Pay Reconcilement," Corporate Cashflow, pp. 7 & 11 (Feb. 1995).
Fitch, "Digital Image Systems Speed Return Items, Exceptions," Corporate Cashflow, pp. 8 & 10 (May 1996).
Frequently Asked Questions on Drive Space Issues, Drive Space FAQ, 1 page (date unknown).
Fricke, "PACES Paperless Automated Check Exchange & Settlement Next Steps," Chase Manhattan Bank, 10 pages (Aug. 12, 1997).
Frost National Bank Selects NCR Over Old Mainframe Environment, AT&T News Release, http://www.aft.com/news/0493/930428.nca.html, 2 pages (Apr. 28, 1993).
FSTC Demonstrates Interbank Check Image Pilot; Multi-vendor System Speeds Check Clearing, Cuts Fraud, FSTC Projects—Check Image Exchange Project, Press Release, http://www.fstc.orq/projects/imaging/public/information.cfm, 2 pages (Dec. 12, 1995).
FSTC Financial Services Technology Consortium, PowerPoint Presentation, Ansi6v4[1].ppt, pp. 1-27 (no date available).
FSTC Interbank Check Imaging Unisys Monthly Status Report, pp. 1-7 (Jun. 26, 1996).
FSTC Interbank Check Imaging Unisys Monthly Status Report, pp. 1-9 (Jul. 22, 1996).
FSTC Projects, Check Image Exchange Project (a.k.a Interbank Check Imaging Project), Financial Services Technology Consortium, http://www.fstc.org/projects/imaging/index.cfm, 6 pages (Downloaded Oct. 30, 2002).
Garvey, "Check Processing Goes Digital—Chase Manhattan Bank to Store Checks Electronically, Saving Time and Money," Informationweek, No. 648, p. 20, 1 page (Sep. 15, 1997).
Gawen, "PC Based Document Image Processing and Signature Verification," OIS IMC91 Document Imaging, Proceedings of the Information & Image Management Conference, London, pp. 389-391 (Jul. 1991).
Global Concepts—Payment Systems Consulting, Global Concepts, Inc., http://www.global-concepts.com/image_archive.htm, 1 page (Downloaded Nov. 20, 2002).
Graf, R.F., "Modem Dictionary of Electronics," 6th Edition, 5 pages (1997).
"Guardian Analytics FraudDESK," Guardian Analytics, www.guardiananalytics.com, 2 pages, 2016.
Gullo, "NCR, Unisys Plan Check Imaging for IBM Systems," American Banker, vol. 156, No. 249, p. 1(2), 2 pages (Dec. 30, 1991).
Gwendolyn Lohse et al., "Federal Operating Rules for Healthcare Administrative Simplification," 2011 Payments, NACHA—The Electronic Payments Association, pp. 1-32, Apr. 3-6, 2011.

(56) References Cited

OTHER PUBLICATIONS

Hakeda, "The Image Object Content Architecture," IBM Systems Journal, vol. 29, No. 3, pp. 333-342 (1990).
Hanna, FSTC Image Exchange, POS Image Capture Pilot—Reader-Scanner Study, RDM Corp, 1 page (May 21, 1996).
"Healthcare in the Electronic Environment, Payment, Information and Communication Within the Revenue Cycle," Alacriti Cleaiwave, 2011 Payments, pp. 1-30, Apr. 3-6, 2011.
Helm, "Banks Check Into Image Processing," Computers in Banking, vol. 7, No. 3, p. 25(7), 8 pages (Mar. 1990).
Helm, "Who's Doing What in Image Processing. (includes definition of image processing)," ABA Banking Journal, vol. 33, No. 1, p. 31(3), 6 pages (Jan. 1991).
Helms, "Introduction to Image Technology," IBM Systems Journal, vol. 29, No. 3, pp. 313-332 (1990).
Henry Ijams et al., "Evaluating ePayables Opportunities to Improve A/P Efficiencies," pp. 1-28, Jun. 22, 2011.
High-Volume Data Capture Sans the Paper, Bank Systems & Technology, p. 35 (May 1996).
Horine, "AT&T and Fisery Team to Offer Imaging Solutions," AT&T News Release, http://www.att.com/news/0995/950913.nca.html, 2 pages (Sep. 13, 1995).
Huntington Bancshares in the Forefront of Technology with Purchase of Unisys Check Imaging System, PR Newswire, p. 1 (Oct. 11, 1989).
Moore, "IBM, Unisys Test Check Systems for Fed Reserve," Federal Computer Week, vol. 6, No. 21, p. 6(2), 1 page (Jul. 27, 1992).
Moreau, "Payment by Authenticated Facsimile Transmission a Check Replacement Technology for Small and Medium Enterprises—Payment Processing Overview," Connotech, http://connotech.com/PAYPROC.HTM, 23 pages (Downloaded Nov. 25, 2006).
Morris et al., "Image System Communications," IBM Systems Journal, vol. 29, No. 3, pp. 371-383 (1990).
Murphy, POD Check Imaging Faces New Challenges (In 1995 vs 1996, banks raised investment in check imaging by 9% from $198 mil and $215 mil; new low cost POD technology keeps it down), Bank Technology News, vol. 10, No. 3, p. 23, 3 pages (Mar. 1997).
National City, NCR Form Strategic Imaging Partnership, AT&T News Release, http://www.aft.com/news/1192/921109.nca.html, 3 pages (Nov. 9, 1992).
NCR, CKI to Market Image-based Credit Card Chargeback System, AT&T News Release, http://www.att.com/news/0193/930106.ncb.html, 2 pages (Jan. 6, 1993).
NCR and Arkansas Systems Announce Strategic Alliance, AT&T News Release, http://www.att.com/news/0793/930712.ncb.html, 2 pages (Jul. 12, 1993).
NCR and Cincinnati Bell Offer Image Processing Service, AT&T News Release, http://www.att.com/news/0194/940111.nca.html, 2 pages (Jan. 11, 1994).
NCR and Signet Banking to Provide Item Processing Services, AT&T News Release, http://www.att.com/news/0793/930713.ncb.html, 2 pages (Jul. 13, 1993).
NCR Demonstrates Full Line of Retail Products at NFR Conference, AT&T News Release, http://www.att.com/news/0193/930118.ncd.html, 3 pages (Jan. 18, 1993).
NCR Demonstrates Systems for Insurance and Accounting Industry, AT&T News Release, http://www.att.com/news/0592/920531.nca.html, 3 pages (May 31, 1992).
NCR Deposit Processing Technology Speeds Banking Operations, AT&T News Release, http://www.att.com/news/1292/921207.ncc.html, 3 pages (Dec. 7, 1992).
NCR Document Management System Includes Kodak, Ricoh Products, AT&T News Release, http://www.att.com/news/0493/930406.ncc.html. 3 pages (Apr. 6, 1993).
NCR Introduces Scalable Image Item Processing Solution, AT&T News Release, http://www.att.com/news/0196/960119.nca.html, 3 pages (Jan. 19, 1996).
NCR Offers New Image-Based Document Management System, AT&T News Release, http://www.att.com/news/0692/920623.ncb.html 3 pages (Jun. 23, 1992).
NCR Reports—Financial Services Trends & Technologies, NCR Corporation, Issue 4, 6 pages (1997).
NCR Signs DSI Alliance for Imaging Statement Processing, AT&T News Release, http://www.att.com/news/0792/920720.nca.html, 2 pages (Jul. 20, 1992).
NCR Unveils Client-Server Check Imaging (NCR introduced NCR Scalable Image Item Processing Solution, a client-server based system for image-based check processing), Bank Technology News, vol. 9, No. 3, p. 23, 1 page (Mar. 1996).
New ATM from AT&T GIS Features Automated Document Processing, AT&T News Release, http://www.att.com/news/1194/941129.ucb.html 4 pages (Nov. 29, 1994).
New Mexico Uses NCR Imaging Systems for Tax, Revenue Processing, AT&T News Release, http://www.att.com/news/0793/930712.ncc.html, 2 pages (Jul. 12, 1993).
News Release, Retail Banking Solution Enhanced, AT&T News Release, http://www.att.com/news/0590/900521.nca.html, 2 pages (May 21, 1990).
"Ninth National Medical Banking Institute, The Growing Collaboration of eHealth and Medical Banking, HIMSS G7 Operating Rules in Healthcare," pp. 1-11, Feb. 15, 2011.
Nixdorf Computer Introduces DCPA Image—A Sophisticated Document Image Processing System with Unglue capabilities, PR Newswire, 3 pages (Aug. 15, 1989).
Nixon, "Is Check Imaging for You? (automation in banking)(includes related articles)," Savings & Community Banker, vol. 2, No. 10, p. 28(6), 6 pages (Oct. 1993).
Norwest Bank Selects NCR Image-based Processing Systems, AT&T News Release, http://www.att.com/news/0893/930802.nca.html, 3 pages (Aug. 2, 1993).
Nugent W.R. "Specifications for a Stack Droid: Robotics Required for Large Libraries of Digitized Images on Optical Disk," 1 page (date unknown).
O'Heney, Prepare for the Image Revolution. (Bankers and Vendors)(image processing; includes related article listing image processing products)(buyers guide), Computers in Banking, vol. 6, No. 10, p. 24(6), 8 pages (Oct. 1989).
On the ImagingTechnology Front (Unisys Corp is in an accord to Remarket Broadway & Seymore Inc's VisualImpact software, a midrange check-imaging system), American Banker, vol. CLXI, No. 68, p. 26, 1 page (Apr. 10, 1996).
PACES—Paperless Automated Check Exchange & Settlement—Project Proposal, FSTC, PACESPRO[1].doc, 25 pages (Apr. 23, 1998).
PACES—Paperless Automated Check Exchange & Settlement—Requirements Document, FSTC, PACESRequirements[1].doc, 25 pages (Apr. 3, 1998).
Padgett, T., "Melville, N. Y.—Based DataTreasury Fights J.P. Morgan Chase over Patent," Newsday, 4 pages (Oct. 22, 2003).
Paperless Automated Check Exchange and Settlement (PACES), FSTC Projects, http://www.fstc.org/projects/paces/projstatus.cfm, 2 pages (Jun. 22, 2000).
"Payment Trends in the Healthcare Industry," A Survey of Healthcare Providers, pp. 5-38, Fall 2010.
Perry et al., "Experience Gained in Implementing ImagePlus," IBM Systems Journal, vol. 29, No. 3, pp. 467-488 (1990).
Plesums et al., "Large-Scale Image Systems: USAA Case Study," IBM Systems Journal, vol. 29, No. 3, pp. 343-355 (1990).
Priya Malhotra, "Clearing House Enumerates e-Payment IIIs," American Banker, 4 pages (Aug. 13, 2002).
Regions Bank Selects ImageSoft to Provide Imaging Solution, Business Wire, p. 9161220, 2 pages (Sep. 16, 1997).
Richard D. Marks, "Ninth National Medical Banking Institute, The Growing Collaboration of eHealth and Medical Banking, Health Record Banking: Changing the Game for Healthcare Information Technology, An Analysis of ahecking Accounts for Health Information," pp. 1-13, Feb. 10, 2011.
Robert Hunter, "Letter Re: CMS-0024-IFC, Adoption of Standards for Health Care EFTs and Remittance Advice," pp. 1-10, Mar. 12, 2012.

(56) References Cited

OTHER PUBLICATIONS

Roldan, PACES—Paces Models—FSTC Project, Chase Manhattan Bank, 19 pages (Jul. 17, 1997).
Roldan, "Project Overview—PACES Planning Meeting", New York City, FSTC, PacesOverview40[1].ppt, 28 pages (Dec. 19, 1997).
Russ Waterhouse, "Administrative Simplification under the Patient Protection and Affordable Care Act Standards and Operating Rules for Electronic Funds Transfer (EFT) and Remittance Advice (RA)," National Committee of Vital and Health Statistics (NCVHS) Subcommittee on Standards, pp. 1-11, Dec. 3, 2010.
Russ Waterhouse, "National Committee on Vital and Health Statistics (NCVHS) Subcommittee on Standards, Administrative Simplification Under the Patient Protection and Affordable Care Act, Standards and Operating Rules for Electronic Funds Transfer (EFT) and Remittances Advice (RA)," The Clearing House, pp. 1-5, Dec. 3, 2010.
Russ Waterhouse et al., "The Healthcare Payments Solution: What's in It for the Banking Industry," NACHA Payments 2011, pp. 1-17, Apr. 5, 2011.
Ryman, "Personal Systems Image Application Architecture: Lessons Learned from the ImagEdit Proaram," IBM Systems Journal, vol. 29, No. 3, pp. 408-420 (1990).
"SAS® Fraud Management—Real-time scoring of all transactions for fast, accurate fraud detection," Product Brief, SAS, www.sas.com, 6 pages, 2015.
Schwartz, "Banks to Test Imaging for Clearing Checks," CommunicationsWeek, p. 35, 2 pages (Sep. 14, 1992).
Signet Bank Processes Over 2,500 Documents/Hour in Unisys Check Imaging Tests, PR Newswire, p. 0409P8428, 2 pages (Apr. 9, 1991).
Softchec Licenses 'Envision' Image Solution to West Suburban Bank, PR Newswire, p. 116SETU002, 2 pages (Jan. 16, 1996).
Spencer, "Scanning Goes Vertical: A Big Future for Specialized Check Scanning; Check Scanning Technology," Advanced Imaging, pp. 42-44 (Oct. 1997).
IBM 3898 Image Processor, Product Announcement, IBM, 3 pages (Mar. 19, 1990).
"IBM 3995 Optical Library Dataserver—Economical, high-capacity, removable optical storage," IBM Corporation, 4 pages (1991).
"IBM ImagePlus Fact Sheet," IBM Corporation, 2 pages (1991).
"IBM's ImagePlus eases transformation of the Worker's Compensation Board," IBM Corporation, 2 pages (1991).
"IBM's ImagePlus key to improving Royal Trust's customer service," IBM Corporation, 2 pages (1991).
"IBM's ImagePlus: Making USAA's 'Impossible Dream' a reality," IBM Corporation, 3 pages(1991).
IBM X9.46 Pilot Status—Summary, 3 pages (no date available).
IdeaCopTM OpenOpposition Prior Art Report for now U.S. Pat. No. 5910988 by PatenTrakkerTM, Email regarding USPTC Reexam. C.N. U.S. Appl. No. 90/007,829, Requested Date: Nov. 25, 2005, from "PT" <admin@patentrakker.com>, pp. 1-13 (May 10, 2006).
Image Can Be . . . Everything!, At Your Service, A Newsletter from the Federal Reserve Bank of Kansas City, pp. 1-6 (Special Edition—Summer 1995).
Image Processing Survival Guide, vol. II—Sure-Fire Strategies for Implementing Image-Remittance, Phillips Business Information, Inc., 40 pages (1996).
Imaging Products, United States Banker, vol. 100, No. 8, p. 23(3), 6 pages (Aug. 1990).
Imaging Technology: Generating New Bank Revenues in the Age of the Consumer, NCR Reports—Financial Services Trends & Technologies, NCR Corporation, Issue 1, 4 pages (Jan. 1997).
Imaging Vendors Shape Processing, Banking Management, vol. 69, No. 4, p. 29, 1 page (Apr. 1993).
Implementing Imaging Payment Systems: Managing Change to Achieve Results, NCR Reports—Financial Services Trends & Technologies, NCR Corporation, Issue 2, 3 pages (Feb. 1997).
Implementing National Electronic Payment System in Emerging Economies, NCR Reports—Financial Services Trends & Technologies, NCR Corporation, vol. 1, Issue 7, 12 pages (1997).
Information Technology Outsourcing: Sharpening Management Focus in Financial Institutions, NCR Reports—Financial Services Trends & Technologies, NCR Corporation, Issue 5, 6 pages (1997).
Integrated, Customer-Focused Banking Architecture: Tomorrow's Competitive Edge, NCR Reports—Financial Services Trends & Technologies, NCR Corporation, Issue 3, 6 pages (Mar. 1997).
Interbank Check Image Project, FSTC, PowerPoint Presentation, no1016V4[1].ppt, 18 pages (no date available).
Interbank Check Imaging, FSTC General Meeting—Orlando, Florida, 5 pages (Apr. 17, 1997).
Introducing the Age of Document-Image Processing, FileNetTM Brochure, FileNet Corporation, 13 pages (1984).
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-6, Nov. 15, 2010.
Irfan Ahmad, "Payments Processor Perspective on EFT Enrollment," Hearing 2—Section 10109 of the Affordable Care Act Provider Enrollment Forms, National Committee of Vital and Health Statistics (NCVHS) Subcommittee on Standards, pp. 1-5, Nov. 18, 2011.
Item Processing Leaps Ahead with VisualImpact and Windows NT. (Sponsored Supplement: Unlock Your Back Office with Microsoft BackOffice), US Banker, vol. 105, No. 6, p. S4(3), 4 pages (Jun. 1995).
J. Estep, "Ninth National Medical Banking Institute, The Growing Collaboration of eHealth and Medical Banking, Banks Engaging in Healthcare Reform," pp. 1-20, Feb. 21, 2011.
J. Steven Stone et al., "Healthcare Reform: What Does It Really Mean for Banks?," Nacha, pp. 1-37, 2011.
J.P. Morgan, "Addressing the Administrative Cost Trajectory in a New Environment," Post-Reform Opportunities for Healthcare Payments, pp. 1-14, Apr. 27, 2010.
Janusky, FSTC Interbank Check Imaging, 6 pages (Apr. 29, 1996).
Janusky, FSTC Interbank Check Imaging, 7 pages (May 22, 1996).
Jim St. Clair et al., "Ninth National Medical Banking Institute, The Growing Collaboration of eHealth and Medical Banking, Banking Platforms: Creating Programs to Speed Innovation in Healthcare," pp. 1-28, Feb. 11, 2011.
Joint Marketing & Referral Agreement Between ACS Image Solutions, Inc. and JPMorgan Chase Bank, 27 pages (Mar. 15, 2002).
JPMorgan Chase and DataTreasury Settle Patent Dispute, Company Announcement, DataTreasury Corporation, http://www.finextra.com/fullpr.asp?pf=y&id=4989, 1 page (Jul. 6, 2005).
Kingman III et al., "Operational Image Systems: A New Opportunity," IBM Systems Journal, vol. 29, No. 3, pp. 304-312 (1990).
Kniskem, "Engineering a Visionary Solution," Datamation, vol. 36, No. 8, pp. 1-3 (Apr. 15, 1990).
Kniskem, J.M., "Strategic Rethinking," 6 pages (date unknown).
Kutler, "AT&T, IBM and Unisys Join Bank Resrearch Group. (Financial Services Technology Consortium)," American Banker, vol. 159, No. 124, p. 14(1), 3 pages (Jun. 29, 1994).
MagTek Adds Enhanced Reading to MICRImageTM—New Reading Capability Supports Check Conversion with Higher Reliability, MagTek Press Release, 3 pages (Jan. 9, 2003).
MagTek Unveils Excella, a Dual-side Scanner for Check 21 Applications, 1 page (May 10, 2004).
MagTek Upgrades Its MICRImageTM Check Reader/Scanner—V. 34 Modem Supports High-Speed Image Archiving for Check Conversion, MagTek Press Release, 3 pages (Jun. 12, 2002).
MagTek's MICRImage Transmits Check Images at Speed of Ethernet, MagTek Press Release, 2 pages (Feb. 14, 2002).
Marjanovic, "Home Loan Bank to Offer Check-image Statements to Members' Customers. (Federal Home Loan Bank of Pittsburgh)(Brief Article)," American Banker, vol. 159, No. 248, p. 14(1), 2 pages (Dec. 29, 1994).
Marjanovic, "Mich. National Streamlines Imaging with IBM System. (check imaging)," American Banker, vol. 160, No. 176, pp. 1-2 (Sep. 13, 1995).

(56) References Cited

OTHER PUBLICATIONS

Marjanovic, "Payment Groups Square Off Over Electronic Check Plan," American Banker, 1 page (May 8, 1996).

Matt Brodis et al., "Best Practices for Migrating Healthcare Payments to ACH," pp. 1-39, Apr. 3-6, 2011.

Matthew Smith and Victoria Terekhova, "Electronic Payments in Healthcare: Overcoming the Challenges," pp. 1-25, Apr. 3-6, 2011.

McGinn, "IBM ImagePlus High Performance Transaction System. (IBM Harnesses Image Processing to Make its 389x/XP Cheque Processors More Efficient)(Product Announcement)," Computergram International, No. 1389, p. CG103210008, 2 pages (Mar. 21, 1990).

Messmer, "Hurdles Stand in Way of Electronic Checking," Network World, p. 33, 1 page (Sep. 4, 1995).

Methodology and Value, Image Archive Forum, 20 pages (Sep. 19, 1997).

Meyerson, "PACES Redeposit Processing," pp. 1-60 (no date available).

MICR Technology Helps Eliminate POS Check Fraud, Chain Store Age Executive, p. 79 (Sep. 1991).

Minoli, D., "Imaging in Corporate Environments Technology and Communication," McGraw-Hill, Inc., 315 pages (1994).

Entity Relation Diagram

Create A Bank Profile

Create A Bank Profile (cont'd)

Delete A Bank Profile

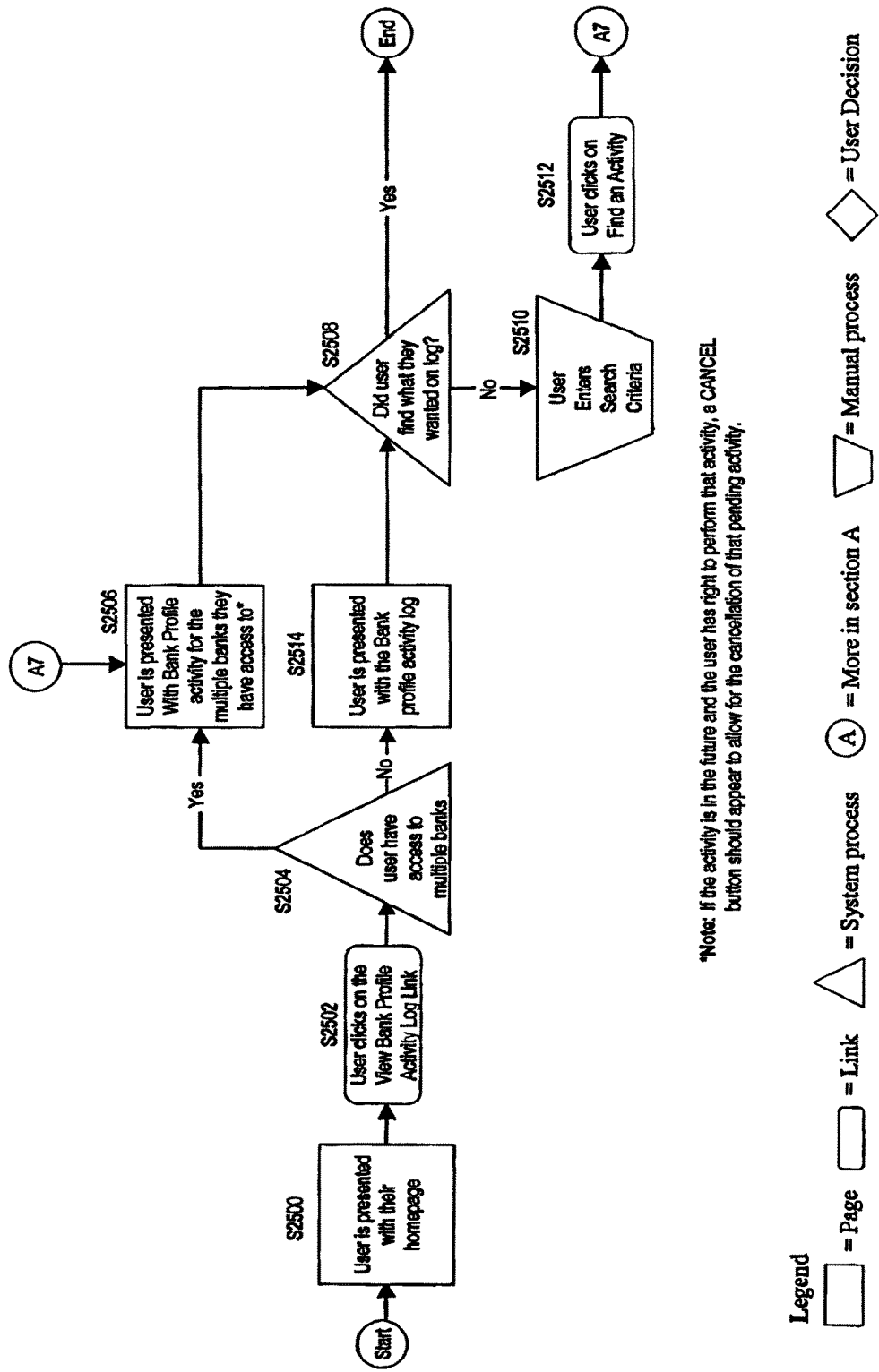

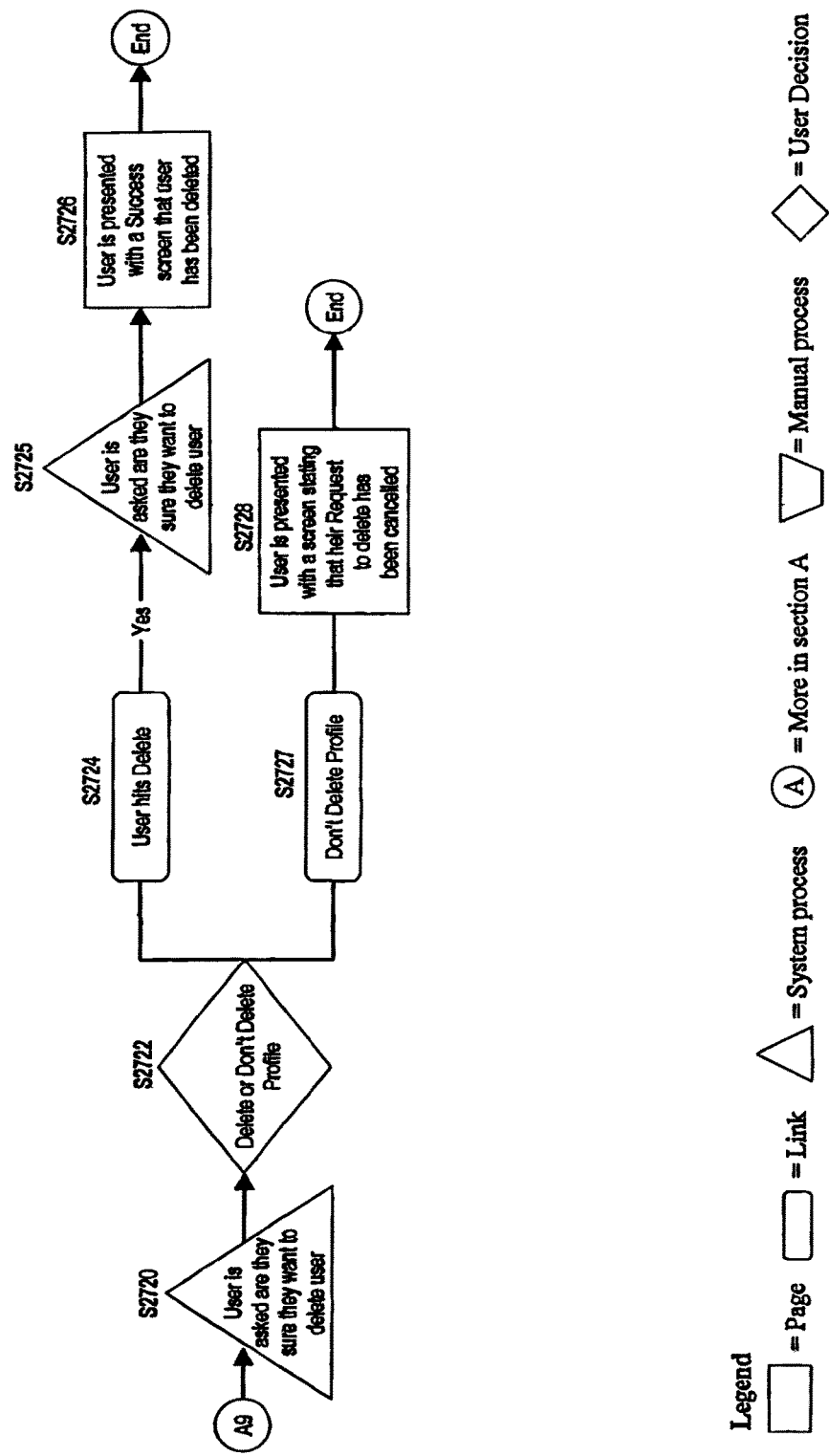
FIG. 16B Delete A User

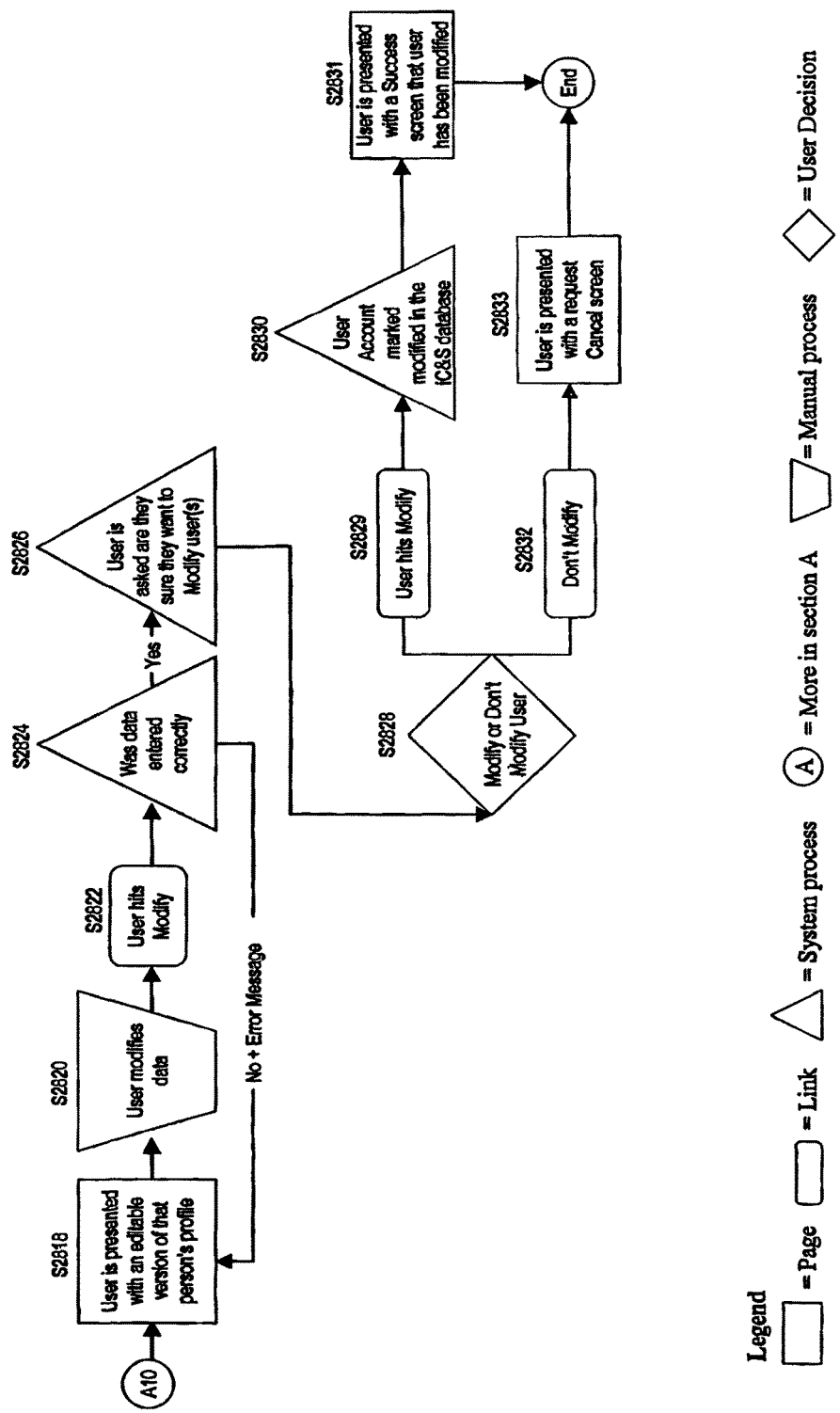

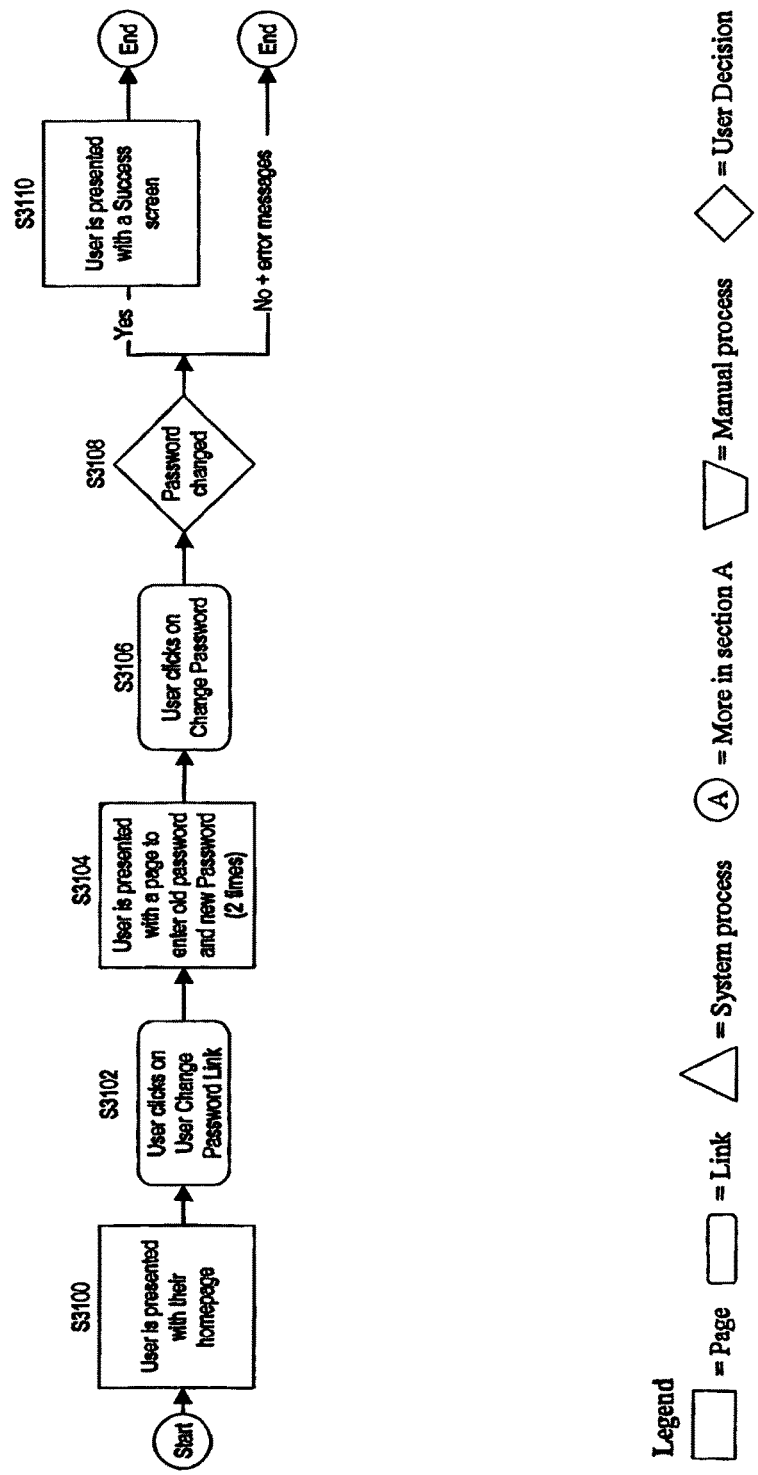

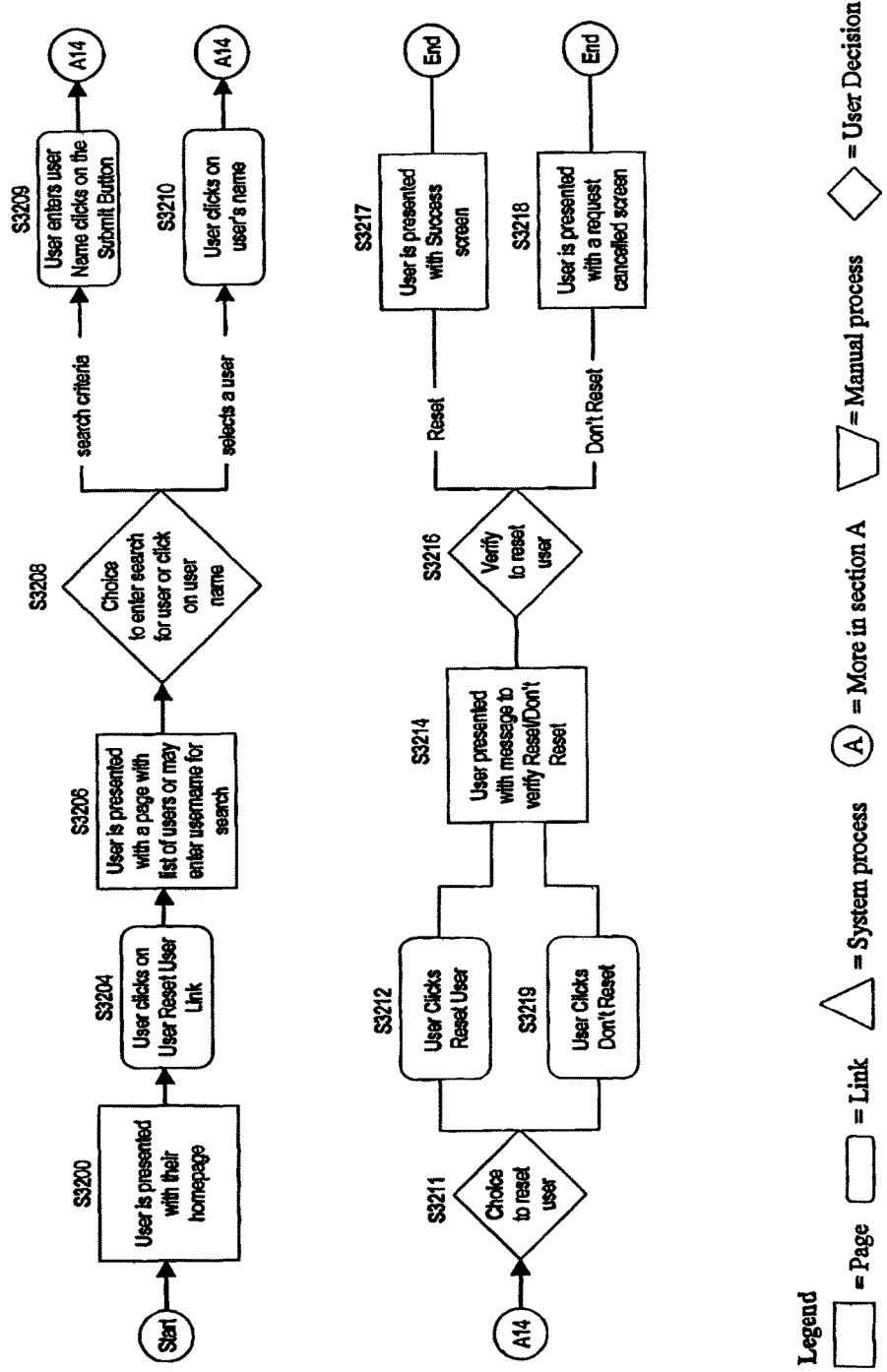

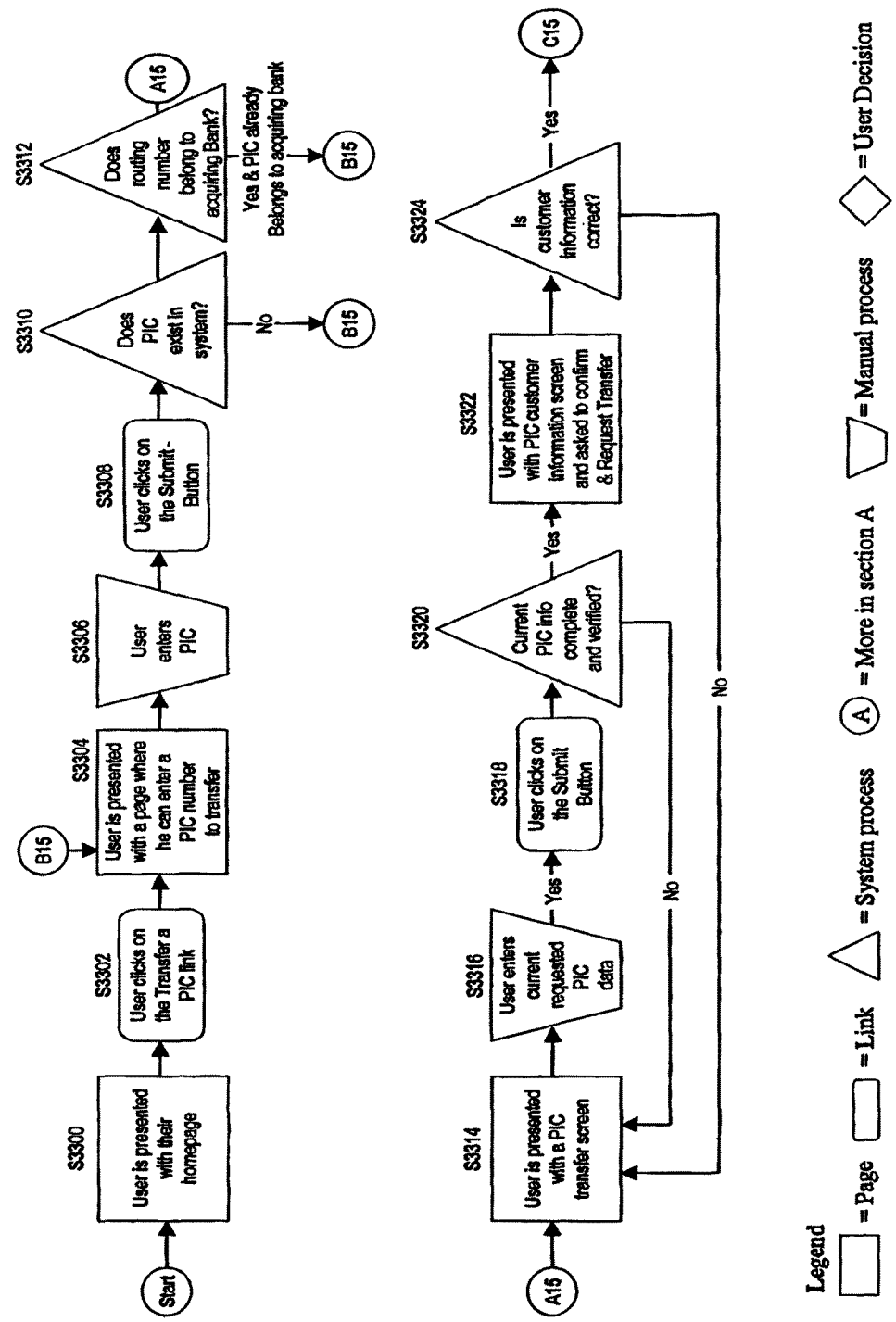
FIG. 22A Transfer a PIC

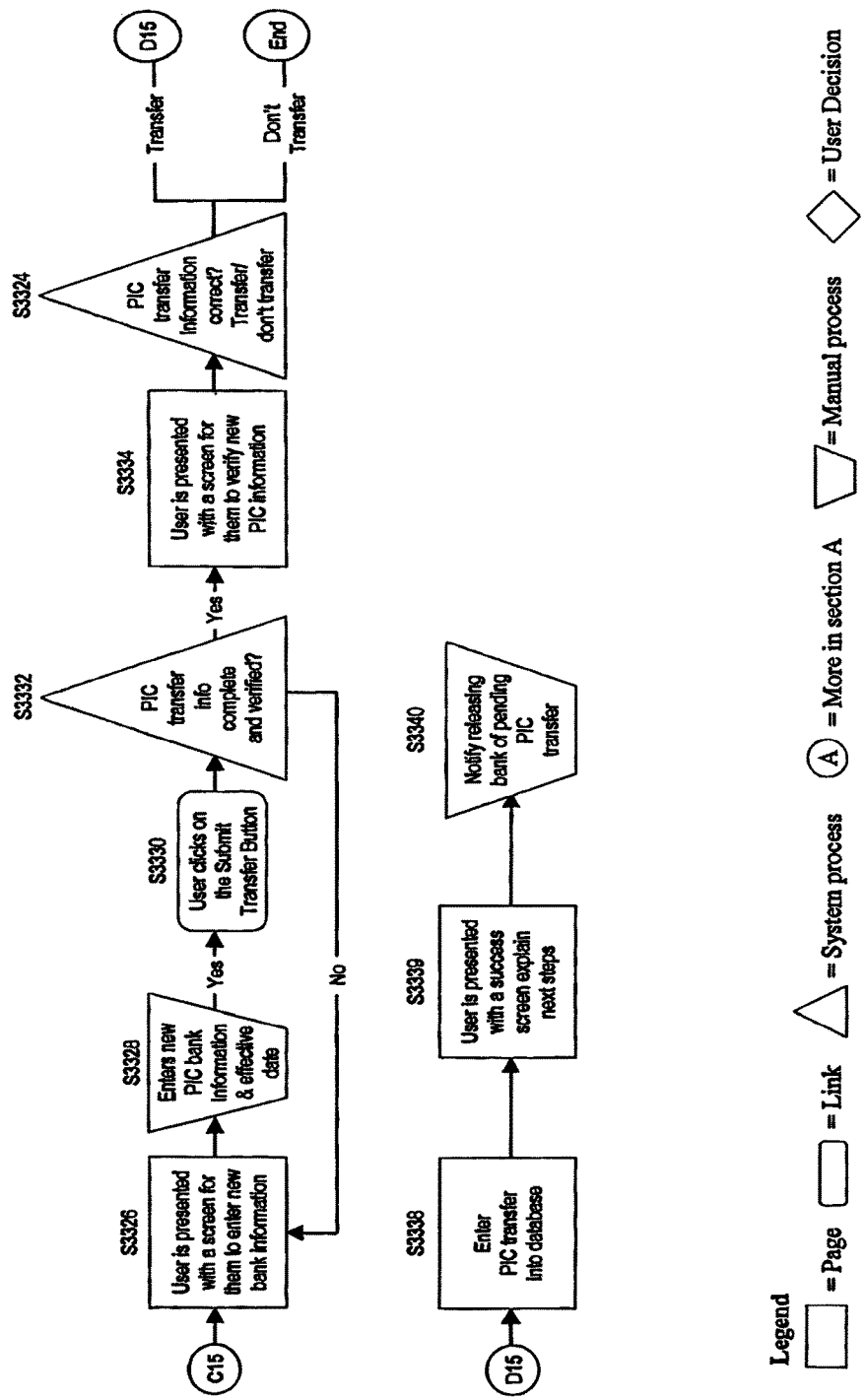

Reactivate A PIC

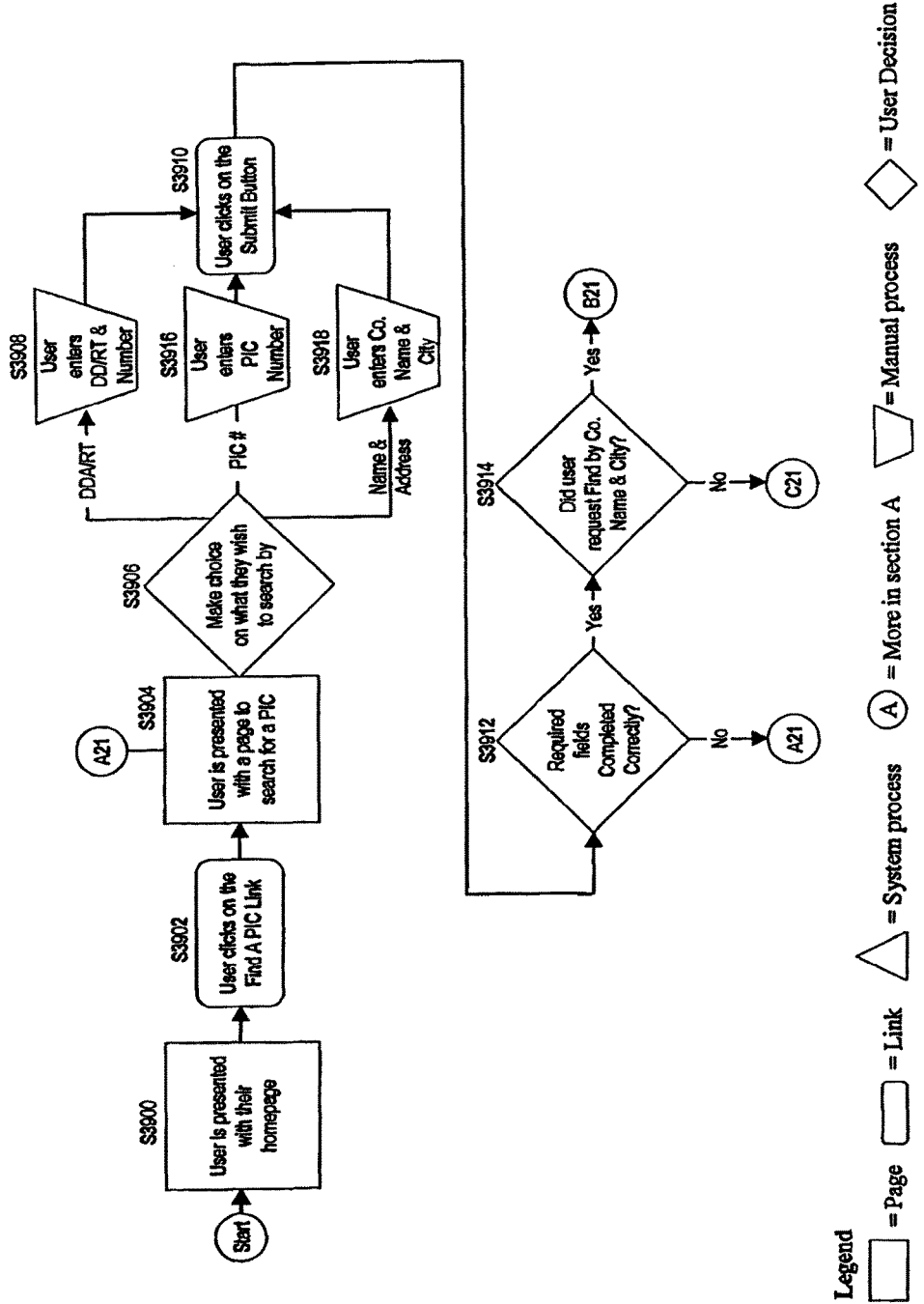

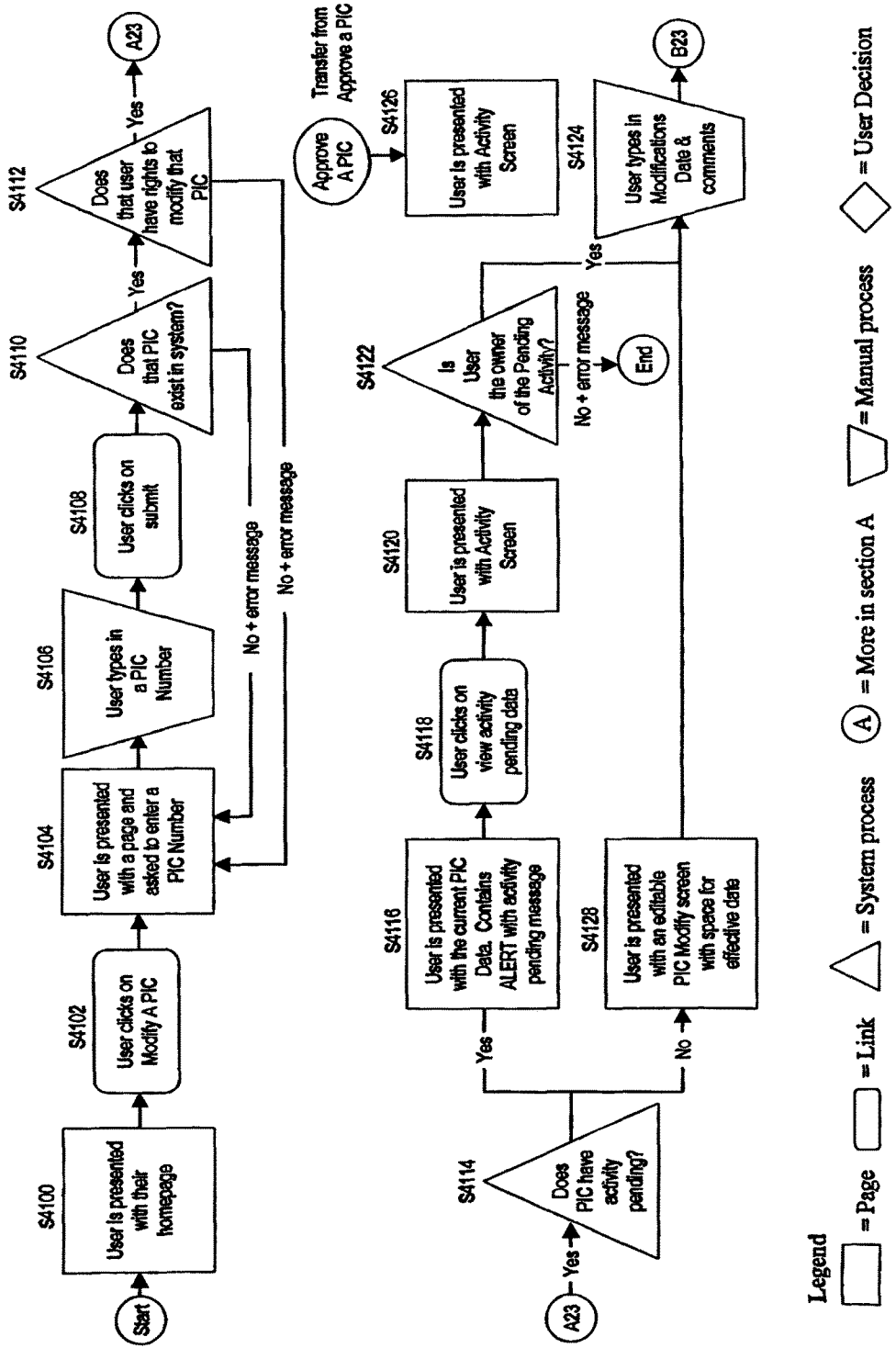
FIG. 30A   Modify A PIC

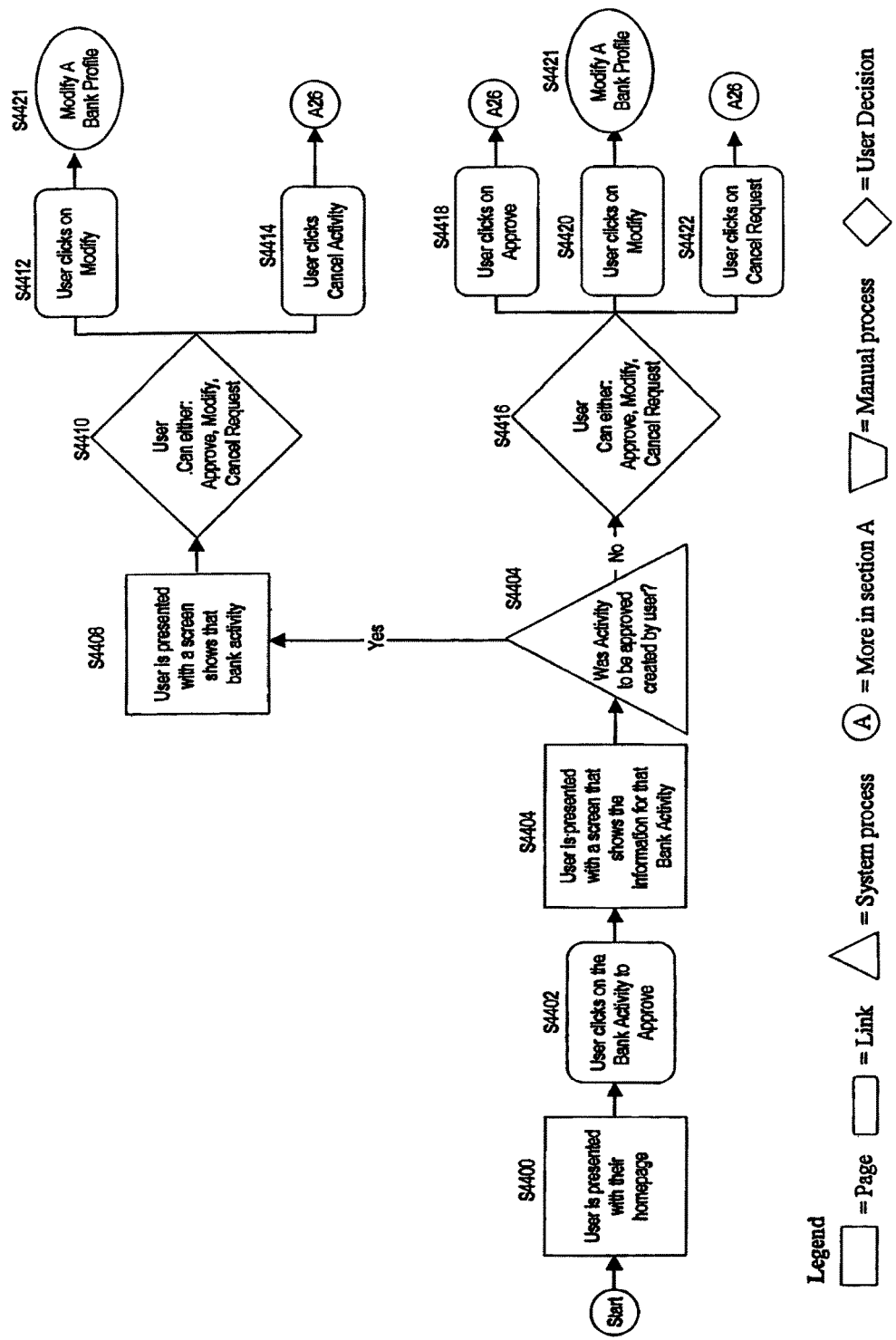
FIG. 33A    Approve A Bank Profile Modification

Approve A Bank Profile Modification

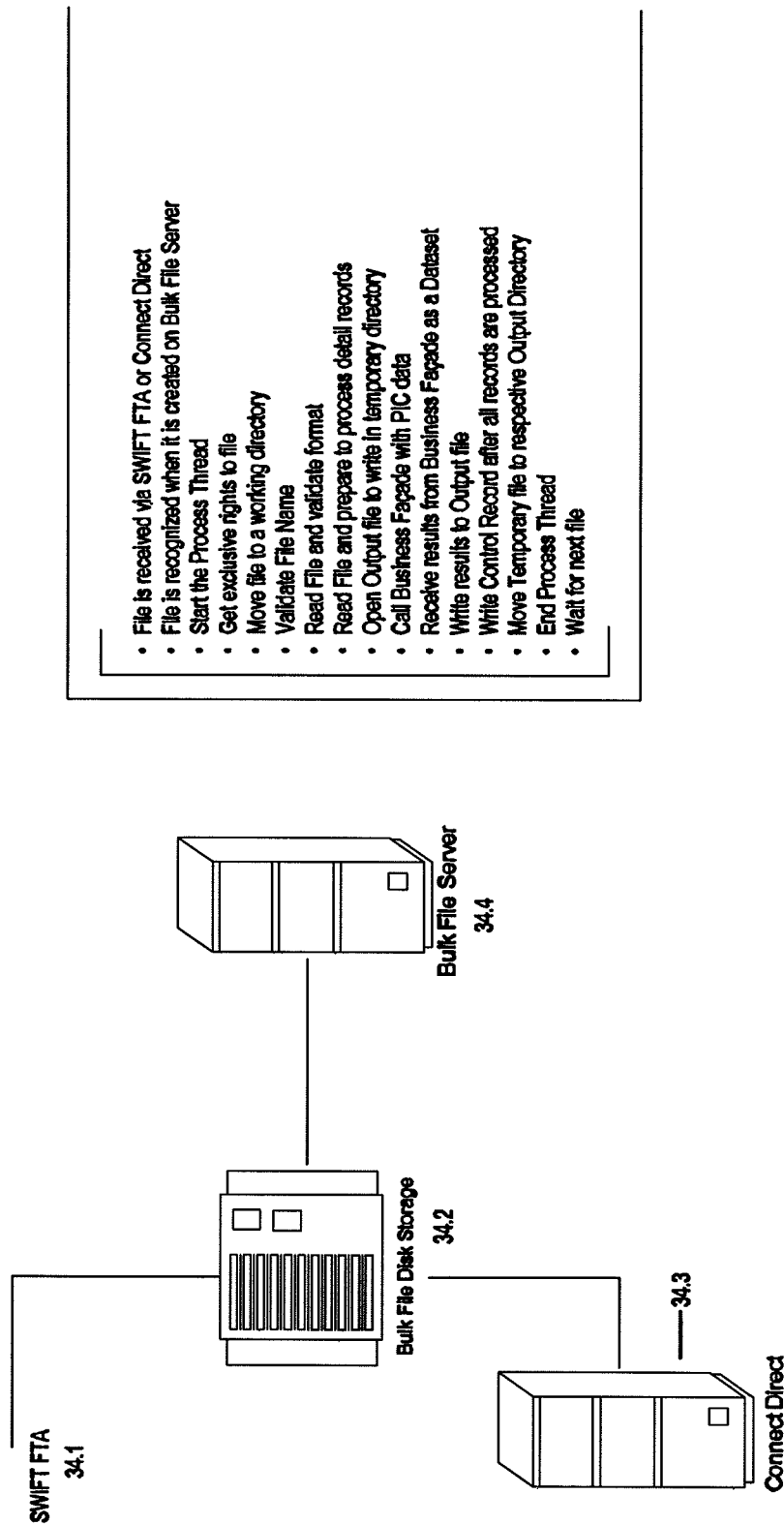
FIG. 34  PIC BATCH SERVICE

PAYMENT IDENTIFICATION CODE AND PAYMENT SYSTEM USING THE SAME

CROSS REFERENCE TO RELATED APPLICATIONS

This application is a continuation of U.S. patent application Ser. No. 14/514,124, filed on Oct. 14, 2014, now abandoned, which is a continuation of U.S. patent application Ser. No. 14/181,474, filed on Feb. 14, 2014, now abandoned, which is a continuation of U.S. patent application Ser. No. 13/748,448, filed on Jan. 23, 2013, now abandoned, which is a continuation of U.S. patent application Ser. No. 13/116,584, filed on May 26, 2011, now abandoned, which is a continuation of U.S. patent application Ser. No. 10/420,726, filed on Apr. 23, 2003, now U.S. Pat. No. 7,979,348, issued on Jul. 12, 2011, which claimed the benefit of U.S. Provisional Application No. 60/374,936, filed on Apr. 23, 2002. The present application claims a priority benefit to all such applications, and the disclosure of each of those applications is hereby incorporated by reference in its entirety, as if fully set forth herein.

BACKGROUND OF THE INVENTION

Field of the Invention

The present invention relates to systems and methods of making electronic payments. In particular, the present invention relates to systems and methods for making payments to and from banking institutions.

Description of the Related Art

With the emergence and adoption of the Internet and related technologies, businesses are moving toward electronic integration of supply and financial chains. Complete financial integration requires the ability to issue information-rich, secure, private and guaranteed final payments.

Consumer-to-business e-payment has grown steadily over the past years, but business-to-business (B2B) e-payment growth has been much slower. Among the reasons for this lack of growth in B2B e-payments are the fear that e-payments would lack remittance information and other vital data, and the reluctance to give out account numbers.

The current environment for payments involving businesses and banks is primarily a paper one. The efficiency of paper processing has created a weak electronic bill payment infrastructure. Banks are at the center of the bill payment process. They hold customer accounts from which payments are authorized and are positioned to deliver the remittance information to the biller. Banks are also positioned to deliver invoice information to the biller's customers who are also the banks' customers.

In conventional non-electronic bill payment systems, where an ongoing relationship exists, a party initiating payment (hereinafter "payor") pays a debt to a biller by mailing a check in response to receipt of the biller's invoice. The term "biller" is used to refer to the "payee" or entity to be paid. Attached to most biller's invoices is a payment coupon to be returned with the check. The coupon contains at least the consumer-biller account number, as well as other information that will assist the biller, or the biller's bank, in properly crediting the consumer (i.e., the party initiating payment) with payment.

The need to improve payment systems was recognized in the late 1960s. Special committees on paperless entries were formed and alternatives to paper checks were developed. From this early work, the first automated clearing house (ACH) for the exchange of consumer-oriented paperless entries was established. The early ACH associations worked with their local Federal Reserve Bank to provide the facilities, equipment, and staff to operate an automated clearing house. Ultimately this lead to the development of the Electronic Payment Network (EPN), which is a private sector automated clearing house operator.

The ACH network is a low-cost electronic payment mechanism that can be used to pay both individual consumers and companies, regardless of size. In order to use the ACH network, bank routing information and payee (demand deposit account (DDA) identifier) account number must be supplied. This information must either be supplied by the initiator of the payment, or must be retained by the banking system of the payor. This presents a major problem that inhibits widespread use of the ACH network because bank routing and account information of the payee is rarely conveyed to payors for use in initiating payment instructions.

One type of system used in processing international and domestic payments electronically is the Clearing House Interbank Payments System (CHIPS), which was established in 1970. CHIPS is the foremost means for transferring U.S. dollars among world banks. In the CHIPS, a universal identifier (UID) number is utilized that uniquely identifies individual customer accounts. The CHIPS UID number is a six-digit number that is used to identify named accounts at depository institutions on the CHIPS.

Another system used for processing electronic payment is the Electronic Payment Network.

Because of the problems of security, authorization, authenticity, the fear that e-payments would lack remittance information and other vital data, and the reluctance of businesses to give out account numbers, there exists a need for a system and method that would enable the initiation and receipt of electronic payments with full remittance information that leverages the best features of existing electronic payment systems, such as ACH EPN and CHIPS, as a backbone to the system and method.

The need also exists for maintaining the confidentiality of account information and provide ease of maintenance when an account holder transfers from one depository institution to another.

Future enhancements to electronic bill payment will be integrated with existing systems, including the present invention, to form a complete supply and financial chain integration, as depicted in FIG. 1.

As shown in FIG. 1, the iClearing & Settlement (iC&S) allows for modular implementation wherein existing infastructures/processes, such as CHIPS and EPN, provide the basis for an electronic payment system. Envisioned is a new, future payment channel, XML of Rich Payment information that allows the Buyer's Bank and the Seller's Bank to communicate directly with the iC&S system for electronic payments. The Financial Services Solution provides adjudicated invoices to the Buyer's Bank and Rich Information (XML) to the Seller's Bank of buy and sell transactions between a Buyer and Seller.

SUMMARY OF THE INVENTION

The present invention has been made to solve the above-explained conventional problems, and it is an object of the invention to provide a secure electronic payment method. It is another object of the invention to maintain the confidentiality of account information. The objects of the invention are realized by a method for effecting electronic payment between an originator's account and a beneficiary's account, safeguarding banking and account information, while utilizing existing payment systems, and to a system that operates in accordance with the method. The method comprises generating a system routing number and a payment identification code (PIC) relating to the beneficiary's account information, distributing a list of payment identification codes to the existing payment system and financial institutions owning the account related to the payment identification codes on the list, and the originator receiving a system routing number and the beneficiary's PIC number. The method also includes the originator communicating a payment instruction to a financial institution of the originator, wherein the payment instruction includes the system routing number beneficiary's payment identification code, the originator's financial institution receiving the payment instruction from the originator, wherein if the received PIC matches the originator's financial institution internal list of PICs, the originator's financial institution performs an "on us" transaction, and transmitting a payment instruction to an existing payment system in a case where the received PIC does not match originator's financial institution internal list of PICs. The method further includes the existing payment system validating the received PIC against a PIC database, wherein if the PIC is invalid, the payment instruction is returned to the originator's financial institution, converting the PIC and system routing number to a receiving payment instruction in a case where the PIC is a valid PIC, wherein the receiving payment instruction includes the beneficiary's financial institution's routing number and the beneficiary's account number. The existing payment system transmits the receiving payment instruction to a financial institution of the beneficiary, the beneficiary's financial institution credits the beneficiary's account if no problem exists, and otherwise returns a receiving payment instruction to the existing, payment system. Upon receipt of the returned receiving payment instruction by the existing payment system, the existing payment system translates the receiving payment instruction into the payment instruction prior to transmitting the payment instruction back to originator's financial institution, wherein the payment identification code is unique to each beneficiary's account.

According to another aspect of the present invention, a web-based payment method is provided for effecting electronic payment between an originator's account and a beneficiary's account utilizing existing payment systems. The method includes generating a payment identification code and a system routing number uniquely identifying account information of the beneficiary, distributing the payment identification code and the beneficiary's account information relating to the payment identification code to the existing payment systems, the beneficiary transmitting the payment identification code to the originator, and in response to a payment order from the beneficiary, the originator transmitting a payment instruction to the financial institution of the originator. The payment instruction includes the payment identification code of the beneficiary, and the amount to be paid. The method also includes the originator's financial institution processing and transmitting a payment instruction to an existing payment system to effect an electronic funds transfer of funds, the existing payment system converting a payment identification code included in a payment instruction to the beneficiary's account information and forwarding a converted payment instruction to the beneficiary's financial institution, and the beneficiary's financial institution effecting an electronic funds transfer on the basis of the converted payment instruction by crediting the beneficiary's account. According to one embodiment of the invention the communications between the originator, the financial institution of the originator, the existing payment system, the beneficiary's financial institution, and the beneficiary is accomplished at least partly via the Internet, although in other embodiments, at least some or all of the communication may take place via any other suitable type of network of interest.

According to a further aspect of the present invention, a secure electronic payment method between a consumer and a biller facilitated through an existing payment system is provided. The method includes generating a payment identification code unique to a biller's account information, distributing the payment identification code to the biller and the existing payment system, the biller communicating the payment identification code to the consumer, and the consumer electronically transmitting a payment instruction via the consumer's financial institution to the existing payment system. The payment instruction preferably comprises information indicating at least source of the consumer's account information, a payment amount, and the biller's payment identification code. The method also includes the existing payment system validating the payment identification code of the biller, and, upon validating the payment identification code of the biller, the existing payment system converting the payment identification code of the biller included in the payment instruction into the biller's account information which includes the routing number of the biller's financial institution. Further steps include transmitting the converted payment instruction to the biller's financial institution, applying a credit to the biller's account in an amount corresponding to the payment amount included in the payment instruction, and applying a debit to the consumer's account in an amount corresponding to the payment amount included in the payment instruction.

Further objects, features, and advantages of the present invention will become apparent from the following detailed description of the invention with reference to the attached drawings.

BRIEF DESCRIPTION OF THE DRAWINGS

The present invention will be more readily understood from a detailed description of the preferred embodiments taken in conjunction with the following figures.

FIG. 14 is a flowchart of a view bank profile activity log process;

FIGS. 16A and 16B are a flowchart of a delete user process;

FIGS. 17A and 17B are a flowchart of a modify user process;

FIG. 20 is a flowchart of a change password process;

FIG. 21 is a flowchart of a reset user process;

FIGS. 22A and 22B are a flowchart of a transfer PIC process;

FIGS. 28A and 28B are a flowchart of a find a PIC process;

FIGS. 30A and 30B are a flowchart of a modify PIC process;

FIGS. 33A and 33B are a flowchart of an approve bank profile modification process;

FIG. 34 is a block diagram of a PIC batch service.

DETAILED DESCRIPTION OF THE PREFERRED EMBODIMENTS

The system using the payment identification code of the present invention will have the advantage of encouraging the use of electronic payments between business buyers and sellers. To employ the concept, banks are issued a unique payment identifier code (PIC) number for each business customer demand deposit account (DDA). As part of the issuance process, a trusted third party, such as a clearing house, for example the New York Clearing House, links sensitive information related to the seller and its individual DDA to the issued PIC number. Such a trusted third party will set up a system (hereinafter "the system") that will, among other things, maintain and distribute PIC numbers for all that wish to use them. As a result, confidential account relationship information is masked to outside parties. Individual sellers communicate their PIC numbers to buyers who are then capable of originating payments using the PIC number. Upon receipt of a payment instruction containing a valid seller PIC number, a payment system, such as EPN or CHIPS, can then access the PIC database to retrieve associated account information required to execute the payment.

The use of the PIC number promises to deliver several benefits:

First, increased security. By safeguarding banking and account information, corporations minimize the potential for fraudulent account activity. This benefit is very important for Internet-based transactions where counter-parties do not know each other. Also, it is envisioned that the PIC number will be an integral component of the open-standards-based payment channel of the future.

Second, portability. Preferably, individual PIC numbers will remain with business customers regardless of changes in their banking relationships or account information such as address. As a result, corporations can communicate a single payment identification code to trading partners, a code that never changes.

Third, efficiency. Presently, 12 billion business-to-business checks are written each year. It is envisioned that the PIC number will be able to be used by businesses that do not employ electronic payments as part of their financial operations. Reducing the number of paper-based payments increases efficiency for all members of the financial chain.

Figure 1:
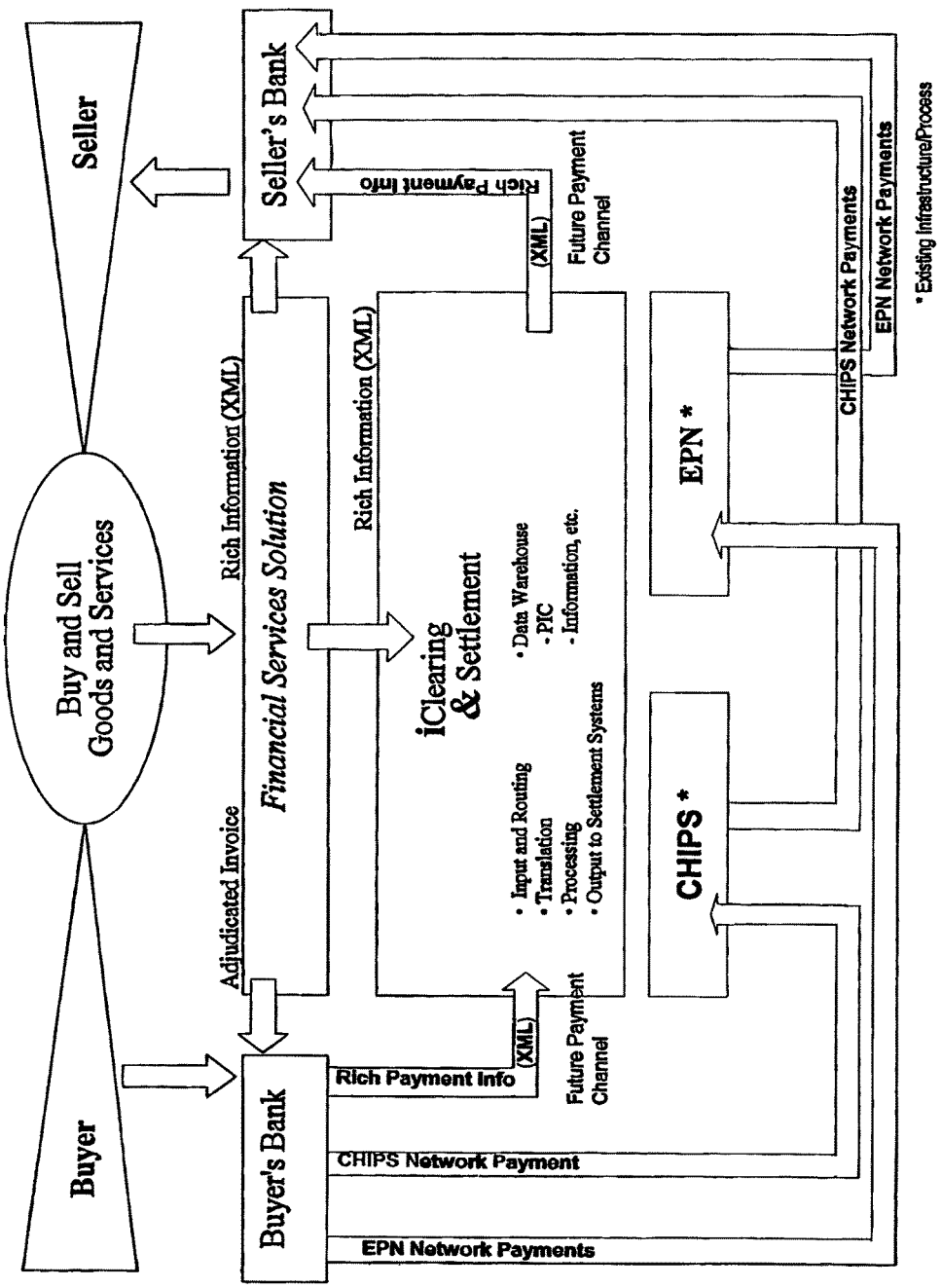
FIG. 1 is a block diagram of potential future integration of supply and financial chains.
Figure 2:
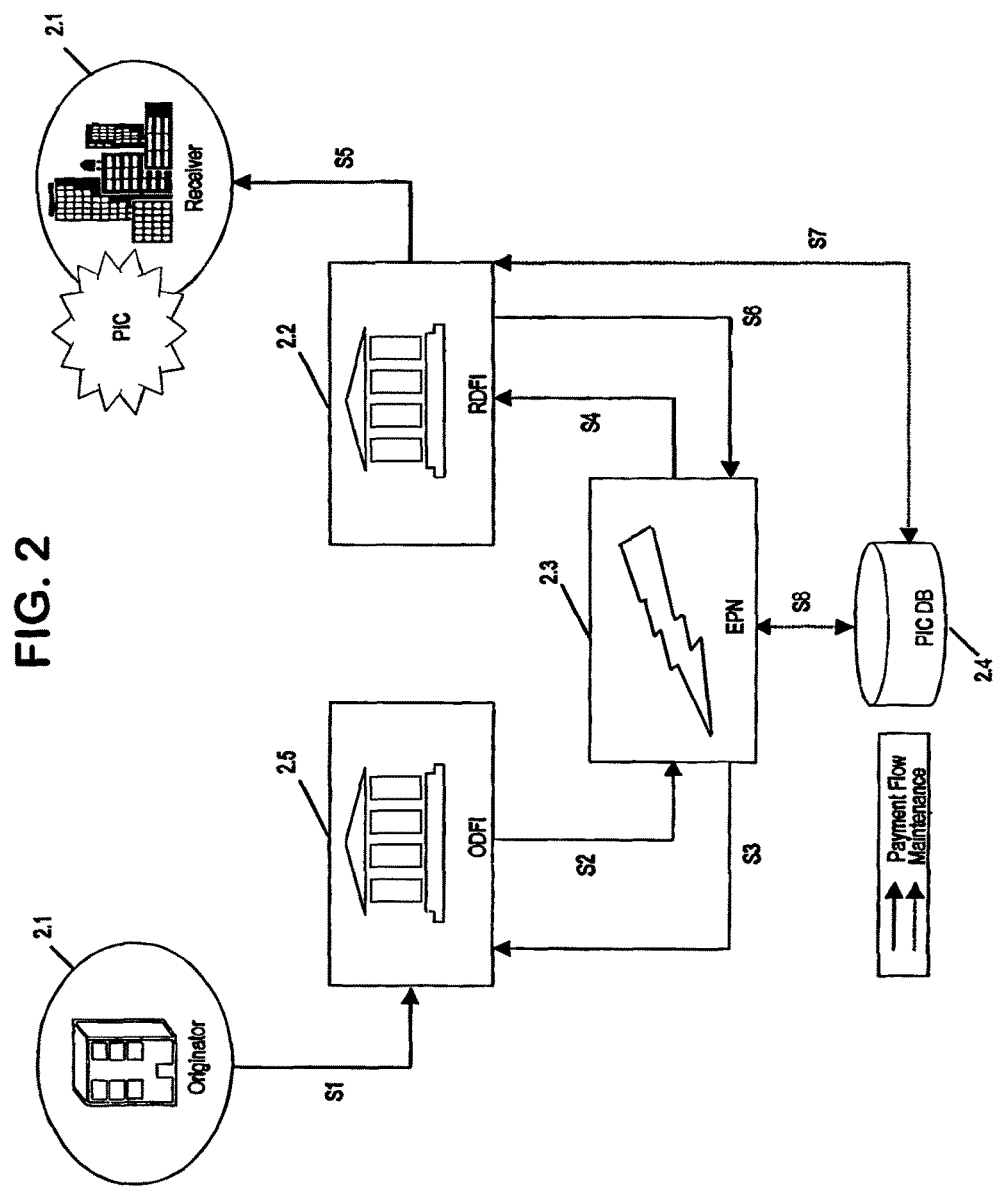
FIG. 2 is a flowchart of the present invention integrated with the EPN system.
Figure 3:
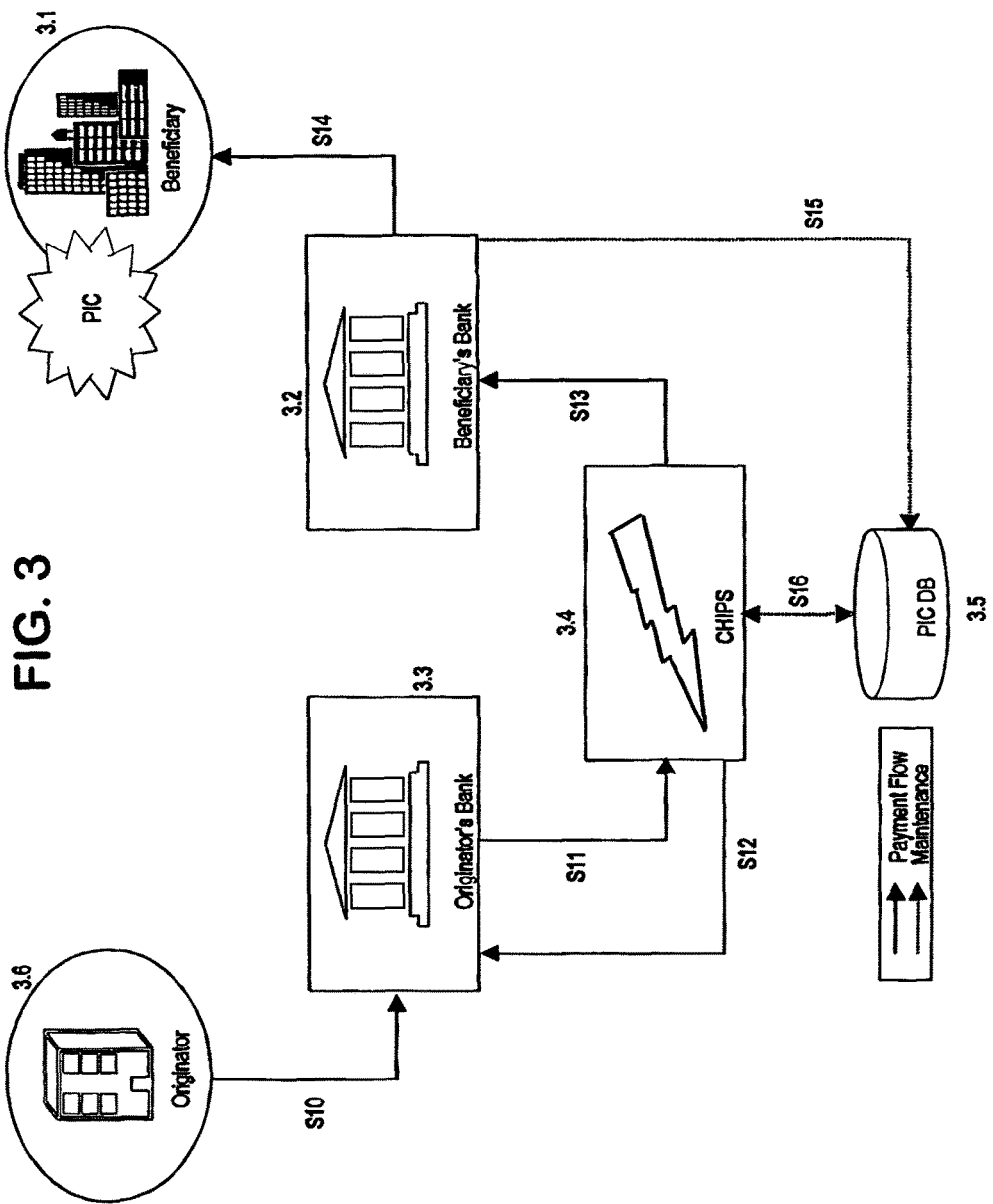
FIG. 3 is a flowchart of the present invention integrated with the CHIPS system.
Figure 4:
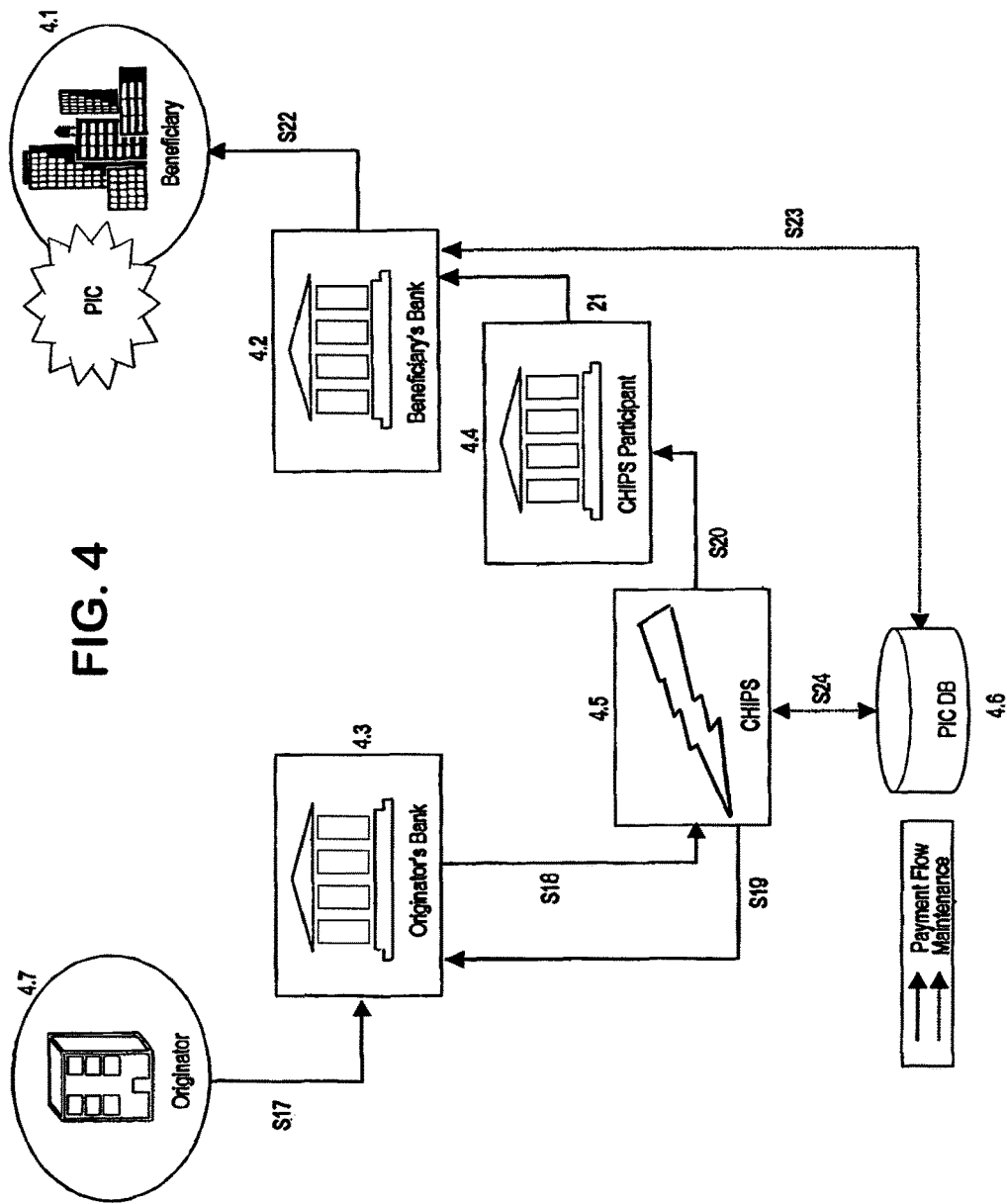
FIG. 4 is a flowchart of the present invention integrated with an alternate-CHIPS configuration.

Preferred embodiments of the system for implementing the present invention will now be discussed with reference to FIGS. 2 through 4. FIGS. 2 through 4, which are high-level block diagrams of the various parties involved in the implementation and use of the preferred embodiments, show the PIC Process Definition and how the PIC concept integrates with the existing EPN and CHIPS payment systems. Hardware systems suitable for use by the various parties are well known in the art, and one of ordinary skill in the art is capable of implementing such systems as needed. In practice, it is expected that the system will utilize systems and communication infrastructure that are already in operation. Also, the responsibilities of buyers, sellers and their respective financial institutions are outlined. While similar in concept, many of the details associated with processing PIC payments vary between EPN-based and CHIPS-based transactions. It should be noted while the use of the PIC number will be explained with reference to the existing EPN and CHIPS systems, this is for illustrative purposes only and the present invention is not limited to use with those systems.

FIG. 2 is a diagram illustrating the process utilizing the PIC of the present invention with the EPN system 2.3 As a pre-condition for the process steps described FIG. 2, a PIC number must be issued to the RDFI 2.2 for the receiver's DDA. The RDFI 2.2 communicates a system routing number and PIC number to the receiver 2.1.

An originator 2.6 receives a system routing number and PIC number from the receiver 2.1. The originator 2.6 enters the system routing number and the receiver's PIC number into the normal routing and account number fields in either the cash management system supplied by the ODFI 2.5 or through its accounts payable system. An example of a cash management entry interface is depicted in FIG. 5.

Figure 5:
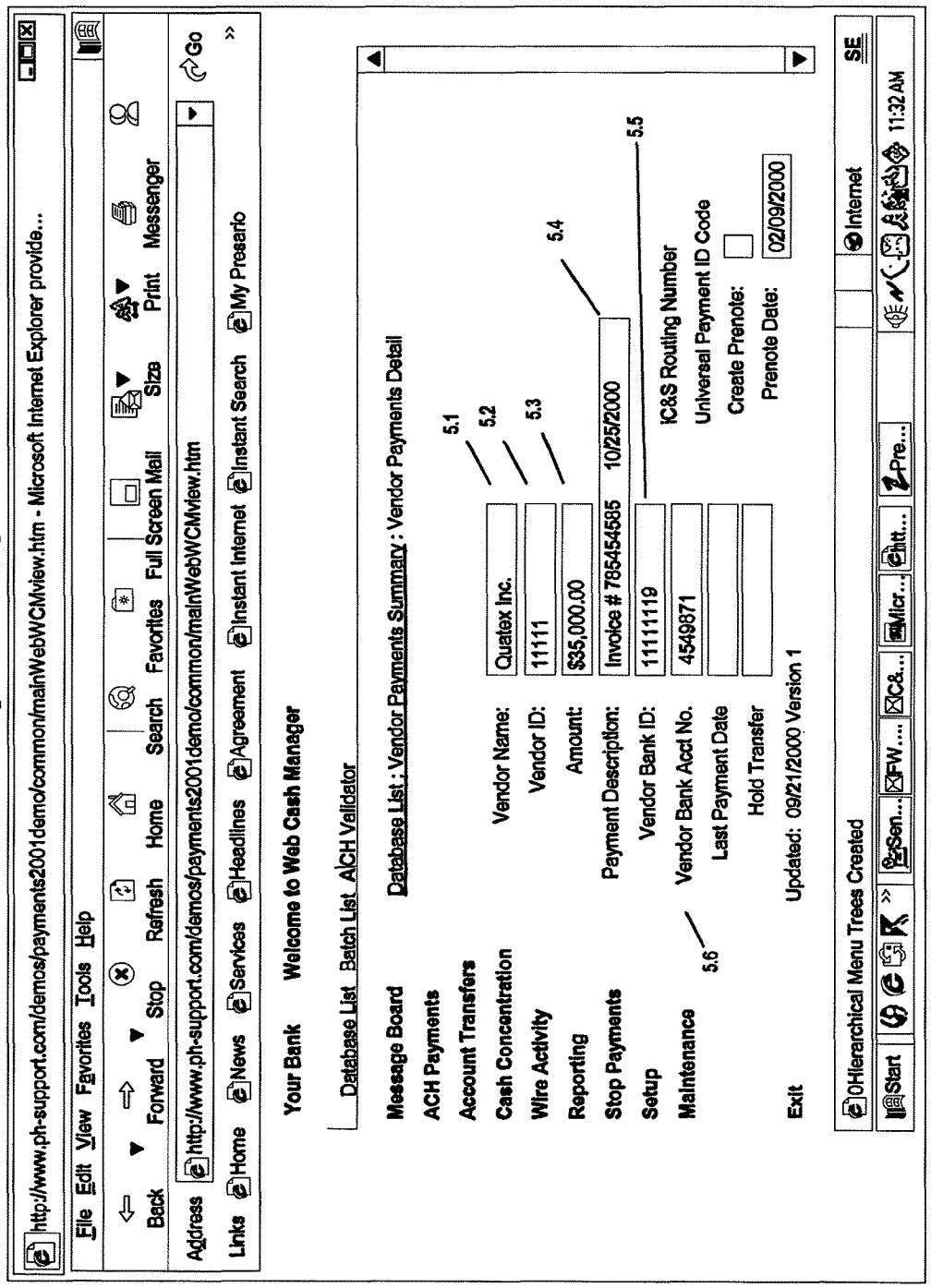
FIG. 5 is an example of a cash management entry window.

FIG. 5 shows a web-based cash manager system enabling the originator to make a payment request. The cash management entry in FIG. 5 includes at least the following fields vendor name (beneficiary/receiver) 5.1, vendor identification number 5.2, amount of payment 5.3, a payment description 5.4, vendor bank identification 5.5, for which in the present embodiment the system routing number will be used, and a vendor bank account number 5.6 for which in the present invention the PIC number will be used. Other fields can be added as necessary, depending on each financial institution's requirements.

At step S1 of the flowchart in FIG. 2, the ODFI 2.5 receives a payment request, identifies it as a system routing transaction by the routing number and checks the PIC number against an internal list of PIC numbers to determine if the receiver's 2.1 PIC number exists at the ODFI 2.5 (i.e., to check if it is an "on-us" transaction). If the PIC number indicates an on-us transaction, the ODFI 2.5 completes a book transfer of funds, and the ODFI 2.5 debits the originator's account.

At step S2, if a PIC number match does not exist, the ODFI 2.5 sends the payment instruction to the EPN system 2.3. At step S3, the EPN system 2.3 validates the PIC number against the PIC database 2.4. If invalid, the payment instruction is returned to the ODFI 2.5 with an appropriate error message. Once validated, the EPN system 2.3 replaces the system routing number and PIC number with the RDFI routing number and the receiver's DDA number (not shown), and at step S4, payment information is routed to the RDFI 2.2. At step S5, the RDFI 2.2 credits the receiver DDA.

At step S6, if there is a problem at the RDFI 2.2 receiving the payment, it is returned through the EPN system 2.3. The EPN system 2.3 recognizes returns specific to the system and translates the DDA number back into the system routing number and PIC number before returning the payment instruction to the ODFI 2.5.

At step S7, the RFDI 2.2 maintains PIC numbers related to their business customer accounts through one of the system's service channels. At step S8, the PIC database (not shown) on the EPN 2.3 is updated daily with changes from the master PIC database 2.4. The master PIC database 2.4 is described later.

FIG. 3 is a diagram illustrating the process utilizing the PIC of the present invention with the CHIPS system 3.4. As a pre-condition for the processing in FIG. 3, the system issues a PIC number for the beneficiary's DDA to the beneficiary's bank 3.2. The beneficiary's bank 3.2 communicates iC&S routing number and PIC number to the beneficiary 3.1.

The originator 3.6 receives the system routing number and PIC number from the beneficiary 3.1. The originator 3.6 enters the system routing number and the beneficiary's PIC number into the normal routing and account number fields in either the cash management system supplied by originator's bank 3.3 or the accounts payable system.

At step S10, the originator's bank 3.3 (also known as the CHIPS send participant) receives a payment request and checks the PIC number against internal list of PIC numbers to determine if the beneficiary's PIC number is a business customer of the originator's bank 3.3.

At step S11, if a PIC number match does not exist, the originator's bank 3.3 sends the payment instruction to CHIPS 3.4. At step S12, CHIPS 3.4 validates the PIC number against the PIC database on CHIPS. If invalid, the payment is rejected and sent back to the originator's bank 3.3 with the appropriate error message.

At step S13, once validated, CHIPS 3.4 replaces the system routing number and PIC number with the beneficiary bank's and (in this case) the CHIPS receive participant's routing number and the beneficiary's DDA number. At step S13, all payment information is routed to the CHIPS receive participant (beneficiary bank) 3.2, and at step S14, the beneficiary bank 3.2 credits the beneficiary's 3.1 DDA.

At step S13, the beneficiary bank 3.2 maintains PIC numbers related to their customer accounts through one of the channels provided by the system (which is described later) and at step S16, the PIC database on CHIPS (not shown) is updated daily with changes from the master PIC database 3.5.

FIG. 4 is a diagram illustrating an alternative process utilizing the PIC of the present invention with the CHIPS 4.5 system (CHIPS with corresponding bank). As a pre-condition for the process depicted in FIG. 4, the system issues a PIC number to the beneficiary's bank 4.2 for the beneficiary's 4.1 DDA. The beneficiary bank 4.2 communicates the system routing number and PIC number to receiver.

The originator 4.7 receives the system routing number and the PIC number from the beneficiary 4.1. The originator 4.7 enters the system routing number and the beneficiary's PIC number into the normal routing and account number fields in either the cash management system supplied by the originator's bank 4.3 or the accounts payable system.

At step S17, the originator's bank 4.3 and (in this case) the CHIPS send participant receives the payment request and checks the PIC number against an internal list of PIC numbers to determine if the beneficiary's 4.1 PIC number is a business customer of the originator's bank 4.3. At step S18, if a PIC number match does not exist, the originator's bank 4.3 sends the payment instruction to CHIPS 4.5.

At step S19, CHIPS 4.5 validates the PIC number against the PIC database on CHIPS. If invalid, the payment is rejected and sent back to originator's bank 4.3 with the appropriate error message. Once validated, CHIPS 4.5 replaces the routing number and PIC number with the CHIPS receive participant's routing number and the beneficiary's 4.1 DDA number.

If the beneficiary's bank 4.2 is the CHIPS receive participant, the payment is sent directly to the beneficiary bank 4.2 and the business customer DDA is credited. In the illustrated case, the beneficiary's bank 4.2 is not a CHIPS receive participant, so CHIPS 7.5 looks to the beneficiary's 4.1 PIC for predetermined CHIPS receive participant routing information.

At step S20, information on the entire CHIPS chain is included in the payment instruction (beneficiary's bank 4.2 routing number and beneficiary's 4.1 DDA number, name, address, etc.) and routed to the CHIPS receive participant 4.4. At step S21, the CHIPS receive participant 4.4 receives the payment and forwards it to the beneficiary's bank 4.2, and at step S22, the beneficiary's bank 4.2 credits the beneficiary's 4.1 DDA.

At step S23, the beneficiary bank 4.2 maintains PIC numbers related to their customer accounts through one of the channels provided by the system, and at step S24, the PIC database on CHIPS (not shown) is updated daily with changes from the master PIC database 4.6.

To use the PIC enhancement of the present invention, participant banks must fulfill certain requirements. These requirements include:

Connectivity. Initially, banks must either have an operational connection to SWIFTNet or ConnectDirect.

SWIFTNet is S.W.I.F.T's™ advanced IP-based messaging solution. SWIFTNet allows a financial institution to do business in an environment that combines the security of a private network and the guarantees of a trusted third party with the flexibility of Internet technologies.

ConnectDirect is a peer-to-peer file-based integration software for high-volume, assured file transfers. ConnectDirect automates the secure, reliable transfer of large volumes of data within and between enterprises. ConnectDirect is available only for those banks that are currently set up for file transfer. These connections are necessary to provide a secure channel for enrollment and maintenance of PIC numbers.

ACH System Enhancement (Minor). Because the PIC number hides receiving bank information, originating banks do not know when they are originating "on us" transactions. Banks wishing to filter out "on us" PIC transactions may want to make modifications to their ACH origination methods/systems. However, modifications are not required.

Resource Commitment. Banks must have the resources to supply an enrollment file extract, test the PIC system, and train their staff to service PICs.

Other System Requirements. Programming changes may be required on the sending and the receiving sides of a transaction. However, the required changes would be minor. For example, a sending bank may want to change the cash management field labeled "account number" to "PIC number." Or, the receiving bank may want to "track" all transactions involving the system.

For those banks that choose to pilot the PIC service, there are several additional requirements. These requirements include:

Fees. If a pilot bank cannot immediately identify and divert "on us" PIC transactions, the trusted third party can issue a credit for the estimated amount of "on-us" charges incurred during pilot activities.

Customer Identification. The pilot bank would preferably be required to identify specific business customers whom they intend to partner with during the PIC pilot for EPN. The criteria for pilot customers (buyers and sellers) include EPN/CHIPS registration. Both the buyer and seller are required to be EPN registered bank customers. This requirement prevents the situation where a buyer sends a PIC-based transaction to their bank who, in turn, send it to the Federal Reserve who will likely not be able to process the transaction during the pilot phase.

Figure 6:
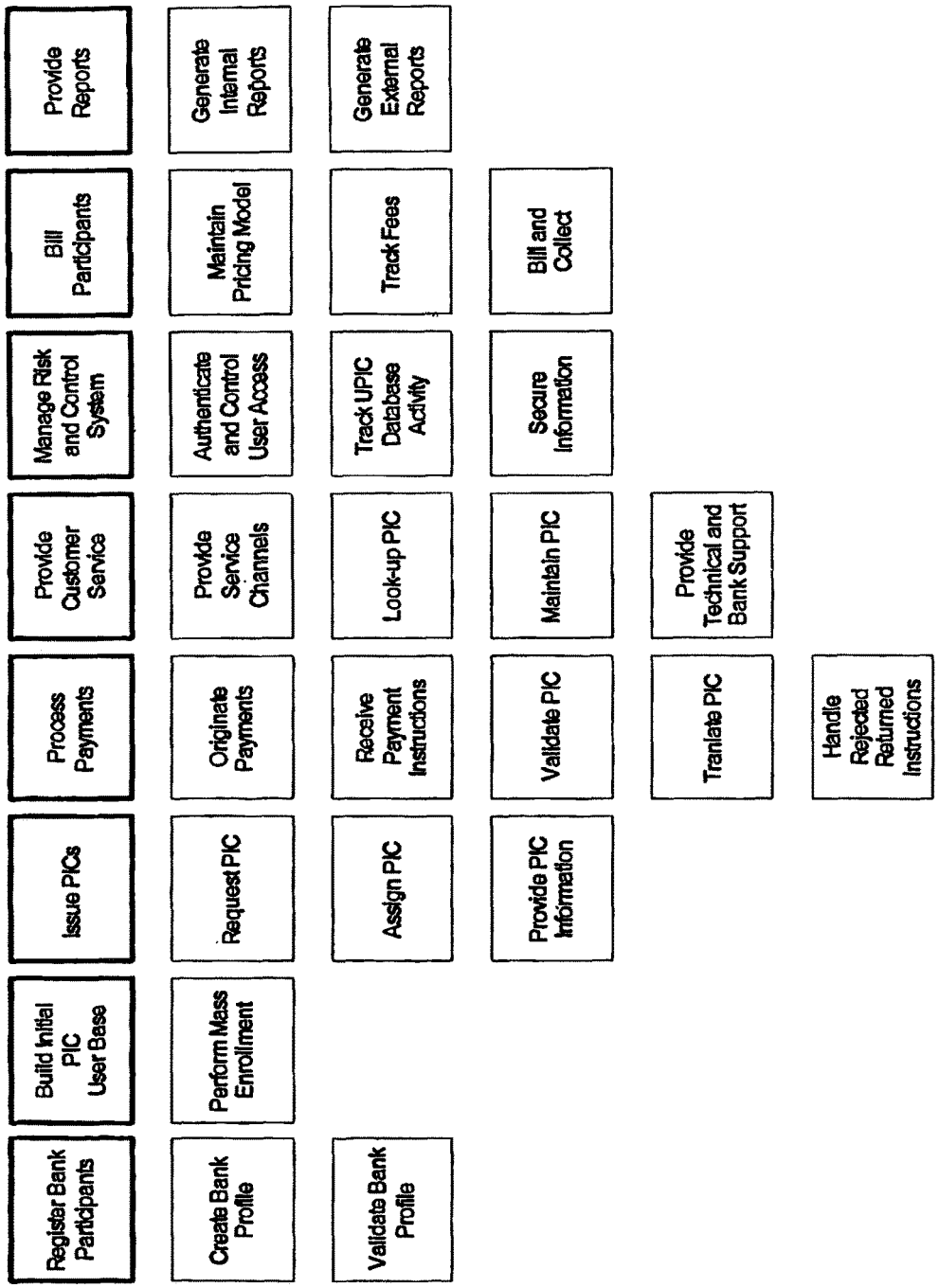
FIG. 6 is an example of an entity-relationship diagram of the PIC database.

The PIC database is housed in a relational database application. FIG. 6 depicts an example of a structure of the PIC database. As is appreciated, there are countless configurations for a relational database depicting a PIC database. FIG. 6 only illustrates one such possible configuration, and in no way should be construed as limiting the application of the inventive systems and methods to that configuration. FIG. 6 shows a PIC database with 16 tables. Table 1 is a summary of the PIC database and describes each of the tables represented in FIG. 6. FIG. 6 and Table 1 are illustrative only of a PIC database.

TABLE 1

Database Summary

| | |
|---|---|
| Target DBMS: | Microsoft SQL Server |
| Number of tables: | 16 |
| Number of views: | 0 |
| Number of columns: | 165 |
| Number of Indexes: | 4 |
| Number of foreign keys: | 20 |
| last map date: | Jan. 2, 1970 |
| Extended attributes: | |
| Filegroup | F1 |
| Filegroup | F2 |
| FIlegroup | PRIMARY |

| Tables | Columns | Indexes | Foreign Keys | Notes |
|---|---|---|---|---|
| PICSTATUS | 2 | 0 | 0 | |
| PICS | 1 | 0 | 0 | |
| PICACTIVITY | 41 | 2 | 7 | |
| PICACTION | 2 | 0 | 0 | |
| PICACCOUNTSTATUS | 2 | 0 | 0 | |
| PIC | 31 | 1 | 3 | |
| SYSTEMPARA | 2 | 0 | 0 | |
| SOURCE | 2 | 0 | 0 | |
| BANKSTATUS | 2 | 0 | 0 | |
| BANKROUTING | 2 | 0 | 1 | |
| BANKPROFILE | 29 | 0 | 3 | |
| BANKACTIVITY | 41 | 1 | 6 | |
| BANKACTION | 2 | 0 | 0 | |
| ACTIVITYSTATUS | 2 | 0 | 0 | |
| ACTIVITYDISP | 2 | 0 | 0 | |
| ACCOUNTSTATUS | 2 | 0 | 0 | |

ACCOUNT STATUS

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | 0 |
| Extended Attributes: | |
| OnFileGroup | PRIMARY |
| Clustered PK | Yes |

| Columns | Data Type | Allow NULLS | Value/Range |
|---|---|---|---|
| STATUSID | tinyint | Not allowed | |
| DESCRIPTION | varchar(30) | Not allowed | |

| Foreign keys | Child | Parent |
|---|---|---|
| FK_BANKACTIVITY-ACCOUNT STATUS_EPN | BANKACTIVITY.EPNFLAG | STATUSID |
| FK_BANKACTIVITY-ACCOUNT STATUS_CHIPS | BANKACTIVITY.CHIPSFLAG | STATUSID |
| FK_BANKACTIVITY-ACCOUNT STATUS_EPN | BANKACTIVITY.EPNFLAG | STATUSID |

TABLE 1-continued

Database Summary

| FK_BANKACTIVITY-ACCOUNT STATUS_CHIPS | BANKACTIVITY.CHIPSFLAG | STATUSID |
| FK_BANKACTIVITY-ACCOUNT STATUS_EPN | BANKACTIVITY.EPNFLAG | STATUSID |

Column details

1. STATUSID

| | |
|---|---|
| Physical data type: | tinyint |
| Allow NULLs: | Not allowed |

2. DESCRIPTION

| | |
|---|---|
| Physical data type: | varchar(30) |
| Allow NULLs: | Not allowed |

ACTIVITYDISP

| | |
|---|---|
| Owner: | dbo |
| Target DB name: | icns |
| Number of columns | 2 |
| Number of Indexes: | 0 |
| Number of foreign keys: | 0 |
| Codes: | 0 |
| Type: | 0 |
| Extended Attributes: | |
| OnFileGroup | PRIMARY |
| Clustered PK | Yes |

| Columns | Data Type | Allow NULLS | Value/Range |
|---|---|---|---|
| STATUSID | tinyint | Not allowed | |
| DESCRIPTION | varchar(30) | Not allowed | |

| Foreign keys | Child | Parent |
|---|---|---|
| FK_BANKACTIVITY-ACCOUNT STATUS_EPN | BANKACTIVITY.EPNFLAG | STATUSID |
| FK_BANKACTIVITY-ACCOUNT STATUS_CHIPS | BANKACTIVITY.CHIPSFLAG | STATUSID |
| FK_BANKACTIVITY-ACCOUNT STATUS_EPN | BANKACTIVITY.EPNFLAG | STATUSID |
| FK_BANKACTIVITY-ACCOUNT STATUS_CHIPS | BANKACTIVITY.CHIPSFLAG | STATUSID |
| FK_BANKACTIVITY-ACCOUNT STATUS_EPN | BANKACTIVITY.EPNFLAG | STATUSID |

Column details

1. STATUSID

| | |
|---|---|
| Physical data type: | tinyint |
| Allow NULLs: | Not allowed |

2. DESCRIPTION

| | |
|---|---|
| Physical data type: | varchar(30) |
| Allow NULLs: | Not allowed |

ACTIVITYSTATUS

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | 0 |
| Extended Attributes: | |
| OnFileGroup | PRIMARY |
| Clustered PK | Yes |

| Columns | Data Type | Allow NULLS | Value/Range |
|---|---|---|---|
| STATUSID | tinyint | Not allowed | |
| DESCRIPTION | varchar(30) | Not allowed | |

| Foreign keys | Child | Parent |
|---|---|---|
| FK_BANKACTIVITY_ACTIVITYSTATUS | BANKACTIVITY.ACTIVITYSTATUS | STATUSID |
| FK_BANKACTIVITY-ACTIVITY STATUS | UPOCACTIVITY.CHIPSFLAG | STATUSID |

TABLE 1-continued

Database Summary

Column details

1. STATUSID

| | |
|---|---|
| Physical data type: | tinyint |
| Allow NULLs: | Not allowed |

2. DESCRIPTION

| | |
|---|---|
| Physical data type: | varchar(30) |
| Allow NULLs: | Not allowed |

BANKACTION

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | 0 |
| Extended Attributes: | |
| OnFileGroup | PRIMARY |
| Clustered PK | Yes |

| Columns | Data Type | Allow NULLS | Value/Range |
|---|---|---|---|
| ACTIONID | tinyint | Not allowed | |
| DESCRIPTION | varchar(30) | Not allowed | |

| Foreign keys | Child | Parent |
|---|---|---|
| FK_BANKACTIVITY_BANKACTIVITY_BANKACTION | BANKACTIVITY.ACTIONS | ACTIONID |

Column details

1. ACTIONID

| | |
|---|---|
| Physical data type: | tinyint |
| Allow NULLs: | Not allowed |

2. DESCRIPTION

| | |
|---|---|
| Physical data type: | varchar(30) |
| Allow NULLs: | Not allowed |

BANKACTIVITY

| | | |
|---|---|---|
| Owner: | dbo | |
| Target DB name: | icns | |
| Number of columns: | 41 | |
| Number of Indexes: | 1 | |
| Number of foreign keys: | 6 | |
| Codes: | 3 | |
| Type: | Table | |
| User defined types: | Name | Data Type |
| | BANKRTN | N-Signed Integer |
| | CHIPSABA | N-Signed Integer |
| | BANKRTN | N-Signed Integer |
| Clustered PK | Yes | |

| Columns | Data Type | Allow NULLS | Value/Range |
|---|---|---|---|
| ACTIVITYID | Int Identity | Not allowed | |
| ACTIVITYDISP (FK) | tinyint | Not allowed | |
| APPLDATE | datetime | Allowed | |
| ACTIVITYSTATUS (FK) | tinyint | Not allowed | |
| CREATEDATE | datetime | Not allowed | |
| CREATEUSER | varchar(40) | Not allowed | |
| CREATESOURCE (FK) | tinyint | Not allowed | |
| APPRDATE | datetime | Allowed | |
| APPRUSER | varchar(40) | Allowed | |
| CANCELDATE | datetime | Allowed | |
| CANCELUSER | varchar(40) | Allowed | |
| ACTIONS (FK) | tinyint | Not allowed | |
| EFFDATE | datetime | Not allowed | |
| BANKRTN (I1) | BANKRTN | Not allowed | |
| BANKNAME | varchar(96) | Not allowed | |
| EPNFLAG (FK) | tinyint | Not allowed | |

TABLE 1-continued

| Database Summary | | |
|---|---|---|
| CHIPSFALG (FK) | tinyint | Not allowed |
| CHIPSABA | CHIPSABA | Allowed |
| CHIPSLNKRTN | BANKRTN | Allowed |
| CHIPSDDA | varchar(34) | Allowed |
| CHIPSDEPTH | tinyint | Allowed |
| BANKTYPE | varchar(3) | Not Allowed |
| ADD1 | varchar(64) | Allowed |
| ADD2 | varchar(64) | Allowed |
| ADD3 | varchar(64) | Allowed |
| ADD4 | varchar(50) | Allowed |
| CITY | varchar(32) | Allowed |
| STATE | varchar(32) | Allowed |
| ZIP | varchar(11) | Allowed |
| COUNTRY | char(3) | Not Allowed |
| PHONE | Phone | Allowed |
| FAX | Phone | Allowed |
| EMAIL | email | Allowed |
| BACKPHONE | Phone | Allowed |
| BACKFAX | Phone | Allowed |
| BACKEMAIL | email | Allowed |
| WPAYNA1 | varchar(35) | Allowed |
| WPAYNA2 | varchar(35) | Allowed |
| WPAYNA3 | varchar(35) | Allowed |
| WPAYNA4 | varchar(35) | Allowed |
| COMMENTS | varchar(80) | Allowed |

| Indexes | Columns | Sort Order |
|---|---|---|
| IX_BANKACTIVITY_BANKRTN (I1) | BANKRTN | Ascending |

| Foreign keys | Child | Parent |
|---|---|---|
| FK_BANKACTIVITY_ACCOUNTSTATUS_EPN | EPNFLAG | ACCOUNTSTATUS.STATUSID |
| FK_BANKACTIVITY_ACCOUNTSTATUS_CHIPS | CHIPSFLAG | ACCOUNTSTATUS.STATUSID |
| FK_BANKACTIVITY_ACTIVITYDISP | ACTIVITYDISP | ACTIVITYDISP.DISPID |
| FK_BANKACTIVITY_ACTIVITYSTATUS | ACTIVITYSTATUS | ACTIVITYSTATUS.STATUSID |
| FK_BANKACTIVITY_BANKACTION | ACTIONS | BANKACTION.ACTIONID |
| FK_BANKACTIVITY_SOURCE | CREATESOURCE | SOURCE.SOURCEID |

| Column details | | | |
|---|---|---|---|
| Columns | Data Type | Allow NULLS | Value/Range |

1. ACTIVITYID

Physical data type: int identity
Allow NULLs: Not allowed

2. ACTIVITYDISP (FK)

Physical data type: tinyint
Allow NULLs: Not allowed

3. APPLDATE

Physical data type: datetime
Allow NULLs: Not allowed

4. ACTIVITYSTATUS (FK)

Physical data type: datetime
Allow NULLs: Not allowed

5. CREATEDATE

Physical data type: datetime
Allow NULLs: Not allowed

6. CREATEUSER

Physical data type: varchar(40)
Allow NULLs: Not allowed

7. CREATESOURCE (FK)

Physical data type: tinyint
Allow NULLs: Not allowed

8. APPRDATE

Physical data type: datetime
Allow NULLs: Not allowed

TABLE 1-continued

Database Summary

9. APPRUSER

| | |
|---|---|
| Physical data type: | datetime |
| Allow NULLs: | Allowed |

10. CANCELDATE

| | |
|---|---|
| Physical data type: | datetime |
| Allow NULLs: | Allowed |

11. CANCELUSER

| | |
|---|---|
| Physical data type: | varchar(40) |
| Allow NULLs: | Allowed |

12. ACTIONS (FK)

| | |
|---|---|
| Physical data type: | tinyint |
| Allow NULLs: | Not Allowed |

13. EFFDATE

| | |
|---|---|
| Physical data type: | datetime |
| Allow NULLs: | Not allowed |
| Default value: | getdate( ) + 1 |

14. BANKRTN (I1)

| | |
|---|---|
| Physical data type: | BANKRTN |
| Allow NULLs: | Not allowed |

15. BANKNAME

| | |
|---|---|
| Physical data type: | varchar(96) |
| Allow NULLs: | Not allowed |

16. EPNFLAG (FK)

| | |
|---|---|
| Physical data type: | tinyint |
| Allow NULLs: | Not allowed |

17. CHIPSFLAG (FK)

| | |
|---|---|
| Physical data type: | tinyint |
| Allow NULLs: | Not allowed |

18. CHIPSABA

| | |
|---|---|
| Physical data type: | CHIPSABA |
| Allow NULLs: | Allowed |

19. CHIPSLINKRTN

| | |
|---|---|
| Physical data type: | BANKRTN |
| Allow NULLs: | Allowed |

20. CHIPSDDA

| | |
|---|---|
| Physical data type: | varchar(34) |
| Allow NULLs: | Allowed |

21. CHIPSDEPTH

| | |
|---|---|
| Physical data type: | tinyint |
| Allow NULLs: | Allowed |

22. BANKTYPE

| | |
|---|---|
| Physical data type: | varchar(3) |
| Allow NULLs: | Allowed |

23. ADD1

| | |
|---|---|
| Physical data type: | varchar(64) |
| Allow NULLs: | Not Allowed |

24. ADD2

| | |
|---|---|
| Physical data type: | varchar(64) |
| Allow NULLs: | Allowed |

25. ADD3

| | |
|---|---|
| Physical data type: | varchar(64) |
| Allow NULLs: | Allowed |

26. ADD4

| | |
|---|---|
| Physical data type: | varchar(50) |
| Allow NULLs: | Allowed |

27. CITY

| | |
|---|---|
| Physical data type: | varchar(32) |
| Allow NULLs: | Allowed |

TABLE 1-continued

Database Summary

| | |
|---|---|
| 28. STATE | |
| Physical data type: | varchar(32) |
| Allow NULLs: | Allowed |
| 29. ZIP | |
| Physical data type: | varchar(11) |
| Allow NULLs: | Allowed |
| 30. COUNTRY | |
| Physical data type: | char(3) |
| Allow NULLs: | Not Allowed |
| 31. PHONE | |
| Physical data type: | Phone |
| Allow NULLs: | Allowed |
| 32. FAX | |
| Physical data type: | Phone |
| Allow NULLs: | Allowed |
| 33. EMAIL | |
| Physical data type: | email |
| Allow NULLs: | Allowed |
| 34. BACKPHONE | |
| Physical data type: | Phone |
| Allow NULLs: | Allowed |
| 35. BACKFAX | |
| Physical data type: | Phone |
| Allow NULLs: | Allowed |
| 36. BACKEMAIL | |
| Physical data type: | email |
| Allow NULLs: | Allowed |
| 37. WPAYNA1 | |
| Physical data type: | varchar(35) |
| Allow NULLs: | Allowed |
| 38. WPAYNA2 | |
| Physical data type: | varchar(35) |
| Allow NULLs: | Allowed |
| 39. WPAYNA3 | |
| Physical data type: | varchar(35) |
| Allow NULLs: | Allowed |
| 40. WPAYNA4 | |
| Physical data type: | varchar(35) |
| Allow NULLs: | Allowed |
| 41. COMMENTS | |
| Physical data type: | varchar(80) |
| Allow NULLs: | Allowed |

Code details

| | |
|---|---|
| 1. CK BANKACTIVITY ADD3 | |
| Type: | Check clause |
| Code body: | ([ADD3] is null and [ADD2] is not null or [ADD3] is null and [ADD2] is null) |
| 2. CK BANKACTIVITY ADD4 | |
| Type: | Check clause |
| Code body: | ([ADD4] is null and [ADD3] is not null or [ADD4] is null and [ADD3] is null) |
| 3. Checkactions | |
| Type: | Trigger |
| Code body: | CREATE TRIGGER Checkactions ON dbo.BANKACTIVITY<br>FOR INSERT<br>AS<br>insert bankprofile<br>select bankrtn, bankname, createdate=getdate( ),lastupdate=getdate( ),epnflag, chipsflag, |

TABLE 1-continued

Database Summary chipsaba, chipslinkrtn,chipsdda,chipsdepth,banktype,
add1,add2,add3,add4,city,state,zip,country,
phone,fax,email,backphone,backfax,backemail,
wpayna1,wpayna2,wpayna3,wpayna4 from inserted
where actions=1

Index details
IX BANKACTIVITY BANKRTN

| | |
|---|---|
| Column(s): | BANKRTN (Asc) |
| Unique: | No |
| Extended attributes: | |
| OnFileGroup | F1 |
| CLUSTERED | No |
| IGNORE_DUP_KEY | No |
| FILLFACTOR | 0 |
| PAD_INDEX | No |
| DROP_EXISTING | No |
| STATISTICS_NORECOMPUTE | No |

Foreign key details (child)

| Definition: | Child | Parent |
|---|---|---|

FK BANKACTIVITY ACCOUNTSTATUS EPN

| | EPNFLAG | ACCOUNTSTATUS.STATUSID |
|---|---|---|
| Relationship type: | Non-Identifying | |
| Cardinality: | One-to-Zero-or-More | |
| Allow NULLs: | Not allowed | |
| Verb phrase: | | |
| Inverse phrase: | is of | |
| Ref. Integrity on update: | No action | |
| Ref. Integrity on delete: | No action | |

FK BANKACTIVITY ACCOUNTSTATUS CHIPS

| | CHIPSFLAG | ACCOUNTSTATUS.STATUSID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_ACCOUNTSTATUS_CHIPS | |
| Inverse phrase: | is of | |
| Ref. Integrity on update: | No action | |
| Ref. Integrity on delete: | No action | |

FK BANKACTIVITY ACTIVITYDSP

| | ACTIVITYDISP | ACTIVITYDISP.DISPID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_ACTIVITYDISP | |
| Inverse phrase: | is of | |
| Ref. Integrity on update: | No action | |
| Ref. Integrity on delete: | No action | |

FK BANKACTIVITY ACTIVITYSTATUS CHIPS

| | ACTIVITYDISP | ACTIVITYDISP.DISPID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_ACTIVITYDISP | |
| Inverse phrase: | is of | |
| Ref. Integrity on update: | No action | |
| Ref. Integrity on delete: | No action | |

FK BANKACTIVITY ACTIVITYSTATUS

| | ACTIVITYSTATUS | ACTIVITYSTATUS.DISPID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_ACTIVITYSTATUS | |
| Inverse phrase: | is of | |
| Ref. Integrity on update: | No action | |
| Ref. Integrity on delete: | No action | |

TABLE 1-continued

Database Summary

FK BANKACTIVITY BANKACTION

| | ACTIONS | BANKACTION.ACTIONID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_BANKACTION | |
| Inverse phrase: | is of | |
| Ref. Integrity on update: | No action | |
| Ref. Integrity on delete: | No action | |

FK BANKACTIVITY SOURCE

| | CREATESOURCE | SOURCE.SOURCEID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_SOURCE | |
| Inverse phrase: | is of | |
| Ref. Integrity on update: | No action | |
| Ref. Integrity on delete: | No action | |

FK BANKACTIVITY SOURCE

| | CREATESOURCE | SOURCE.SOURCEID |
|---|---|---|
| Relationship type: | Non-Identifying | |
| Cardinality: | One-to-Zero-or-More | |
| Allow NULLs: | Not allowed | |
| Verb phrase: | hasFK_BANKACTIVITY_SOURCE | |
| Inverse phrase: | is of | |
| Ref. Integrity on update: | No action | |
| Ref. Integrity on delete: | No action | |

BANKPROFILE

| | | | |
|---|---|---|---|
| Owner: | | dbo | |
| Target DB name: | | icns | |
| Number of columns: | | 29 | |
| Number of Indexes: | | 0 | |
| Number of foreign keys: | | 3 | |
| Codes: | | 3 | |
| Type: | | Table | |
| User defined types: | | Name | Data Type |
| | | BANKRTN | N-Signed Integer |
| | | CHIPSABA | N-Signed Integer |
| | | BANKRTN | N-Signed Integer |
| | | Phone | C-Variable Length(32) |
| | | Phone | C-Variable Length(32) |
| | | email | C-Variable Length(32) |
| | | Phone | C-Variable Length(128) |
| | | Phone | C-Variable Length(32) |
| | | email | C-Variable Length(128) |
| | | | C-Variable Length(32) |
| | | | C-Variable Length(32) |
| | | | C-Variable Length(128) |
| Extended Attributes: | | | |
| OnFileGroup | | F1 | |
| Clustered PK | | No | |

| Columns | Data Type | Allow NULLS | Value/Range |
|---|---|---|---|
| BANKRTN | BANKRTN | Not allowed | |
| BANKNAME | varchar(96) | Not allowed | |
| CREATEDATE | datetime | Not allowed | |
| LASTUPDT | datetime | Not allowed | |
| STATUS (FK) | tinyint | Not allowed | |
| EPNFLAG | tinyint | Not allowed | |
| CHIPSFLAG (FK) | tinyint | Not allowed | |
| CHIPSABA | chipsaba | Allowed | |
| CHIPSLINKRTN | bankrtn | Allowed | |
| CHIPSDDA | varchar(34) | Allowed | |
| CHIPSDEPTH | tinylint | Allowed | |
| ADD1 | varchar(64) | Not allowed | |
| ADD2 | varchar(64) | Allowed | |
| ADD3 | varchar(64) | Allowed | |
| ADD4 | varchar(64) | Allowed | |
| CITY | varchar(32) | Allowed | |
| STATE | varchar(32) | Allowed | |
| ZIP | varchar(11) | Allowed | |

TABLE 1-continued

Database Summary

| | | |
|---|---|---|
| COUNTRY | char(3) | Not allowed |
| PHONE | Phone | Allowed |
| FAX | Phone | Allowed |
| EMAIL | email | Allowed |
| BACKPHONE | Phone | Allowed |
| BACKFAX | Phone | Allowed |
| BACKEMAIL | email | Allowed |
| WPAYNA1 | varchar(35) | Allowed |
| WPAYNA2 | varchar(35) | Allowed |
| WPAYNA3 | varchar(35) | Allowed |
| WPAYNA4 | varchar(35) | Allowed |

| Foreign keys | Child | Parent |
|---|---|---|
| FK_BANKPROFILE_ACCOUNTSTATUS_EPM | EPNFLAG | ACCOUNT.STATUSID |
| FK_BANKPROFILE_ACCOUNTSTATUS_CHIPS | CHIPSFLAG | ACCOUNT.STATUSID |
| FK_BANKPROFILE_BANKSTATUS | STATUS | BANKSTATUS.STATUSID |
| FK_BANKROUTING_BANKPROFILE | BANROUT.LINKEDRTN | BANKRTN |

Column details

1. BANKRTN

| | |
|---|---|
| Physical data type: | BANKRTN |
| Allow NULLs: | Not allowed |

2. BANKNAME

| | |
|---|---|
| Physical data type: | varchar(96) |
| Allow NULLs | Not allowed |

3. CREATDATE

| | |
|---|---|
| Physical data type: | datetime |
| Allow NULLs | Not allowed |
| Default value: | getdate( ) |

4. LASTUPDT

| | |
|---|---|
| Physical data type: | datetime |
| Allow NULLs | Not allowed |
| Default value: | getdate( ) |

5. STATUS (FK)

| | |
|---|---|
| Physical data type: | tinyint |
| Allow NULLs | Not allowed |

6. EPNFLAG (FK)

| | |
|---|---|
| Physical data type: | tinyint |
| Allow NULLs | Not allowed |

7. CHIPSFLAG (FK)

| | |
|---|---|
| Physical data type: | tinyint |
| Allow NULLs | Not allowed |

8. CHIPSABA

| | |
|---|---|
| Physical data type: | CHIPSABA |
| Allow NULLs | Allowed |

9. CHIPSLINKRTN

| | |
|---|---|
| Physical data type: | BANKRTN |
| Allow NULLs | Allowed |

10. CHIPSDDA

| | |
|---|---|
| Physical data type: | varchar(34) |
| Allow NULLs | Allowed |

11. CHIPSDEPTH

| | |
|---|---|
| Physical data type: | tinyint |
| Allow NULLs | Allowed |

12. ADD1

| | |
|---|---|
| Physical data type: | varchar(64) |
| Allow NULLs | Not allowed |

13. ADD2

| | |
|---|---|
| Physical data type: | varchar(64) |
| Allow NULLs | Allowed |

TABLE 1-continued

Database Summary

14. ADD3

| | |
|---|---|
| Physical data type: | varchar(64) |
| Allow NULLs | Allowed |

15. ADD4

| | |
|---|---|
| Physical data type: | varchar(64) |
| Allow NULLs | Allowed |

16. CITY

| | |
|---|---|
| Physical data type: | varchar(32) |
| Allow NULLs | Allowed |

17. STATE

| | |
|---|---|
| Physical data type: | varchar(32) |
| Allow NULLs | Allowed |

18. ZIP

| | |
|---|---|
| Physical data type: | varchar(11) |
| Allow NULLs | Allowed |

19. COUNTRY

| | |
|---|---|
| Physical data type: | char(3) |
| Allow NULLs | Not allowed |

20. PHONE

| | |
|---|---|
| Physical data type: | Phone |
| Allow NULLs | Allowed |

21. FAX

| | |
|---|---|
| Physical data type: | Phone |
| Allow NULLs | Allowed |

22. EMAIL

| | |
|---|---|
| Physical data type: | email |
| Allow NULLs | Allowed |

23. BACKPHONE

| | |
|---|---|
| Physical data type: | Phone |
| Allow NULLs | Allowed |

24. BACKFAX

| | |
|---|---|
| Physical data type: | Phone |
| Allow NULLs | Allowed |

25. BACKEMAIL

| | |
|---|---|
| Physical data type: | email |
| Allow NULLs | Allowed |

26. WPAYNA1

| | |
|---|---|
| Physical data type: | varchar(35) |
| Allow NULLs | Allowed |

27. WPAYNA2

| | |
|---|---|
| Physical data type: | varchar(35) |
| Allow NULLs | Allowed |

28. WPAYNA3

| | |
|---|---|
| Physical data type: | varchar(35) |
| Allow NULLs | Allowed |

29. WPAYNA4

| | |
|---|---|
| Physical data type: | varchar(35) |
| Allow NULLs | Allowed |

Code details

1. CK BANK ADD3

| | |
|---|---|
| Type: | Check clause |
| Code body: | ([ADD3] is null and [ADD2] is not or [ADD3] is null [ADD2] is null) |

2. CK BANK ADD4

| | |
|---|---|
| Type: | Check clause |
| Code body: | ([ADD4] is null and [ADD3] is not null or [ADD4] is null and [ADD3] is null) |

TABLE 1-continued

Database Summary

3. NoModify Bank

| | |
|---|---|
| Type: | Trigger |
| Code body: | CREATE TRIGGER NoModifyBank ON [dbo].[BankProfile] |
| | INSTEAD OF INSERT, UPDATE, DELETE |
| | AS |
| | Raiserror("Direct modification to this table is not allowed", 16,1) |

Foreign key details (child)

| Definition: | Child | Parent |
|---|---|---|
| | FK BANKPROFILE ACCOUNTSTATUS EPN | |
| | EPNFLAG | ACCOUSTATUS.STATUSID |
| Relationship type: | Non-Identifying | |
| Cardinality: | One-to-Zero-or-More | |
| Allow NULLs: | Not allowed | |
| Verb phrase: | has FK_BANKPROFILE_ACCOUNTSTATUS_EPN | |
| Inverse phrase: | is of | |
| Ref. Integrity on update; | No action | |
| Ref. Integrity on delete: | No action | |
| | FK BANKPROFILE ACCOUNTSTATUS CHIPS | |
| | CHIPSFLAG | ACCOUSTATUS.STATUSID |
| Relationship type: | Non-Identifying | |
| Cardinality: | One-to-Zero-or-More | |
| Allow NULLs: | Not allowed | |
| Verb phrase: | has FK_BANKPROFILE_ACCOUNTSTATUS_CHIPS | |
| Inverse phrase: | is of | |
| Ref. Integrity on update; | No action | |
| Ref. Integrity on delete: | No action | |
| | FK BANKPROFILE BANKSTATUS | |
| | STATUS | BANKSTATUS.STATUSID |
| Relationship type: | Non-Identifying | |
| Cardinality: | One-to-Zero-or-More | |
| Allow NULLs: | Not allowed | |
| Verb phrase: | has FK_BANKPROFILE_BANKSTATUS | |
| Inverse phrase: | is of | |
| Ref. Integrity on update; | No action | |
| Ref. Integrity on delete: | No action | |

BANKROUTING

| | | |
|---|---|---|
| Owner: | dbo | |
| Target DB name: | icns | |
| Number of columns: | 2 | |
| Number of indexes: | 0 | |
| Number of foreign keys: | 1 | |
| Codes: | 0 | |
| Type: | Table | |
| User defined types: | Name | Data Type |
| | BANKRTN | N-Signed Integer |
| | BANKRTN | N-Signed Integer |
| Extended attributes: | | |
| OnFileGroup | PRIMARY | |
| Clustered PK | Yes | |

| Columns | Data Type | Allow NULLS | Value/Range |
|---|---|---|---|
| BANKRTN | BANKRTN | Not allowed | |
| LINKEDRTN (FK) | BANKRTN | Not allowed | |

| Foreign keys | Child | Parent |
|---|---|---|
| FK_BANKROUTING_BANKPROFILE | LINKEDRTN | BANKPROFILE.BANKRTN |
| FK_PICACTIVITY_BANKROUTING | PICACITIVITY.BANKRTN | BANKRTN |

Column details

1. BANKRTN

| | |
|---|---|
| Physical data type: | BANKRTN |
| Allow NULLs: | Not allowed |

TABLE 1-continued

Database Summary

2. LINKEDRTN (FK)

| | |
|---|---|
| Physical data type: | BANKRTN |
| Allow NULLs: | Not allowed |

Foreign key details (child)
FK BANKROUTING BANKPROFILE

| Definition: | Child | Parent |
|---|---|---|
| | LINKEDRTN | BANKPROFILE.BANKRTN |
| Relationship type: | Non-Identifying | |
| Cardinality: | One-to-Zero-or-More | |
| Allow NULLs: | Not allowed | |
| Verb phrase: | hasFK_BANKROUTING_BANKPROFILE | |
| Inverse phrase: | is of | |
| Ref. Integrity on update: | No action | |
| Ref. Integrity on delete: | No action | |

BANKSTATUS

| | |
|---|---|
| Owner: | dbo |
| Target DB name: | icns |
| Number of columns: | 2 |
| Number of indexes: | 0 |
| Number of foreign keys: | 0 |
| Codes: | 0 |
| Type: | Table |
| Extended attributes: | |
| OnFileGroup | PRIMARY |
| Clustered PK | Yes |

| Columns | Data Type | Allow NULLS | Value/Range |
|---|---|---|---|
| STATUS | tinyint | Not allowed | |
| DESCRIPTION | varchar(50) | Not allowed | |

| Foreign keys | Child | Parent |
|---|---|---|
| FK_BANKPROFILE_BANKSTATUS | BANKPROFILE.STATUS | STATUSID |

Column details

1. STATUSID

| | |
|---|---|
| Physical data type: | tinyint |
| Allow NULLs: | Not allowed |

2. DESCRIPTION

| | |
|---|---|
| Physical data type: | varchar(50) |
| Allow NULLs | Not allowed |

SOURCE

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | Table |
| Extended Attributes: | |
| OnFileGroup | PRIMARY |
| Clustered PK | Yes |

| Columns | Data Type | Allow NULLS | Value/Range |
|---|---|---|---|
| SOURCEID | tinyint | Not allowed | |
| DESCRIPTION | varchar(30) | Not allowed | |

| Foreign keys | Child | Parent |
|---|---|---|
| FK_BANKACTIVITY-SOURCE | BANKACTIVITY.CREATESOURCE | SOURCEID |
| FK_PICACTIVITY_SOURCE | PICACTIVITY.CREATESOURCE | SSOURCEID |

TABLE 1-continued

Database Summary

Column details

1. SOURCEID

| | |
|---|---|
| Physical data type: | tinyint |
| Allow NULLs: | Not allowed |

2. DESCRIPTION

| | |
|---|---|
| Physical data type: | varchar(30) |
| Allow NULLs: | Not allowed |

SYSTEMPARA

| | |
|---|---|
| Owner: | dbo |
| Target DB name: | icns |
| Number of columns: | 2 |
| Number of indexes: | 0 |
| Number of foreign keys: | 0 |
| Codes: | 0 |
| Type: | Table |
| Extended attributes: | |
| OnFileGroup | PRIMARY |
| Clustered PK | No |

| Columns | Data type | Allow NULLs | Value/Range |
|---|---|---|---|
| PICDIGITS | tinyint | Not allowed | |
| PICSPEND | int | Not allowed | |

Column details

1. PICDIGITS

| | |
|---|---|
| Physical data type: | tinyint |
| Allow NULLs: | Not allowed |

2. PICSPEND

| | |
|---|---|
| Physical data type: | int |
| Allow NULLs: | Not allowed |

PIC

| | | | |
|---|---|---|---|
| Owner: | dbo | | |
| Target DB name: | icns | | |
| Number of columns: | 31 | | |
| Number of Indexes: | 1 | | |
| Number of foreign keys: | 3 | | |
| Codes: | 3 | | |
| Type: | Table | | |
| User defined types: | Name | Data Type | |
| | PICTYPE | C-Variable Length(17) | |
| | BANKRTN | N-Signed Integer | |
| | PICTYPE | C-Variable Length(17) | |
| | BANKRTN | N-Signed Integer | |
| | Phone | C-Variable Length(32) | |
| Extended attributes: | | | |
| OnFileGroup | F1 | | |
| Clustered PK | No | | |

| Columns | Data Type | Allow NULLS | Value/Range |
|---|---|---|---|
| PICID | PICTYPE | Not allowed | |
| PICSTATUS (FK) | tinyint | Not allowed | |
| EPNFLAG (FK) | tinyint | Not allowed | |
| CHIPSFLAG (FK) | tinyint | Not allowed | |
| BANKRTN (I1) | BANKRTN | Not allowed | |
| MASTERPIC | PICTYPE | Allowed | |
| PICDDASIZE | tinyint | Not allowed | |
| PICDDA | varchar(34) | Not allowed | |
| CHIPSABA | smallint | Allowed | |
| CHIPSLINKRTN | BANKRTN | Allowed | |
| CORPNAME | varchar(96( | Not allowed | |
| ADD1 | varchar(64) | Not allowed | |
| ADD2 | varchar(64) | Allowed | |
| ADD3 | varchar(64) | Allowed | |
| ADD4 | varchar(64) | Allowed | |

TABLE 1-continued

| Database Summary | | |
|---|---|---|
| CITY | varchar(32) | Allowed |
| STATE | varchar(32) | Allowed |
| ZIP | varchar(32) | Allowed |
| COUNTRY | char(3) | Not allowed |
| PHONE | Phone | Allowed |
| SICBCODE | smallint | Allowed |
| DUNSID | varchar(10) | Allowed |
| BICCODE | int | Allowed |
| BEICODE | smallint | Allowed |
| TAXID | int | Allowed |
| WPAYNA1 | varchar(35) | Allowed |
| WPAYNA2 | varchar(35) | Allowed |
| WPAYNA3 | varchar(35) | Allowed |
| WPAYNA4 | varchar(35) | Allowed |
| CREATDATE | datetime | Not allowed |
| LASTUPDT | datetime | Not allowed |

| Indexes | Columns | Sort order |
|---|---|---|
| IX_PIC_BANKRTN (I1) | BANKRTN | Ascending |

| Foreign keys | Child | Parent |
|---|---|---|
| FK_BANKACCOUNT STATUS_EPN | EPNFLAG | PICACCOUNTSTATUSID |
| FK_PIC_PICACCOUNTSTATUS_CHIPS | CHIPSFLAG | PICACCOUNTSTATUSID |
| FK_PIC_PICSTATUS | PICSTATUS | PICSTATUS.PICSTATUSID |

Column details

1. PICID

| Physical data type: | PICTYPE |
| Allow NULLs: | Not allowed |

2. PICSTATUS (FK)

| Physical data type: | tinyint |
| Allow NULLs: | Not allowed |

3. EPNFLAG (FK)

| Physical data type: | tinyint |
| Allow NULLs: | Not allowed |

4. CHIPSFLAG (FK)

| Physical data type: | tinyint |
| Allow NULLs: | Not allowed |

5. BANKRTN (FK)

| Physical data type: | BANKRTN |
| Allow NULLs: | Not allowed |

6. MASTERRPIC

| Physical data type: | PICTYPE |
| Allow NULLs: | Allowed |

7. PICDDASIZ

| Physical data type: | tinyint |
| Allow NULLs: | Not allowed |

8. PICDDA

| Physical data type: | varchar(34) |
| Allow NULLs: | Not allowed |

9. CHIPSABA

| Physical data type: | smallint |
| Allow NULLs: | Allowed |
| Default value: | 0 |

10. CHIPSLINKRTN

| Physical data type: | BANKRTN |
| Allow NULLs: | Allowed |

11. CORPNAME

| Physical data type: | varchar(96) |
| Allow NULLs: | Not allowed |

12. ADD1

| Physical data type: | varchar(64) |
| Allow NULLs: | Not allowed |

TABLE 1-continued

Database Summary

13. ADD2

| Physical data type: | varchar(64) |
|---|---|
| Allow NULLs: | Not allowed |

14. ADD3

| Physical data type: | varchar(64) |
|---|---|
| Allow NULLs: | Not allowed |

15. ADD4

| Physical data type: | varchar(64) |
|---|---|
| Allow NULLs: | Allowed |

16. CITY

| Physical data type: | varchar(32) |
|---|---|
| Allow NULLs: | Allowed |

17. STATE

| Physical data type: | varchar(32) |
|---|---|
| Allow NULLs: | Not allowed |

18. ZIP

| Physical data type: | varchar(32) |
|---|---|
| Allow NULLs: | Allowed |

19. COUNTY

| Physical data type: | char(3) |
|---|---|
| Allow NULLs: | Not allowed |

20. PHONE

| Physical data type: | Phone |
|---|---|
| Allow NULLs: | Allowed |

21. SICBCODE

| Physical data type: | Samallint |
|---|---|
| Allow NULLs: | Allowed |

22. DUNSID

| Physical data type: | varchar(10) |
|---|---|
| Allow NULLs: | Allowed |

23. BICCODE

| Physical data type: | int |
|---|---|
| Allow NULLs: | Allowed |

24. BICCODE

| Physical data type: | smallint |
|---|---|
| Allow NULLs: | Allowed |

25. TAXID

| Physical data type: | int |
|---|---|
| Allow NULLs: | Allowed |

26. WPAYNA1

| Physical data type: | varchar(35) |
|---|---|
| Allow NULLs: | Allowed |

27. WPAYNA2

| Physical data type: | varchar(35) |
|---|---|
| Allow NULLs: | Allowed |

28. WPAYNA3

| Physical data type: | varchar(35) |
|---|---|
| Allow NULLs: | Allowed |

29. WPAYNA4

| Physical data type: | varchar(35) |
|---|---|
| Allow NULLs: | Allowed |

30. CREATDATE

| Physical data type: | datetime |
|---|---|
| Allow NULLs: | Not allowed |
| Default value: | getdate( ) |

TABLE 1-continued

Database Summary

31. LASTUPDT

| | |
|---|---|
| Physical data type: | datetime |
| Allow NULLs: | Not allowed |
| Default value: | getdate( ) |

Code details

1. CK CORP ADD3

| | |
|---|---|
| Type: | Check clause |
| Code body: | ([ADD3] is null and [ADD2] is not null or [ADD3] is null and [ADD2] is null) |

2. CK CORP ADD4

| | |
|---|---|
| Type: | Check clause |
| Code body: | ([ADD4] is null and [ADD3] is not null or [ADD4] is null and [ADD3] is null) |

3. NoModifyPIC

| | |
|---|---|
| Type: | Trigger |
| Code body: | CREATE TRIGGER NoModifyPIC ON [dbo].[PIC] INSTEAD OF INSERT, UPDATE, DELETE AS Raiserror('Direct modification to this table is not allowed', 16,1) |

Index details

IX PIC BANKRTN
Column(s): BANKRTN (Asc)

| | |
|---|---|
| Unique: | No |
| Extended attributes: | |
| OnFileGroup | F2 |
| CLUSTERED | No |
| IGNORE_DUP_KEY | No |
| FILLFACTOR | 0 |
| PAD_INDEX | No |
| DROP_EXISTING | No |
| STATISTICS_NORECOMPUTE | No |

Foreign key details (child)
FK PIC PICACCOUNTSTATUS EPN
Foreign key details (child)

| Definition: | Child | Parent |
|---|---|---|

FK PIC PICACCOUNTSTATUS EPN

| | EPNFLAG | PICACCOUNTSTATUS.STATUSID |
|---|---|---|
| Relationship type: | Non-Identifying | |
| Cardinality: | One-to Zero-or-More | |
| Allow NULLs: | Not allowed | |
| Verb phrase: | hasFK_PIC_PICACCOUNTSTATUS_EPN | |
| Inverse phrase: | is of | |
| Ref. Integrity on update: | No action | |
| Ref. Integrity on delete: | No action | |

FK PIC PICACCOUNTSTATUS CHIPS

| | CHIPSFLAG | PICACCOUNTSTATUS.STATUSID |
|---|---|---|
| Relationship type: | Non-Identifying | |
| Cardinality: | One-to-Zero-or-More | |
| Allow NULLs: | Not allowed | |
| Verb phrase: | hasFK_PIC_PICACCOUNTSTATUS_CHIPS | |
| Inverse phrase: | is of | |
| Ref. Integrity on update: | No action | |
| Ref. Integrity on delete: | No action | |

FK PIC PICSTATUS

| | PICSTATUS | PICSTATUS.PICSTATUSID |
|---|---|---|
| Relationship type: | Non-Identifying | |
| Cardinality: | One-to-Zero-or-More | |
| Allow NULLs: | Not allowed | |

TABLE 1-continued

Database Summary

| | |
|---|---|
| Verb phrase: | hasFK_PIC_PICSTATUS |
| Inverse phrase: | is of |
| Ref. Integrity on update: | No action |
| Ref. Integrity on delete: | No action |

PICACCOUNTSTATUS

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | Table |
| Extended Attributes: | |
| OnFileGroup | PRIMARY |
| Clustered PK | Yes |

| Columns | Data Type | Allow NULLS | Value/Range |
|---|---|---|---|
| STATUSID | tinyint | Not allowed | |
| DESCRIPTION | varchar(20) | Not allowed | |

| Foreign keys | Child | Parent |
|---|---|---|
| FK_PIC_PICACCOUNTSTATUS_EPN | PIC.EPNFLAG | STATUSID |
| FK_PICACCOUNTSTATUS_CHIPS | PIC.CHIPSFLAG | STATUSID |
| FK_PICACTIVITY_PICACCOUNTSTATUS_EPN | PICACITIVITY.EPNFLAG | STATUSID |
| FK_PICACTIVITY_PICACCOUNTSTATUS_CHIPS | PICACITIVITY.CHIPSFLAG | STATUSID |

Column details

1. STATUSID

| | |
|---|---|
| Physical data type: | tinyint |
| Allow NULLs: | Not allowed |

2. DESCRIPTION

| | |
|---|---|
| Physical data type: | varchar(20) |
| Allow NULLs: | Not allowed |

PICACTION

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | Table |
| Extended Attributes: | |
| OnFileGroup | PRIMARY |
| Clustered PK | Yes |

| Columns | Data Type | Allow NULLS | Value/Range |
|---|---|---|---|
| ACTIONID | tinyint | Not allowed | |
| DESCRIPTION | varchar(20) | Not allowed | |

| Foreign keys | Child | Parent |
|---|---|---|
| FK_PICACTIVITY_PICACTION | PICACTIVITY.PICACTION | ACTIONID |

TABLE 1-continued

Database Summary

Column details

1. ACTIONID

| | |
|---|---|
| Physical data type: | tinyint |
| Allow NULLs: | Not allowed |

2. DESCRIPTION

| | |
|---|---|
| Physical data type: | varchar(20) |
| Allow NULLs: | Not allowed |

PICACTIVITY

| | | | |
|---|---|---|---|
| Owner: | dbo | | |
| Target DB name: | icns | | |
| Number of columns: | 41 | | |
| Number of Indexes: | 2 | | |
| Number of foreign keys: | 7 | | |
| Codes: | 1 | | |
| Type: | Table | | |
| User defined types: | Name | Data Type | |
| | PICTYPE | C-Variable Length(17) | |
| | BANKRTN | N-Signed Integer | |
| | CHIPSABA | N-Signed Integer | |
| | BANKRTN | N-signed Integer | |
| | Phone | C-Variable Length(32) | |
| Extended attributes: | | | |
| OnFileGroup | F2 | | |
| Clustered PK | Yes | | |

| Columns | Data Type | Allow NULLS | Value/Range |
|---|---|---|---|
| ACTIVITYID | Int Identity | Not allowed | |
| ACTIVITYDISP (FK) | tinyint | Not allowed | |
| APPLDATE | datetime | Allowed | |
| STATUS (FK) | tinyint | Not allowed | |
| CREATEDATE | datetime | Not allowed | |
| CREATEUSER | varchar(40) | Not allowed | |
| CREATESOURCE (FK) | tinyint | Allowed | |
| APPRDATE | datetime | Allowed | |
| APPRUSER | varchar(40) | Allowed | |
| CANCELDATE | datetime | Allowed | |
| CANCELUSER | varchar(40) | Allowed | |
| PICACTION (FK) | tinyint | Not allowed | |
| EFFDATE | datetime | Allowed | |
| PICID (12) | PICTYPE | Allowed | |
| EFFDATE | tinyint | Not allowed | |
| PICID (12) | tinyint | Not allowed | |
| EPNFLAG (FK) | BANKRTN | Not allowed | |
| CHIPSFLAG (FK) | tinyint | Not allowed | |
| BANKRTN (FK, I1) | BANKRTN | Not allowed | |
| PICDDASIZE | tinyint | Not allowed | |
| PICDDA | varchar(34) | Not allowed | |
| CHIPSABA | CHIPSABA | Allowed | |
| CHIPSRTN | BANKRTN | Allowed | |
| CORPNAME | varchar(96) | Not allowed | |
| ADD1 | varchar(64) | Not allowed | |
| ADD2 | varchar(64) | Allowed | |
| ADD3 | varchar(64) | Allowed | |
| ADD4 | varchar(64) | Allowed | |
| CITY | varchar(32) | Allowed | |
| STATE | varchar(32) | Allowed | |
| ZIP | varchar(11) | Allowed | |
| COUNTRY | char(3) | Not allowed | |
| PHONE | phone | Allowed | |
| SICBCODE | char(10) | Allowed | |
| DUNSID | varchar(10) | Allowed | |
| BICCODE | int | Allowed | |
| BEICODE | smallint | Allowed | |
| TAXID | int | Allowed | |
| WPAYNA1 | varchar(35) | Allowed | |
| WPAYNA2 | varchar(35) | Allowed | |
| WPAYNA3 | varchar(35) | Allowed | |
| WPAYNA4 | varchar(35) | Allowed | |
| COMMENTS | varchar(80) | Allowed | |

TABLE 1-continued

Database Summary

| Indexes | Columns | Sort order |
|---|---|---|
| IX_PICACTIVITY_BANKRTN (I1) | BANKRTN | Ascending |
| IX_PICACTIVITY_PICID (12) | PICID | Ascending |

| Foreign keys | Child | Parent |
|---|---|---|
| FK_PICACTIVITY_ACTIVITYDISP | ACTIVITYDISP | ACTIVITYDISP.DISPID |
| FK_PICACTIVITY_ACTIVITYSTATUS | STATUS | ACTIVITYSTATUS.STATUSID |
| FK_PICACTIVITY_BANKROUTING | BANKRTN | BANKROUTING.BANKRTN |
| FK_PICACTIVITY_SOURCE | CREATESOURCE | SOURCE.SOURCEID |
| FK_PICACTIVITY_PICACCOUNTSTATUS_EPN | EPNFLAG | PICACCOUNTSTATUS.STATUSID |
| FK_PICACTIVITY_PICACCOUNTSTATUS_CHIPS | CHIPSFLAG | PICACCOUNTSTATUS.STATUSID |
| FK_PICACTIVITY_PICACTION | PICACTION | PICACTION.ACTIONID |

Column details

1. ACTIVITYID

| | |
|---|---|
| Physical data type: | int identity |
| Allow NULLs: | Not allowed |

2. ACTIVITYDISP (FK)

| | |
|---|---|
| Physical data type: | tinyint |
| Allow NULLs: | Not allowed |

3. APPLDATE

| | |
|---|---|
| Physical data type: | datetime |
| Allow NULLs: | Allowed |

4. STATUS (FK)

| | |
|---|---|
| Physical data type: | tinyint |
| Allow NULLs: | Not allowed |

5. CREATEDATE

| | |
|---|---|
| Physical data type: | datetime |
| Allow NULLs: | Not allowed |

6. CREATE USER

| | |
|---|---|
| Physical data type: | varchar(40) |
| Allow NULLs: | Not allowed |

7. CREATESOURCE (FK)

| | |
|---|---|
| Physical data type: | tinyint |
| Allow NULLs: | Allowed |

8. APPRDATE

| | |
|---|---|
| Physical data type: | datetime |
| Allow NULLs: | Allowed |

9. APPRUSER

| | |
|---|---|
| Physical data type: | varchar(40) |
| Allow NULLs: | Allowed |

10. CANCELDATE

| | |
|---|---|
| Physical data type: | datetime |
| Allow NULLs: | Allowed |

11. CANCELUSER

| | |
|---|---|
| Physical data type: | varchar(40) |
| Allow NULLs: | Allowed |

12. PICACTION

| | |
|---|---|
| Physical data type: | tinyint |
| Allow NULLs: | Not allowed |

13. EFFDATE

| | |
|---|---|
| Physical data type: | datetime |
| Allow NULLs: | Allowed |
| Default value: | getdate( ) + 1 |

14. PICID (12)

| | |
|---|---|
| Physical data type: | PICTYPE |
| Allow NULLs: | Allowed |

15. EPNFLAG (FK)

| | |
|---|---|
| Physical data type: | tinyint |
| Allow NULLs: | Not allowed |

TABLE 1-continued

Database Summary

16. CHIPSFLAG (FK)

| | |
|---|---|
| Physical data type: | tinyint |
| Allow NULLs: | Not allowed |

17. BANKRTN (FK, 11)

| | |
|---|---|
| Physical data type: | BANKRTN |
| Allow NULLs: | Not allowed |

18. PICDDASIZE

| | |
|---|---|
| Physical data type: | tinyint |
| Allow NULLs: | Not allowed |

19. PICDDA

| | |
|---|---|
| Physical data type: | varchar(34) |
| Allow NULLs: | Not allowed |

20. CHIPSABA

| | |
|---|---|
| Physical data type: | CHIPSABA |
| Allow NULLs: 0 | Allowed |

21. CHIPSRTN

| | |
|---|---|
| Physical data type: | BANKRTN |
| Allow NULLs: | Allowed |

22. CORPNAME

| | |
|---|---|
| Physical data type: | varchar(96) |
| Allow NULLs: | Not allowed |

23. ADD1

| | |
|---|---|
| Physical data type: | varchar(64) |
| Allow NULLs: | Not allowed |

24. ADD2

| | |
|---|---|
| Physical data type: | varchar(64) |
| Allow NULLs: | Allowed |

25. ADD3

| | |
|---|---|
| Physical data type: | varchar(64) |
| Allow NULLs: | Allowed |

26. ADD4

| | |
|---|---|
| Physical data type: | varchar(64) |
| Allow NULLs: | Allowed |

27. CITY

| | |
|---|---|
| Physical data type: | varchar(32) |
| Allow NULLs: | Allowed |

28. STATE

| | |
|---|---|
| Physical data type: | varchar(32) |
| Allow NULLs: | Allowed |

29. ZIP

| | |
|---|---|
| Physical data type: | varchar(11) |
| Allow NULLs: | Allowed |

30. COUNTRY

| | |
|---|---|
| Physical data type: | char(3) |
| Allow NULLs: | Not allowed |

31. PHONE

| | |
|---|---|
| Physical data type: | Phone |
| Allow NULLs: | Allowed |

32. SICBCODE

| | |
|---|---|
| Physical data type: | char(10) |
| Allow NULLs: | Allowed |

33. DUNSID

| | |
|---|---|
| Physical data type: | varchar(10) |
| Allow NULLs: | Allowed |

34. BICCODE

| | |
|---|---|
| Physical data type: | int |
| Allow NULLs: | Allowed |

TABLE 1-continued

Database Summary

35. BEICODE

| | |
|---|---|
| Physical data type: | smallint |
| Allow NULLs: | Allowed |

36. TAXID

| | |
|---|---|
| Physical data type: | int |
| Allow NULLs: | Allowed |

37. WPAYNA1

| | |
|---|---|
| Physical data type: | varchar(35) |
| Allow NULLs: | Allowed |

38. WPAYNA2

| | |
|---|---|
| Physical data type: | varchar(35) |
| Allow NULLs: | Allowed |

39. WPAYNA3

| | |
|---|---|
| Physical data type: | varchar(35) |
| Allow NULLs: | Allowed |

40. WPAYNA4

| | |
|---|---|
| Physical data type: | varchar(35) |
| Allow NULLs: | Allowed |

41. COMMENTS

| | |
|---|---|
| Physical data type: | varchar(80) |
| Allow NULLs: | Allowed |

Code details

1. AddPICActivity

| | |
|---|---|
| Type: | Trigger |
| Code body: | CREATE trigger dbo.AddPICActivity on dbo.PICACTIVITY |
| | For INSERT |
| | as |
| | declare @action int |
| | declare @PICID varchar (17) |
| | select @action=PICaction from inserted |
| | if(@action=2) |
| | if(notexists(select u.PICID from PIC u,insertd i where i.PICID=u.PICID)) |
| | Begin |
| | raiserror ('PICID not exists, Transaction is rolled back',16,1) |
| | ROLLBACK |
| | End |
| | if(NULL=(select PICID from inserted) |
| | Begin |
| | Raiserror('PICID cannot be NULL',16,1) |
| | ROLLBACK |
| | End |
| | if(@action=1) |
| | BEGIN |
| | exec PickPIC @ PICID OUT |
| | Update PIC Activity |
| | set PICID=@PICID |
| | from PICACTIVITY u, Inserted i |
| | where u.activityID=i.activityID |
| | insert PIC |
| | select @PICID,2,epnflag,chipsflag,bankrtn,null,PICDASIXE,PICDDA, |
| | CHIPSABA,CHIPSRTN,Corpname,Add1,Add2,Add4,City,State,Zip, |
| | Country,Phone,SICBCODE,DUNSID,BICCODE,BEICODE,TAXID,WPAYNA1,WPAY |
| | NA2,WPAYNA3,WPAYNA4,Getdate( ),Getdate( ) from Inserted |
| | End |

Index details

IX PICACTIVITY BANKTRN

| | |
|---|---|
| Columns(s) | BANKRPTN (Asc) |
| Unique: | No |
| Extended attributes | |
| OnFileGroup | F1 |
| CLUSTERED | No |
| IGNORE_DUP_KEY | No |
| FILLFACTOR | 0 |
| PAD_INDEX | No |

TABLE 1-continued

Database Summary

| | | |
|---|---|---|
| DROP_EXISTING | | No |
| STATISTICS_NORECOMPUTE | | No |
| IX PICACTIVITY PICID | | |
| Column(s) | | PICID (Asc) |
| Unique: | | No |
| Extended attributes | | |
| OnFileGroup | | F1 |
| CLUSTERED | | No |
| IGNORE_DUP_KEY | | No |
| FILLFACTOR | | 0 |
| PAD_INDEX | | No |
| DROP_EXISTING | | No |
| STATISTICS_NORECOMPUTE | | No |

Foreign key details (child)

| Definition | Child | Parent |
|---|---|---|
| | FX PICACTIVITY ACTIVITYDISP | |
| | ACTIVITYDISP | ACTIVITYDISP.DISPID |
| Relationship type: | Non-Identifying | |
| Cardinality | One-to-Zero-or-More | |
| Allow NULLs: | Not allowed | |
| Verb phrase: | hasFK_PICACTIVITY_ACTIVITYDISP | |
| Inverse phrase: | is of | |
| Ref. Integrity on update: | No action | |
| Ref. Integrity on delete: | No action | |
| | FX PICACTIVITY ACTIVITYSTATUS | |
| | STATUS | ACTIVITYSTATUS-STATUSID |
| Relationship type: | Non-Identifying | |
| Cardinality | One-to-Zero-or-More | |
| Allow NULLs: | Not allowed | |
| Verb phrase: | hasFK_PICACTIVITY_ACTIVITYSTATUS | |
| Inverse phrase: | is of | |
| Ref. Integrity on update: | No action | |
| Ref. Integrity on delete: | No action | |
| | FK PICACTIVITY BANKROUTING | |
| | BANKRTN | BANKROUTING.BANKRTN |
| Relationship type: | Non-Identifying | |
| Cardinality | One-to-Zero-or-More | |
| Allow NULLs: | Not allowed | |
| Verb phrase: | hasFK_PICACTIVITY_BANKROUTING | |
| Inverse phrase: | is of | |
| Ref. Integrity on update: | No action | |
| Ref. Integrity on delete: | No action | |
| | FK PICACTIVITY SOURCE | |
| | CREATESOURCE | SOURCE.SOURCEID |
| Relationship type: | Non-Identifying | |
| Cardinality | Zero-or-One-to-Zero-or-More | |
| Allow NULLs: | Allowed | |
| Verb phrase: | hasFK_PICACTIVITY_SOURCE | |
| Inverse phrase: | is of | |
| Ref. Integrity on update: | No action | |
| Ref. Integrity on delete: | No action | |
| | FK PICACTIVITY PICACCOUNTSTATUS.EPN | |
| | EPNFLAG | PICACCOUNTSTATUS.STATUSID |
| Relationship type: | Non-Identifying | |
| Cardinality | One-to-Zero-or-More | |
| Allow NULLs: | Not allowed | |
| Verb phrase: | hasFK_PICACTIVITY_PICACCOUNTSTATUS-EPN | |
| Inverse phrase: | is of | |
| Ref. Integrity on update: | No action | |
| Ref. Integrity on delete: | No action | |
| | FK PICACTIVITY PICACCOUNTSTATUS CHIPS | |
| | CHIPSFLAG | PICACCOUNTSTATUS.STATUSID |
| Relationship type: | Non-Identifying | |
| Cardinality | One-to-Zero-or-More | |
| Allow NULLs: | Not allowed | |

TABLE 1-continued

Database Summary

| | |
|---|---|
| Verb phrase: | hasFK_PICACTIVITY_ACCOUNTSTATUS.CHIPS |
| Inverse phrase: | is of |
| Ref. Integrity on update: | No action |
| Ref. Integrity on delete: | No action |

FK PICACTIVITY PICACTION

| | | |
|---|---|---|
| | PICACTION | PICACTION.ACTIONID |
| Relationship type: | Non-Identifying | |
| Cardinality | One-to-Zero-or-More | |
| Allow NULLs: | Not allowed | |
| Verb phrase: | hasFK_PICACTIVITY_PICACTION | |
| Inverse phrase: | is of | |
| Ref. Integrity on update: | No action | |
| Ref. Integrity on delete: | No action | |

PICS

| | | |
|---|---|---|
| Owner: | dbo | |
| Target DB name: | icns | |
| Number of columns: | 1 | |
| Number of Indexes: | 0 | |
| Number of foreign keys: | 0 | |
| Codes: | 1 | |
| Type: | Table | |
| User defined types: | Name | Data Type |
| | PICTYPE | C-Variable Length(17) |
| Extended attributes: | | |
| OnFileGroup | PRIMARY | |
| Clustered PK | No | |

| Columns | Data type | Allow NULLs | Value/Range |
|---|---|---|---|
| PICID | PICTYPE | Not allowed | |

Column details

1. PICID

| | |
|---|---|
| Physical data type: | PICTYPE |
| Allow NULLs: | Not allowed |

Code details

1. UPDATESYPARA

| | |
|---|---|
| Type: | Trigger |
| Code body: | CREATE TRIGGER DBO UPDATESYSPARA [dbo].[PICS] |
| | FOR INSERT |
| | AS |
| | UPDATE SYSTEMPARA |
| | SET PICDIGITS-8, |
| | PICSPEND=(SELECT |
| | COUNT(*)FROM pics) |

PICS

| | |
|---|---|
| Owner: | dbo |
| Target DB name: | icns |
| Number of columns: | 2 |
| Number of Indexes: | 0 |
| Number of foreign keys: | 0 |
| Codes: | 0 |
| Type: | Table |
| Extended attributes: | |
| OnFileGroup | PRIMARY |
| Clustered PK | Yes |

TABLE 1-continued

Database Summary

| Columns | Data type | Allow NULLs | Value/Range |
|---|---|---|---|
| PICSTATUSID | tinyint | Not allowed | |
| DESCRIPTION | varcher(30) | Not allowed | |

| Foreign keys | Child | Parent |
|---|---|---|
| FK_PIC_PICSTATUS | PIC.PICSTATUS | PICSTATUSID |

Column details

1. PICSTATUSID

| | |
|---|---|
| Physical data type: | tinyint |
| Allow NULLs: | Not allowed |

2. DESCIPTION

| | |
|---|---|
| Physical data type: | varchar(30) |
| Allow NULLs: | Not allowed |

The following is a list of application components associated with the PIC database. The list also shows functions associated with each component. This list is for illustrative purposes only.

PIC
  Add PIC
    Input: PIC table fields, Initial Status of Activity record (approved or proposed)
    Output: PIC number or error number, Activity ID number
    Process: Ensure no PIC record and no PIC Activity record already exists for PIC. If no problems encountered, add an activity record to the PIC Activity table. If initial status is approved, assign PIC number and add record to PIC table as inactive. The PIC number will become active when the apply activity program is run for the PIC number's effective date.
  Modify PIC
    Input: PIC table fields, Initial Status of Activity record
    Output: Error message if unsuccessful, Activity ID number
    Process: If no problems exist, add activity record
  Transfer PIC
    Input: Required fields as indicated in business plan
    Output: Error message if unsuccessful
    Process: If no problems exist, add activity record.
  Inquiry by DDA/RT (Demand Deposit Account/Routing Number)
    Input: DDA number and RT
    Output: A list of PIC records matching the input
  Inquiry by PIC
    Input: PIC number
    Output: PIC record if found
  Inquiry by Name
    Input: Name and/or address fields, routing number
    Output: List of possible matches
    Process: Only allow inquiry into PICs belonging to the requesting bank
PIC Activity
  Change Status of existing Activity
    Input: Activity ID, New Status (approved, cancelled, applied etc.)
    Output: Error message if unsuccessful
  Inquire by Activity Request Number
    Input: Activity ID
    Output: Activity record
  Inquire on all Activity in Proposed state for a bank
    Input: Routing Number
    Output: List of all proposed activity records
  Inquire on all activity (closed and open) by a PIC number
    Input: Routing Number, PIC number
    Output: List of all activity records for PIC number
    Process: Should not include activity records for that PIC number that were made by another bank in the case of a PIC that has gone through a transfer
Bank Profile
  Add Bank Profile Record
    Input: All Bank Profile fields
    Output: Error message if unsuccessful
    Process: Set status to initialized so the first time a bank signs on to the web site it verifies all data, then set flag to active
  Modify Bank Profile Record
    Input: All Bank Profile fields
    Output: Error message if unsuccessful
    Process: If no problems encountered, add an activity record to the Bank Profile Activity table.
  Routing Number Table
    Add routing number entry for a Master routing number
      Input Bank Routing Number, Master Bank Routing Number
      Output: Error Message if unsuccessful
    Delete routing number entry from a Master routing number
      Input: Bank Routing Number, Master Bank Routing Number
      Output: Error Message if unsuccessful
  Bank Profile Activity
    Inquire by an RT number for all prior activity records
      Input: Bank Routing Number, Master Bank Routing Number
      Output: List of activity records
Users
  Retrieve user info via active directory call
  Add user via active directory call
  Modify user attributes via active directory call Create program or use SQL (Structured Query Language) utility to apply and create a file of today's PIC and bank profile activity effective for the next business day and send this file to the CHIPS and EPN mainframes.

Create program to process an incoming file from a bank and generate an outbound file. This will call the appropriate functions within the appropriate components above such as the Add PIC function. Each component needs to have functions for inquiring, adding, modifying and deleting records. (No delete is required for PICs For illustrative purposes, a number of PIC processes are depicted in tabular form in Tables 2 through 5. Each table provides the Name, Type, and Size of the Field, and depending on the type of process being performed whether the field is input/output of the process (X), an optional input/output (O), only displayed (D), or the result of the process (R).

Also, for illustrative purposes, the following is a list of potential business facade routines and business rules routines associated with the PIC database.

Business Facade Routines for PIC
GetPICbyPIC
Description: Get one the PICs with the specified PIC belonging to the User's RT. If a date is specified, show the historical representation for the requested date.
Parameters:
PIC number
Routing Transit Number
Date (optional—only supply if looking for a specific date).
Output: PIC Dataset
GetPICbyDDART
Description: Get one or more PICs with the specified DDA/RT belonging to the User's RT. If a date is specified, show the historical representation for the requested date.
Parameters:
DDA Number
Routing Number
User's Routing Number
Date (optional—only supply if looking for a specific date).
Output: Owner Flag: 1 if the PIC number belongs to user's bank PIC Data structure

TABLE 2

PIC ACCOUNT PROCESS

| PIC ACCOUNT PIC ACCOUNT | TYPE | SZ | ISSUE PIC | MAINTAIN (MODIFY) | TRANSFER | INVESTIGATIONS (INQUIRY) |
|---|---|---|---|---|---|---|
| PIC IDENTIFIER | AN | 17 | R | D | D | D |
| PIC GLOBAL STATUS | N | 1 | X | X |  | D |
| EPN ACCOUNT STATUS | N | 2 | X | X |  | D |
| CHIPS ACCOUNT STATUS | N | 2 | X | X |  | D |
| BANK RT NUMBER | N | 9 | X | X | X | D |
| PIC DDA SIZE | N | 2 | X | X | X | D |
| PIC DDA | AN | 34 | X | X | X | D |
| PIC CHIPS BANK ABA | N | 4 | O | O | O | D |
| CHIPS LINK RT NUMBER | N | 9 | O | O | O | D |
| PIC BANK CATEGORY | N | 2 | O | O |  | D |
| CORPORATE NAME | ANS | 96 | X | X |  | D |
| ADDRESS 1 | ANS | 64 | X | X |  | D |
| ADDRESS 2 | ANS | 64 | O | O |  | D |
| ADDRESS 3 | ANS | 64 | O | O |  | D |
| ADDRESS 4 | ANS | 64 | O | O |  | D |
| CITY | ANS | 32 | O | O |  | D |
| STATE/PROV | ANS | 32 | O | O |  | D |
| POSTAL CODE | AN | 11 | O | O |  | D |
| COUNTRY | ANS | 3 | X | X |  | D |
| PHONE NUMBER | AN | 32 | O | O |  | D |
| SIC BUSINESS CODE | N | 4 | O | O |  | D |
| DUNS ID | AN | 10 | O | O |  | D |
| BIC CODE | N | 11 | O | O |  | D |
| BEI CODE | N | 6? | O | O |  | D |
| TAX ID | N | 12 | O | O |  | D |
| WIRE PAY N/A 1 | ANS | 35 | O | O |  | D |
| WIRE PAY N/A 2 | ANS | 35 | O | O |  | D |
| WIRE PAY N/A 3 | ANS | 35 | O | O |  | D |
| WIRE PAY N/A 4 | ANS | 35 | O | O |  | D |
| CREATION DATETIME | N | 14 | R | D |  | D |
| LAST UPDATE DATETIME | N | 14 | R | R |  | D |

X—I/O of Process
O—Optimal I/O
D—Display Only
R—Result of Process

TABLE 3

PIC ACTIVITY PROCESS

| PIC ACTIVITY FIELD NAME | TYPE | SZ | ISSUE PIC | MODIFY PIC | TRANSFER PIC | ACTIVITY INQUIRY | APPROVE ACTIVITY | REVISE ACTIVITY | CANCEL ACTIVITY |
|---|---|---|---|---|---|---|---|---|---|
| ACTIVITY ID | N | 12 | R | R | R | D | D | D | D |
| ACTIVITY DISPOSITION | N | 1 | R | R | R | D | D | R | R |
| APPLIED DATETIME | N | 14 | | | | D | | | |
| ACTIVITY STATUS | N | 2 | R | R | R | D | R | R | R |
| CREATION DATETIME | N | 14 | R | R | R | D | D | D | D |
| CREATED BY USER | AN | 40 | R | R | R | D | D | D | D |
| APPROVAL DATETIME | N | 14 | | | | D | R | | |
| APPROVED BY USER | AN | 40 | | | | D | R | | |
| CANCELLED DATETIME | N | 14 | | | | D | | R | R |
| CANCELLED BY USER | AN | 40 | | | | D | | R | R |
| PIC DETAIL ACTION | AN | 6 | R | R | R | D | D | X | D |
| PIC IDENTIFIER | AN | 17 | R | R | R | D | D | X | D |
| UPDATE EFFECTIVE DATE | N | 8 | R | R | | D | D | O | D |
| EPN ACCOUNT STATUS | N | 2 | R | R | | D | D | X | D |
| CHIPS ACCOUNT STATUS | N | 2 | R | R | | D | D | X | D |
| BANK RT NUMBER | N | 9 | R | R | R | D | D | X | D |
| PIC DDA SIZE | N | 2 | R | R | R | D | D | X | D |
| PIC DDA | AN | 34 | R | R | R | D | D | X | D |
| PIC CHIPS BANK ABA | N | 4 | R | R | R | D | D | O | D |
| CHIPS LINK RT NUMBER | N | 9 | R | R | R | D | D | O | D |
| PIC BANK CATEGORY | N | 2 | R | R | | D | D | O | D |
| CORPORATE NAME | ANS | 96 | R | R | | D | D | X | D |
| ADDRESS 1 | ANS | 64 | R | R | | D | D | X | D |
| ADDRESS 2 | ANS | 64 | R | R | | D | D | O | D |
| ADDRESS 3 | ANS | 64 | R | R | | D | D | O | D |
| ADDRESS 4 | ANS | 64 | R | R | | D | D | O | D |
| CITY | ANS | 32 | R | R | | D | D | O | D |
| STATE/PROV | ANS | 32 | R | R | | D | D | O | D |
| POSTAL CODE | AN | 11 | R | R | | D | D | O | D |
| COUNTRY | ANS | 3 | R | R | | D | D | X | D |
| BIC CODE | N | 11 | R | R | | D | D | O | D |
| BEI CODE | N | 6? | R | R | | D | D | O | D |
| TAX ID | N | 12 | R | R | | D | D | O | D |
| WIRE PAY N/A 1 | ANS | 35 | R | R | | D | D | O | D |
| WIRE PAY N/A 2 | ANS | 35 | R | R | | D | D | O | D |
| WIRE PAY N/A 3 | ANS | 35 | R | R | | D | D | O | D |
| WIRE PAY N/A 4 | ANS | 35 | R | R | | D | D | O | D |
| COMMENTS | | | R | R | R | D | D | | |

X—I/O of Process
O—Optimal I/O
D—Display Only
R—Result of Process

TABLE 4

BANK PROFILE PROCESS

| BANK PROFILE FIELD NAME | TYPE | SZ | ADD BANK | MODIFY PROFILE | INVESTIGATIONS (INQUIRY) |
|---|---|---|---|---|---|
| BANK ROUTING NUMBER | N | 9 | X | X | D |
| BANK STATUS | N | 1 | X | X | D |
| BANK NAME | AN | 96 | X | X | D |
| CREATION DATETIME | N | 14 | R | D | D |
| LAST UPDATE DATETIME | N | 14 | R | R | D |
| EPN FLAG | N | 1 | X | X | D |
| CHIPS FLAG | N | 1 | X | X | D |
| CHIPS BANK ABA | N | 4 | O | O | D |
| CHIPS LINK RT NUMBER | N | 9 | O | O | D |
| CHIPS DDA ACCT | AN | 34 | O | O | D |
| CHIPS CHAIN DEPTH | N | 1 | O | O | D |
| TYPE OF BANK | AN | 3 | X | X | D |

TABLE 4-continued

BANK PROFILE PROCESS

| BANK PROFILE FIELD NAME | TYPE | SZ | ADD BANK | MODIFY PROFILE | INVESTIGATIONS (INQUIRY) |
|---|---|---|---|---|---|
| ADDRESS 1 | ANS | 64 | X | X | D |
| ADDRESS 2 | ANS | 64 | O | O | D |
| ADDRESS 3 | ANS | 64 | O | O | D |
| ADDRESS 4 | ANS | 64 | O | O | D |
| CITY | ANS | 32 | O | O | D |
| STATE/PROV | ANS | 32 | O | O | D |
| POSTAL CODE | AN | 11 | O | O | D |
| COUNTRY | ANS | 3 | X | X | D |
| PHONE NUMBER | AN | 32 | O | O | D |
| FAX NUMBER | AN | 32 | O | O | D |
| E-MAIL ADDRESS | ANS | 128 | O | O | D |
| BACKUP PHONE NUMBER | AN | 32 | O | O | D |
| BACKUP FAX NUMBER | AN | 32 | O | O | D |
| BACKUP E-MAIL ADDRESS | ANS | 128 | O | O | D |
| WIRE PAY N/A/4 | ANS | 35 | O | O | D |
| WIRE PAY N/A 2 | ANS | 35 | O | O | D |
| IRE PAY N/A 3 | ANS | 35 | O | O | D |
| WIRE PAY N/A 4 | ANS | 35 | O | O | D |

X—I/O of Process
O—Optimal I/O
D—Display Only
R—Result of Process

TABLE 5

BANK PROFILE ACTIVITY PROCESS

| BANK PROFILE ACTIVITY FIELD NAME | TYPE | SZ | ADD BANK PROFILE | MODIFY PROFILE | ACTIVITY INQUIRY | APPROVE ACTIVITY | REVISE ACTIVITY | CANCEL ACTIVITY |
|---|---|---|---|---|---|---|---|---|
| ACTIVITY ID | N | 12 | R | R | D | D | D | D |
| ACTIVITY DISPOSITION | N | 1 | R | R | D | D | R | R |
| ACTIVITY APPLIED DATETIME | N | 14 | | | D | | | |
| ACTIVITY STATUS | N | 2 | R | R | D | R | R | R |
| ACTIVITY CREATION DATETIME | N | 14 | R | R | D | D | D | D |
| CREATED BY USER | AN | 40 | R | R | D | D | D | D |
| ACTIVITY APPROVAL DATETIME | N | 14 | | | D | R | | |
| APPROVED BY USER | AN | 40 | | | D | R | | |
| ACTIVITY CANCELLED DATETIME | N | 14 | | | D | | R | R |
| CANCELLED BY USER | AN | 40 | | | D | | R | R |
| DETAIL ACTION | N | 1 | R | R | D | D | X | D |
| UPDATE EFFECTIVE DATE | N | 8 | R | R | D | D | X | D |
| BANK ROUTING NUMBER | N | 9 | R | R | D | D | D | D |
| BANK STATUS | N | 1 | R | R | D | D | X | D |
| BANK NAME | AN | 96 | R | R | D | D | X | D |
| CREATION DATETIME | N | 14 | R | R | D | D | D | D |
| LAST UPDATE DATETIME | N | 14 | R | R | D | D | R | D |
| EPN FLAG | N | 1 | R | R | D | D | X | D |
| CHIPS FLAG | N | 1 | R | R | D | D | X | D |
| CHIPS BANK ABA | N | 4 | R | R | D | D | O | D |
| CHIPS LINK RT NUMBER | N | 9 | R | R | D | D | O | D |
| CHIPS DDA ACCT | AN | 34 | R | R | D | D | O | D |
| CHIPS CHAIN DEPTH | N | 1 | R | R | D | D | O | D |
| TYPE OF BANK | AN | 3 | R | R | D | D | X | D |
| ADDRESS 1 | ANS | 64 | R | R | D | D | X | D |
| ADDRESS 2 | ANS | 64 | R | R | D | D | O | D |
| ADDRESS 3 | ANS | 64 | R | R | D | D | O | D |
| ACTIVITY ID | N | 12 | R | R | D | D | D | D |
| ADDRESS 4 | ANS | 64 | R | R | D | D | O | D |
| CITY | ANS | 32 | R | R | D | D | O | D |
| STATE/PROV | ANS | 32 | R | R | D | D | O | D |
| POSTAL CODE | AN | 11 | R | R | D | D | O | D |
| COUNTRY | ANS | 3 | R | R | D | D | X | D |
| PHONE NUMBER | AN | 32 | R | R | D | D | O | D |
| FAX NUMBER | AN | 32 | R | R | D | D | O | D |
| E-MAIL ADDRESS | ANS | 128 | R | R | D | D | O | D |
| BACKUP PHONE NUMBER | AN | 32 | R | R | D | D | O | D |
| BACKUP FAX NUMBER | AN | 32 | R | R | D | D | O | D |
| BACKUP E-MAIL ADDRESS | ANS | 128 | R | R | D | D | O | D |
| WIRE PAY N/A 1 | ANS | 35 | R | R | D | D | O | D |
| WIRE PAY N/A 2 | ANS | 35 | R | R | D | D | O | D |

TABLE 5-continued

BANK PROFILE ACTIVITY PROCESS

| BANK PROFILE ACTIVITY FIELD NAME | TYPE | SZ | ADD BANK PROFILE | MODIFY PROFILE | ACTIVITY INQUIRY | APPROVE ACTIVITY | REVISE ACTIVITY | CANCEL ACTIVITY |
|---|---|---|---|---|---|---|---|---|
| WIRE PAY N/A 3 | ANS | 35 | R | R | D | D | O | D |
| WIRE PAY N/A 4 | ANS | 35 | R | R | D | D | O | D |

X—I/O of Process
O—Optimal I/O
D—Display Only
R—Result of Process

GetPICbyCorpNameCity

Description: Get all PICs that begin with the Corporation. Name supplied and restrict by the city name if supplied. No date is allowed for this search.

Parameters:

Corp Name

City Name

Output: PIC dataset of all PICs meeting the search

CreatePIC

Description: Create a PIC record. Sets up a PIC Dataset and calls the business rules' insert PIC procedure which validates all fields passed. This routine is passed a flag saying whether this is just a validate call or a validate and update call. Boolean procedure returning true if successful.

Parameters:

All PIC fields

Routing Number of User requesting the create

Update or Validate only

GetPICtoModify

Description: Gets a PIC record to modify. If PIC is valid, then it returns the PIC data record from the PIC table. If open activity exists, the activity id is set to the activity ID of the pending activity. Boolean procedure returning true if successful.

Parameters:

PIC

Routing Number of User requesting the create

PICdata

UpdatePIC

Description: Modify a PIC record. Passes a PIC dataset to the business rules' update PIC procedure which validates all fields passed. This routine is passed a flag saying whether this is just a validate call, or a validate and update call. Boolean procedure returning true if successful.

Parameters:

All PIC fields in PIC dataset form

Update or Validate only

ClosePIC

Description: Changes the status of a PIC record to closed. Passes the PIC Dataset to the business rules' closethePIC procedure which validates all fields passed. Boolean procedure returning true if successful.

Parameters:

PIC data

ReactivatePIC

Description: Changes the status of a closed PIC record to open. Passes the PIC Dataset to the business rules' close PIC procedure which validates all fields passed. Boolean procedure returning true if successful.

Parameters:

PIC data

ApproveActivity

Description: Changes the status of a proposed PIC activity record to approved. Calls the business rules' approve PIC Activity procedure. Boolean procedure returning true if successful.

Parameters:

PIC data set including the activity ID number and the user name approving the record CancelActivity Description: Changes the status of an open PIC activity record to canceled. Calls the business rules' cancel PIC Activity procedure. Boolean procedure returning true if successful.

Parameters:

PIC data set including the activity ID number and the user name approving the record.

TransferPIC

Description: Transfers a PIC from one bank to another. Calls the business rules' transfer PIC procedure. Boolean procedure returning true if successful.

Parameters:

PIC dataset including the PIC, Requesting User's RT, the new RT, new DDA numjber and new TaxID ContestTransfer Description: Contests a PIC Transfer. Calls the business rules' contest transfer procedure. Boolean procedure returning true if successful.

Parameters:

PIC data set including the activity ID number and user contesting the transfer

Release Transfer

Description: Releases a PIC Transfer. Calls the business rules' release transfer procedure. Boolean procedure returning true if successful.

Parameters:

PIC dataset including the activity ID and the user releasing the transfer

Business Facade Routines for URIC Activity

SearchActivitybyPIC

Description: Get all PIC activity for a given PIC. Routing number is supplied to ensure the PIC belongs to the requestor. If a date is supplied restrict the selection to be between the dates given.

Parameters:

PIC

Routing Transit Number

Optional Start Date

Optional End Date

Output: PIC dataset of all PIC activity records of activity records

SearchActivityByType

Description: Get all PIC activity for a bank based on the type of activity. Routing number is supplied to ensure the PIC belongs to the requestor. If a date is supplied restrict the selection to be between the dates given.

Parameters:

Activity Type

Routing Transit Number

Optional Start Date

Optional End Date Output: PIC dataset of all URIC activity records of activity records SearchActivityByStatus Description: Get all PIC activity for a bank based on a given activity status. Routing number is supplied to ensure the PIC belongs to the requestor. If a date is supplied restrict the selection to be between the dates given.

Parameters:

Activity Status

Routing Transit Number

Optional Start Date

Optional End Date

Output: URIC dataset of all PIC activity records of activity records

SearchActivitybyCorpName

Description: Get all PIC activity for a bank based on a company name. Routing number is supplied to ensure the PIC belongs to the requestor. If a date is supplied restrict the selection to be between the dates given.

Parameters:

Company Name

Routing Transit Number

Optional Start Date

Optional End Date Output: PIC dataset of all PIC activity records of activity records SearchActivitybyUserName Description: Get all PIC activity for a bank created by a specific user. Routing number is supplied to ensure the PIC belongs to the requestor. If a date is supplied restrict the selection to be between the dates given.

Parameters:

User Name

Routing Transit Number

Optional Start Date

Optional End Date

Output: PIC dataset of all PIC activity records of activity records

GetPICActivitybyID

Description: Get a specific PIC activity record

Parameters:

Activity ID Number

Output: PIC dataset of all PIC activity records of activity records

Business Rules Routines for PIC

Insert

Description: Validates all fields passed. If update is requested and all edits pass, the new PIC is createdBoolean procedure returning true if successful.

Validates the following

All fields for proper size and character type

DDA must be 17 characters or less if EPN enabled. If only CHIPS enabled it can be up to 35

Must be either CHIPS enabled or EPN enabled

If bank is not CHIPS enabled, CHIPS enabled flag cannot be on

If bank is not EPN enabled, EPN enabled flag cannot be on

Cannot skip an address line

If CHIPS enabled, Wire pay name and address is required

Cannot skip a wire pay name and address line

Must be a valid business date. Cannot be less than the next valid effective date (either tomorrow or the next day if the update has already been run)

RTN must belong to the bank requesting

DDA/RT combination cannot already exist

Parameters:

All PIC fields via the PIC dataset

Routing Number of User requesting the create

Update or Validate only

Update

Description: Validates all fields passed. If validate only is requested, only validation is done. If all fields pass all edits and update is requested, the PIC record is updated by creating an activity record. Boolean procedure returning true if successful.

Validates all the same as Insert with the following exceptions:

DA/RT can already exist

Must notify if open activity already exists for the PIC

Parameters:

All PIC fields via the PIC dataset

Update or Validate only

ClosethePIC

Description: Changes the status of a PIC record to closed. Validates the close request. If passes the edits, calls the update data access routing to create an activity record with an action type of close. Boolean procedure returning true if successful.

Parameters:

PIC data set

Validates: effective date for a valid business date

ReactivatethePIC

Description: Changes the status of a PIC record to open. Validates the reactivate request. If passes the edits, calls the update data access routing to create an activity record with an action type of reactivate. Boolean procedure returning true if successful.

Parameters:
PIC data set
Validates: effective date for a valid business date
ApproveActivity
Description: Changes the status of a proposed PIC activity record to approved if validation is successful. Calls the data access Update Status routine. Boolean procedure returning true if successful.
Parameters:
Activity ID Number
Validates: The user approving is not the user that entered the activity
CancelActivity
Description: Changes the status of an open PIC activity record to canceled if the validation is successful. Calls the data access Update Status routine. Boolean procedure returning true if successful.
Parameters:
Activity ID Number
Validates: The user canceling the activity is either the creator or an administrator
TransferPIC
Description: Transfers a PIC from one bank to another if all validations are successful. Boolean procedure returning true if successful.
Parameters:
PIC data as dataset
Validates:
Effective date is valid business date
Must be either EPN capable or CHIPS capable
Cannot be EPN capable if bank is not EPN capable
Cannot be CHIPS capable if bank is not CHIPS capable
DDA number must be alphanumeric
DDA number cannot exceed 17 characters if EPN capable
ContestTransfer
Description: Updates the PIC activity record with the status of contested. Callst the data access Update Status routine. Boolean procedure returning true if successful.
Parameters:
Activity ID Number
User contesting the transfer
ReleaseTransfer
Description: Updates the PIC activity record with the status of released. Calls the data access Update Status routine. Boolean procedure returning true if successful.
Parameters:
Activity ID Number
User releasing the transfer
Data Access Routines for PIC
FindPICbyPIC
Description: Gets a PIC record from PIC Activity based on a date passed. The routine passes along a flag which indicates whether the requesting bank has the right to see the entire PIC information or just a limited view. Boolean procedure returning true if successful.
Parameters:
Routing Number of User requesting the find
PIC
Date
Stored Procedure Called: pfindpic_picid
FindPICbyAction
Description: Get a PIC activity record by the activity ID number
Parameters:
Activity ID Number
Stored Procedure Called: pviewwpicactivity
FindPICbyComCity
Description: Get a list of PICs by querying on Company name and city name
Parameters:
Routing Number of User requesting the find
Corporate Name
City Name
Stored Procedure Called: pfindpic_name
FindPICbyRTNDDA
Description: Retrieve a PIC by Routing Number/DDA number for a specific date. The routing passes along a flag which indicates whether the requestor has the right to see the entire PIC information or just a limited view.
Parameters:
Routing Number of User requesting the find
Routing Number of the PIC
DDA Number of the PIC
Date
ValidateEffectiveDate
Description: Validate if a specific date is a business date: Also must be within 90 days.
Parameters:
Effective Date
Stored Procedure Called: pvalidateRTN
ValidateRTN
Description: Validates whether a routing number belongs to the user's bank
Parameters:
Routing Number of requesting User
Routing Number to verify
Stored Procedure Called: pvalidateRTN
ValidateRTDDAUnique
Description: Verifies the Routing Number/DDA Number combination does not already exist for any PIC,
Parameters:
DDA Number
Routing Number
Stored Procedure Called: pvalidatertn_DDA
GetActivitybyCorpName
Description: Gets all PIC activity records for a given corporate name. If dates are supplied, the records are restricted between the dates. Records are also restricted based on the user RTN.
Parameters:
RTN of the user requesting the search
Corporate Name
Optional Start date and End date
Stored Procedure Called: pfindUA_Name
GetActivitybyStatus
Description: Gets all PIC activity records with a given activity status. If dates are supplied, the records are restricted between the dates. Records are also restricted based on the user RTN.
Parameters:
RTN of the user requesting the search
Activity Status
Optional Start date and End date
Stored Procedure Called: pfindUA_Status
GetActivitybyType
Description: Gets all PIC activity records with a given activity type. If dates are supplied, the records are restricted between the dates. Records are also restricted based on the user RTN.

Figure 7:
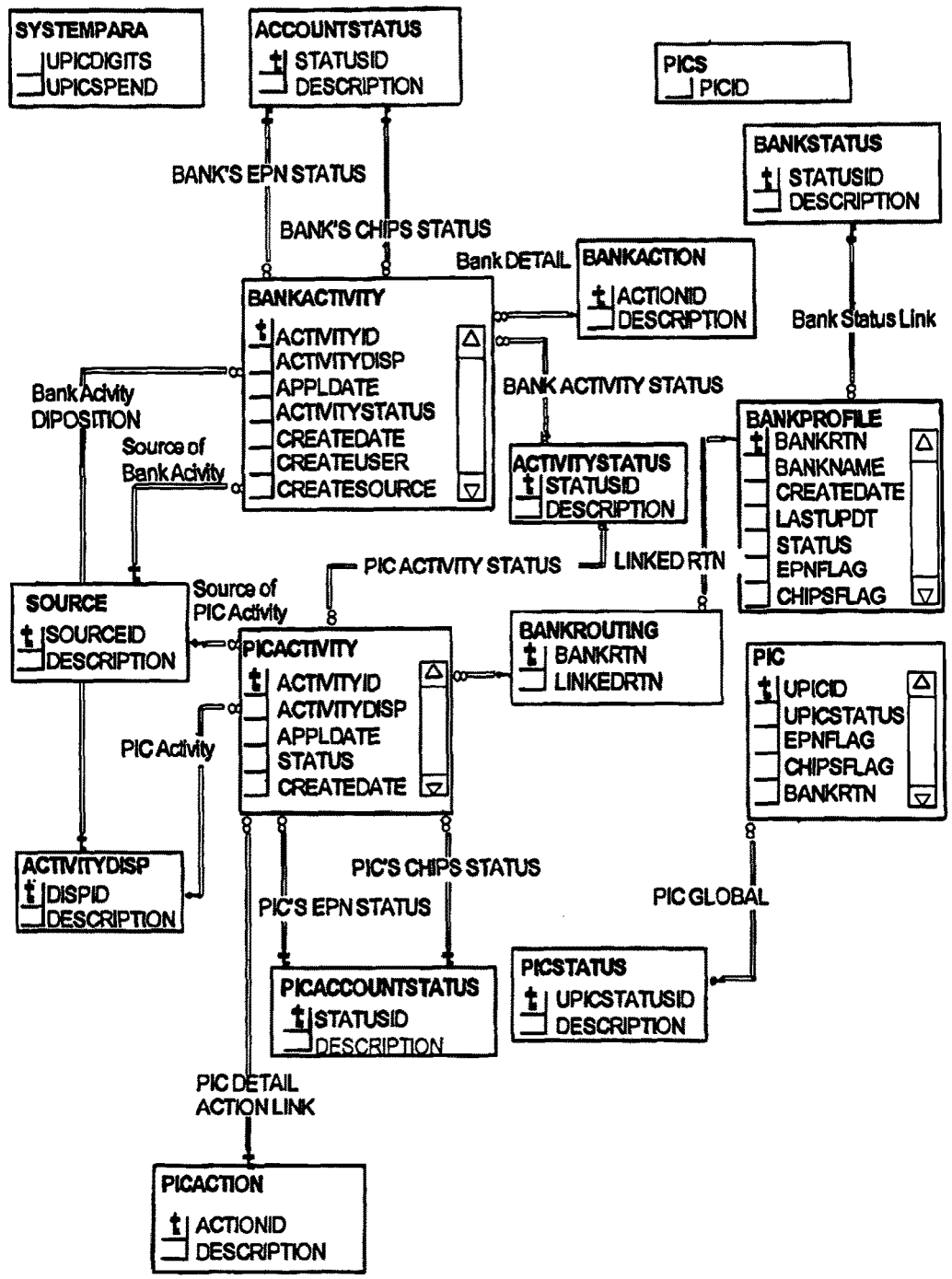
FIG. 7 is a functional process model depicting approach to defining business requirements of the present invention.

Parameters:
RTN of the user requesting the search
Activity Type
Optional Start date and End date
Stored Procedure Called: pfindUA_Type
GetActivitybyPIC
Description: Gets all PIC activity records for a given PIC. If dates are supplied, the records are restricted between the dates. Records are also restricted based on the user RTN.
Parameters
RTN of the user requesting the search
PIC ID Number
Optional Start date and End date
Stored Procedure Called: pfindUA_PICID
GetActivitybyUserName
Description: Gets all PIC activity records created by a specific user. If dates are supplied, the records are restricted between the dates. Records are also restricted based on the user RTN.
Parameters:
RTN of the user requesting the search
User Name
Optional Start date and End date
Stored Procedure Called: pfindUA_User A functional process model illustrating an approach to gather business requirements is depicted in FIG. 7. In developing the process model, potential PIC functionality categories from registration to reporting are defined.

The sections that follow outline the detailed functional requirements related to the PIC to the framework outlined in FIG. 7.

Register Bank Participants

Business customers who use the PIC functionality must have DDAs at a bank registered with the trusted third party to distribute PICs. Banks participating in the system are the primary channels for reaching business customers for all PIC activities, from marketing to maintenance. Preferably, no direct interaction between business customers and the system support team is expected. One of the advantages of the implementation of the PIC is to provide services to banks that transparently enhance bank relationships with their customers.

Create Bank Profile

To establish a PIC system relationship with a trusted third party, individual banks preferably complete a formal registration process. Formal registration requires each bank to provide entity-type information about itself. The trusted third party uses this information to create a bank profile, which is stored as part of the system database. Bank profiles serve as the foundation for providing customer service for the complement of system enhancements. The information stored in the bank profile includes: bank name, primary address, primary contact, EPN registered, CHIPS registered, etc.

In addition, the profile includes information related to individual bank preferences. Examples of preference information include requirements related to maintenance approval and preferred data format(s). Furthermore, if a bank uses service providers to maintain individual DDAs, then a list of approved service providers authorized to access and maintain PIC data on a member bank's behalf is stored in the bank profile. The bank profile is flexible and capable of accommodating additional data elements.

Validate Bank Profile

Individual bank profile information is collected and validated prior to issuing PIC numbers to customer DDAs. After profile information is received, the system performs a validation process, checking all elements of the bank profile for accuracy.

Initially, all banks registering for the system are to be current participants of CHIPS or EPN. After initial deployment, banks are able to register for services without being CHIPS or EPN participants. However, such banks, who would typically be correspondents of CHIPS or EPN participants, must complete a bank profile with the system to gain access to PIC administrative functions. Also, non-participant banks must specify how transactions are to be executed, either through correspondent relationships or the Federal Reserve. Existing CHIPS or EPN system participants are not required to execute additional agreements for PIC. For current participants, the trusted third party expedites the registration process by leveraging information from the EPN and/or CHIPS platforms to automatically complete individual bank profiles. In this situation, the registering bank is required to supply any missing profile information and confirm the auto-populated profile data elements.

Build Initial PIC User Base

Once bank registration is complete, a bank is eligible to begin the process of requesting PICs for existing DDAs. To promote extensive participation and to accelerate PIC adoption, the system would preferably mass enroll all appropriate participating bank business customer DDAs in the PIC program. Mass enrollment, or mass PIC issuance, preferably takes place via bulk file transfer. Bulk file transfer is described later.

Perform Mass Enrollment

Participating bank business customers are automatically assigned a PIC for each of their DDAs via a mass enrollment process. The mass enrollment process relies on customer DDA data supplied by participating banks to populate the PIC database. Data is supplied by participating banks via a database extract file. The specifications for the database extract file are standard and defined by the system. Data fields required to complete DDA mass enrollment are identical to data fields required to complete a single DDA PIC enrollment. The database extract file elements preferably include: DDA name, address, account type, routing number, account number, etc.

Only information required for PIC creation is included in the mass enrollment requirements. Sensitive information (e.g., credit scoring) is not a PIC requirement.

Participant banks would preferably request PIC numbers only for DDAs that receive remittance payments. As a result, banks should identify and exclude non-remittance accounts from the mass enrollment file. The system preferably accepts files via ConnectDirect (only for banks who currently have software installed and frame-relay links to the trusted third party), in cases where banks do not have connectivity via SWIFTNet. Files may also be accepted via the Internet. In order to make the mass enrollment process simple, the system does not require changes to current bank DDA systems. Upon completion of the mass PIC enrollment process, the system returns a file containing all PIC numbers and their respective DDA information to participating banks. The PIC file is returned to banks in the same data format in which it was received. When format or data omission errors occur in the mass enrollment file, the individual items in error are returned to the participating bank with a reject code. The entire enrollment file is not rejected unless significant format problems exist.

Issue PICs

Request PIC

PIC numbers are issued for business customer accounts by the system upon request from a registered bank or an approved service provider. Banks who are not system registered cannot request PICs. Also, a bank (or approved service provider) can request PICs for their business customer accounts only. While business customers actually own PICs, the requesting bank (or approved service provider) is responsible for the PIC until the PIC is closed or transferred to another bank. PIC requesting banks are required to provide the information necessary for PIC creation. PIC responsible banks also coordinate all PIC maintenance for related customer and correspondent bank accounts. Participating banks can request PIC numbers through multiple channels. These channels include: Batch file request; real-time request via web-site; and real-time request via messaging.

Individual PIC creation requests are initiated via a system website or messaging over SWIFTNet. Such transactions may also be executed via the Internet.

Assign PIC

Upon receipt of a PIC assignment request, the system checks the requesting DDA number to determine if it has been previously issued a PIC. If a PIC already exists for a given DDA number, the assignment request is rejected. Otherwise, the system creates a new record and assigns a PIC. The system issues a single PIC for each DDA number. A PIC is the same for a DDA whether transactions occur through EPN or CHIPS. Unlike PIC numbers, system routing transit numbers will differ for the CHIPS and EPN platforms, or any other platforms that may be supported for PICs. However, the system allows multiple PIC numbers to point to a single DDA to accommodate cases where companies merge or bank architecture changes.

PIC numbers are assigned randomly from a given block of numbers determined by system administrators. PIC numbers range from a minimum of eight to a maximum of 17 numeric characters. Initially, eight digit numbers are assigned—six digits plus two check digits. The two right-most digits comprise the two check digits. The six left-most digits in an eight-digit PIC are used to compute the check digits.

The two check digits are employed to mitigate transposition errors and ensure that each PIC numbers are unique. Insertion of leading zeroes is not required to use PIC numbers.

Provide PIC Information

After assignment of a PIC to a DDA number, the PIC database record is populated with data provided by the requesting bank. The data elements for a PIC record include: company name, company address, bank name, routing number, account number, account type, status, etc.

Account type, as defined by the system indicates whether the account is a business account, internal account, for correspondent relationships, or a consumer account for use in a home banking context. The PIC database record also indicates the EPN/CHIPS enabled status of an account if applicable. This status is important as some banks or accounts may not be registered with both EPN and CHIPS. The status field reads as enabled, disabled or suspended. If a bank is both EPN and CHIPS registered, PIC numbers are enabled for both payment systems at the time of PIC assignment. In addition to system specific status, the PIC database also contains information related to the overall status of the PIC. This status can be active, suspended or closed. Upon assignment of a PIC, the overall status defaults to active.

Many banks rely on correspondent relationships to execute CHIPS payments. There can be multiple bank process links associated with a single CHIPS payment. These links create a CHIPS "payment chain." As a consequence, the PIC database record, for a CHIPS enabled customer whose bank is not a direct CHIPS participant, requires an additional data element. This element contains the PIC associated with the account at the CHIPS participating bank. By capturing the PIC of the next bank account in the chain, iC&S allows for easy maintenance of correspondent relationship information. A correspondent relationship change requires a change to a single PIC in the payment chain.

Process Payments

Originate Payments

The use of PICs by buyers and sellers requires minimal changes, if any, to originating bank's and receiving bank's systems. The system routing number and PIC are used in the same manner as routing numbers and account numbers are used currently in, for example, EPN. PIC numbers are left justified with any leading zeros being insignificant. EPN and CHIPS recognize PIC transactions through a PIC-specific routing number contained within the payment instruction. For EPN, the flag is a nine digit system routing number. This is a unique number identifying a particular financial institution and which is assigned by, and registered with, an independent organization, preferably with Thompson Financial. For CHIPS, the flag is a four-digit number determined by the Clearing House. Once a transaction is identified as an a system PIC transaction, the EPN/CHIPS platform scans the account number field in the payment instruction and reads the PIC to retrieve the associated account information. For all system transactions, the account number/PIC field is mandatory.

Receive Payment Instructions

Processing a PIC payment refers to the process of receiving a payment instruction, identifying the instruction as a PIC transaction, validating the PIC, translating the PIC and forwarding the payment to the beneficiary's bank. The PIC payment process of the present invention may be integrated with the processes of EPN and CHIPS. While it may be preferable initially to use the system to facilitate credit origination only, blocking all debit originations, it is possible, and may be advantageous, to use PIC for certain types of EPN debit transactions. PIC credit payments require the receiving customer to have a PIC. The payment originator is not required to have a PIC.

When an originating bank is not an EPN participant, ACH payments are routed to the Federal Reserve. The Federal Reserve recognizes PIC transactions from the system routing number and credits a system-specific settlement account. EPN then performs the PIC translation, payment delivery and settlement to complete the transaction. A similar process is used for processing CHIPS transactions in cases where an originating bank is not a CHIPS participant and sends wire transactions (with PICs) though the Federal Reserve for processing.

To execute CHIPS payments, participating banks must process payments through a CHIPS registered participant. All CHIPS registered participants and their correspondent banks are required to have PICs. Finally, implementation of the PIC concept does not adversely impact overall EPN/CHIPS platform performance.

Validate PIC

PIC numbers are validated before account information look-up can occur and before the payment can be sent to the receiver. The EPN and CHIPS platforms each have a copy of the PIC database in order to validate and translate PICs. These PIC databases reside on the EPN and CHIPS platforms and are updated daily by the master PIC database (immediately after previous day changes have been recorded). When validating the PIC against the PIC database, the payment systems return (EPN) or reject (CHIPS) the payment for the following reasons: PIC is invalid; and PIC status is not active.

EPN and CHIPS capture the return/rejection error reason, which is accessible by internal customer service. If a PIC is rejected in CHIPS, it is rejected with the generic "invalid" response currently used by the system.

Translate PIC

Once a PIC is validated, EPN/CHIPS translates the system routing number and PIC to the bank routing number and customer DDA number using information contained in the PIC database. Because of the direct linkage between PIC and EPN/CHIPS, PIC translation is available during all EPN/CHIPS processing windows. For CHIPS PIC transactions, where a chain of banks is involved, CHIPS retrieves and translates the PIC of all banks in the payment chain and places the information in the payment record. The system may truncate certain fields. The PIC numbers are included in the outbound transaction.

Handle Rejected/Returned Instructions

ACH reversals are allowed for PIC transactions. For EPN returns from receiving banks, EPN identifies which returns are PIC transactions and require reverse translation. EPN then translates the bank routing number and DDA number back to the system routing number and PIC prior to returning a transaction to an originating bank. Furthermore, the system passes all returns to originating banks with the same information and in the same format that the original instruction was received. However, a system tag is added to identify returns. A generic reason code (i.e., invalid account) and addenda records are also included in all returned transactions.

FIGS. 2 through 4 provide a summary description of the payment processes.

Provide Customer Service

The system provides customer service to banks through the current EPN and CHIPS customer service organization(s). Preferably, the system provides service directly to banks, and their correspondents while the responsibility to communicate directly with business customers resides with banks.

Provide Service Channels

PIC customer service is provided to banks via multiple channels to accommodate individual bank preferences/processes. PIC service is available 24 hours per day, seven days a week via a combination of the following service channels and mediums: Self-service web-site; Bulk-file transfer; Messaging; Email; and Telephone.

The service website is accessible via the SWIFTNet private network. In the future, banks may access the website via the Internet. The system website includes functionality related to frequently asked questions, on-line help and contacts. Customer service email addresses and telephone numbers are listed on the web site.

Look-Up PIC

A PIC look/up search capability is provided to banks via multiple customer service channels. The PIC lookup provides a method for bank (or approved service provider) users to view the PIC database to retrieve their PICs and related information. The PIC lookup function is searchable on the following fields in the PIC data record: PIC, DDA number, account name and address. A public PIC directory enables buyers to find seller PIC numbers. Bank customers are able to opt-in to the public PIC directory.

Maintain PIC

Maintaining accurate account information is critical to achieving a high incidence of PIC transactions. For this reason, the system philosophy related to PIC service places responsibility for PIC database maintenance with participating banks. Only authorized system customer service, participating bank or approved service provider personnel can access the PIC database to perform maintenance functions. When viewing or maintaining the PIC database, users are only granted access to PICS that relate to accounts of their bank customers. Basic PIC maintenance functions include: Close PIC; Change PIC Database Information; Transfer PIC; and Administer Profiles.

Close PIC. When a business customer closes a PIC through its bank, the PIC is retired forever. While PIC closings are infrequent, they may occur in cases of account closings due to bankruptcy or merger.

Change PIC Database Information. Changes to PIC database information are file transfer-based, message-based, web-based or telephone-based. With regard to file transfers, the system accepts PIC maintenance request files several times a day, in both XML and flat file formats. XML is the preferred file format. Files follow a format determined by the system and must be authorized prior to transfer.

All information contained in the PIC database record (except for the PIC) can be changed through maintenance requests. However, requests made through the website or through messaging are restricted to changes of non-transaction critical information. Information considered transaction critical is any information required to process a payment transaction including routing and DDA numbers.

All maintenance requests include an effective date field. Once a request is received by the system the changes are not applied until the effective date specified. If no effective date is identified, the changes appear immediately and are placed in production systems the following day. Furthermore, the system provides banks with the option to require approval for all web or message-based maintenance requests of critical information.

Only a single change request and a single transfer request can be pending for a given PIC at any time. The system processes both if the transfer effective date is after the change effective date. Otherwise, the change request is ignored at the time of transfer. If a user needs to make additional changes after submitting a maintenance request, they must cancel the original request and include all changes in a new request. Bank users have the ability to access all outstanding and previously applied updates to its. PICs.

Also, when web or message-based maintenance requests are submitted, initiators of the request receive an automated confirmation screen or message that contains relevant transaction advice.

Finally, participating banks have a copy of the PIC database for their DDA accounts to facilitate look-up and assist in identification of on-us transactions. To update the bank's customer PIC database copy, a bank requests an update file. This request includes a specific date range to determine the update requirements. If no date range is provided, the system default is to provide all updates since the date of the requesting bank's last recorded update request. Updated PIC files are returned to banks in the same format in which they were received. As necessary, the system provides banks with a complete file of all PIC data belonging to their customers.

Transfer PIC. The transfer process allows a PIC to remain with a business customer regardless of changes in the business customer's bank relationship. To complete a PIC transfer between banks, the receiving bank, or its approved service provider, must initiate the transfer. Initiation of a transfer requires proper authorization from the business customer associated with the transferring PIC. The receiving bank must also provide the system with the transferring bank and the new bank account information for validation purposes. Once a transfer is requested, it generates a notification to the bank surrendering responsibility for the PIC.

Administer Profiles. As part of the system, direct or indirect participants of the EPN and CHIPS systems must establish bank entity profiles and individual user profiles. The self-serve website has an administrator restricted section that provides functionality to administer both types of profiles. The system requires four super administrators (two for EPN and two for CHIPS) from each participating bank. Super administrators are responsible for managing their bank's user profile information. Critical data elements in the bank profile are restricted, including settlement, routing, translation and billing information. Changes to critical information occur through off-line processes. The functions to administer user profiles include changing access controls, resetting password, creating user profiles and displaying bank user profiles records. Administrative updates occur in real-time.

Provide Technical and Bank Support

The system provides bank support via the current EPN and CHIPS customer service organization. System administrators and customer service representatives have user profiles to control access and restrict functionality and administrative rights. Customer service is able to perform all maintenance functions on behalf of banks and respond to both phone and email inquiries.

Manage Risk and Control System

To ensure proper security of PIC data and to protect against unauthorized changes of information, the system has a methodology for system control and risk management. There are four key areas of this methodology:

Manage technical architecture
Authenticate and control user access
Track PIC database activity
Secure information Technical architecture is outside the scope of the business requirements effort and is not outlined in this document.

Authenticate and Control User Access

Participating banks are responsible for designating four super administrators, two for the EPN platform and two for the CHIPS platform. Super administrators are responsible for PIC account maintenance. Each super administrator can delegate responsibility for PIC maintenance and administration as they see fit; however, only authenticated users are permitted to make changes to the system database. An authenticated user must have a system user-profile. This profile contains several data elements including: user name, password, title, bank name, contact information, etc. There is also an employee type data element that identifies whether a user is bank or a system employee. User profiles are used to authorize a user's access, maintenance and administrative rights via all channels of communication.

Access to the system website is restricted by a login that requires a user to enter a username and password. User names and passwords must be at least six characters long, be a combination of alpha and number characters, and changed on a periodic basis. The user profile contains a status field that indicates if the profile is active, disabled or closed. A disabled status occurs when a profile has not been accessed for one month or after three failed login attempts. Once a profile is disabled, the user is restricted from logging onto the website until an administrator resets the user profile status to active. Changes related to all non-transaction critical PIC data such as name and address are allowed via the website. However, changes to transaction critical information (e.g., routing and account number) are handled off-line. This limitation allows the Clearing House to more closely monitor changes that affect PIC transaction processing.

Track PIC Database Activity

To manage risk, all modifications to the PIC database are tracked and logged. Changes to the PIC database, such as PIC assignment, maintenance and transfer are captured in a PIC activity log including the "before and after" information related to modified fields, the name of the user who performed the modification, and the date and time the change occurred. The activity log is accessible to bank super administrators via the website. All other payment related activity is tracked on the current EPN/CHIPS platform and is not stored in the PIC database.

Secure Information

Bank customer DDA information is confidential and cannot be used for anything other than PIC services initiated by participating banks on behalf of their customers. Sensitive data on the PIC master and EPN/CHIPS databases is encrypted. At a minimum, routing numbers, DDA numbers and taxpayer identification numbers must be encrypted. To bolster security, the system preferably uses of SWIFTNet to receive and transmit customer enrollment, update and information files between the system and participating banks. For SWIFTNet and ConnectDirect transmissions, the system relies on security inherent to the network and software, as well as smart cards/digital certificates to receive and transmit customer enrollment, update, and information files. Furthermore, SWIFTNet has closed user groups that restrict unknown entities from accessing the network. In the future, the Internet may be used for transmission. In this instance, the system requires a minimum of 128-bit or Triple Des encryption.

Bill Participants

Standard pricing for PIC transactions is established. PIC related transaction fees are tracked in the current EPN/CHIPS platform and do not require a separate billing advice. Rather, EPN/CHIPS bills include the number of PIC transactions performed during the billing period and related charges. Banks make appropriate payment to the Clearing House for PIC services electronically.

Provide Reports

Because the PIC feature is an enhancement to the existing Clearing House payment systems, there are no additional reporting requirements related to the PIC feature. All payments related and statistical reports are provided through existing EPN and CHIPS reporting capabilities.

Reporting requirements related to the PIC database and maintenance functions are handled through bulk file transfer and the self-serve website. Banks can receive a file that includes all customer PICs. Reporting requirements for maintenance functionality include pending/completed PIC maintenance requests and listings of user profile usernames and passwords. This information is accessible via the iC&S website.

Several processes with respect to the system are described below with reference to FIGS. 8 through 33. Interaction with the PIC system is accomplished through various screens. The following describes some of the PIC screen definitions. These screen definitions may be developed to show various processes performed using the PIC database.

PIC Screen Definitions:

Welcome Screen

Initial screen presented at IC&S web site. Contains text describing iC&S and anything else a business group wants.

The Welcome Screen also contains a Login Button, user and password fields and skip Login Screen Button.

Login Screen

Contains entry fields for Usercode and Password. Successful login brings you to Menu screen. After a User logs in we know which bank the user belongs to and his/her access rights.

Menu Screen

Contains initial access to all capabilities that is defined for the user. Those things not allowed for the user are not visible or accessible. Those users that have Update capability will also have Inquiry capability by default. Possible Options are

| PIC | Inquiry | Update |
|---|---|---|
| PIC Activity | Inquiry | Update (approve/cancel) |
| Member | Inquiry | Update |
| Member Activity | Inquiry | |
| User | Inquiry | Update |
| User Activity | Inquiry | |

PIC Inquiry

Inquiry by PIC

This inquiry will display the PIC Detailed. Screen. The PIC does not have to belong to the controlling bank. Do we show all account information? If inquiry is done to re-route payments the account information will be needed.

Inquiry by Account Number

This inquiry is restricted to the PICS owned by the banks. Returned is the PIC List Screen. If there is a list then the user could select an entry for the detailed information.

Inquiry by Name

This inquiry is restricted to the PICS owned by the banks. Returned is the PIC List Screen. If there is a list then the user could select an entry for the detailed information. The inquiry should be able to be refined by city and/or state.

PIC List Screen

This screen will list possible candidates found from an inquiry. It will display PIC, RT number and Name and Address info, (as much as possible).

PIC Detail Screen

This screen will show detailed information regarding a specific PIC. If the user is from not from the controlling bank customer contact information is not displayed. If the user is not allowed to see account information the account number is not displayed.

PIC Activity Inquiry.

This permits inquiry by "closed/open" activity, and includes the option of looking at all closed activity. A qualifier by date range and/or PIC number or account number is used. This functionality Also allow inquiry by RT number. The results of the inquiry returns the Activity List screen.

PIC Activity List

This screen list activity records based on the Activity Inquiry Screen. It will summarize the status, action, for an PIC activity. Selecting an activity record will display the PIC Activity Detail screen.

PIC Activity Detail

This screen will contain all of the detail information regarding the activity record. If the activity record is open and the USER has update capabilities the activity record may be approved or cancelled. If the bank reviewing has 2-step approval process the activity goes in as proposed and must be approved by someone with PIC update capabilities. If the bank has dual operator approval option then the approval operator must be different from the entering operator.

Member Inquiry

This screen allows an authorized user to view MEMBER profile information. This screen will display bank names, account, wire chaining and other configuration information. If a bank list exits it is displayed and if categories are defined for the bank they are also displayed.

Member Update

This screen allows changes to the MEMBER profile by an authorized user. An add will be performed by IC&S staff after signup information is gathered. Changes are made by the Member. A delete may only be performed by IC&S staff. When a change is made the member profile is immediately updated and a closed member activity record is automatically created.

Member Activity Inquiry

This screen is used to display the Member Activity List screen by an authorized user. The activity may be selected by date range.

Member Activity List

This screen is used to display a list of member activity update records. It will display a summary of activity and dates. Selecting an activity record will display the Member Activity Detail screen.

Member Activity Detail Screen

This screen is used to display the Member profile change detail information.

USER Inquiry

This screen allows an authorized user to view USER profile information. This screen will display all access capabilities of a USER.

USER Update

This screen allows changes to the USER profile by an authorized user. When a change is made the USER profile is immediately updated and a closed USER activity record is automatically created.

USER Activity Inquiry

This screen is used to display the USER Activity List screen. The activity may be selected by date range.

USER Activity List

This screen is used to display a list of USER activity update records. It will display a summary of activity and dates. Selecting an activity record will display the USER Activity Detail screen.

USER Activity Detail Screen

This screen is used to display the USER profile change detail information.

User Options Matrix

| PIC | Inquiry | Update | Account Information |
|---|---|---|---|
| PIC Activity | Inquiry | Update | |
| Member | Inquiry | Update | |
| Member Account | Inquiry | (If Member Update then Inquiry) | |
| USER | Inquiry | Update | |
| USER Account | Inquiry | (If USER Update then Inquiry) | |

PIC Maintenance

The maintenance of PIC fall within 4 categories, Add, Change, Delete(close), and Transfer.

PIC ADD: This screen is used to create a new PIC. Some of the fields are required while others are optional. Required fields are the RT number and DDA number that represent the account, Name and Address of the customer and the CHIPS/

EPN enabled flag. Optional fields are the Contact information. If CHIPS enabled an optional "wire" name and address may be entered. If the "wire" name and address is not specified the customer name and address will be truncated to fit into this name and address.

PIC CHANGE: This screen is used to change and existing PIC. It will contain all the fields that an ADD screen contains. Any field may be changed except the RT number field. This may be changed only with a PIC Transfer screen.

PIC TRANSFER: This screen is used to move a PIC from one bank to another bank. The new bank must enter the new RT and DDA number for the account, and also provide the old RT and DDA number. Any of the other fields may also be changed at this time. The "old" bank will be notified of the transfer and have 48 hours to contest the transfer. All transfer will be effective 2 days after approval.

PIC DELETE: PICS are never actually deleted, but are considered to be closed. They can be reopened at a later date.

System Processes

Figure 8:
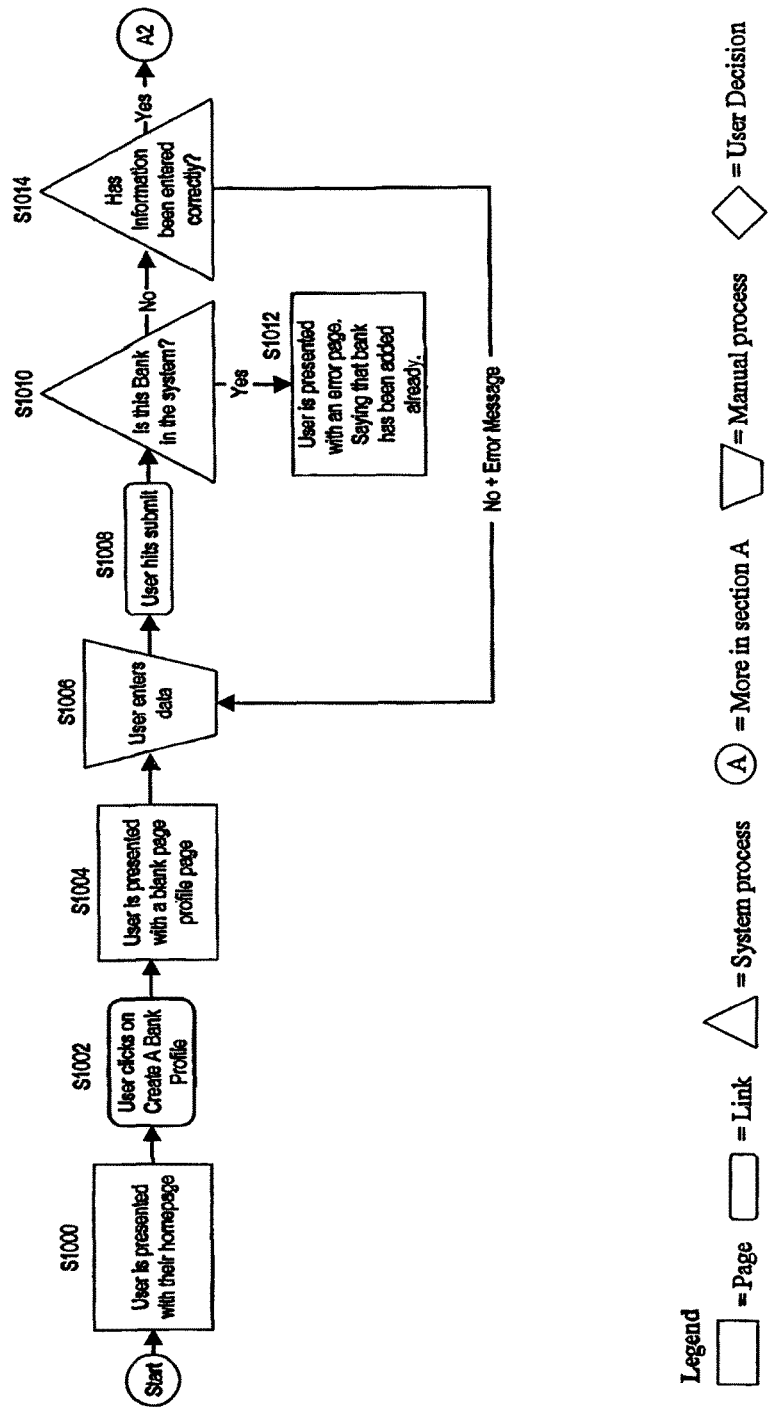
FIGS. 8 and 9 are a flowchart of a create a bank profile.
Figure 9:
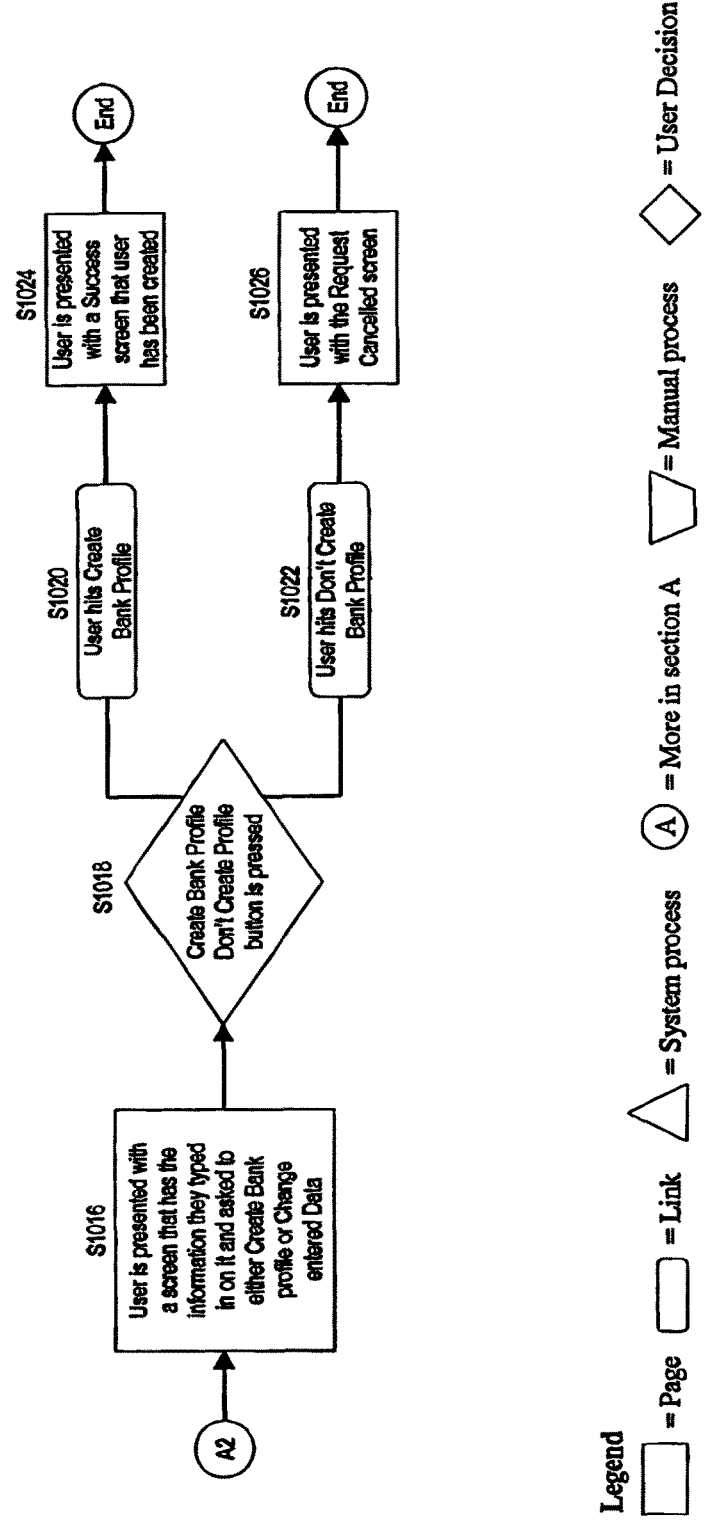

FIGS. 8 and 9 together show a Create a Bank Profile process. This process is accomplished mostly offline by internal users at a depository institution. In FIG. 8, at step S1000, the user is presented with their home page. At step S1002, the user clicks on an icon for Create a Bank Profile. The user is then presented, at step S1004 with a blank bank profile page. At step S1006, the user enters data and at step S1008 hits submit. At step S1010, if the bank is in the system, the flow proceeds to step S1012, at which point the user is presented with an error page saying that the bank has already been added. If the bank is not in the system, then at step S1014, it is determined if the information has been entered correctly. If so, the flow proceeds to section A2 of FIG. 9.

At FIG. 9, at step S1016, the user is presented with a screen that has the information they typed in and the user is asked to either create a bank profile or change entered data. At step S1018 it is determined whether the create bank profile or the don't create bank profile has been pressed. If the create a bank profile button is pressed at step S1020, then flow proceeds to step S1024 at which the user is presented with a success screen that the profile has been created and the process terminates. If the don't create a profile button is pressed at step S1022, then flow proceeds to step S1026 at which the user is presented with the request cancelled screen and the process terminates.

Figure 10:
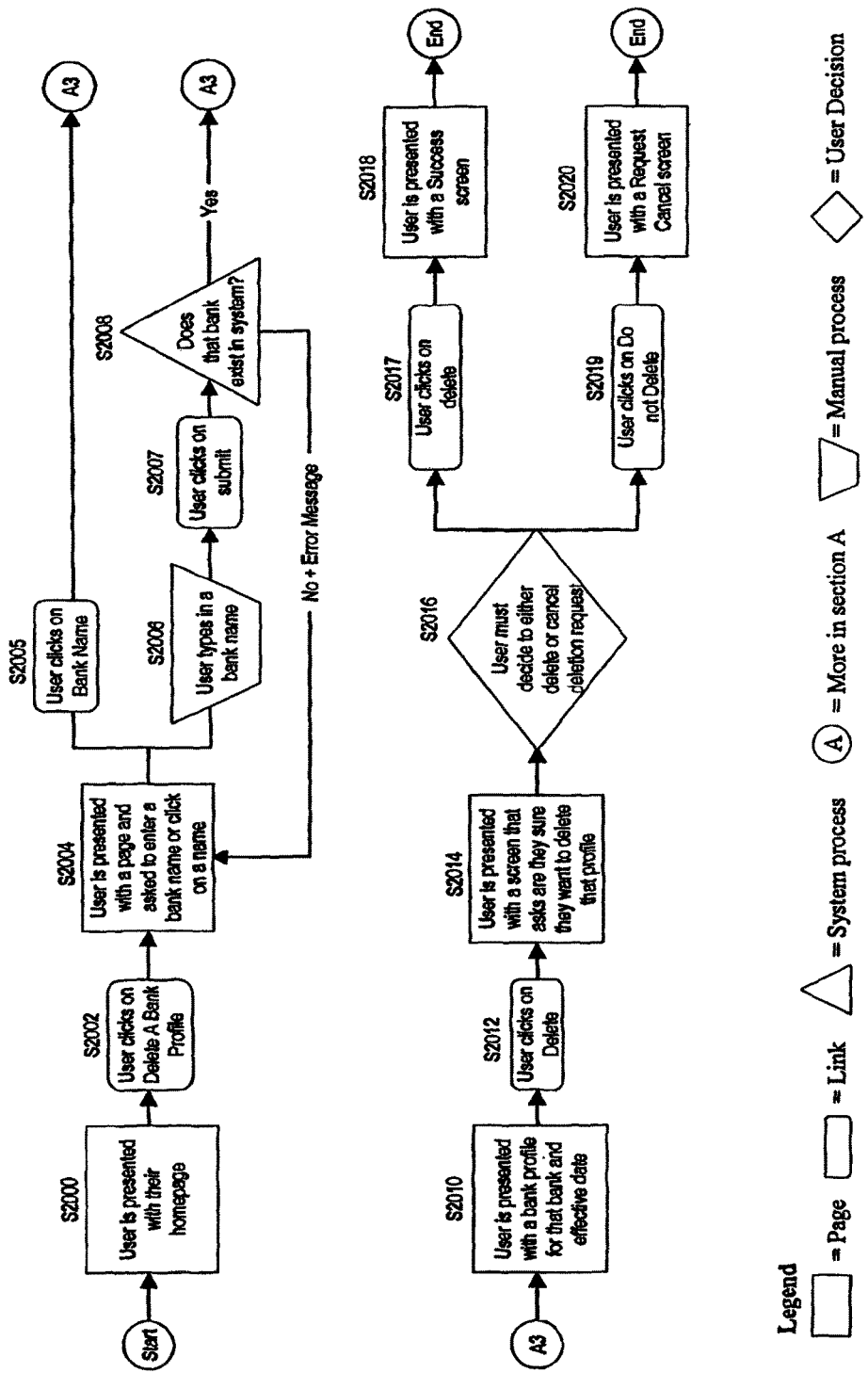
FIG. 10 is a flowchart of a delete bank profile process.

FIG. 10 is a flowchart of a Delete a Bank Profile process, accomplished by users with proper authority and access at the trusted third party. At step S2000, the user is presented with their home page. At step S2002, the user clicks on delete a bank profile. At step S2004, the user is presented with a page offering the choice of entering a bank name or selecting from a listed bank name. If the user clicks on a bank name, at step S2005, the flow proceeds to section A3 of the figure. If the user types in a bank name at step S2006 and clicks on submit at step S2007, then at step S2008 if the bank exists on the system, the flow proceeds to section A3. Otherwise, flow returns, with an error message, to step S2004, and the user is again asked to enter a bank name or select a bank name.

At step S2010 the user is presented with a bank profile for the selected bank. Then, to delete the bank profile, at step S2012 the user clicks on delete. At step S2014 the user is presented with a screen asking if they are sure they want to delete the profile. If at step S2016 the user clicks at step S2017 on delete, then at step S2018, the user is presented with a Success screen and the flow terminates. On the other hand, if the user at step S2019 clicks on. Do Not Delete, then at step S2020, the user is presented with a Request Cancel screen and the flow terminates.

Figure 11:
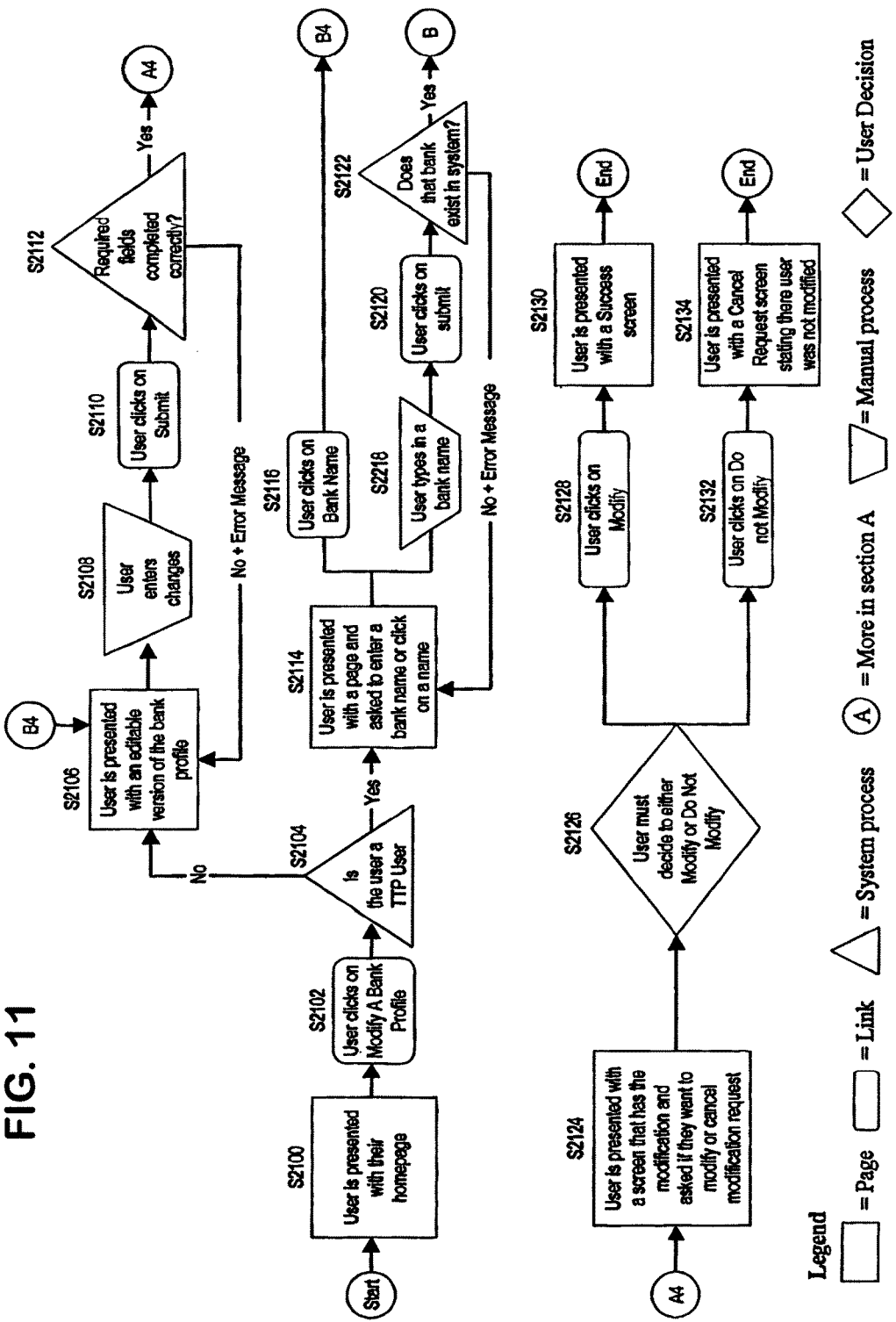
FIG. 11 is a flowchart of a modify bank profile process.

FIG. 11 shows the flow for a Modifying a Bank Profile process. This is a permission based process, whereby only those users with proper permission may perform this process. At step S2100, the user is presented with their homepage. At step S2102, the user clicks on Modify a Bank profile. If it is determined at step S2104, that the user is not a trusted third party (TTP) user, then at step S2106, the user is presented with an editable version of the bank profile. At step S2108, the user enters changes, then at step S2110, the user clicks on submit. If it is determined at step S2112 that the required fields are completed correctly, then the flow goes to section A4. If it is determined at step S2104, that the user is a trusted third party (TTP) user, then at step S2114, the user is presented with a page and asked to enter a bank name or click on a name. If at step S2114 the user sees the bank name, then at step S2116, the user clicks on the bank name and flow proceeds to section B4. If the user is not provided a bank name to click, then at step S2118, the user types in a bank name. At step S2120, the user clicks on submit, then at step S2122, the user is asked whether their bank exists in the system. If yes, flow proceeds to section B4. If no, flow proceeds back to S2114 with an error message added to what is presented to the user. At step S2124, the user is presented with a screen that has the modification of the bank profile and asked if they want to modify or cancel the modification request. At step S2126, the user must decide to either modify or not to modify. If the user decides to modify at step S2126, then at step S2128, the user clicks on modify, and at step S2130, the user is presented with a success screen and the flow ends. If the user decides not to modify at step 2126, then at step S2132, the user clicks on do not modify. At step S2134, the user is presented with a cancel request screen stating that the user was not modified and the flow ends.

Figure 12:
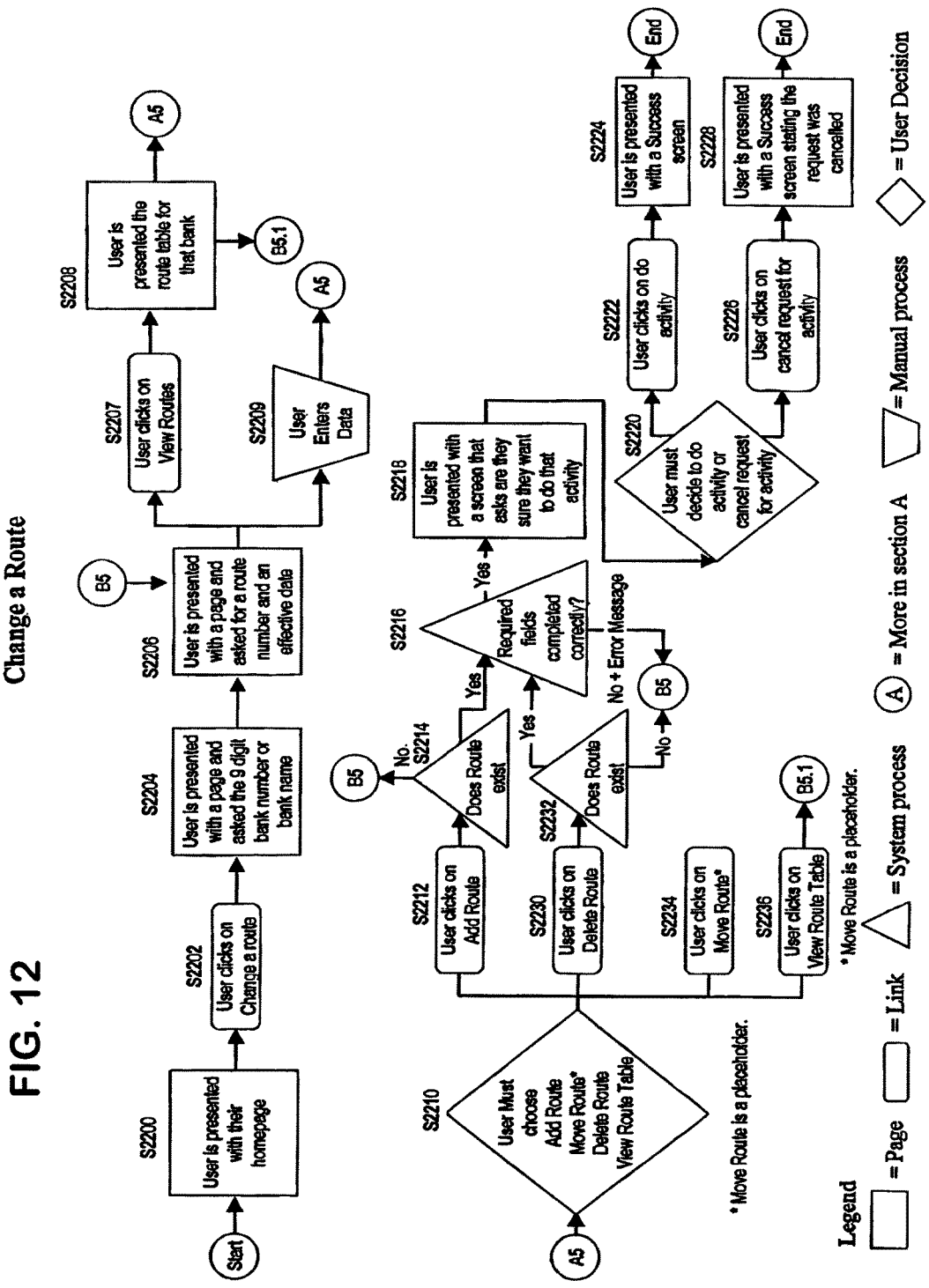
FIG. 12 is a flowchart of a change route process.

FIG. 12 shows the flow for a Change a Route process. This process is accomplished by the trusted third part. At step S2200, the user is presented with their homepage. At step S2202, the user clicks on change a route. At step S2204, the user is presented with a page to enter the 9 digit bank number or bank name. At step S2206, the user is presented with a page and asked for a route number and an effective date. At step S2207, the user clicks on View Routes. At step S2208, the user is presented the route table for that bank and the flow proceeds to section A5. At step S2209, the user enters data and the flow proceeds to section A5. At step S2210, the user must choose: Add Route, Move Route, Delete Route, View Route Table. At step S2212, the user has clicked on Add Route, and the flow proceeds to step S2214, to determine whether Route exists. If no, flow proceeds to section B5. If no yes, flow proceeds to step S2216, where it is determined if required fields has been completed correctly? If no, flow proceeds, with an error message, to section B5. If yes, then at step S2218, the user is presented with a screen that asks if they are sure they want to do that activity. At step S2220, the user must decide to do activity or cancel request for activity. At step S2222, the user has clicked on "do activity." Then at step S2224, the user is presented with a Success screen and the flow terminates. At step S2226, the user has clicked on "cancel request for activity." Then at step S2228, the user is presented with a Success screen stating the request was canceled and the flow terminates. At step S2230, the user has clicked on Delete Route, then at step S2232, it is determined if Route exists. If yes, flow proceeds to step S2216. If no, flow proceeds to section B5. At step S2234, the user clicks on Move Route which is a placeholder. At S2236, the user clicks on View Route Table, and the flow proceeds to section B5.1.

Figure 13:
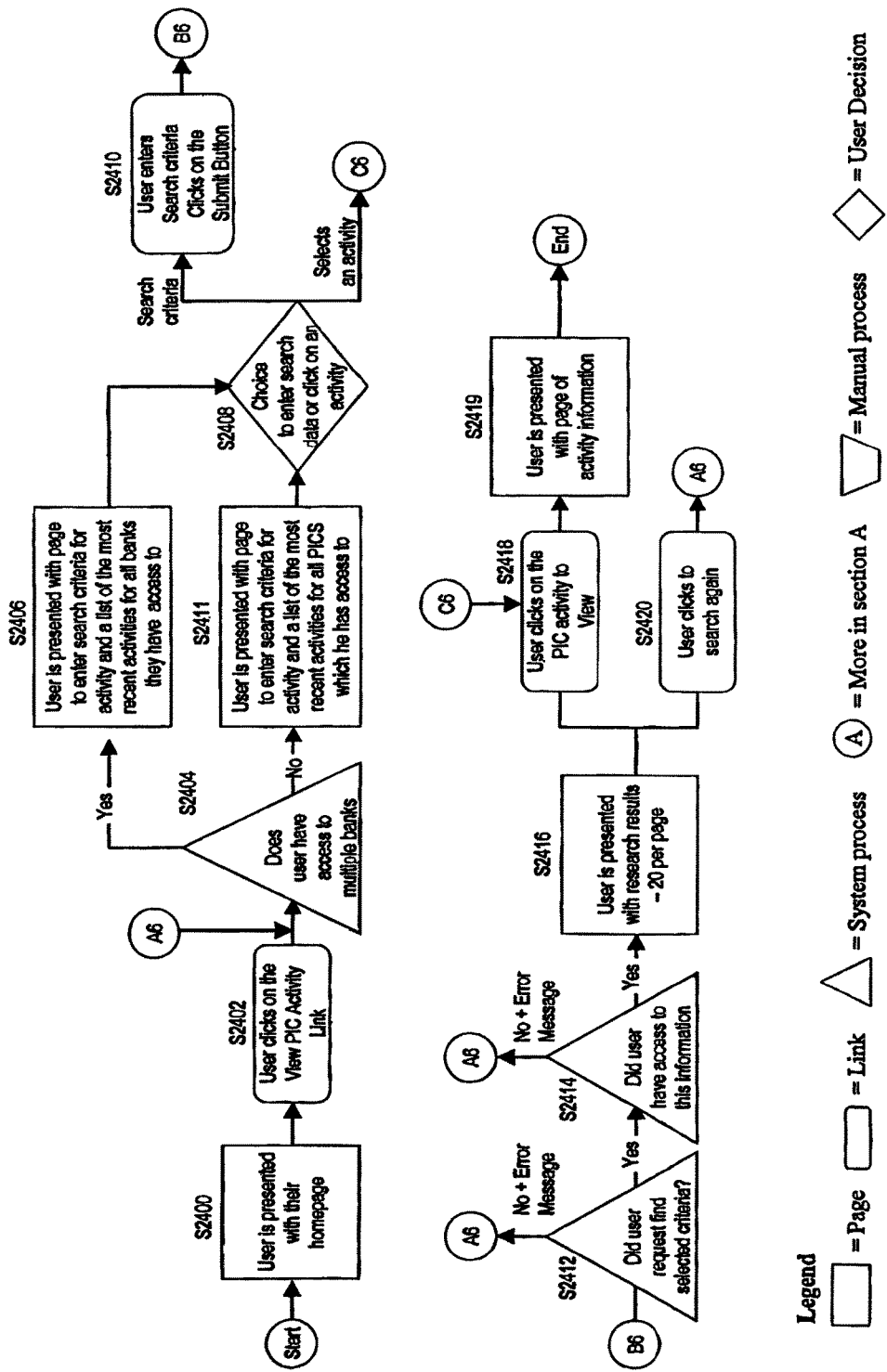
FIG. 13 is a flowchart of a view PIC activity log process.

FIG. 13 is a flowchart of the View PIC Activity log process. In this process, all user related activities should appear based upon a search criteria. At step S2400, the user is presented with their homepage. At step. S2402, the user clicks on the View PIC Activity Link. At step S2404, it is determined if the user has access to multiple banks. If yes, then at step S2406, the user is presented with page to enter search criteria for activity and a list of the most recent activities for all banks they have access to. At step S2408, the user is presented with a choice to enter search data or click on an activity. At step S2410, user that has entered search criteria clicks on the Submit Button. If an activity is selected, the flow proceeds to section C6. If at step S2404 the answer is no, then at step S2411, the user is presented with page to enter search criteria for activity and a list of the most recent activities for all PICs which he has access to and then the flow proceeds to step S2408. At step S2412, it is determined if the user requested find selected criteria? If no, then flow proceeds to section A6 with an error message. If yes, then flow proceeds to step S2414, where it is determined if the user has access to this information. If no, then flow proceeds to section A6, with an error message. If yes, then flow proceeds to step S2416, the user is presented with search results, 20 per page. At step S2418, the user clicks on the PIC activity to View, and at step S2419, the user is presented with page of activity information and the process terminates. Alternatively, at step S2420, the user clicks to search again, and the flow proceeds to section A6.

FIG. 14 is a flowchart of the View Bank Profile Activity log process. At step S2500, the user is presented with their homepage. At step S2502, the user clicks on the View Bank Profile Activity Log Link. At step S2504, it is determined if the user has access to multiple banks. If yes, then at step S2506, the user is presented with Bank Profile activity for the multiple banks they have access to. If the activity is in the future and the user has right to perform that activity, a CANCEL button preferably appears to allow for the cancellation of that pending activity. At step S2508, it is determined if the user found what they wanted on log. If yes, then the process terminates. If no, then the flow proceeds to step S2510, where the user enters Search Criteria. At step S2512, the user clicks on Find an Activity and the flow proceeds to section A7. If at step S2504, the answer is no, then at step S2514, the user is presented with the Bank profile activity log after which the flow proceeds to step S2514.

Figure 15A:
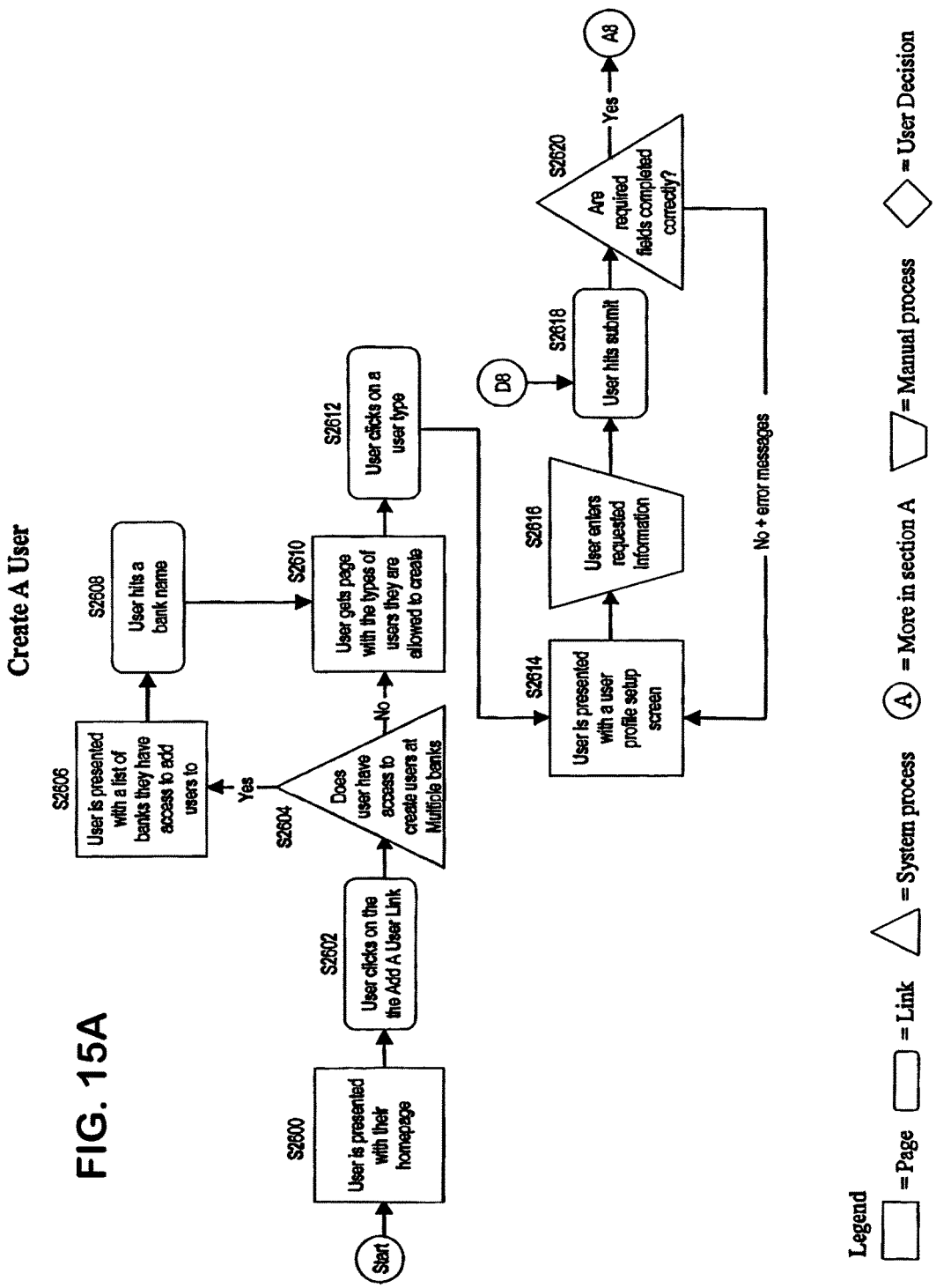
FIGS. 15A and 15B are a flowchart of a create user process.
Figure 15B:
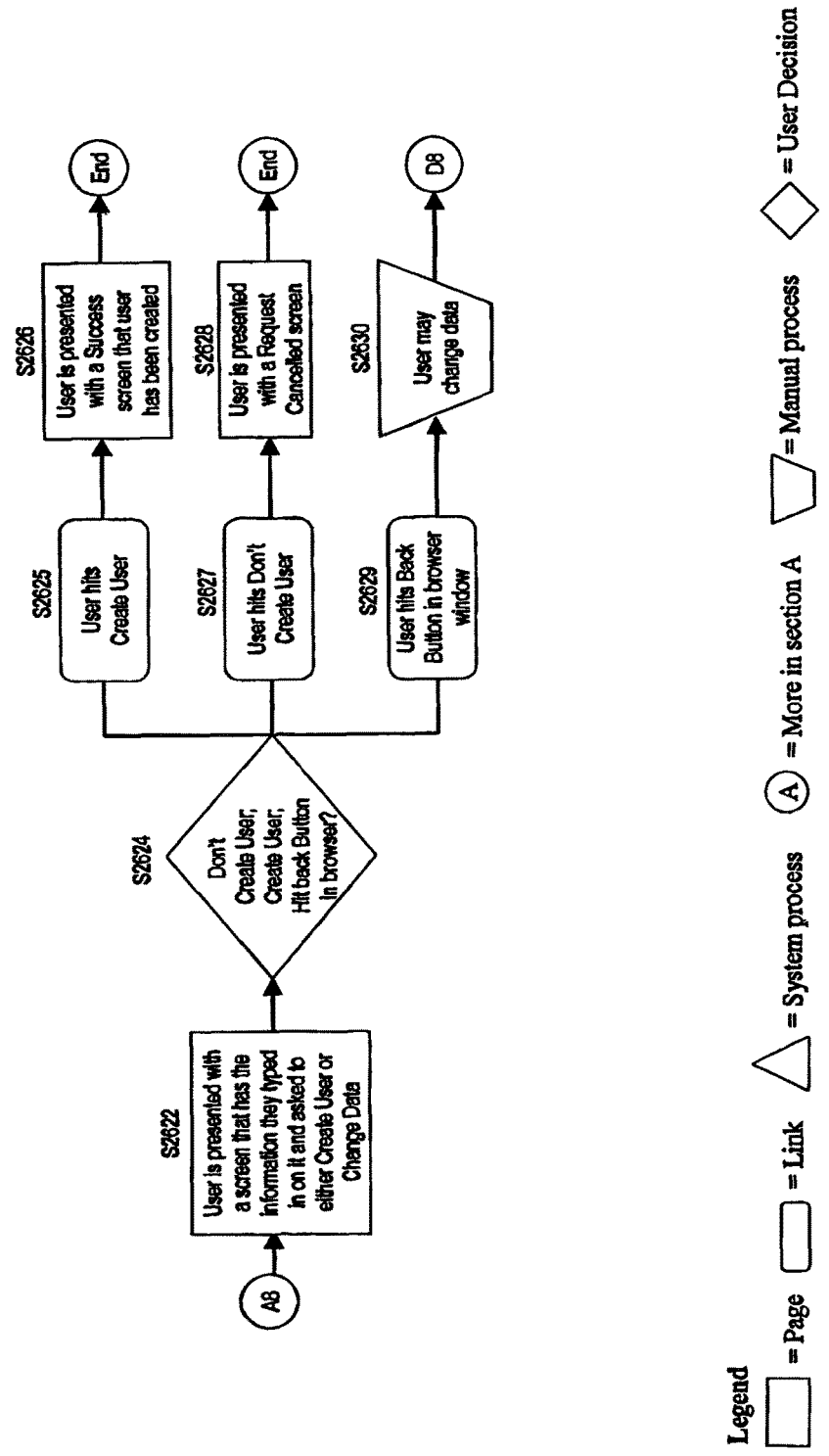

FIGS. 15A and 15B are a flowchart of the Create a User process. At step S2600, the user is presented with their homepage. At step S2602, the user clicks on the Add A User Link. At step S2604, it is determined if the user has access to create the users at Multiple banks. If yes, then at step S2606, the user is presented with a list of banks they have access to add the users to. At step S2608, the user hits a bank name. At step S2610, the user gets page with the types of the users they are allowed to create. If at step S2604 the answer is no, then flow proceeds directly to step S2610. At step S2612, the user clicks on a the user type. At step S2614, the user is presented with an a user profile setup screen. At step S2616, the user enters requested information. At step S2618, the user hits submit. At step S2620, it is determined if the required fields were completed correctly. If yes, flow proceeds to section A8. If no, flow proceeds to step S2614 with an error message. At step S2622, the user is presented with a screen that has the information they typed in on it and asked to either Create User or Change Data. At step S2624, the user has a decision whether to hit Create User, Don't Create User, or hit Back Button in browser. If at step S2625 the user hits Create User, then at step S2626, the user is presented with a Success screen that the user has been created and the process terminates. If instead the user, at step S2627 hits Don't Create User, then flow proceeds to step S2628, and the user is presented with Request Cancelled screen and process terminates. If the user, at step S2629 hits the Back Button in the browser Window, then at step S2630, the user may change data and the flow proceeds to section D8.

Figure 16A:
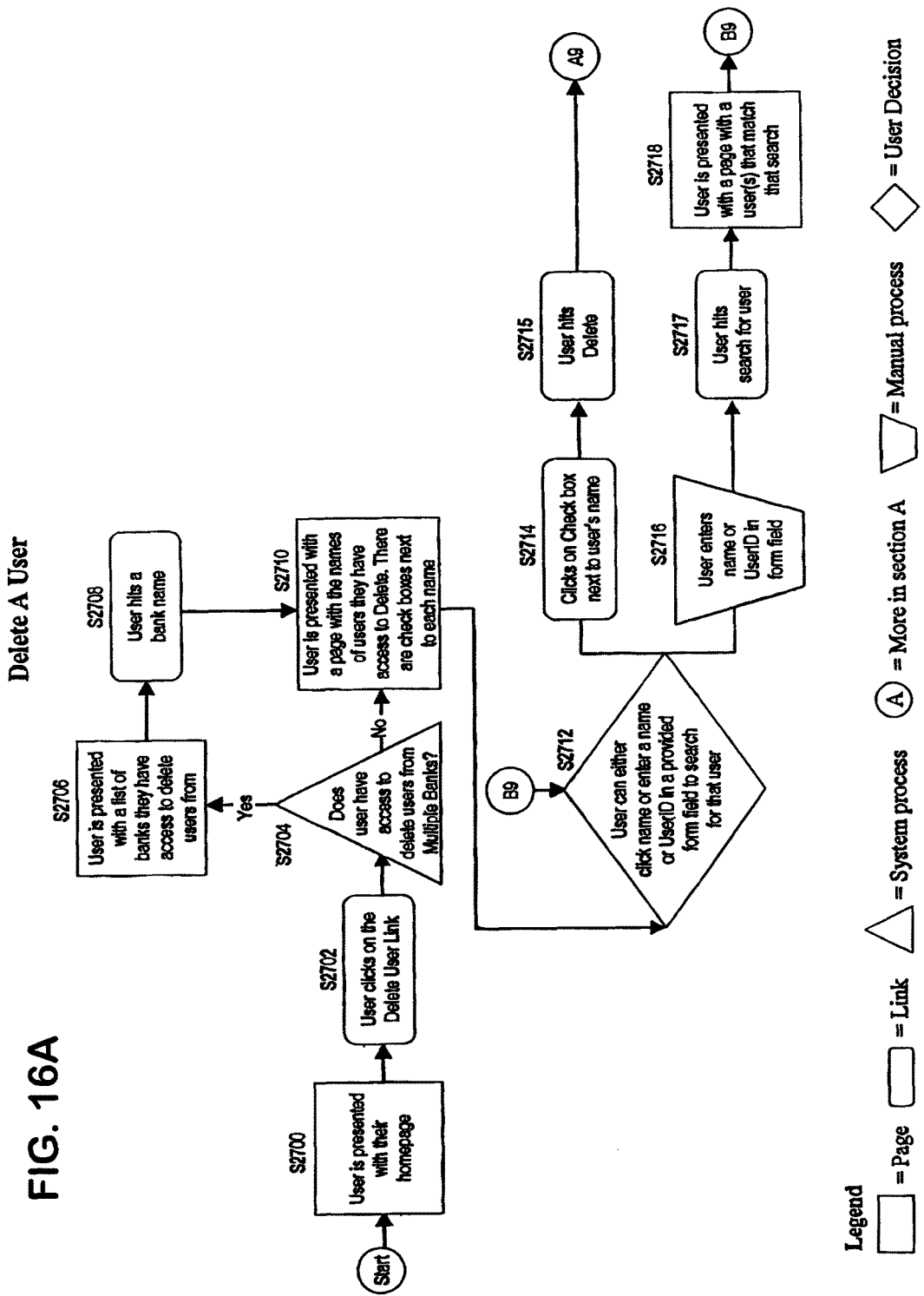

FIGS. 16A and 16B are a flowchart of the Delete a User process. Note that a user cannot delete themselves. At step S2700, the user is presented with their homepage. At step S2702, the user clicks on the Delete User Link. At step S2704, it is determined if the user has access to delete the users from Multiple banks. If yes, then at step S2706, the user is presented with a list of banks they have access to delete the users from. At step S2708, the user hits a bank name. At step S2710, the user is presented with a page with the names of the users they have access to delete. There are check boxes next to each name. If at step S2704 the determination is no, then the flow proceeds directly from step S2704 to step S2710. At step S2712, the user can either click name or enter a name or UserID in a provided form field to search for that user. If at step S2714, the user clicks on the Check box next to the user's name, then at step S2715, the user hits Delete and the flow goes to section A9. If instead, at step S2716, the user enters name or UserID in form field, then at step S2717, the user hits search for user, and at step S2718, the user is presented with a page with a user or users that match that search and the flow proceeds to section B9. At step S2720, the user is asked whether they are sure they want to delete user. At step S2722, the user decides whether to Delete Profile or Don't Delete Profile. If the user at step S2724, hits Delete, then at step S2725, the user account is marked for deletion in the system database and at step S2726, the user is presented with a Success screen that user has been deleted, and the process terminates. If instead, at step S2727, the user selects Don't Delete Profile, then at step S2728, the user is presented with a screen stating their Request to delete has been cancelled and the process terminates.

Figure 17A:
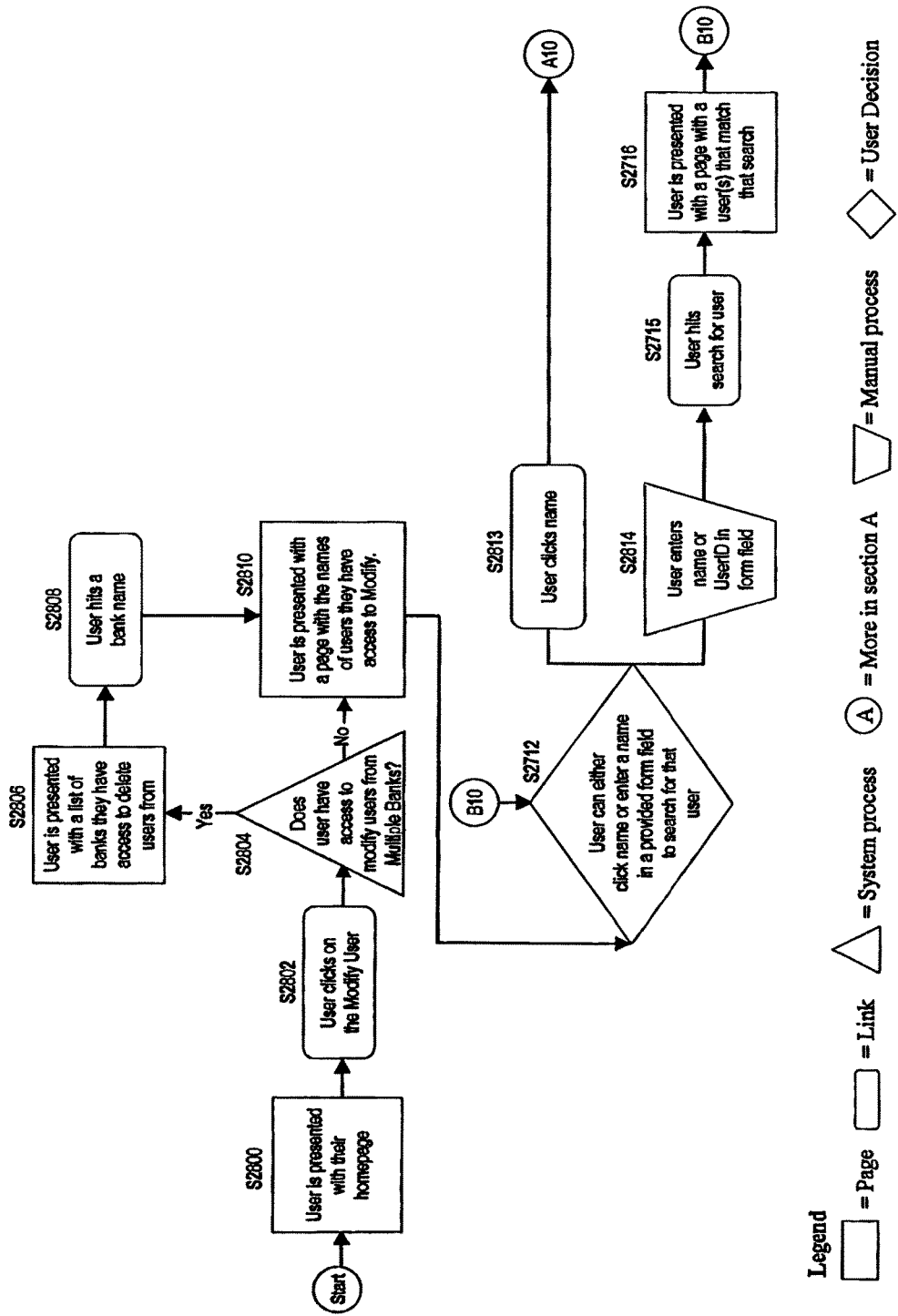

FIGS. 17A and 17B are a flowchart of a Modify a User process. At step S2800, the user is presented with their homepage. This is a permission based process, whereby only those users with proper permission may perform this process. At step S2802, the use clicks on the Modify User. At step S2804, it is determined if the user has access to modify users from multiple banks. If yes, then at step S2806, the user is presented with a list of banks they have access to modify users from. At step S2808, the user hits a bank name. Then at step S2810 the user is presented with a page with the names of users they have access to modify. If at step S2804 the answer is no, the flow proceeds directly from step S2804 to step S2810. At step S2812, the user can either click a name or enter a name in a provided form field to search for that user. If, at step S2813, the user clicks a name, then flow proceeds to section A10. If instead, at step S2814, the users enters a UserID in the form field, then at step S2815, the user hits search for user, and at step S2816, the user is presented with a page with a user or users that match that search and the flow proceeds to section B10. At step S2818, the user is presented with an editable version of that person's profile. At step S2820, the user modifies data. At step S2822, the user hits Modify. At step S2824, it is determined if the data was entered correctly. If, no, flow goes back to step S2818 with an error message. If yes, then at step S2826, the users are asked are they sure they want to modify a user or users. At step S2828, the user decides whether to hit Modify or Don't Modify User. If, at step S2829, the user hits Modify, then at step S2830, the user account marked modified in the PIC database, and at step S2831, the user is presented with a Success screen that user has been modified and process terminates. If instead, at step S2832, the user hits Don't Modify, then at step S2833, the user is presented with a request Cancel screen and the process terminates.

Figure 18:
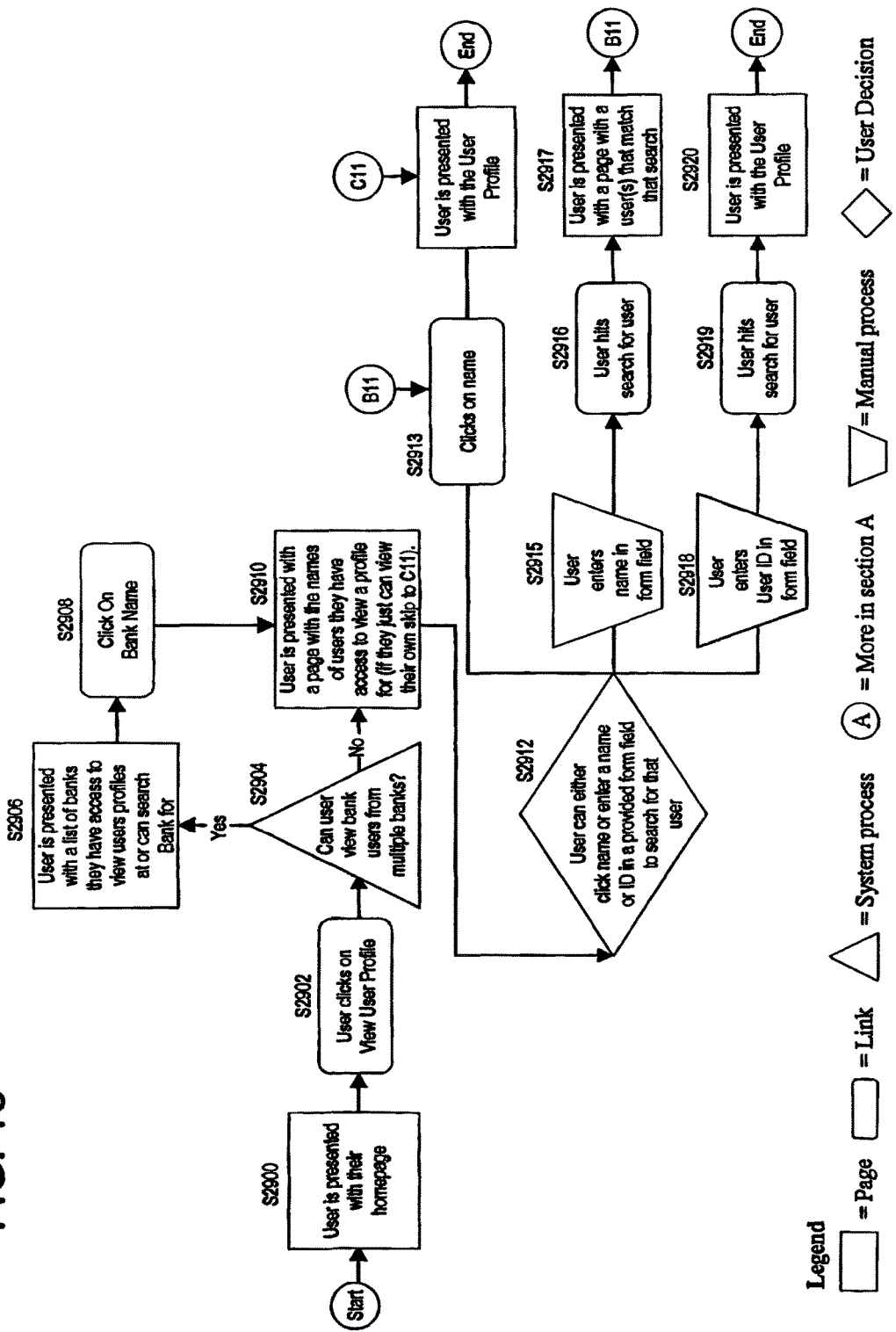
FIG. 18 is a flowchart of a view user profile process.

FIG. 18 is a flowchart of a View a User Profile process. At step S2900, the user is presented with their homepage. This is a permission based process, whereby only those users with proper permission may perform this process. At step S2902, the user clicks on View User Profile. At step S2904, it is determined if the user can View bank users from multiple banks. If yes, then at step S2906, the user is presented with the list of banks they have access to view user profiles at or can search for bank, and at step S2908, the user clicks on Bank Name. At step S2910, the user is presented with a page with the names of users they have access to view a profile for. If the user can only view their own profile, the process skips to section C11. If the determination at step S2904 is no, the flow proceeds directly to step S2910. At step S2912, the user can either click on a name or enter a name or ID in a provided form field to search for that user. If, at step S2913, the user Clicks On Name, then at step S2914, the user is presented with the User Profile and the process terminates. If instead, at step S2915, the user enters name in the form field, then at step S2916, the user hits search for user, and at step S2917, the user is presented with a page with a user or users that match that search and the flow proceeds to section B11. If, at step S2918, the user enters User ID in the form field, then at step S2919, the user hits search for user, and at step S2920, the user is presented with the User Profile and the process terminates.

Figure 19:
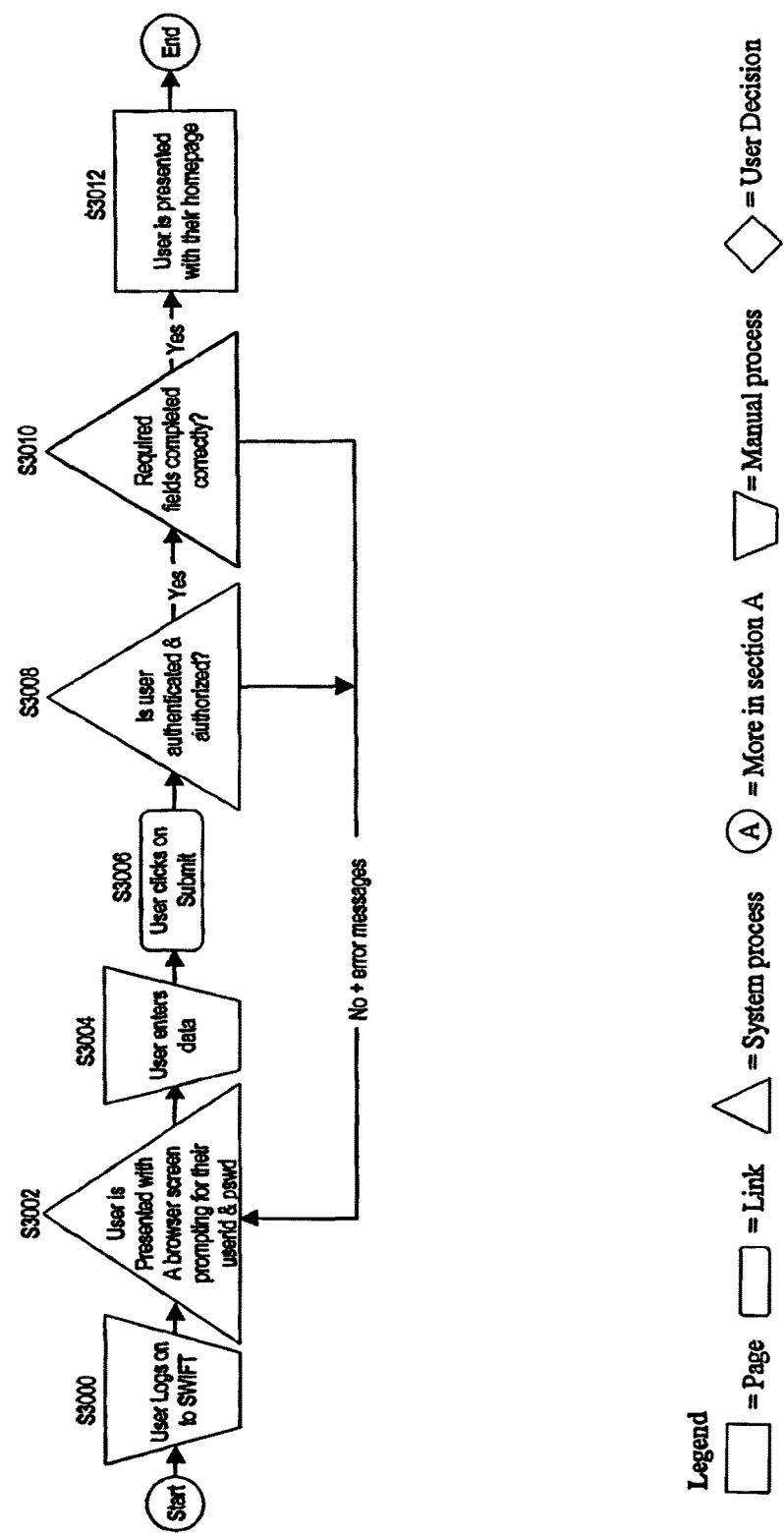
FIG. 19 is a flowchart of a log on to the PIC system process.

FIG. 19 is a flowchart of a Log On to The PIC System process. This is a permission based process, whereby only those users with proper permission may perform this process. At step S3000, the user Logs on to SWWIFTNet. At step S3002, the user is presented with a browser screen prompting for their userid and password. At step S3004, the user enters Data. At step S3006, the user clicks on Submit to submit the data. At step S3008, it is determined if the user is authenticated and authorized. If no, flow returns to step S3002 with an error message. If yes, at step S3010, it is determined if the required fields have been completed correctly. If no, flow returns to step S3002 with an error message. If yes, then at step S3012, the user is presented with their homepage and the process terminates.

FIG. 20 is a flowchart of a Change a Password process. First time new users accessing the system are requested to change the password. Also, request to change password is automatic on password expiration. At step S3100, the user is presented with their homepage. At step S3102, the user clicks on a User Change Password link. At step S3104, the user is presented with a page to enter their old password and new Password, preferably two times. At step S3106, the user clicks Change Password. At step S3108, it is determined if the password has been changed. If yes, at step S3110, the user is presented with a Success screen and the process terminates. If no, an error message is presented and the process terminates. FIG. 21 is a flowchart of a Reset User process. At step S3200, the user is presented with their homepage. At step S3204, the user clicks on User Reset User Link. At step S3206, the user is presented with a page including a list of users as well as the option to enter username for search. At step S3208, the user chooses whether to enter search for user or to click on a user name. If a search is to be performed, at step S3209, the user enters a user name and clicks on the Submit Button and flow proceeds to section A14. If the user wishes to click on a displayed user, then at step S3210, the user clicks on a user's name and the flow proceeds to section A14. At step S3211, the user has the choice to reset the user. At step S3212, the user clicks Reset User. At step S3214, the user is presented with message to verify Reset/Don't Reset. At step S3216, the user will verify to reset the user. At step S3217, if reset selected the user is presented with Success screen and the process terminates. If reset is not selected, at step S3218, the user is presented with a request cancelled screen and the process terminates. If instead, at step S3219, the user clicks Don't Reset, the flow also proceeds to step S3219.

FIGS. 22A and 22B are a flowchart of Transfer a PIC process. This is a permission based process, whereby only those users with proper permission may perform this process. At step S3300, the user is presented with their homepage. At step S3302, the user clicks on the Transfer a PIC link. At step S3304, the user is presented with a page where he can enter a PIC number to transfer. At step S3306, the user enters the PIC. At step S3308, the user clicks on the Submit Button. At step S3310, it is determined if the PIC exists in the system. If no, the flow proceeds to section B15. If yes, at step S3312, it is determined if the routing number belongs to acquiring bank. If no, flow proceeds to section A15. If yes, and the PIC already belongs to an acquiring bank, flow proceeds to section B15. At step S3314, the user is presented with a PIC transfer screen. At step S3316, the user enters Current requested PIC data. At step S3318, the user clicks on the Submit Button. At step S3320, if it is determined if the current PIC info is complete and valid. If no, flow returns to step S3314. If yes, at step S3322, the user is presented with a PIC Customer Information screen and asked to confirm and Request Transfer. At step S3324, it is determined if the customer information is Correct. If no, flow returns to step S3314. If yes, flow proceeds to section C15. At step S3326, the user is presented with a screen for them to enter new bank information. At step S3328, the user enters PIC bank information and an effective date. At step S3330, the user clicks on the Submit Transfer Button.

At step S3332, it is determined if the PIC transfer info is complete and verified. If no, flow returns to step S3326. If yes, at step S3334, the user is presented with a screen for them to verify new PIC information. At step S3336, it is verified whether the PIC transfer information is correct and the decision is made to transfer/don't transfer. If transfer is selected, flow proceeds to section D15. If don't transfer is selected, the process terminates. At step S3338, a PIC transfer is entered into a database. At step S3339, the user is presented with a success screen and an explanation of the next steps: At step S3340, the releasing bank is notified of a pending PIC transfer.

Figure 23:
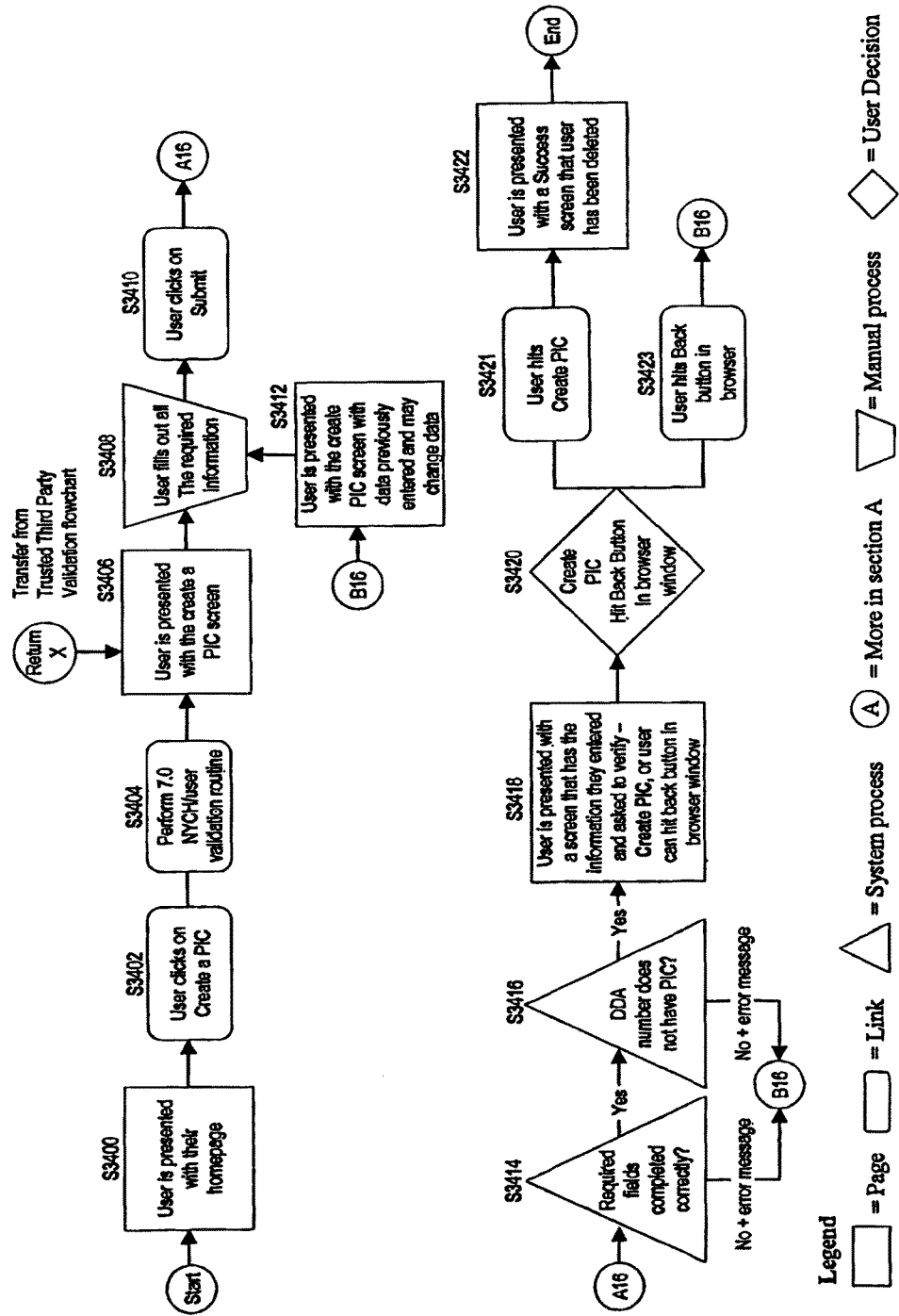
FIG. 23 is a flowchart of a create PIC process.

FIG. 23 is a flowchart of a Create a PIC process. At step S3400, the user is presented with their homepage. At step S3402, the user clicks on Create A PIC. At step S3404, a 7.0 NYCH/user validation Routine is performed. At step S3406, the user is presented with the create a PIC screen. At step S3408, the user fills out all the required information. At step S3410, the user clicks on Submit and the flow proceeds to section A16. At step S3412, the user is presented with the create PIC screen with data previously entered and may change data and the flow proceeds to step S3408. At step S3414, it is determined if the required fields are completed correctly. If no, flow proceeds to section B16 with an error message. If yes, at step S3416, it is determined if the DDA number does not have a PIC. If no, that is, if the DDA already has a PIC, the flow proceeds to B16 with an error message. If yes, at step S3418, the user is presented with a screen that has the information they entered and asked to verify—Create PIC, or the user can hit the back Button in the browser window. At step S3420, the user decides whether to hit create PIC or hit the back Button in the browser window. If at step S3421, the user hits Create PIC, then at step S3422, the user is presented with a Success screen that user has been deleted and the process terminates. If instead, at step S3423, the user hits back button in browser, the flow reverts to section B16.

Figure 24A:
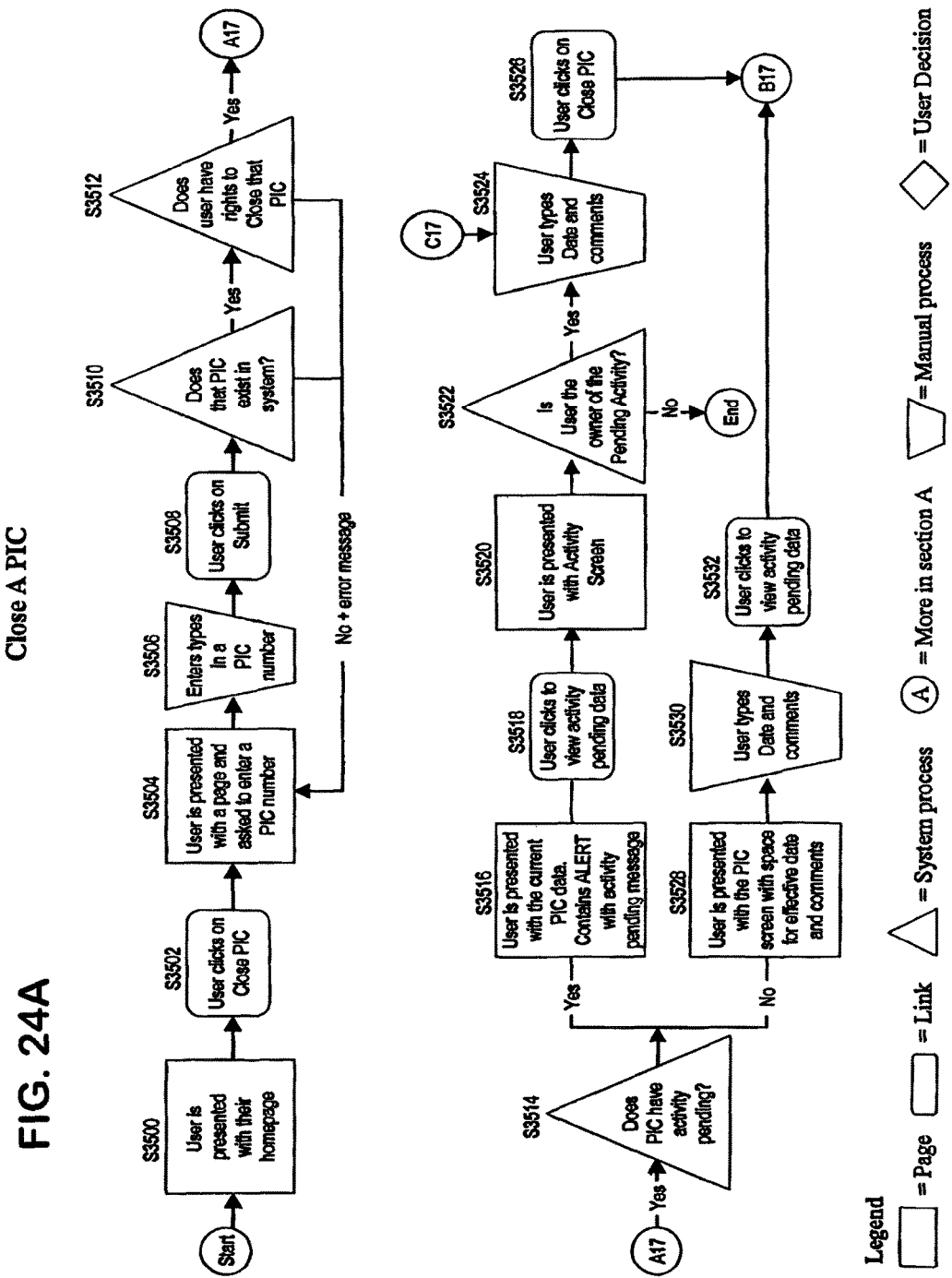
FIGS. 24A and 24B are a flowchart of a close PIC process.
Figure 24B:
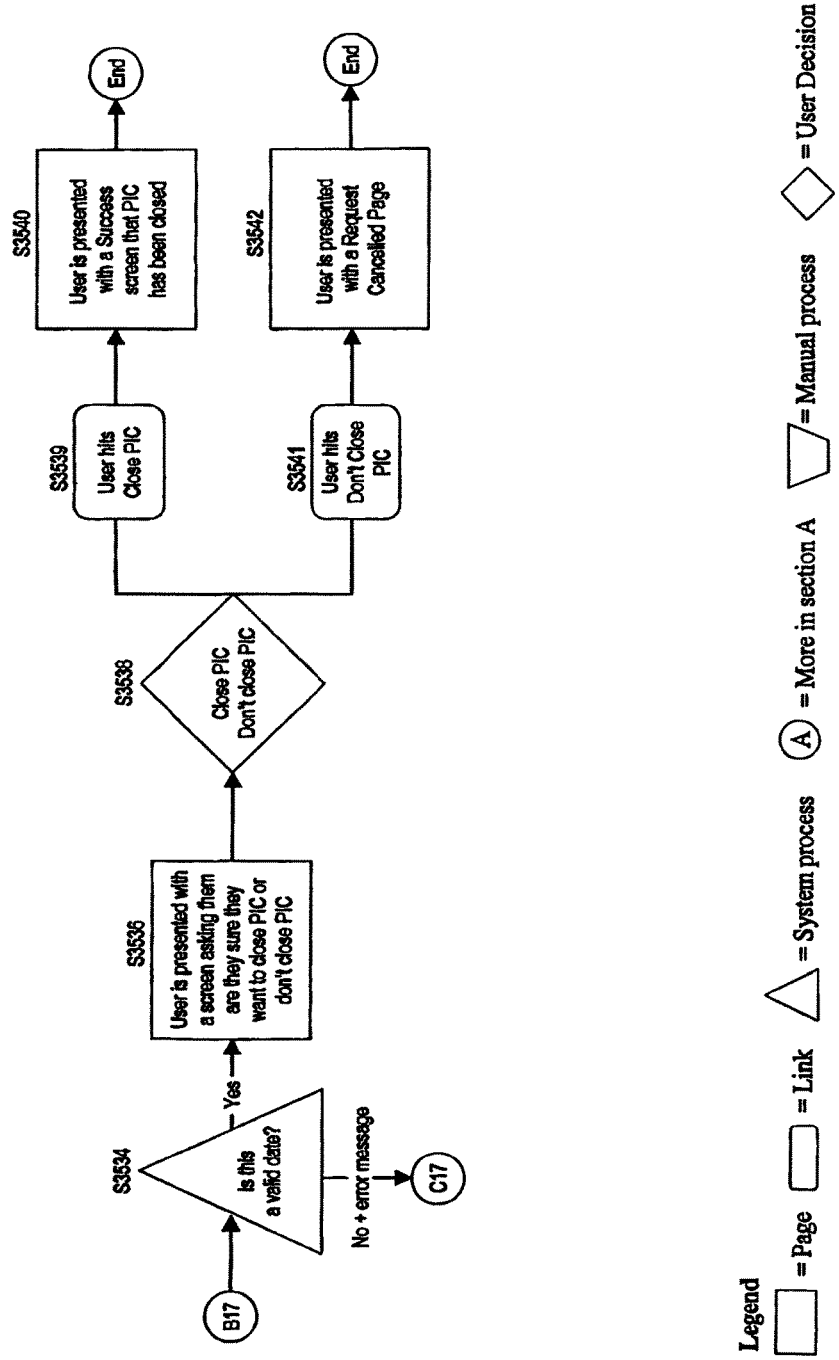

FIGS. 24A and 24B are a flowchart of a Close a PIC process. PICs are never deleted, merely closed. At step S3500, the user is presented with their homepage. At step S3502, the user clicks on Close PIC. At step S3504, the user is presented with a page and asked to enter a PIC Number. At step S3506, the user types in a PIC number. At step S3508, the user clicks on submit. At step S3510, it is determined if the PIC exists in the system. If no, flow returns to step S3504 with an error message. If yes, at step S3512, it is determined if the user has a right to Close that PIC. If no, flow returns to step S3504 with an error message. If yes, flow proceeds to section A17. At step S3514, it is determined if the PIC has activity pending. If yes, at step S3516, the user is presented with the current PIC data, which contains an ALERT with an activity pending message. At step S3518, the user clicks to view activity pending data. At step S3520, the user is presented with Activity Screen. At step S3522, it is determined if the User is the owner of the Pending Activity. If no, the process terminates. If yes, at step S3524, the user types in date and comments. At step S3526, the user clicks on Close PIC and flow proceeds to section B17. If the answer determined at step S3514 is no, then at step S3528, the user is presented with the PIC screen with space for effective date and comments. At step S3530, the user types in dates and comments. At step S3532, the user clicks on Close PIC and the flow proceeds to section B17. At step S3534, it is determined if the date is a valid date. If no, the flow proceeds to section C17 with an error message. If yes, at step S3536, the user is presented with a screen asking them are they sure they want to close PIC or Don't close PIC. At step S3538, the user decides between Close PIC and Don't Close PIC. If, at step S3539, the user hits Close PIC, then at step S3540 the user is presented with a Success screen that PIC has been closed and the process terminates. If instead, at step S3541, the user hits Don't Close PIC, then at step S3542, the user is presented with a Request Canceled Page and the process terminates.

Figure 25A:
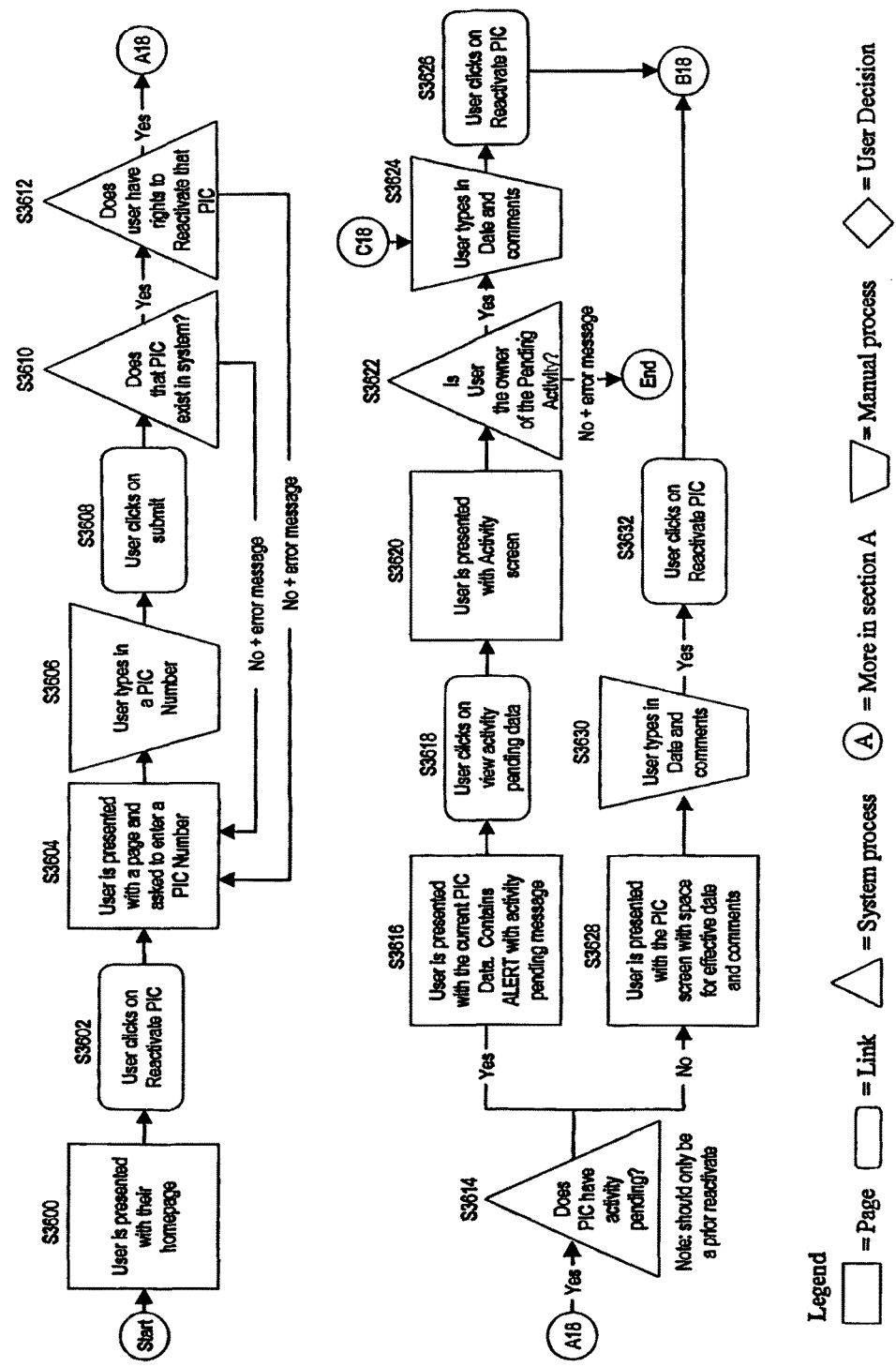
FIGS. 25A and 25B are a flowchart of a reactivate. PIC process.
Figure 25B:
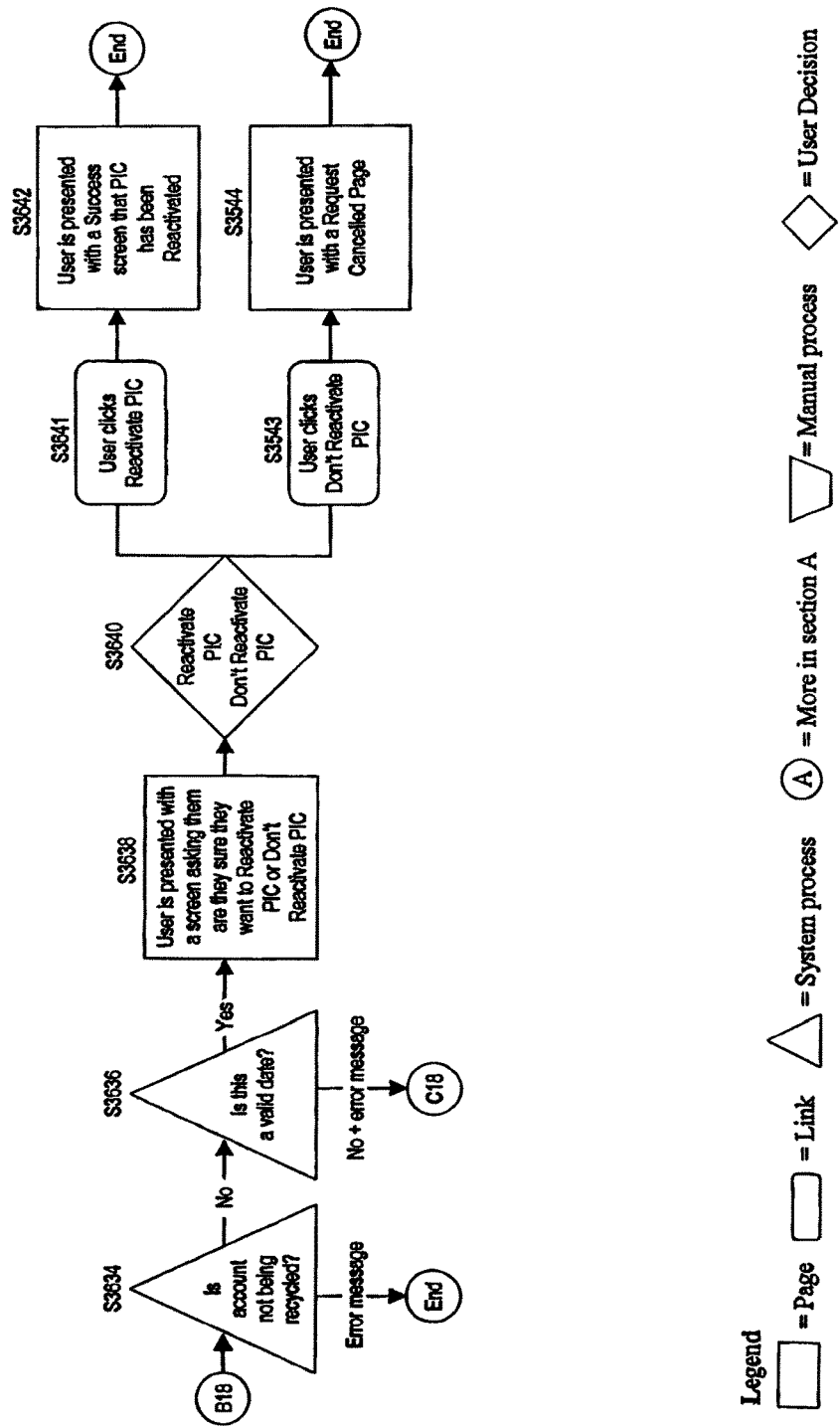

FIGS. 25A and 25B are a flowchart of a Reactivate A PIC process. To reactivate a PIC, it must belong to the bank. At step S3600, the user is presented with their homepage. At step S3602, the user clicks on Reactive PIC. At step S3604, the user is presented with a page and asked to enter a PIC. At step S3606, the user types in a PIC. At step S3608, the user clicks on submit. At step S3610 it is determined if that PIC exists in the system. If no, flow reverts to step S3604 with an error message. If yes, at step S3612 it is determined if the user has rights to reactivate that PIC. If no, flow reverts to step S3604 with an error message. If yes, flow proceeds to section A18, where, at step S3614 it is determined if the PIC has activity pending. If yes, then at step S3616, the user is presented with the current PIC data which contains an ALERT with an activity pending message. At S3618, the user clicks to view activity pending data. At S3620, the user is presented with Activity. Screen. At step S3622, it is determined if the user is the owner of the Pending Activity. If no, the process terminates with an error message. If yes, at step S3624, the user types in Date and comments. At step S3626, the user clicks on Reactivate PIC and the flow proceeds to section B18. If the answer is no at step S3614, then at step S3628, the user is presented with the PIC screen with space for effective date and comments. At step S3630, the user types in Date and comments. At step S3632, the user clicks on Reactivate PIC and the flow proceeds to section B18, where at step S3634, it is determined if the account is being recycled. If yes, the process terminates with an error message. If no, then at step S3636, it is determined if the date is a valid date. If no, flow proceeds to section C18 with an error message. If yes, then at step S3638, the user is presented with a screen asking them are they sure they want to Reactivate PIC or Don't Reactivate PIC. At step S3640, the user decides whether to select Reactivate PIC or Don't Reactivate PIC. If, at step S3641, the user clicks Reactivate PIC, then at step S3642, the user is presented with a Success screen that PIC has been Reactivated and the process terminates. If instead, at step S3643, the user clicks Don't Reactivate PIC then at step S3644, the user is presented with a Request Canceled Page, and the process terminates.

Figure 26:
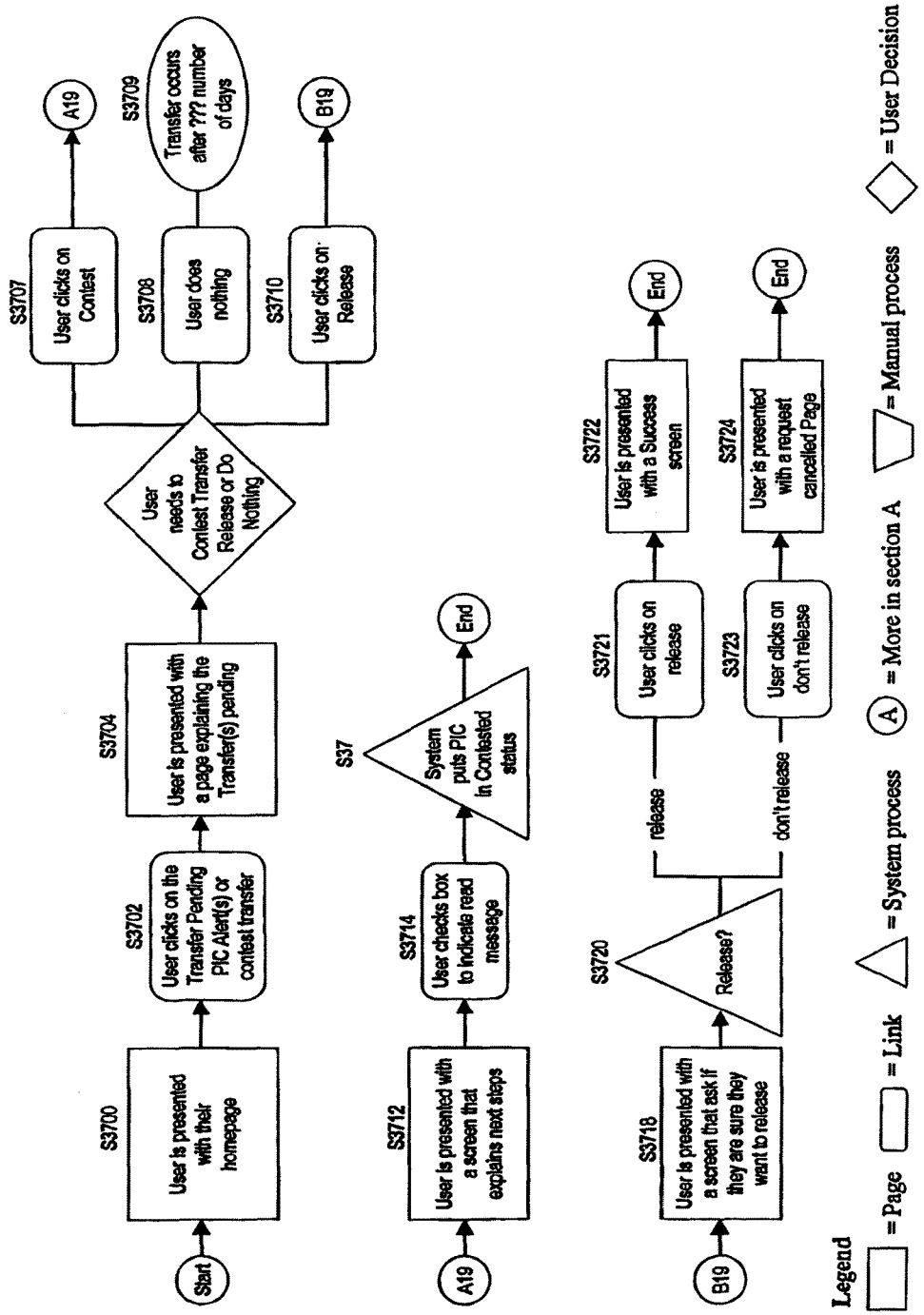
FIG. 26 is a flowchart of a contest/release a PIC pending transfer process.

FIG. 26 is a flowchart of Contest/Release A PIC Pending Transfers process. At step S3700, the user is presented with their homepage. At step S3702, the user clicks on the Transfer Pending PIC Alert(s) or contest transfer. At step S3704, the user is presented with a page explaining the Transfer(s) pending. At step S3706, the user decides whether to Contest Transfer, Release, or Do Nothing. If, at step S3707, the user clicks on Contest, the flow proceeds to section A19. If, at step S3708, the user does nothing, then at step S3709, transfer occurs after a predetermined number of days. If, at step S3710, the user clicks on Release the flow proceeds to section B19. At step S3712, the user is presented with a screen that explains the next steps. At step S3714, the user checks a box to indicate a read message. At step S3716, system puts PIC in Contested status, and the process terminates. At step S3718, the user is presented with a screen that asks if they are sure they want to release. At step S3720, it is determined if there has been a release. If release, then at step S3721, the user clicks on Release, and at step S3722, the user is presented with a success screen and the process terminates. If don't release is selected, at step S3723 the user clicks on Don't Release and at step S3724, the user is presented with a request cancelled screen, and the process terminates.

Figure 27A:
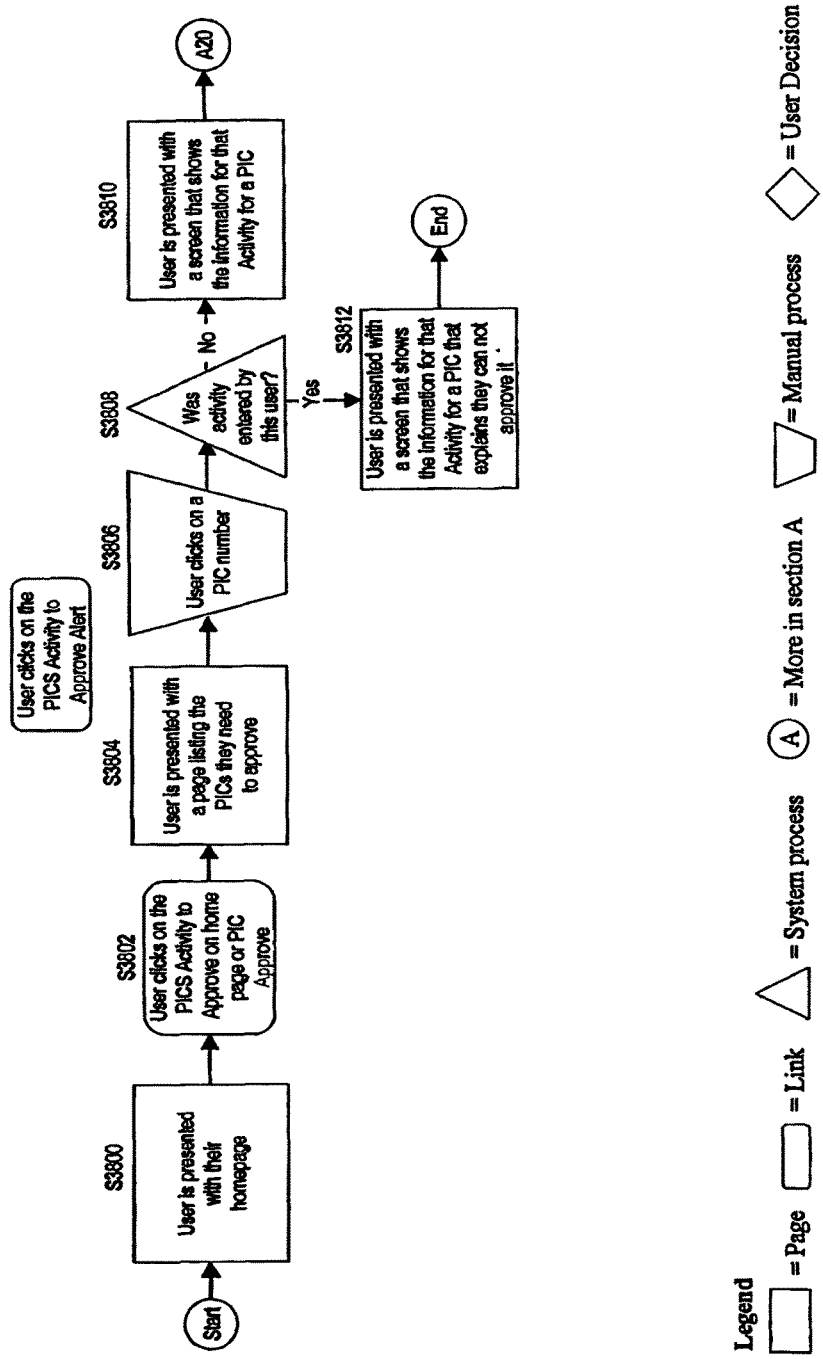
FIGS. 27A and 27B are a flowchart of an approve a PIC activity process.
Figure 27B:
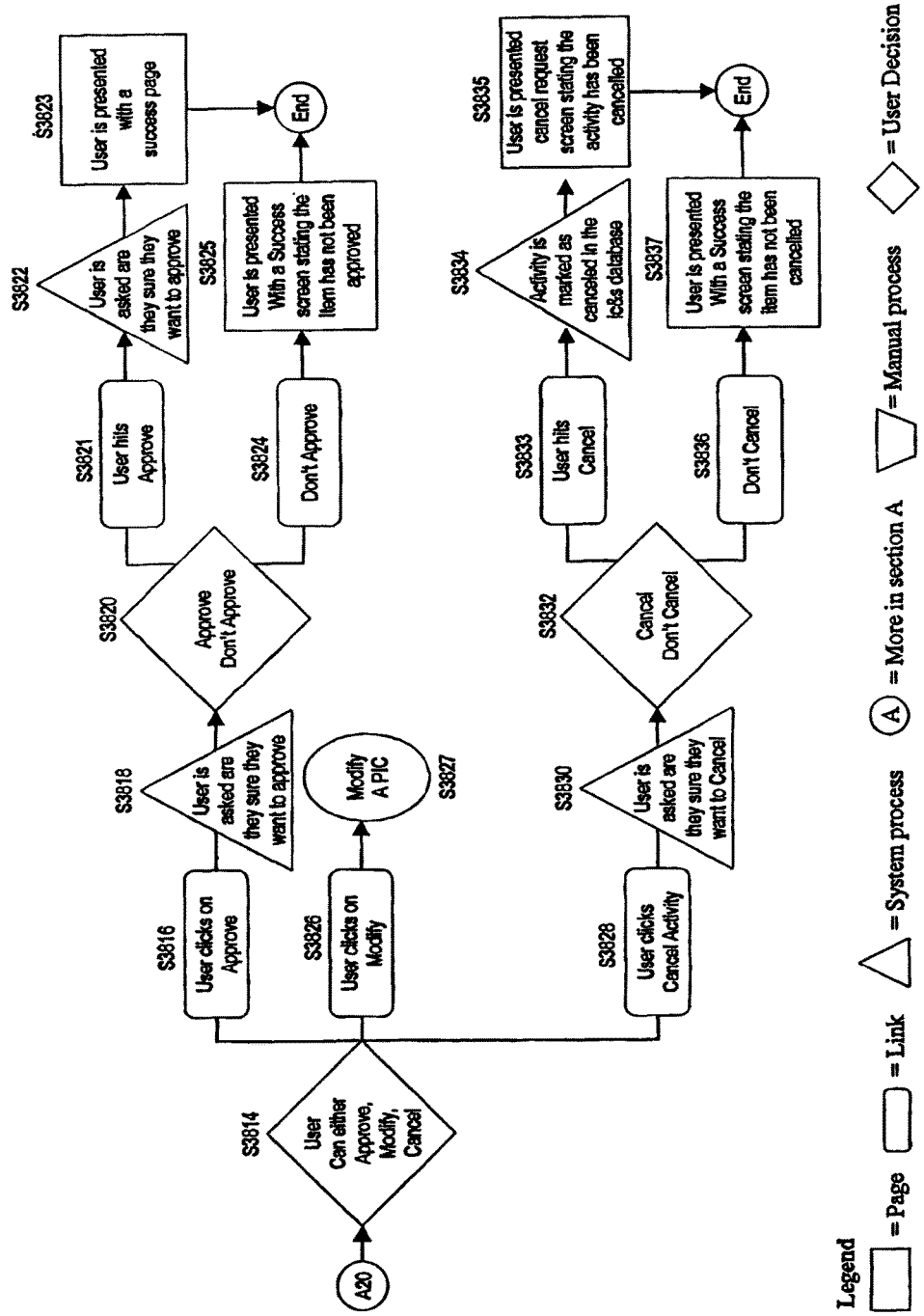

FIGS. 27A and 27B are a flowchart of an Approve A PIC Activity process. Examples of PIC activity that needs to be approved are Add, Delete, and Modify. At step S3800, the user is presented with their homepage. At step S3802, the user clicks on the PICS Activity to Approve on home page or PIC Approve. At step S3804, the user is presented with a page listing the PICs they need to approve. At step S3806, the user clicks on a PIC. At step S3808, it is determined if the activity was entered by this user. If no, then at step S3810, the user is presented with a screen that shows the information for that Activity for a PIC and the process proceeds to section A20. If yes, then at step S3812, the user is presented with a screen that shows the information for that Activity for a PIC that explains they cannot approve it and the process terminates. At step S3814, the user can either Approve, Modify, Cancel. If at step S3816, the user clicks on Approve, then at step S3818, the user is asked are they sure they want to approve. At step S3820, the user decides between Approve and Don't Approve. If, at step S3821, the user hits Approve, then at step S3822, activity is marked as approved in the Ic&s database, and at step S3823, the user is presented with a success page and the process is terminated. If, at step S3824, the user selects Don't Approve, then at step S3825, the user is presented with a Success screen stating the item has not been approved and the process terminates. If, at step S3826, the user clicks on Modify, then at step S3827, the Modify A PIC process is invoked (described later). If, at step S3828, the user clicks Cancel Activity, then at step S3830, the user is asked if they are, sure they want to Cancel. At step S3832, the user decides between Cancel and Don't Cancel. If, at step S3833, the user hits Cancel, then at step S3834, activity is marked as canceled in the ic&s database, and at step S3835, the user is presented cancel request screen stating the activity has been canceled, after which the process terminates. If instead, at step S3836, Don't Cancel is selected, then at step S3837, the user is presented with a Success screen stating the item has not been canceled, after which the process terminates.

Figure 28B:
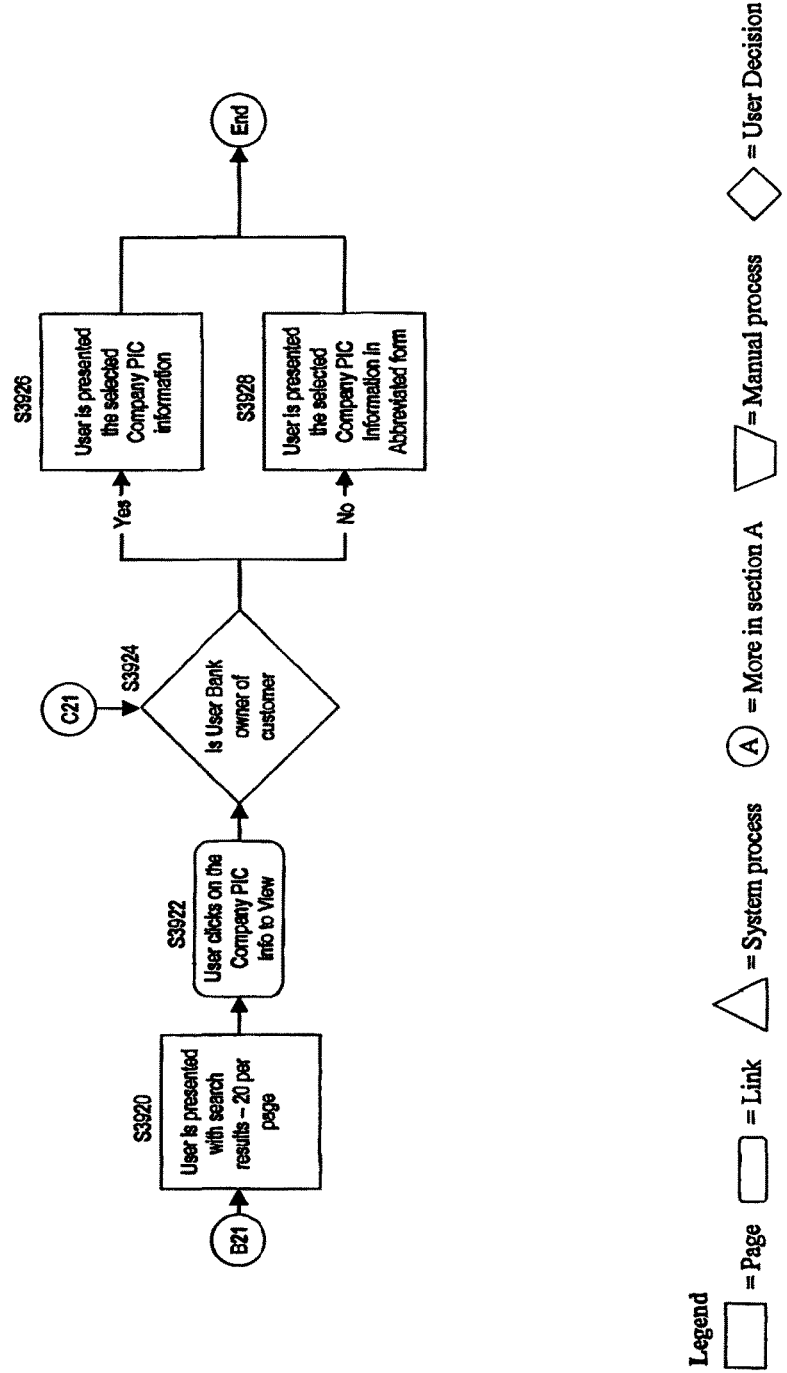

FIGS. 28A and 28B are a flowchart of a Find A PIC process. All PICs will be retrieved based on a search criteria, including closed and pending PICs. Those PICs that a user cannot view or act upon, will also appear but be grayed out. At step S3900, the user is presented with their homepage. At step S3902, the user clicks on the Find A PIC Link. At step S3904, the user is presented with a page to search for a PIC. At step S3906, the user makes a choice as to what they wish to search by. If, at step S3908, the user enters a DDA/RT & Number to perform the search, then at step S3910, the user clicks on the Submit Button, and at step S3912, it is determined if the required fields have been completed correctly. If no, flow proceeds to section A21. If yes, then at step S3914, it is determined if the user requested Find by Co. Name & City. If no, then flow proceeds to section C21. If yes, flow proceeds to section B21.

If, on the other hand, the search is to be by PIC number, then, at step S3916, the user enters PIC Number and the flow proceeds to step S3910. If instead the search is to be by name and address, then at step S3918, the user enters the Company Name and City and the flow proceeds to step S3910 and continues from there as discussed above. At step S3920, the user is presented with search results preferably about 20 per page. At step S3922, the user clicks on the Company PIC info to view. At step S3924, it is determined whether the User Bank is the owner of the customer. If yes, then at step S3926, the user is presented with the selected Company PIC information. If no, then at step S3928, the user is presented with the selected Company PIC information in Abbreviated form In either event, the process is then terminated.

Figure 29:
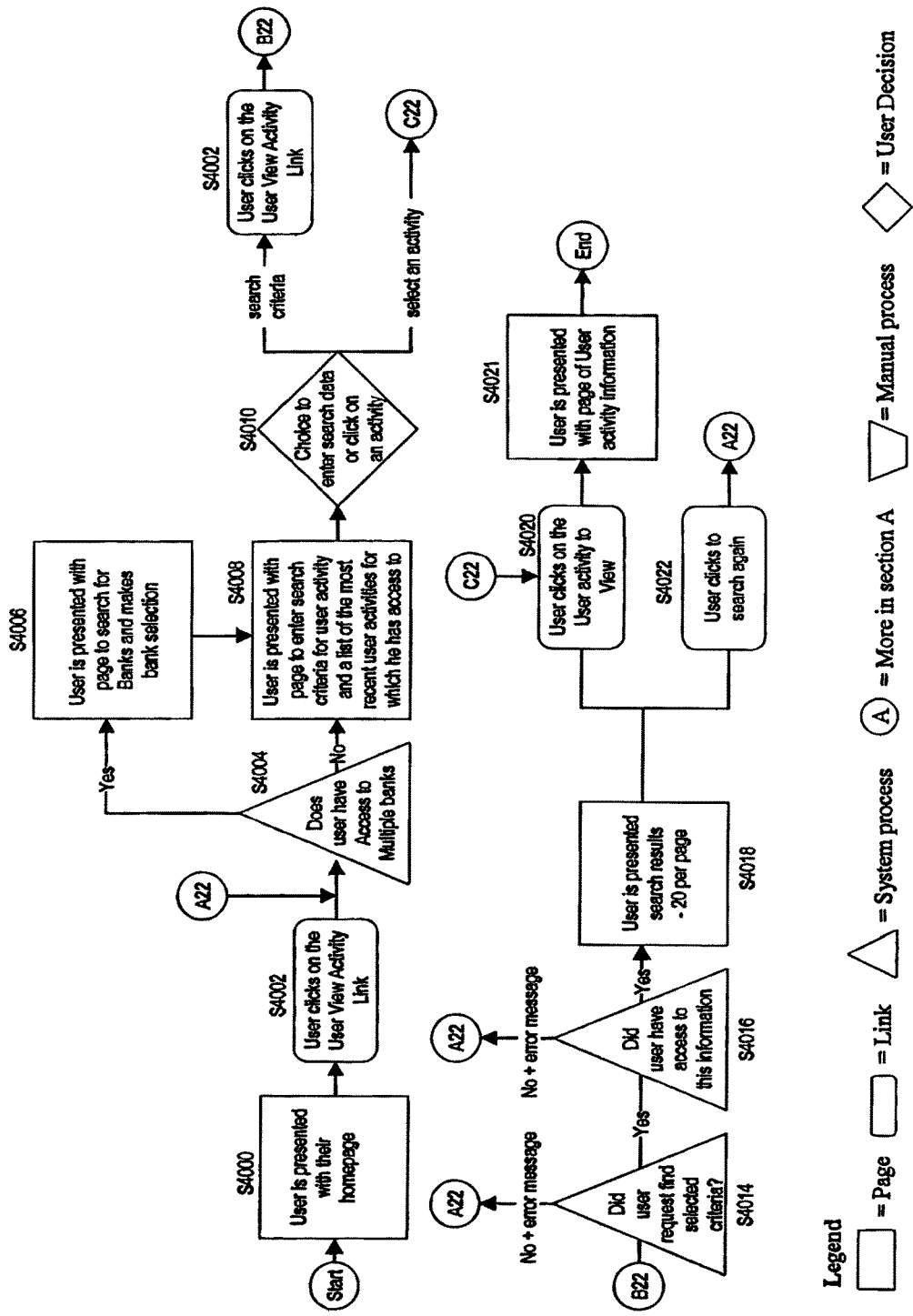
FIG. 29 is a flowchart of a flowchart of a view user profile activity log process.

FIG. 29 is a flowchart of View User Profile Activity Log process. At step S4000, the user is presented with their homepage. At step S4002, the user clicks on the User View Activity Link. At step S4004, it is determined if the user has access to multiple banks. If yes, then at step S4006, the user is presented with page to search for Banks and makes bank selection. At step S4008, the user is presented with page to enter search criteria for user activity and a list of the most recent user activities for which he has access to. If no, the flow proceeds directly from step S4004 to step S4008. At step S4010, the user chooses to enter search data or to click on an activity. If the user chooses to use search criteria, then at step S4012, the user enters search criteria and clicks on the Submit Button and the flow proceeds to section B22. If an activity is selected, the flow proceeds to section C22. At step S4014, it is determined if the user request found selected criteria. If no, flow proceeds to section A22 with an error message. If yes, then at step S4016, it is determined if the user has access to this information. If no, flow proceeds to section A22 with an error message. If yes, then at step S4018, the user is presented with search results preferably about 20 per page. If at step S4020, the user clicks on the User activity to View, then step S4021, the user is presented with page of User activity information and the process terminates. Alternatively, at step S4022, the user can click to search again, and the process returns to section. A22.

Figure 30B:
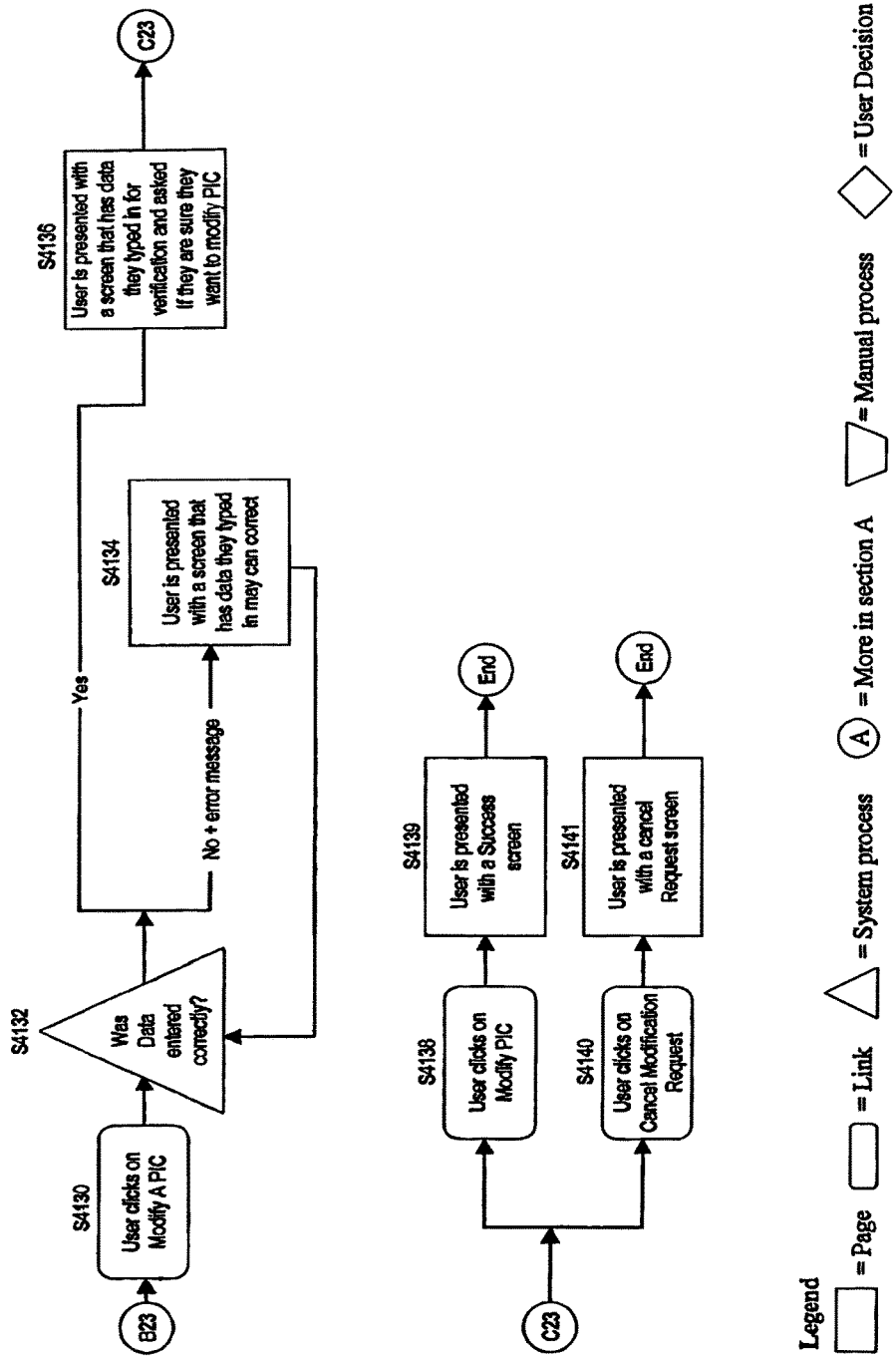

FIGS. 30A and 30B are a flowchart of a Modify A PIC process. This is a permission based process, whereby only those users with proper permission may perform this process. View Only user will not be able to perform this process. Also, anytime a user gets a data entry error; that user is returned to the screen with the data they entered pre-filled. At step S4100, the user is presented with their homepage. At step S4102, the user clicks on Modify A PIC. At step S4104, the user is presented with a page and asked to enter a PIC Number. At step S4106, the user types in a PIC number. At step S4108, the user clicks on submit. At step S4110, it is determined if that PIC exists in the system. If no, flow returns to step S4104 with an error message. If yes, then at step S4112, it is determined if the User has rights to modify that PIC. If no, flow returns to step S4104 with an error message. If yes, then flow proceeds to section A23. At step S4114, it is determined if the PIC has activity pending. If yes, then at step S4116, the user is presented with current PIC data, which contains ALERT with activity pending message. At step S4118, the user clicks to view activity pending data. At step S4120, the user is presented with Activity Screen. At step S4122, it is determined if the User is the owner of the Pending Activity. If no, an error message is produced and the process terminates. If yes, then at step S4124, the user types in Modifications, Date and comments and the flow proceeds to section B23. Step S4124 may also be entered after execution of step S4126, at which a user is presented with an activity screen.

If the answer determined at step S4114 is no, then at step S4128, the user is presented with an editable PIC Modify screen with space for effective date and the flow proceeds to step S4124. At step S4130, the user clicks on Modify PIC. At step S4132, it is determined if the Data was entered correctly. If no, then at step S4134, the user is presented with a screen that has data they typed in so it can be corrected and the flow then returns to step S4132. Once the data is determined to be entered correctly, then at step S4136, the user is presented with a screen that has data they typed in for verification and asked if they are sure they want to modify PIC and the flow proceeds to section C23. At step S4138, the user clicks on Modify PIC, and at step S4139, the user is presented with a Success screen and the process terminates. Alternatively, at step S4140, the user clicks on Cancel Modification Request, and at step S4141, the user is presented with a cancel request screen and the process terminates.

Figure 31:
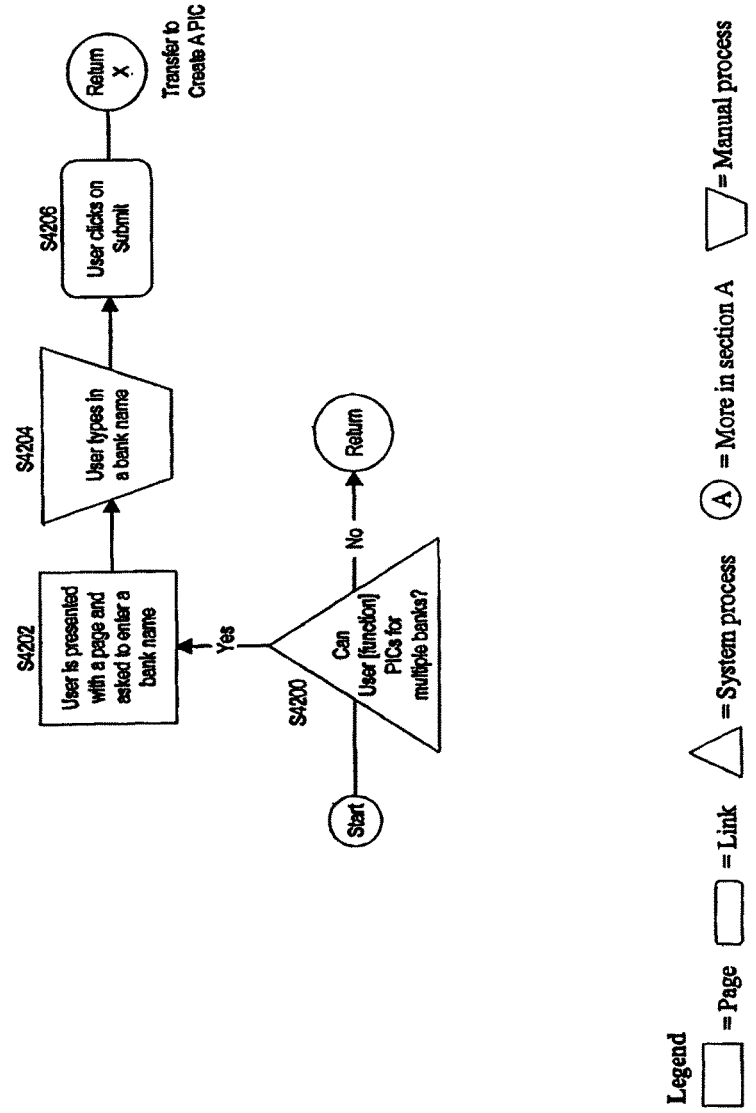
FIG. 31 is a flowchart of a perform trusted third party validation process.

FIG. 31 is a flowchart of a Perform Trusted Third Party Validation process. At step S4200, it is determined if the User can perform one or more functions on PICs for multiple banks. If no, flow returns to the calling process. If yes, at step S4202, the user is presented with a page and asked to enter a bank name. At step S4204, the user types in a bank name. At step S4206, the user clicks on submit and the flow returns to. Create A PIC flowchart at step S3406.

Figure 32:
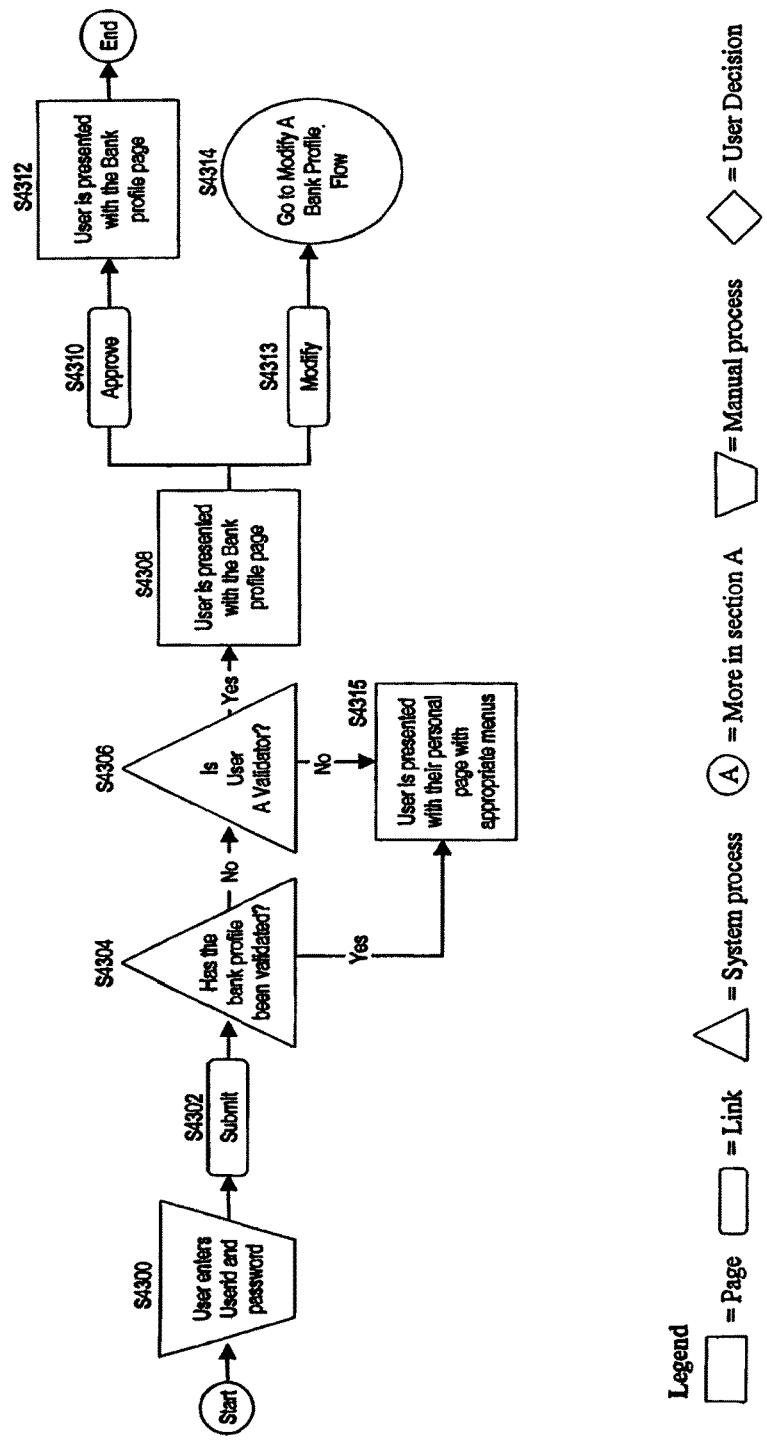
FIG. 32 is a flowchart of a validate bank profile process.

FIG. 32 is a flowchart of a Validate Bank Profile process. This is a one-time process that occurs the first time a bank profile validator logs onto the system. Before any PIC activity can be accomplished, the bank profile must be validated. At step S4300, the user enters the Userid and password, and, at step S4302, hits submit. At step S4304, it is determined if the bank profile has been validated. At step S4306, it is determined if the User is A Validator. If yes, at step S4308, the user is presented with the Bank profile page. If, at step S4310, the user approves, then at step. S4312, the Bank Profile is Validated and the user is presented with a Success screen. If at step S4313, the user chooses modify, then at step S4314, the process transfers to the to "Modify A Bank Profile" flow. If no at step S4306 or if yes at step S4304, then at step S4315, the user is presented with their personal page with appropriate menus.

Figure 33B:
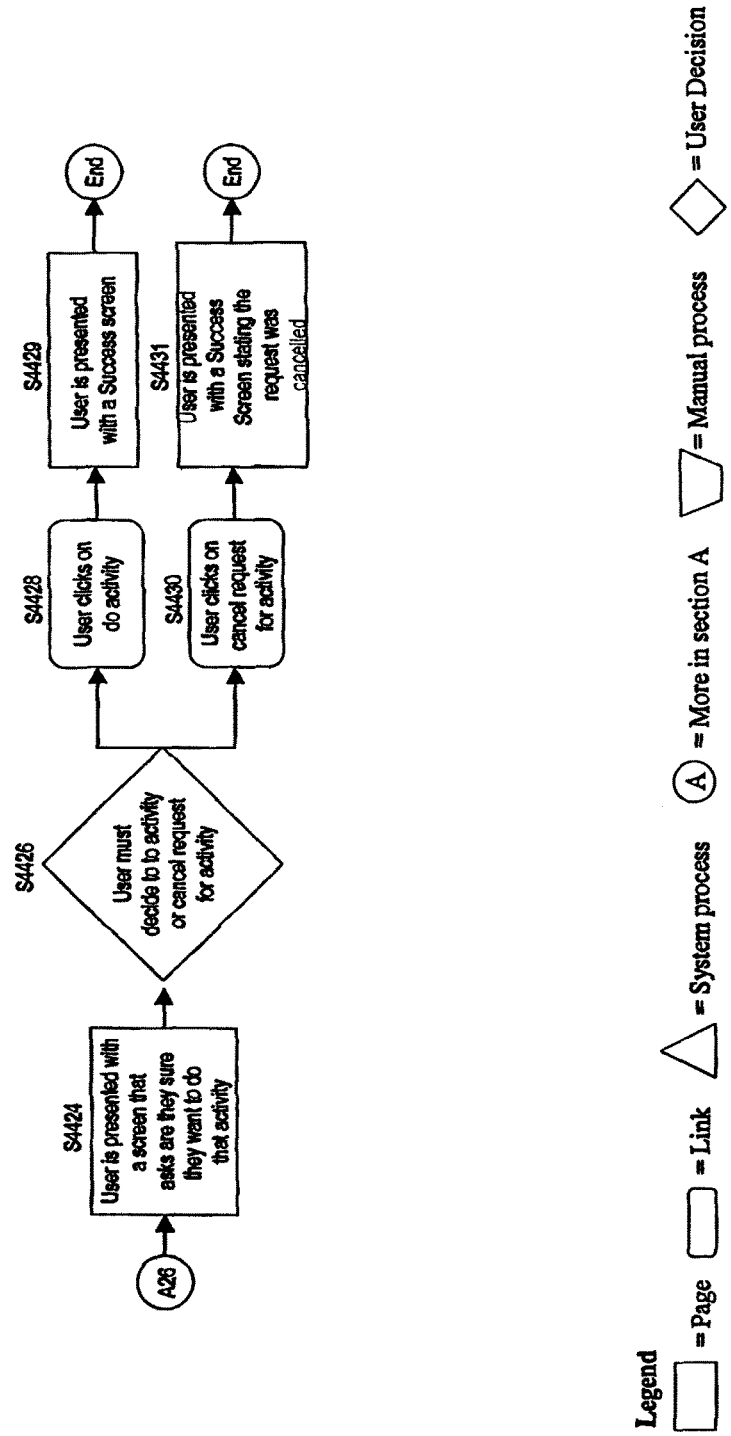

FIGS. 33A and 33B a flowchart of an Approve A Bank Profile Modification process. This process is for future use. Bank Profile activity that would have to be approved would be, for example, Add, and Modify. The approval loop is only necessary when specified on the bank profile. At step S4400, the user is presented with their homepage. At step S4402, the user clicks on the Bank Activity to Approve. At step S4404, the user is presented with a screen that shows the information for that Bank Activity. At step S4406, it is determined if a Activity to be approved was created by user. If yes, then at step S4408, the user is presented with a screen that shows that bank activity. At step S4410, the user can either Modify, or Cancel the Request. If, at step S4412, the user clicks on. Modify, then at step S4413, process Modify A Bank Profile 1.4 is called. If, on the other hand, at step S4414, the user clicks Cancel Activity, then the flow proceeds to section A. If the answer at step S4406 is no, then at step S4416, the user can either: Approve, Modify, or Cancel the Request. If at step S4418, the user clicks on Approve, then the flow proceeds to section A. If, at step S4420, the user clicks on Modify, then at step S4421, the Modify A Bank Profile 1.4. process is called. If instead, at step S4422, the user clicks Cancel Request, the flow proceeds to section A. At step S4424, the user is presented with a screen that asks if they are sure they want to do that activity. At step S4426, the user must decide to do activity or cancel request for activity. If, at step S4428, the user clicks to do activity, then at step S4429, the user is presented with a Success screen and the process terminates. If instead, at step S4430, the user clicks on cancel request for activity, then at step S4431, the user is presented with a Success screen stating the request was canceled, and the process terminates.

The PIC system provides for Batch File updates. FIG. 34 illustrates the PIC Batch service. Files are received over either a secure private network (SWIFTNet) 34.4 or using an existing private CONNECT:Direct 34.1 network to a Bulk File Disk Storage 34.2. The files are then routed to a Bulk File Server 34.3. The PICBatchService recognizes this file and processes it. The executable program:

Starts a Windows Service in FileMonitorService.vb using the System.ServiceProcess. ServiceBase Class. This includes methods to control starting, pausing, continuing and stopping the service.

Within the method OnStart of the Service class, StartMonitor is called. This instantiates an object from the MonitorFiles class in MonitorFiles.vb: This object will then use the System.IO.FileSystemWatcher Class to monitor the file system for new files.

FileSystemWatcher.WaitforChange is then called to wait for new files being created in the input directory. When a file is created the FileSystemWatcher notifies the service by calling MonitorFiles.OnFileCreated, which queues a request to a thread pool. Multithreading is managed by using the System.Threading.Thread Class in .NET The Thread will process the incoming file calling ProcessFile in class Importer. After obtaining exclusive use, the File will be moved to a working directory and then validated for a recognizable File Name format. Valid File Names will continue to be processed. Unrecognized File names will be reported to the Event Log and the thread process will then end.

File formats are then validated for the Incoming Batch File.

If format is correct then update requests are sent to the PIC database by calling the Business Facade Project, The request will pass through the Business Rules and Data Access Projects, performing validations and updates into the PIC database.

All results are received from the Business Facade as a Dataset.

An Output file will be generated in a temporary working directory based on the results. When the file is complete it will be moved to the appropriate Output Directory.

All phases of the batch process will use exception and notification trace logs to track both incoming and outgoing batch files. It will use the System Diagnostic namespace which exposes methods that allow logging of trace messages. This also includes interfaces to MOM 2000 and Event logs.

The file formats consist of a Header record, followed by multiple Detail Records, which is followed by a File Control Record. Tables 6 and 7 depict the PIC Input Load File Format and the PIC Output Load File Format, respectively.

TABLE 6

PIC INPUT LOAD FILE FORMAT:

| FIELD NAME | TYPE | SZ | COLUMNS | REQUIRED | COMMENTS |
|---|---|---|---|---|---|
| INPUT FILE HEADER | | | | | |
| HEADER INDICATOR | N | 1 | 1 | * | Indicates File Header. Always must be "1" |
| SENDING BANK R/T | N | 9 | 2-10 | * | R/T of Bank sending File |
| RECEIVING BANK R/T | N | 9 | 11-20 | * | IC&S Routing Transit Number |
| FILE CREATION DATE | N | 8 | 21-28 | * | Date File was created. Format YYYYMMDD |
| FILE MODIFIER | N | 2 | 29-30 | * | File Sequence Identifier |
| FILER | AN | 770 | 31-800 | | |
| DETAIL INDICATOR | N | 1 | 1 | * | Indicates File Header. Always must be "6" |
| PIC DETAIL ACTION | AN | 6 | 2-7 | * | Files Originated from Bank: CREATE = add a new PIC MODIFY = change an existing PIC TRANSFR = transfer a PIC |

TABLE 6-continued

PIC INPUT LOAD FILE FORMAT:

| FIELD NAME | TYPE | SZ | COLUMNS | REQUIRED | COMMENTS |
|---|---|---|---|---|---|
| | | | | | from another bank |
| | | | | | CLOSE = deactivate a PIC |
| | | | | | REACT = reactivate a PIC |
| PIC IDENTIFIER | AN | 17 | 8-24 | | Input will be zero filled for CREATE |
| UPDATE EFFECTIVE DATE | N | 8 | 25-32 | | Date update is effective Zeros assumes next business date Format is YYYYMMDD |
| PIC STATUS | N | 2 | 33-34 | * | Must be "00" on Input File |
| EPN CAPABLE | N | 1 | 35 | * | Valid Values: 0 = No 1 = Yes |
| CHIPS CAPABLE | N | 1 | 36 | * | Valid Values: 0 = No 1 = Yes |
| BANK RT NUMBER | N | 9 | 37-45 | * | FED's rt for this bank, or Rt # for customers bank |
| DDA ACCOUNT NUMBER | AN | 34 | 46-79 | * | DDA account number EPN has maximum of 17 char (Left Justified) |
| TAXPAYER ID | AN | 12 | 80-91 | * | |
| NAME | ANS | 96 | 92-187 | * | Corporate or individual's name |
| ADDRESS 1 | ANS | 64 | 188-251 | * | First Address line |
| ADDRESS 2 | ANS | 64 | 252-315 | * | Second line of address Required if Address 3 is present |
| ADDRESS 3 | ANS | 64 | 316-379 | * | Third line of address Required if Address 4 is present |
| ADDRESS 4 | ANS | 64 | 380-443 | * | Fourth line of address |
| CITY | ANS | 32 | 444-475 | | |
| STATE/PROV | ANS | 32 | 476-507 | | |
| POSTAL CODE | AN | 11 | 508-518 | | |
| COUNTRY | ANS | 3 | 519-521 | * | Values defined by ISO-3166 3-letter codes. |
| SIC BUSINESS CODE | N | 4 | 522-525 | | Standard Industrial Classification codes |
| DUNES ID | AN | 10 | 526-535 | | D&B D-U-N-S Numbers |
| BIC CODE | N | 11 | 536-546 | | SWIFT BIC Code |
| BEI CODE | N | 11 | 547-557 | | SWIFT Business Entity Identifier |
| IBAN CODE | N | 34 | 558-591 | | International Bank Account Number |
| WIRE PAY N/A 1 | ANS | 35 | 592-626 | | CHIPS/Fed Wire Payment Name/Address 1 |
| WIRE PAY N/A 2 | ANS | 35 | 627-661 | | CHIPS/Fed Wire Payment Name/Address 2 |
| WIRE PAY N/A 3 | ANS | 35 | 662-696 | | CHIPS/Fed Wire Payment Name/Address 3 |
| WIRE PAY N/A 4 | ANS | 35 | 697-731 | | CHIPS/Fed Wire Payment Name/Address 4 |
| FILLER | AN | 69 | 732-800 | | Filled with spaces |

ADDITIONAL NOTES:
Required Fields lists above for the Input Detail Records apply only for "Create", "Modify" and "Transfer" Actions. The fields required for "Close", and "Reactivate" are as follows:

CLOSE:

| FIELD NAME | TYPE | SZ | COLUMNS | REQUIRED | COMMENTS |
|---|---|---|---|---|---|
| DETAIL INDICATOR | N | 1 | 1 | * | Indicates File Header. Always must be "6" |
| PIC DETAIL ACTION | AN | 6 | 2-7 | * | CLOSE = deactivate a PIC |
| PIC IDENTIFIER | AN | 17 | 25-32 | * | Date update is effective Zeros assumes next business date Format is YYYYMMDD |
| FILLER | AN | 768 | 33-800 | | |

REACTIVATE:

| FIELD NAME | TYPE | SZ | COLUMNS | REQUIRED | COMMENTS |
|---|---|---|---|---|---|
| DETAIL INDICATOR | N | 1 | 1 | * | Indicates File Header. Always must be "6" |
| PIC DETAIL ACTION | AN | 6 | 2-7 | * | REACT—Reactivate a PIC |
| PIC IDENTIFIER | AN | 17 | 8-24 | * | Input will be zero filled for CREATE |
| UPDATE EFFECTIVE DATE | N | 8 | 25-32 | * | Date update is effective Zeros assumes next business date Format is YYYYMMDD |
| FILLER | AN | 768 | 33-80 | | |

INPUT FILE CONTROL

| FIELD NAME | TYPE | SZ | COLUMNS | REQUIRED | COMMENTS |
|---|---|---|---|---|---|
| CONTROL INDICATOR | N | 1 | 1 | * | Indicates File Control. Always must be "9" This is Last record on File. |
| TOTAL DETAIL RECORDS | AN | 793 | 8-800 | | |

TABLE 7

PIC OUTPUT LOAD FILE FORMAT:

| FIELD NAME | TYPE | SZ | COLUMNS | COMMENTS |
|---|---|---|---|---|
| OUTPUT FILE HEADER | | | | |
| HEADER INDICATOR | N | 1 | 1 | Indicates File Header. Always must be "1" |
| SENDING BANK R/T | N | 9 | 2-10 | IC&S Routing Transit Number |

TABLE 7-continued

PIC OUTPUT LOAD FILE FORMAT:

| FIELD NAME | TYPE | SZ | COLUMNS | COMMENTS |
|---|---|---|---|---|
| RECEIVING BANK R/T | N | 9 | 11-20 | R/T of Bank sending File |
| FILE CREATION DATE | N | 8 | 21-28 | Date File was created. Format YYYYMMDD |
| FILE MODIFIER | N | 2 | 29-30 | File Sequence Identifier |
| REJECTED FILE IND | N | 1 | 31 | Values: <br> 0—File was Accepted <br> 1—File was Rejected |
| REJECTED TEXT | AN | 50 | 32-71 | This will list the Error message if an input file is rejected |
| FILER | AN | 729 | 72-800 | |
| DETAIL INDICATOR | N | 1 | 1 | Indicates File Header. Always must be "6" |
| PIC DETAIL ACTION | AN | 6 | 2-7 | Valid values are <br> ACCEPT—PIC detail action request accepted by IC&S <br> ERROR—PIC detail action request denied, Associated text begins in column 751 |
| PIC INDETIFIER | AN | 17 | 8-24 | Zero filled for CREATE that was denied |
| UPDATE EFFECTIVE DATE | N | 8 | 25-32 | Date update is effective <br> Format YYYYMMDD |
| PIC STATUS | N | 2 | 33-34 | Valid Values: <br> "00"—Create request was deined <br> "01"—Open (Active) <br> "02"—Closed (Inactive) <br> "03"—Transfer in Process <br> "04"—Transfer being contested <br> "05"—Awaiting approval via Web <br> "06"—Request scheduled for Effective date to be Implemented <br> "99"—Suspended |
| EPN CAPABLE | N | 1 | 35 | Valid Values: <br> 0 = No 1 = Yes |
| CHIPS CAPABLE | N | 1 | 36 | Valid Values: <br> 0 = No 1 = Yes |
| BANK RT NUMBER | N | 9 | 37-45 | FED's rt for this bank, or Rt # for customers bank |
| DDA ACCOUNT NUMBER | AN | 34 | 46-79 | DDA account number EPN has maximum of 17 char (Left Justified) |
| TAXPAYER ID | AN | 12 | 80-91 | |
| NAME | ANS | 96 | 92-187 | Corporate or individual's name |
| ADDRESS 1 | ANS | 64 | 188-251 | First Address line |
| ADDRESS 2 | ANS | 64 | 252-315 | Second line of address <br> Required if Address 3 is present |
| ADDRESS 3 | ANS | 64 | 316-379 | Third line of address <br> Required if Address 4 is present |
| ADDRESS 4 | ANS | 64 | 380-443 | Fourth line of address |
| CITY | ANS | 32 | 444-475 | |
| STATE/PROV | ANS | 32 | 476-507 | |
| POSTAL CODE | AN | 11 | 508-518 | |
| COUNTRY | ANS | 3 | 519-521 | Values defined by ISO-3166 3-letter codes. |
| SIC BUSINESS CODE | N | 4 | 522-525 | Standard Industrial Classification codes |
| DUNS ID | AN | 10 | 526-535 | D&B D-U-N-S Numbers |
| BIC CODE | N | 11 | 536-546 | SWIFT BIC Code |
| BEI CODE | N | 11 | 547-557 | SWIFT Business Entity Identifier |
| IBAN CODE | N | 34 | 558-591 | International Bank Account Number |
| WIRE PAY N/A 1 | ANS | 35 | 592-628 | CHIPS/Fed Wire Payment Name/Address 1 |
| WIRE PAY N/A 2 | ANS | 35 | 627-661 | CHIPS/Fed Wire Payment Name/Address 2 |
| WIRE PAY N/A 3 | ANS | 35 | 662-696 | CHIPS/Fed Wire Payment Name/Address 3 |
| WIRE PAY N/A 4 | ANS | 35 | 697-731 | CHIPS/Fed Wire Payment Name/Address 4 |
| FILLER | AN | 19 | 732-750 | Filled with spaces |
| ERROR TEXT | AN | 50 | 751-800 | Text for error if detail record was rejected |
| OUTPUT FILE CONTROL | | | | |
| CONTROL INDICATOR | N | 1 | 1 | Indicates File Control. Always must be "9" This is Last record on File. |
| TOTAL DETAIL RECORDS | N | 6 | 2-7 | Total Number of Detail Records on File. |
| ACCEPTED RECORDS | N | 6 | 8-13 | Total number of PIC updates Accepted |
| REJECTED RECORDS | N | 6 | 14-19 | Total number of PIC updates Rejected |
| TOTAL RECORDS | N | 6 | 20-25 | Total Number of Records on File. Count of All records including Header, Details, and Control. |
| FILLER | AN | 775 | 26-800 | |

A Configuration File named PICBatchService.EXE.Config is also be included. This is an XML file that must be included in the same path as the executable program. Included in <App Settings> are elements for:
Connection String
Input File Path
Incoming Working Path
Temporary Output File Path
Output File Path for Connect Direct
Output File Path for SWIFT
File Titles for processing:
Input Batch Files:
Path—\"Input Path"\RT\Source\File Name
Input Path—From Configuration File
Source—Connect Direct=CD
  SWIFT=SWIFT
File Name—UINYYYYMMDD99.DAT
  Where: YYYYMMDD—File Creation Date
    99—File Sequence (Start 1 thru 99)
Output Batch Files:
Path—\"Output Path"\RT\Source\File Name
  Output Path—From Configuration File
  Source—Connect Direct=CD
    SWIFT=SWIFT
  File Name—UOUTYYYYMMDD99.DAT
    Where: YYYYMMDD—File Creation Date
      99—File Sequence (Start 1 thru 99)
Each file for an RT should have a unique Creation Date and Modifier.

There will be fields designated as required and optional Requests to "Close" and "Reactivate" will have a limited number of required fields.

Detail records requesting a "Transfer" will only be accepted if the entire file contains Transfer requests.

Output files will always return the entire PIC record.

These will be Binary files in ASCII format without CR & LF characters.

The IC&S RT will be used as the Receiving RT for incoming batch files and the Sending RT for Outgoing batch files.

A file that is not formatted properly will be rejected.
Possible file format errors include:
1. Missing File Header Record
2. Invalid Sending RT for File
3. Invalid Receiving RT for File
4. File Control is not last record
5. Total detail records on File Control is incorrect
Rejected files will be returned as an Output File with
1. Reject File Indicator of "I" and Error Text in Output File Header.
2. Accepted Records of 0 in Output File Control
3. Rejected Records count will be equal to Total Detail Records in File Control.

Detail errors will be designated by "ERROR" in the PIC Detail Action field of the Output batch file and added to the Rejected totals count.

Specific error text will be included as part of the Output File Format where noted.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed:

1. An electronic payment method, comprising:
providing a network that processes electronic payment transactions on behalf of a plurality of payees and a plurality of financial institutions, the network including at least one server;
receiving, via the network, a payment instruction that includes at least a first routing identifier and a payee-related identifier;
determining whether the first routing identifier included in the payment instruction includes a pseudo-code of routing information for a financial institution;
if the first routing identifier is determined to not include a pseudo-code of routing information for a financial institution, then transmitting a payment message based on the first routing identifier, the payment message including the payee-related identifier; and
if the first routing identifier is determined to include a pseudo-code of routing information for a financial institution, then:
performing rules to
determine whether the pseudo-code validates against a database including a table having a plurality of pseudo-codes and a plurality of payee-related sets of information,
if the pseudo-code is determined to be invalid, reject the payment instruction,
if the pseudo-code is determined to be valid, to select one of the plurality of payee-related sets corresponding to at least one of the pseudo-code and the payee-related identifier, each payee-related set of information including payee-related account identification information and a second routing identifier associated with a respective payee-related destination,
retrieve the payee-related account identification information and the second routing identifier of the set selected, the second routing identifier of the set selected being associated with a particular payee-related destination,
replace the payee-related identifier included in the payment instruction with the retrieved payee-related account identification information and replace the first routing identifier with the retrieved second routing identifier, and
transmit a payment message including the retrieved payee-related account identification information to the particular payee-related destination, based on the retrieved second routing identifier of the set selected, the payment message not including at least one of the payee-related identifier and the first routing identifier, and the payee-related account identification information not including the payee-related identifier,
wherein the pseudo-code includes a payment identification code, the payee-related account identification information of each payee-related set of information includes a corresponding encrypted bank account number, and the second routing identifier of each payee-related set of information includes a corresponding encrypted bank routing number.

2. A method according to claim 1, wherein the determining is performed by a payment system.

3. A method according to claim 2, wherein the payment system is an automated clearing house (ACH).

4. A method according to claim 2, wherein the payment system is a funds-transfer system.

5. A method according to claim 1, further comprising:
managing data stored at the database, the data including, for each set of payee-related information, at least one of a name and the second routing identifier of that set of payee-related information; and
generating an access request to the database for at least the second routing identifier of at least one set of payee-related information.

6. A method according to claim 5, wherein the database is a secure database of a trusted third party.

7. A method according to claim 1, further comprising providing an instruction to debit an account of a payor.

8. A method according to claim 1, wherein the particular payee-related destination is a first financial institution, and wherein a payee account is credited at at least one second financial institution.

9. A method according to claim 8, further comprising communicating between the first financial institution and the at least one second financial institution to effect crediting of the payee account.

10. A method according to claim 8, wherein each payment message also specifies a value representing an amount to be paid, and wherein a payee account is credited based on the value.

11. A method according to claim 1, wherein retrieving of the payee-related account identification information and the second routing identifier of the set selected is performed at a third party entity.

12. A method according to claim 1, further comprising validating the payee-related identifier against a database of codes.

13. A method according to claim 1, wherein the bank account number includes a bank account number of a payee account.

14. A method according to claim 1, wherein the pseudo-code of routing information does not identify a financial institution.

15. A method according to claim 1, wherein each second routing identifier is a routing number for an entity other than a payee financial institution.

16. A method according to claim 1, wherein the payment instruction is initiated from a payor.

17. A method according to claim 1, wherein the payment instruction is initiated from a financial institution.

18. A method according to claim 1, further comprising a payor providing the payee-related identifier to initiate the payment instruction.

19. A method according to claim 1, wherein the pseudo-code is a unique pseudo-code, and the payee-related identifier is a further unique pseudo-code.

20. An electronic payment system comprising:
a network that processes electronic payment transactions on behalf of a plurality of payees and a plurality of financial institutions, the network including at least one server;
a receiving unit that receives, via the network, a payment instruction that includes at least a first routing identifier and a payee-related identifier;
a determining unit that determines whether the first routing identifier included in the payment instruction includes a pseudo-code of routing information for a financial institution; and
a transmitting unit configured to
if the first routing identifier is determined to not include a pseudo-code of routing information for a financial institution, transmit a payment message based on the first routing identifier, the payment message including the payee-related identifier, and
if the first routing identifier is determined to include a pseudo-code of routing information for a financial institution, then:
performing rules to
determine whether the pseudo-code validates against a database including a table having a plurality of pseudo-codes and a plurality of payee-related sets of information,
if the pseudo-code is determined to be invalid, reject the payment instruction,
if the pseudo-code is determined to be valid, to select one of the plurality of payee-related sets corresponding to at least one of the pseudo-code and the payee-related identifier, each payee-related set of information including payee-related account identification information and a second routing identifier associated with a respective payee-related destination,
retrieve the payee-related account identification information and the second routing identifier of the set selected, the second routing identifier of the set selected being associated with a particular payee-related destination,
replace the payee-related identifier included in the payment instruction with the retrieved payee-related account identification information and replace the first routing identifier with the retrieved second routing identifier, and
transmit a payment message including the retrieved payee-related account identification information to the particular payee-related destination, based on the retrieved second routing identifier of the set selected, the payment message not including at least one of the payee-related identifier and the first routing identifier, and the payee-related account identification information not including the payee-related identifier,
wherein the pseudo-code includes a payment identification code, the payee-related account identification information of each payee-related set of information includes a corresponding encrypted bank account number, and the second routing identifier of each payee-related set of information includes a corresponding encrypted bank routing number.

21. A non-transitory computer readable medium having stored thereon sequences of instructions, the sequences of instructions including instructions which, when executed by a server, cause the server to perform a method comprising:
receiving, via a network, a payment instruction that includes at least a first routing identifier and a payee-related identifier;
determining whether the first routing identifier included in the payment instruction includes a pseudo-code of routing information for a financial institution;
if the first routing identifier is determined to not include a pseudo-code of routing information for a financial institution, then transmitting a payment message based on the first routing identifier, the payment message including the payee-related identifier; and if the first routing identifier is determined to include a pseudo-code of routing information for a financial institution, then:
performing rules to
determine whether the pseudo-code validates against a database including a table having a plurality of pseudo-codes and a plurality of payee-related sets of information,
if the pseudo-code is determined to be invalid, reject the payment instruction,
if the pseudo-code is determined to be valid, select one of the plurality of payee-related sets corresponding to at least one of the pseudo-code and the payee-related identifier, each payee-related set of information including payee-related account identification information and a second routing identifier associated with a respective payee-related destination,
retrieve the payee-related account identification information and the second routing identifier of the set selected, the second routing identifier of the set selected being associated with a particular payee-related destination,
replace the payee-related identifier included in the payment instruction with the retrieved payee-related account identification information and replace the first routing identifier with the retrieved second routing identifier of the set selected, and
transmit a payment message including the payee-related account identification information of the set selected to the particular payee-related destination, based on the retrieved second routing identifier of the set selected, the payment message not including at least one of the payee-related identifier and the first routing identifier, and the payee-related account identification information not including the payee-related identifier,
wherein the pseudo-code includes a payment identification code, the payee-related account information of each payee-related set of information includes a corresponding encrypted bank account number, and the second routing identifier of each payee-related set of information includes a corresponding encrypted bank routing number.

22. An apparatus comprising:
at least one memory storing a computer program; and
at least one server coupled to the at least one memory, and operating under control of the computer program stored in the at least one memory, to:
receive, via a network, a payment instruction that includes at least a first routing identifier and a payee-related identifier;
determine whether the first routing identifier included in the payment instruction includes a pseudo-code of routing information for a financial institution,
if the first routing identifier is determined to not include a pseudo-code of routing information for a financial institution, then transmit a payment message based on the first routing identifier, the payment message including the payee-related identifier, and
if the first routing identifier is determined to include a pseudo-code of routing information for a financial institution, then:
performing rules to
determine whether the pseudo-code validates against a database including a table having a plurality of pseudo-codes and a plurality of payee-related sets of information,
if the pseudo-code is determined to be invalid, reject the payment instruction,
if the pseudo-code is determined to be valid, select one of the plurality of payee-related sets corresponding to at least one of the pseudo-code and the payee-related identifier, each payee-related set of information including payee-related account identification information and a second routing identifier associated with a respective payee-related destination,
retrieve the payee-related account identification information and the second routing identifier of the set selected, the second routing identifier of the set selected being associated with a particular payee-related destination,
replace the payee-related identifier included in the payment instruction with the retrieved payee-related account identification information and replace the first routing identifier with the retrieved second routing identifier, and
transmit a payment message including the retrieved payee-related account identification information to the particular payee-related destination, based on the retrieved second routing identifier of the set selected, the payment message not including at least one of the payee-related identifier and the first routing identifier, and the payee-related account identification information not including the payee-related identifier,
wherein the pseudo-code includes a payment identification code, the payee-related account information of each payee-related set of information includes a corresponding encrypted bank account number, and the second routing identifier of each payee-related set of information includes a corresponding encrypted bank routing number.

23. An apparatus according to claim 22, wherein the at least one server is associated with an automated clearing house (ACH).

24. An apparatus according to claim 22, wherein the at least one server is associated with a funds-transfer system.

25. An apparatus according to claim 22, wherein the at least one server also operates under control of the computer program to:
manage data stored at a database, the data including at least one of a name and the second routing identifier of the set selected; and
generate an access request to the database for at least the second routing identifier of at least one set of payee-related information.

26. An apparatus according to claim 25, wherein the database is a secure database of a trusted third party.

27. An apparatus according to claim 22, wherein the at least one server also operates under control of the computer program to provide an instruction to debit a payor account.

28. An apparatus according to claim 22, wherein the particular payee-related destination is a first financial institution, and wherein a payee account is credited at at least one second financial institution.

29. An apparatus according to claim 28, wherein the first financial institution and the second financial institution communicate to effect crediting of the payee account.

30. An apparatus according to claim 28, wherein each payment message also specifies a value representing an amount to be paid, and wherein a payee account is credited based on the value.

31. An apparatus according to claim 22, wherein retrieval of the payee-related account identification information includes accessing such information via a third party entity.

32. An apparatus according to claim 22, wherein the at least one server also operates under control of the computer program to validate the payee-related identifier against a database of codes.

33. An apparatus according to claim 22, wherein the corresponding bank account number includes at least a payee-related account number.

34. An apparatus according to claim 22, wherein the pseudo-code of routing information does not identify a financial institution.

35. An apparatus according to claim 22, wherein each second routing identifier is a routing number for an entity other than a payee-related financial institution.

36. An apparatus according to claim 22, wherein the pseudo-code is a pseudo-routing number, and the payee-related identifier is a pseudo-account number.

37. The method of claim 1, further comprising performing a validation of a bank profile.

\* \* \* \* \*